US009037513B2

(12) United States Patent
Rosenblatt et al.

(10) Patent No.: US 9,037,513 B2
(45) Date of Patent: May 19, 2015

(54) SYSTEM AND METHOD FOR PROVIDING ELECTRONIC EVENT TICKETS

(75) Inventors: Michael Rosenblatt, Campbell, CA (US); Andrew Hodge, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1578 days.

(21) Appl. No.: 12/286,446

(22) Filed: Sep. 30, 2008

(65) Prior Publication Data
US 2010/0082491 A1    Apr. 1, 2010

(51) Int. Cl.
| G06Q 20/00 | (2012.01) |
| G06Q 30/00 | (2012.01) |
| G06Q 10/02 | (2012.01) |
| G06Q 20/10 | (2012.01) |
| G06Q 20/36 | (2012.01) |
| G06Q 30/02 | (2012.01) |

(52) U.S. Cl.
CPC .............. *G06Q 30/00* (2013.01); *G06Q 10/02* (2013.01); *G06Q 20/10* (2013.01); *G06Q 20/367* (2013.01); *G06Q 30/0237* (2013.01); Y10S 902/02 (2013.01)

(58) Field of Classification Search
USPC ........................................................ 705/64
See application file for complete search history.

(56) References Cited

U.S. PATENT DOCUMENTS

| 4,701,601 A | 10/1987 | Francini et al. |
| 4,868,376 A | 9/1989 | Lessin et al. |
| 4,929,819 A | 5/1990 | Collins, Jr. |
| 5,239,167 A | 8/1993 | Kipp |
| 5,276,311 A | 1/1994 | Hennige |
| 5,540,301 A | 7/1996 | Dumont |
| 5,917,913 A | 6/1999 | Wang |

(Continued)

FOREIGN PATENT DOCUMENTS

| EP | 1331561 A2 | 7/2003 |
| WO | 02/08863 A2 | 1/2002 |

(Continued)

OTHER PUBLICATIONS

NFC Forum; Near Field Communication and the NFC Forum: The Keys to Truly Interoperable Communications; http://www.nfc-forum.org/resources/white_papers/nfc_forum_marketing_white_paper.pdf ; Wakefield, MA, USA 2007.

(Continued)

*Primary Examiner* — James A Reagan
(74) *Attorney, Agent, or Firm* — Novak Druce Connolly Bove + Quigg LLP

(57) ABSTRACT

Systems, methods, and devices for providing and managing electronic event tickets are provided. For example, a device for managing an electronic event ticket may include a processor configured to run an electronic ticket management application, a memory device configured to store data associated with the electronic ticket management application, an electronic display configured to display at least a portion of the data associated with the electronic ticket management application, and an input/output interface configured to receive an electronic ticket and the data associated with the electronic ticket for management by the electronic ticket management application. The electronic ticket management application may be configured to enable the electronic device to gain entry to an event and to obtain at least one other event-related benefit after the electronic ticket is received by the input/output interface.

42 Claims, 83 Drawing Sheets

(56) References Cited

U.S. PATENT DOCUMENTS

| | | |
|---|---|---|
| 6,175,922 B1 | 1/2001 | Wang |
| 6,400,270 B1 | 6/2002 | Person |
| 6,473,790 B1 | 10/2002 | Tagi |
| 6,684,269 B2 | 1/2004 | Wagner |
| 6,694,387 B2 | 2/2004 | Wagner |
| 6,823,075 B2 | 11/2004 | Perry |
| 6,910,697 B2 | 6/2005 | Varatharajah et al. |
| 7,014,116 B2 | 3/2006 | Craig et al. |
| 7,044,362 B2 | 5/2006 | Yu |
| 7,089,214 B2 | 8/2006 | Wang |
| 7,128,274 B2 | 10/2006 | Kelley et al. |
| 7,149,503 B2 | 12/2006 | Aarnia et al. |
| 7,216,109 B1 * | 5/2007 | Donner ............................. 705/64 |
| 7,240,036 B1 | 7/2007 | Mamdani et al. |
| 7,316,347 B2 | 1/2008 | Poor |
| 7,334,728 B2 | 2/2008 | Williams |
| 7,359,714 B2 | 4/2008 | Parupudi et al. |
| 7,376,591 B2 | 5/2008 | Owens |
| 7,392,226 B1 | 6/2008 | Sasaki et al. |
| 7,464,050 B1 | 12/2008 | Deaton et al. |
| 7,603,321 B2 | 10/2009 | Gurvey |
| 7,995,770 B1 | 8/2011 | Simon |
| 8,191,787 B2 | 6/2012 | Kuchen et al. |
| 8,209,241 B2 | 6/2012 | Gibson et al. |
| 8,290,174 B1 | 10/2012 | Simon |
| 8,478,304 B1 | 7/2013 | David et al. |
| 8,494,967 B2 | 7/2013 | Bergdale et al. |
| 2002/0077983 A1 | 6/2002 | Tagashira |
| 2002/0082931 A1 | 6/2002 | Siegel et al. |
| 2002/0178088 A1 | 11/2002 | Lurie et al. |
| 2002/0198789 A1 | 12/2002 | Waldman |
| 2003/0050854 A1 | 3/2003 | Showghi et al. |
| 2003/0069762 A1 | 4/2003 | Gathman et al. |
| 2003/0069827 A1 | 4/2003 | Gathman et al. |
| 2003/0076963 A1 | 4/2003 | Wells |
| 2003/0097307 A1 | 5/2003 | Greene et al. |
| 2003/0109246 A1 | 6/2003 | Shimizu et al. |
| 2003/0220813 A1 | 11/2003 | Gurvey |
| 2004/0203352 A1 | 10/2004 | Hall et al. |
| 2004/0203636 A1 | 10/2004 | Chan et al. |
| 2005/0027608 A1 | 2/2005 | Wiesmuller et al. |
| 2005/0109841 A1 * | 5/2005 | Ryan et al. ............... 235/380 |
| 2005/0116027 A1 | 6/2005 | Aigiene et al. |
| 2005/0125343 A1 | 6/2005 | Mendelovich |
| 2005/0131871 A1 | 6/2005 | Howard et al. |
| 2005/0222961 A1 | 10/2005 | Staib et al. |
| 2006/0063563 A1 | 3/2006 | Kaufman |
| 2006/0104600 A1 | 5/2006 | Abrams |
| 2006/0111944 A1 | 5/2006 | Sirmans et al. |
| 2006/0173701 A1 | 8/2006 | Gurvey |
| 2006/0213972 A1 | 9/2006 | Kelley et al. |
| 2006/0243609 A1 | 11/2006 | Cole et al. |
| 2006/0266822 A1 | 11/2006 | Kelley et al. |
| 2006/0287004 A1 | 12/2006 | Fuqua |
| 2007/0022058 A1 | 1/2007 | Labrou et al. |
| 2007/0043670 A1 | 2/2007 | Dionne |
| 2007/0043678 A1 | 2/2007 | Dionne |
| 2007/0150369 A1 | 6/2007 | Zivin |
| 2007/0156443 A1 | 7/2007 | Gurvey |
| 2007/0175979 A1 | 8/2007 | Yokota et al. |
| 2007/0190939 A1 | 8/2007 | Abel |
| 2007/0205275 A1 | 9/2007 | Nicola et al. |
| 2007/0228179 A1 | 10/2007 | Atkinson |
| 2007/0235539 A1 | 10/2007 | Sevanto et al. |
| 2007/0255652 A1 | 11/2007 | Tumminaro et al. |
| 2007/0265033 A1 | 11/2007 | Brostrom |
| 2007/0278290 A1 | 12/2007 | Messerges et al. |
| 2008/0005195 A1 | 1/2008 | Li |
| 2008/0052243 A1 | 2/2008 | Narayanaswami et al. |
| 2008/0059323 A1 | 3/2008 | Cheng et al. |
| 2008/0113614 A1 | 5/2008 | Rosenblatt |
| 2008/0147557 A1 | 6/2008 | Sheehy |
| 2008/0154623 A1 | 6/2008 | Derker et al. |
| 2008/0154734 A1 | 6/2008 | Fernandez et al. |
| 2010/0082491 A1 | 4/2010 | Rosenblatt et al. |
| 2010/0257000 A1 | 10/2010 | Harris |
| 2011/0252103 A1 | 10/2011 | Beyer et al. |
| 2012/0072943 A1 | 3/2012 | Pan |
| 2012/0140275 A1 | 6/2012 | Fukuda |
| 2012/0221474 A1 | 8/2012 | Eicher et al. |

FOREIGN PATENT DOCUMENTS

| | | |
|---|---|---|
| WO | 2008/112497 A1 | 9/2008 |
| WO | 2009/018255 A2 | 2/2009 |

OTHER PUBLICATIONS

Near Field Communication in the real world part I; Turning the NFC promise into profitable, everyday applications; http://www.nfc-forum.org/resources/white_papers/Innovision_whitePaper1.pdf ; Innovation Research & Technology plc; Gloucestershire; United Kingdom.

Near Field Communication in the real world part II, Using the right NFC tag type for the right NFC application; http://www.nfc-forum.org/resources/white_papers/Innovision_whitePaper2.pdf ; Innovation Research & Technology plc; Gloucestershire, United Kingdom.

Near Field Communication in the real world part III, Moving to System on Chip (SoC) integration; http://www.nfc-forum.org/resources/white_papers/Innovision_whitePaper3.pdf ; Innovation Research & Technology plc; Gloucestershire, United Kingdom 2007.

Ricker, Thomas; Nokia's 6212 with Bluetooth NFC: Let the pairing revolution begin!; http://www.engadget.com/2008/04/15/nokias-6212-with-bluetooth-nfc-let-the-pairing-revolution-begi/ ; Engadget; 2008.

NFC trial in NYC enables merchant and transit payment via cell phones; Citi/ATT/MasterCard/Nokia run trial in NYC with MTA et al.; http://www.contactlessnews.com/2006/12/14/nfc-trial-in-nyc-enables-merchant-and-transit-payments-via-cell-phones ; Contactless News; 2006.

Port Authority, NJ Transit to test contactless cards; Port Authority/NJ Transit run compatible trial with NYC;http://www.contactlessnews.com/2008/02/25/port-authority-nj-transit-to-test-contactless-cards/ ; Contactless News 2008.

Bart NFC trial first to use mobile phones to pay for fares, food; Bart et al. run trial for automated food and transit payments; http://www.contactlessnews.com/2008/01/29/bart-nfc-trial-first-to-use-mobile-phones-to-pay-for-fares-food/ ; Contactless News 2008.

New NFC trial launched in Spokane; U.S. Bank/MasterCard run trial in Spokane, WA; http://www.contactlessnews.com/2008/01/28/new-nfc-trial-launched-in-spokane/ ; Contactless News 2008.

Ticketmaster UK & Live Nation Introduce State of the Art Access Control in Live Nation Theatres; Ticketmaster Press Release; Jul. 28, 2008.

Mobiqa; Mobile barcode solutions; Where Would You Like to Go?: http://www.mobiqa.com.

Mobiqa Airlines; Mobilising the business: http://www.mobiqa.com/airlines.

Mobiqa Cinema; mobi-ticket™—coming to a cinema near you: http://www.mobiqa.com/cinema.

Mobiqa Live Events; mobi-ticket™—let me entertain you: http://www.mobiqa.com/live.

Mobiqa Rail; Keep on track with mobi-ticket™: http://www.mobiqa.com/rail.

Mobiqa Retail; Shop for success with mobi-coupon™: http://www.mobiqa.com/retail.

K. Penttila, et al.; "Use and interface definition of mobile RFID reader integrated in a smart phone," Consumer Electronics, 2005, Proceedings of the 9th International Symposium on Macau SAR, Jun. 14-16, 2005, IEEE, Jun. 14, 2005, pp. 353-358.

Nokia, "Near Field Communication", White Paper, published Dec. 3, 2007.

DX Presentation (along with English translations), available at http://www.filmweb.no/filmogkino/multimedia/archive/00121/dxpresentasjon_121515a.pdf; includes translation confirmation. (Nov. 13, 2007).

Letter from Steven M. Hertzberg, Abelman, Frayne & Schwab, 666 Third Avenue, New York, NY 10017, representing unknown third-party, Dated Jul. 12, 2010, pp. 1-3, and claim chart (7 pgs.).

* cited by examiner

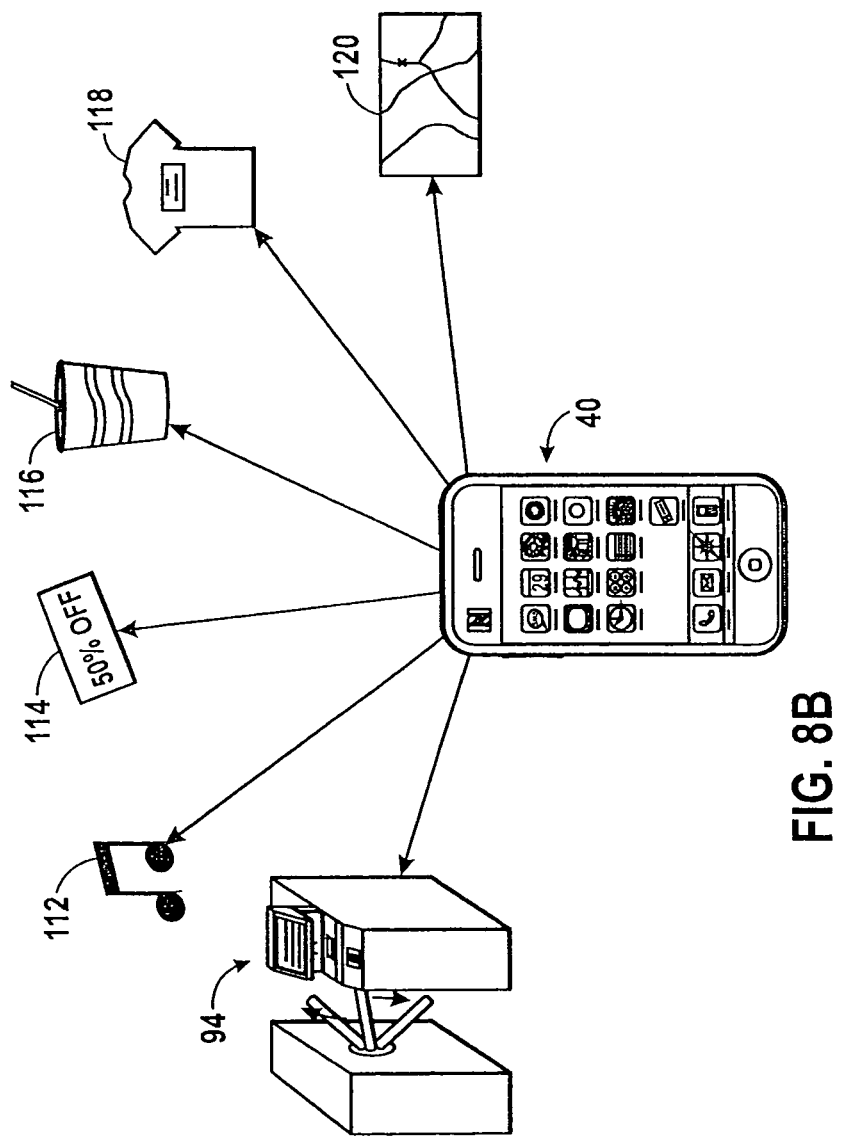

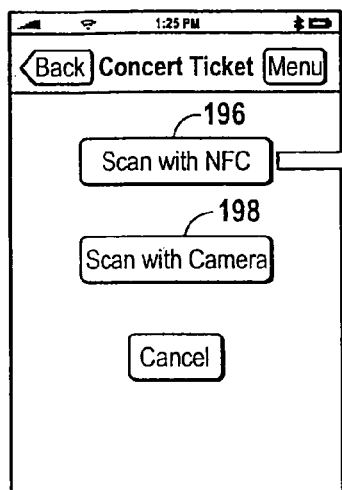
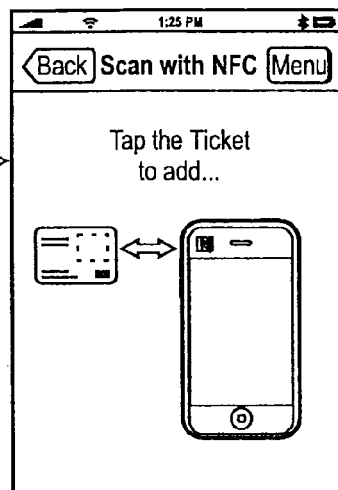
FIG. 12E　　　　　FIG. 12F
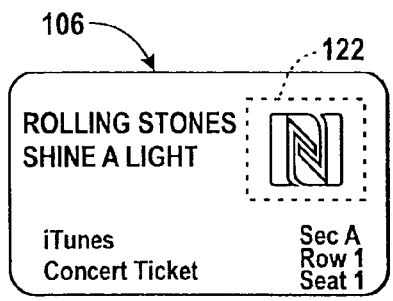
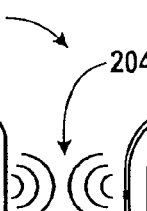
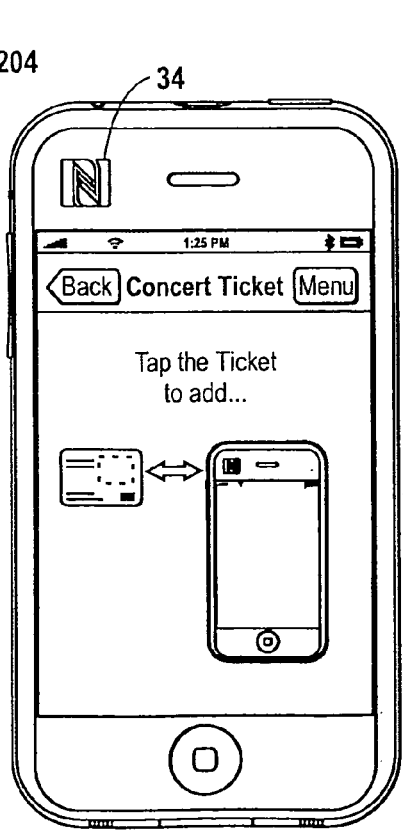
FIG. 13

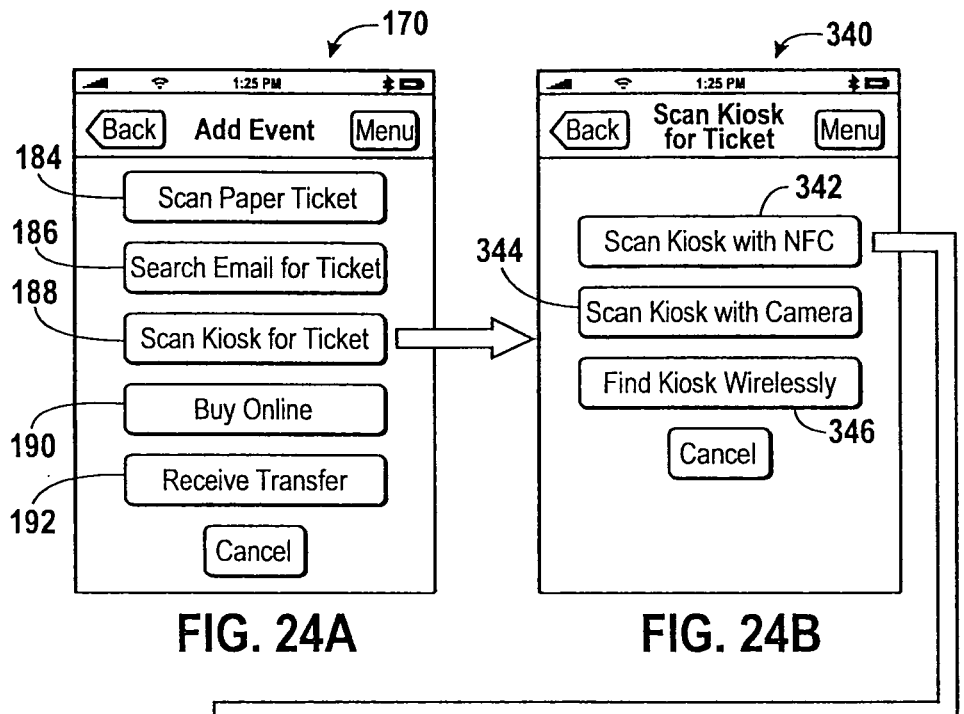
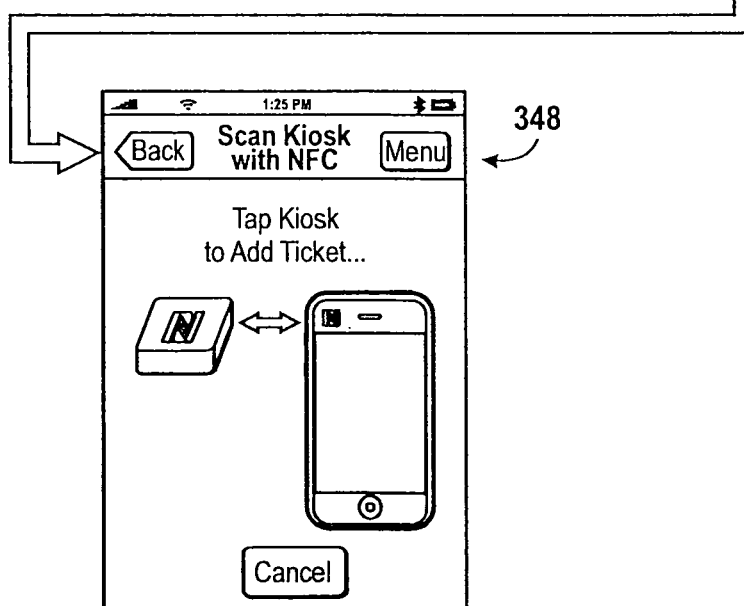
FIG. 24A   FIG. 24B
FIG. 24C

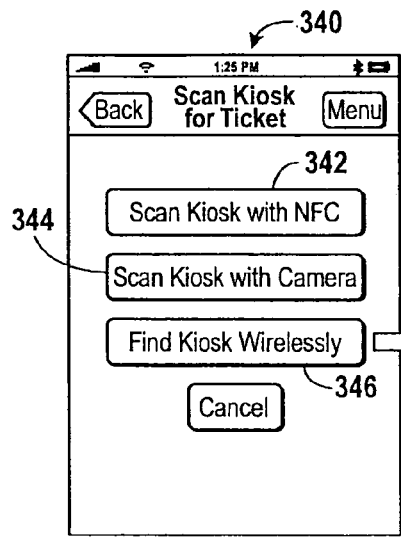
FIG. 36A
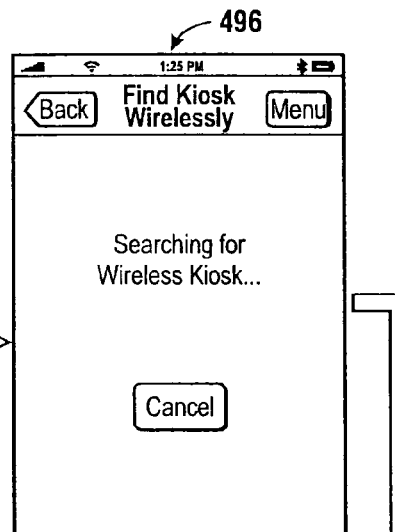
FIG. 36B
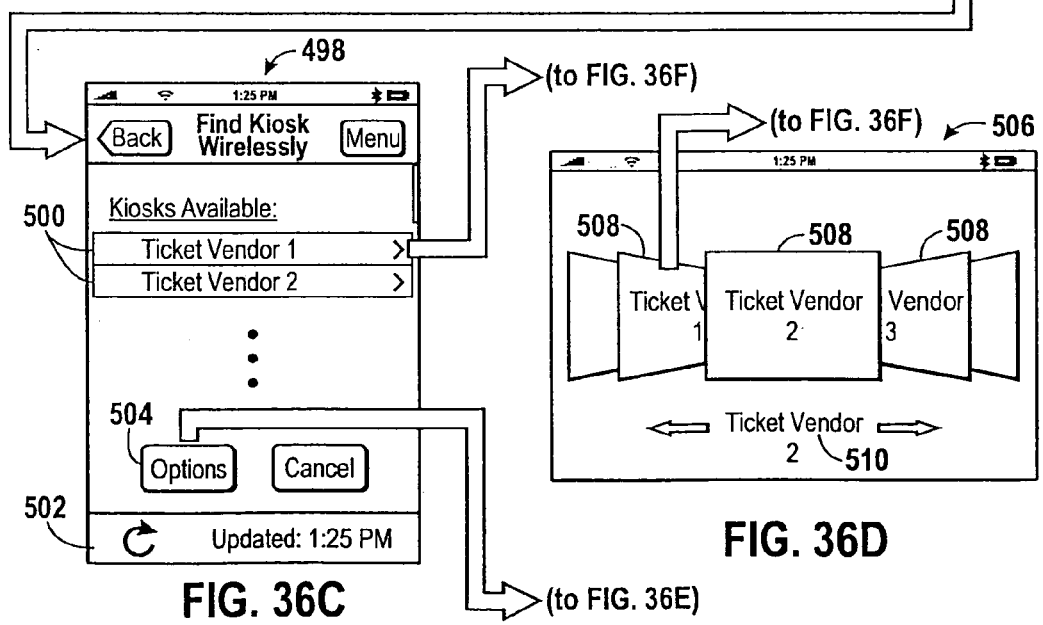
FIG. 36C
FIG. 36D

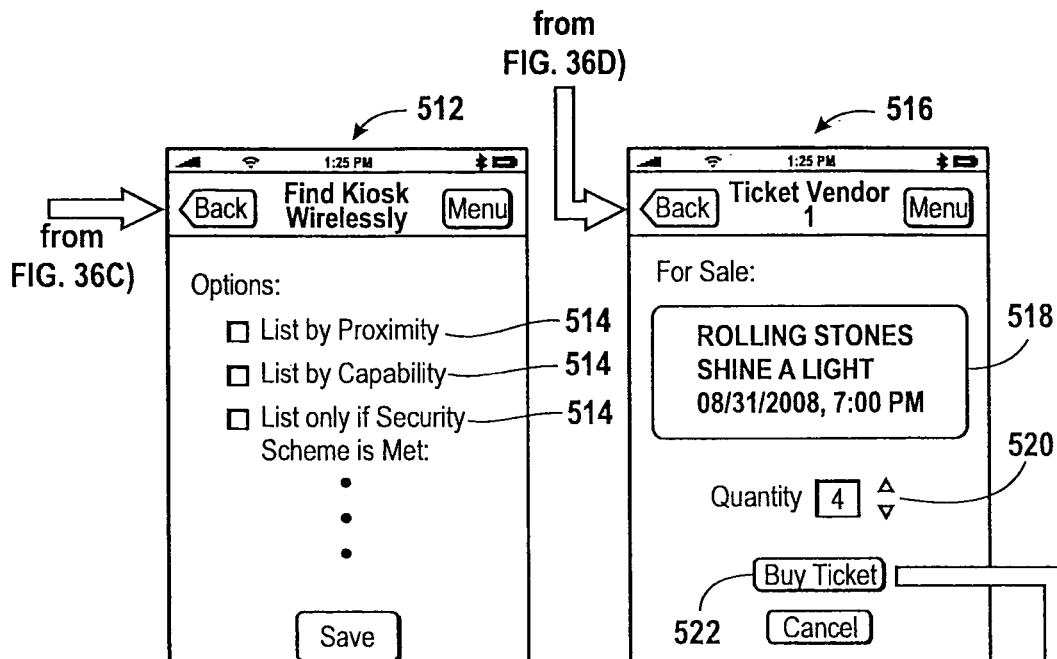
FIG. 36E
FIG. 36F
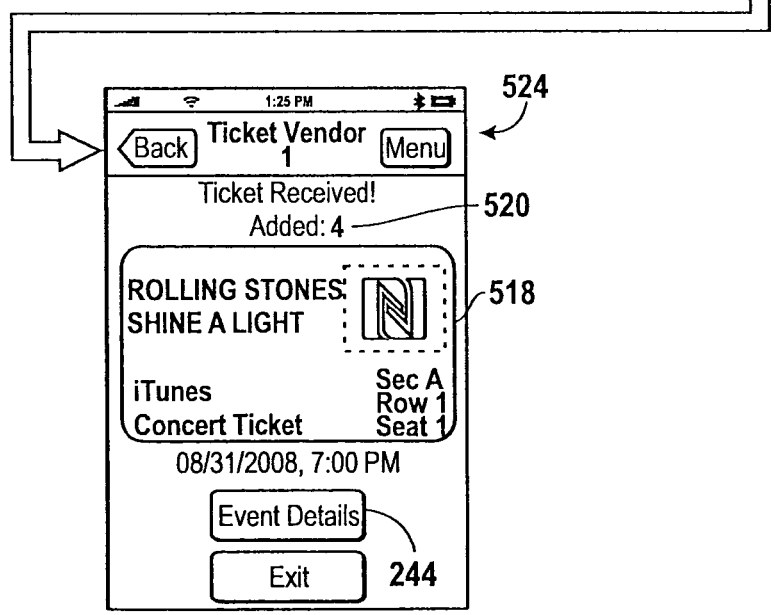
FIG. 36G

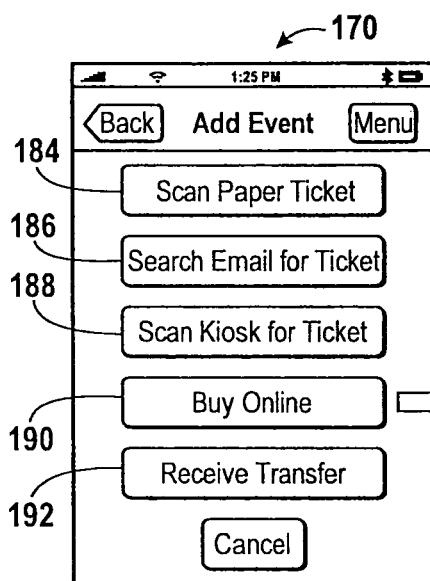
FIG. 37A
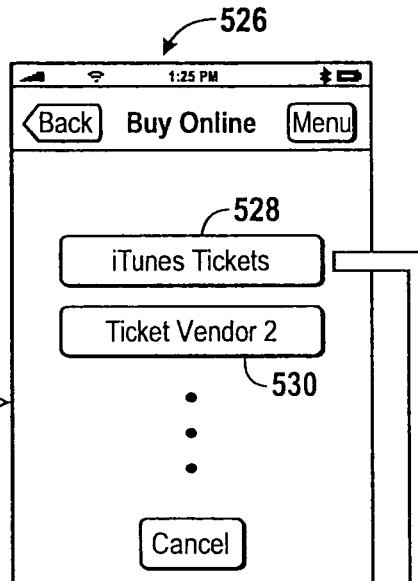
FIG. 37B
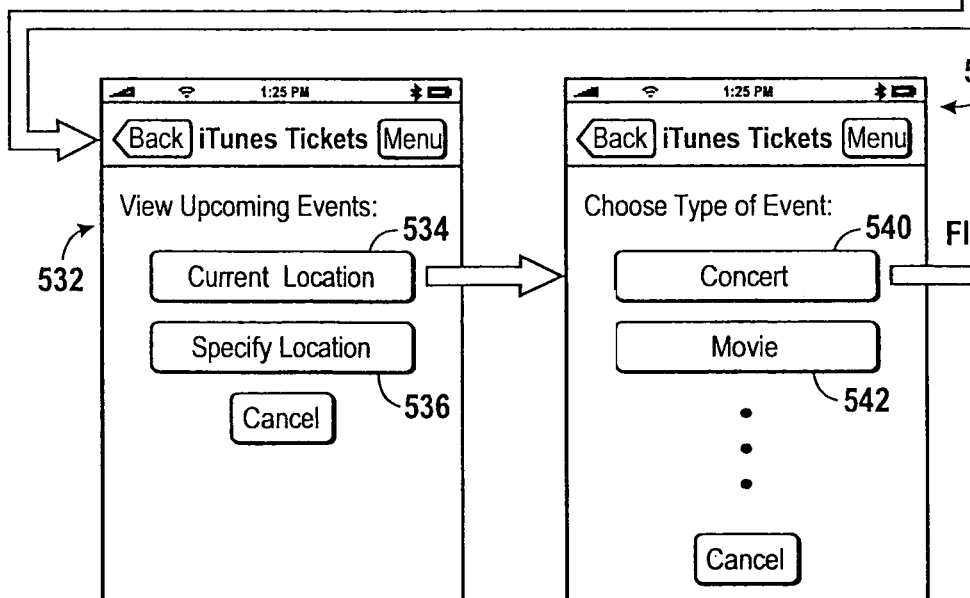
FIG. 37C
FIG. 37D

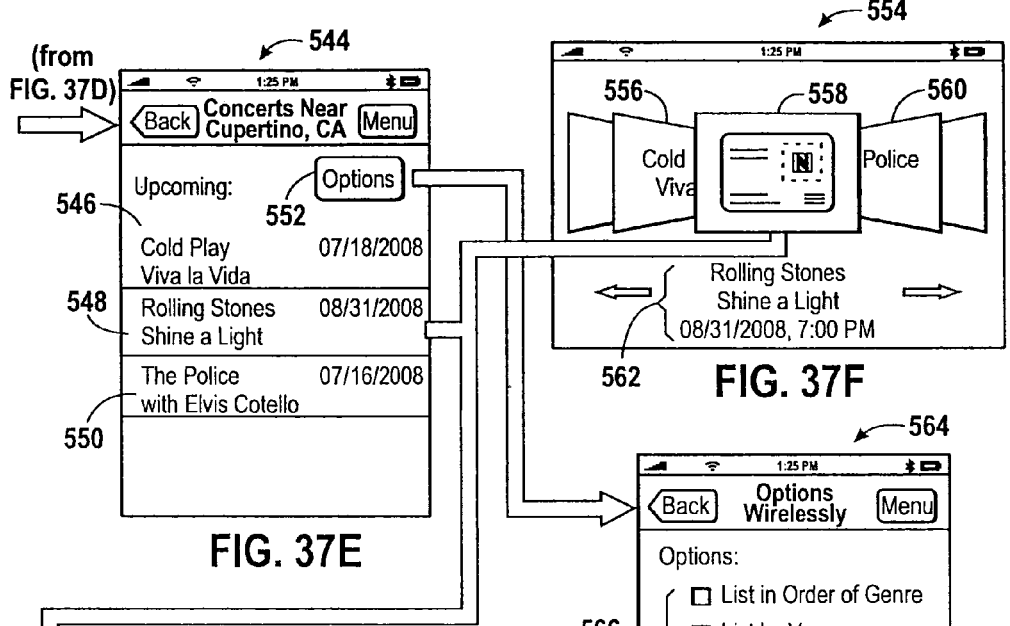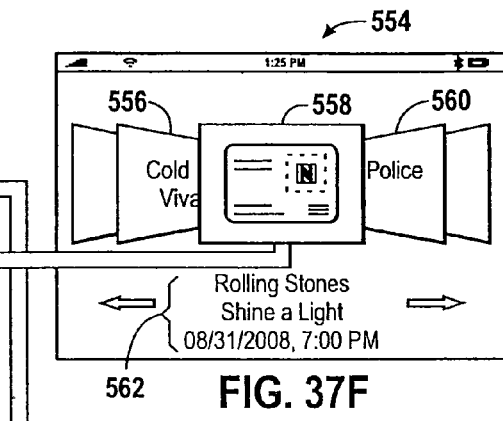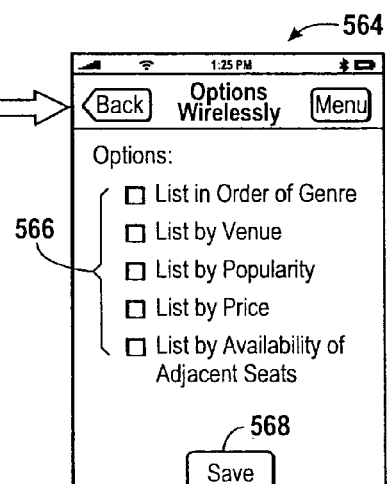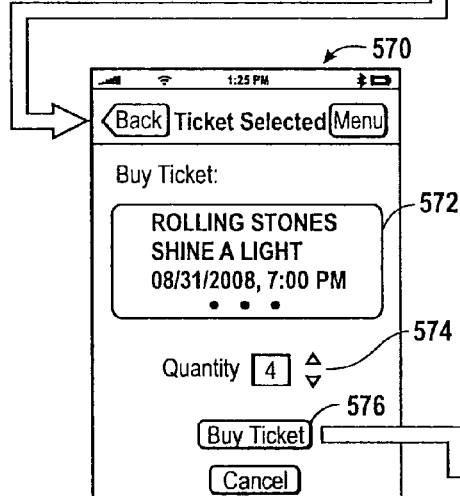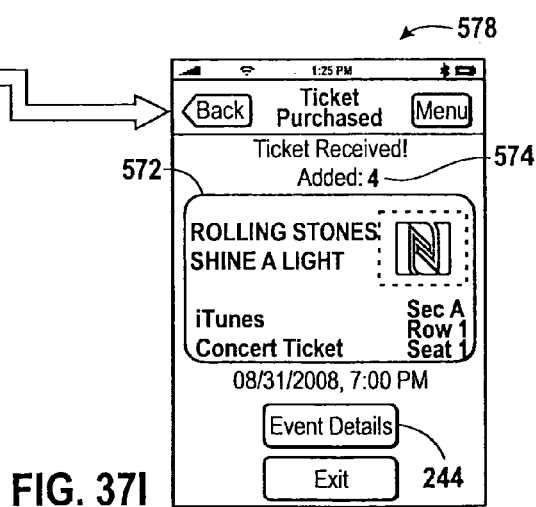
FIG. 37E
FIG. 37F
FIG. 37G
FIG. 37H
FIG. 37I

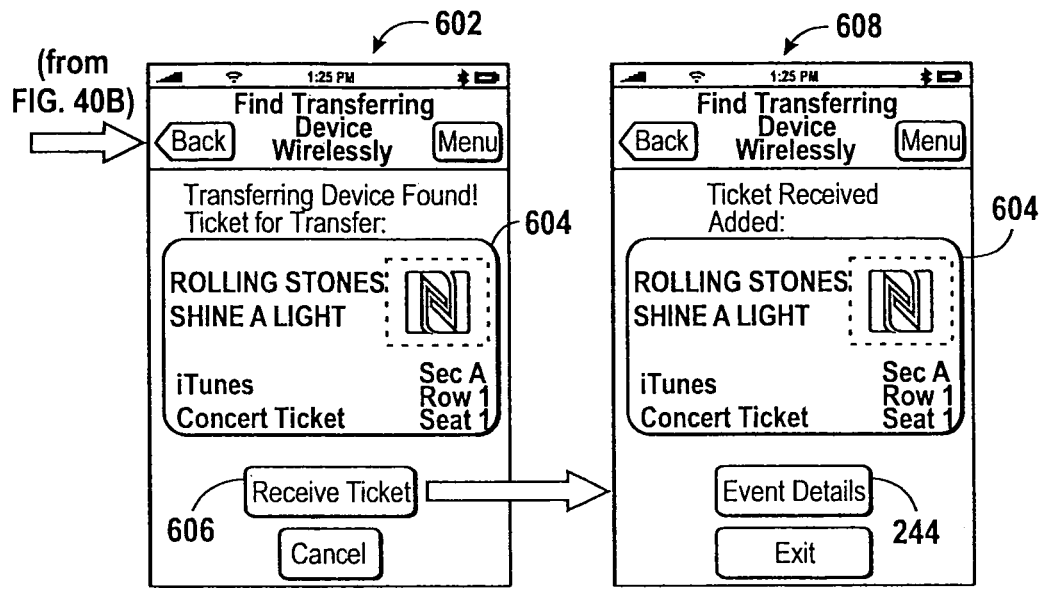
FIG. 40C     FIG. 40D
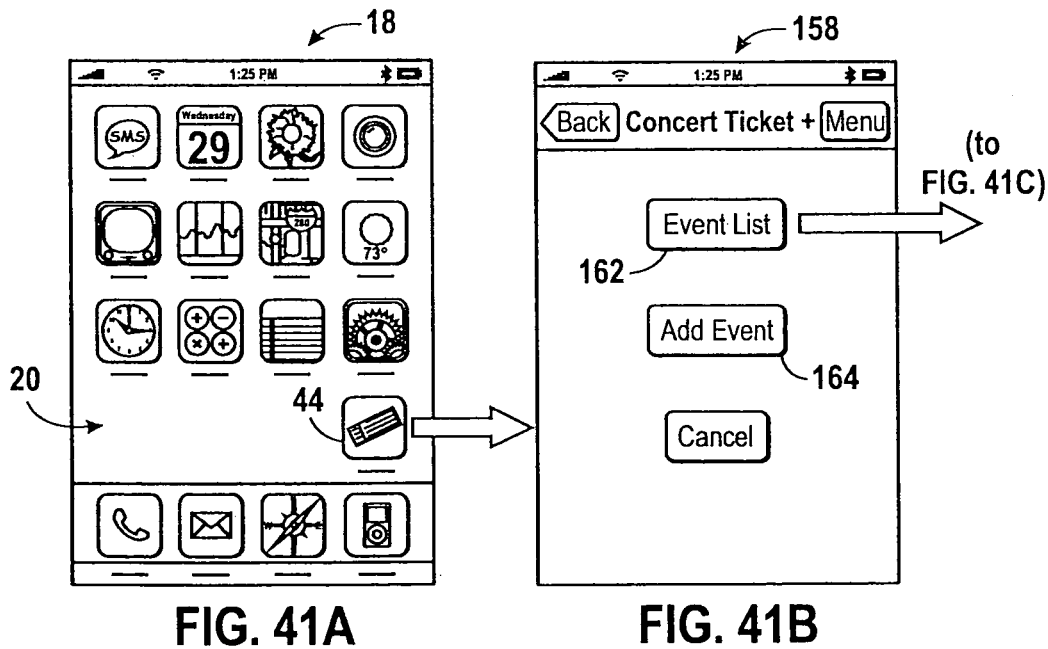
FIG. 41A     FIG. 41B

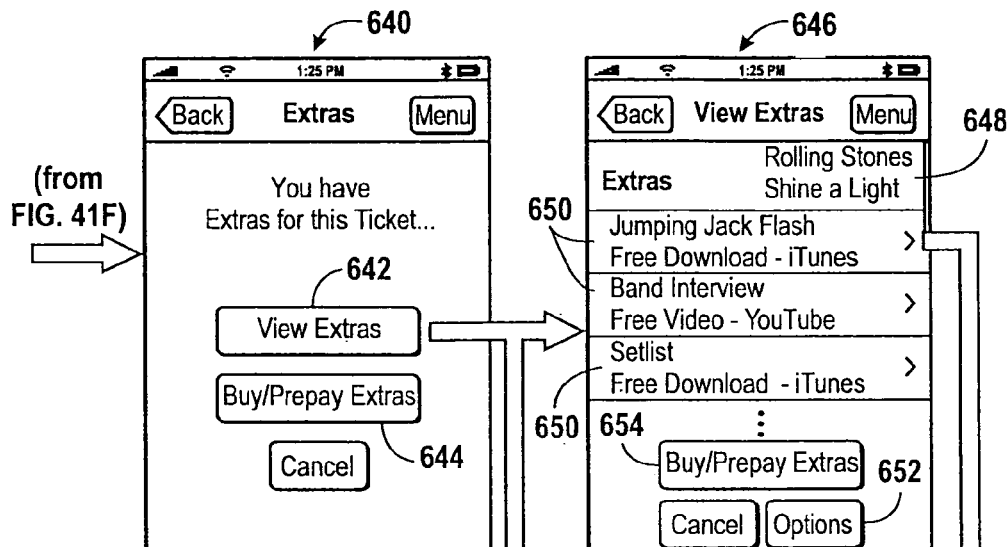
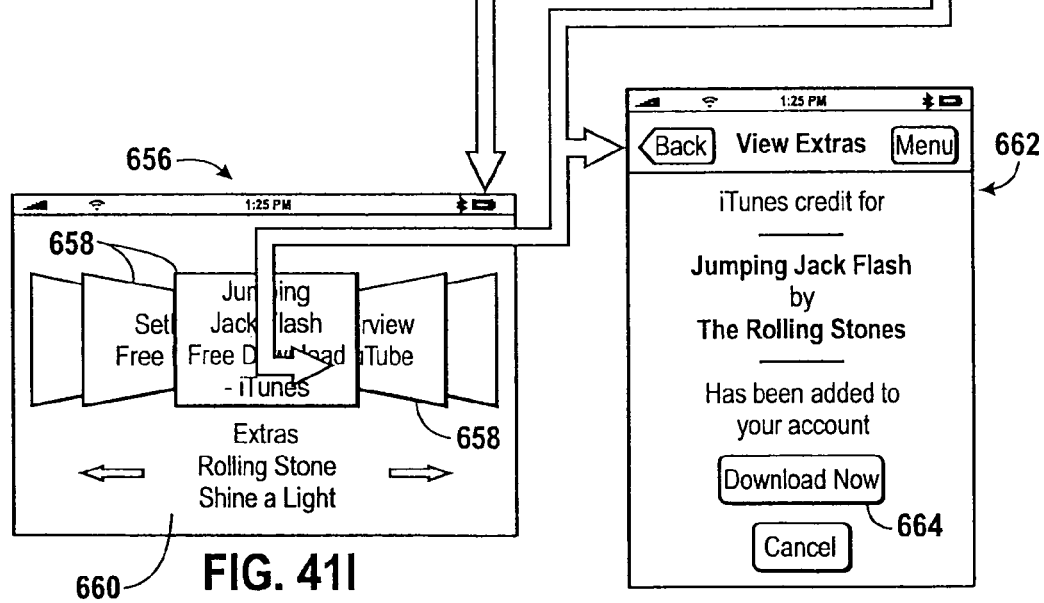
FIG. 41G  FIG. 41H  FIG. 41I  FIG. 41J

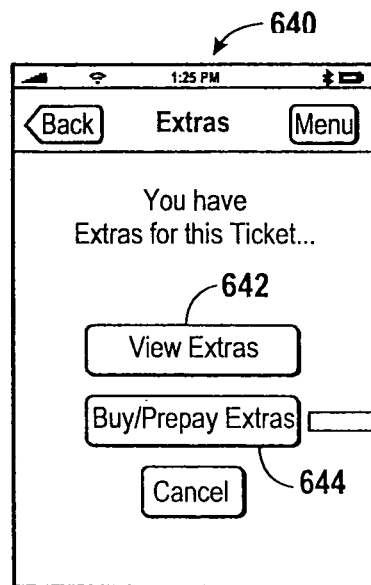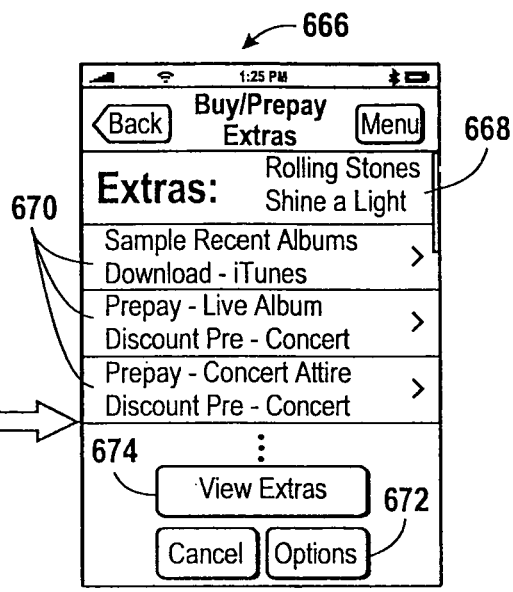
FIG. 42A  FIG. 42B
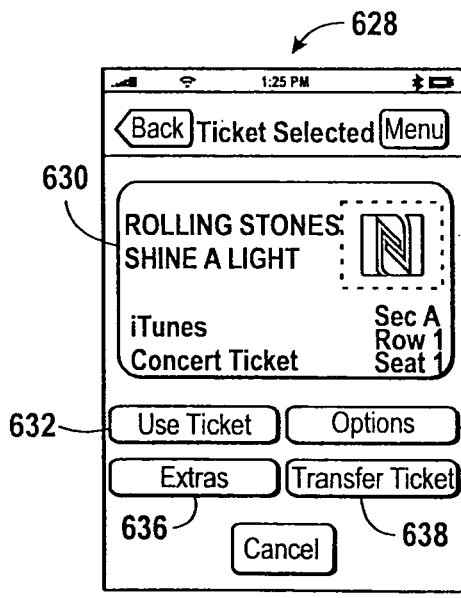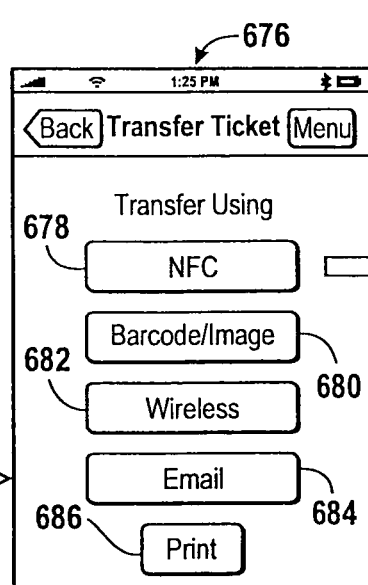
FIG. 43A  FIG. 43B

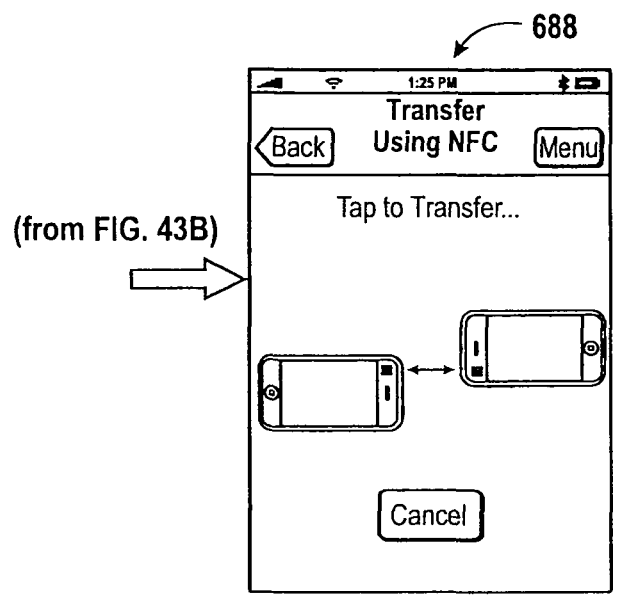
FIG. 43C
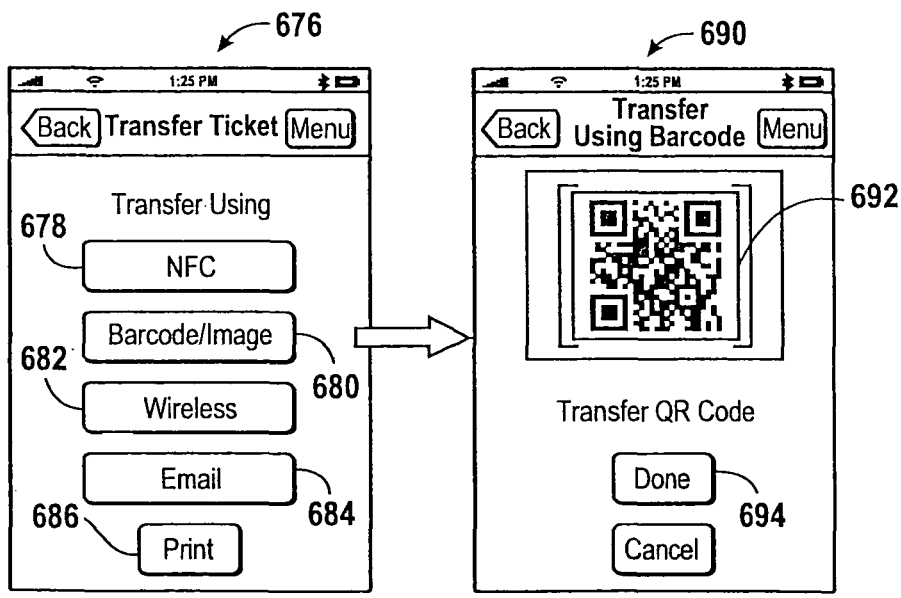
FIG. 44A  FIG. 44B

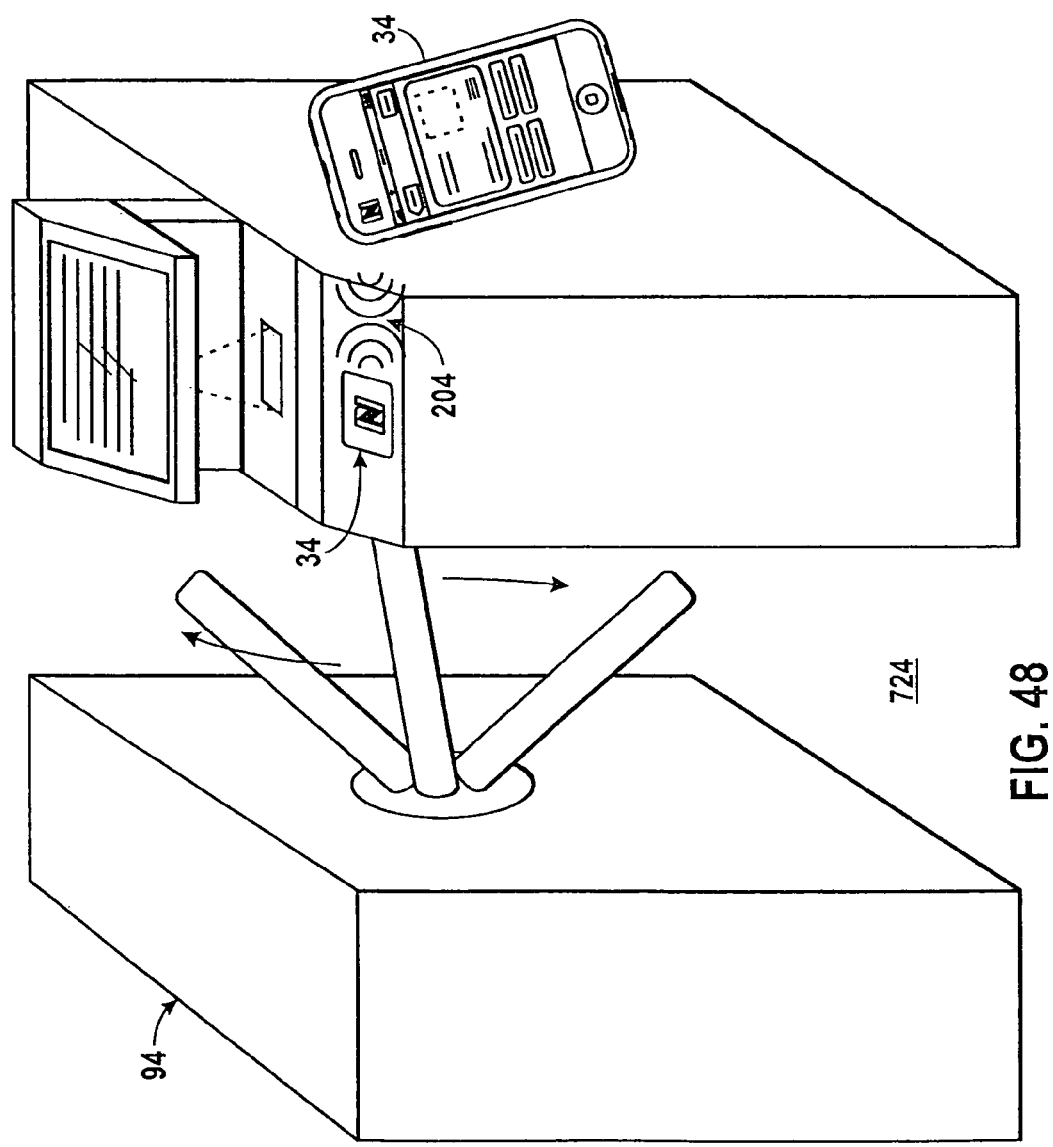

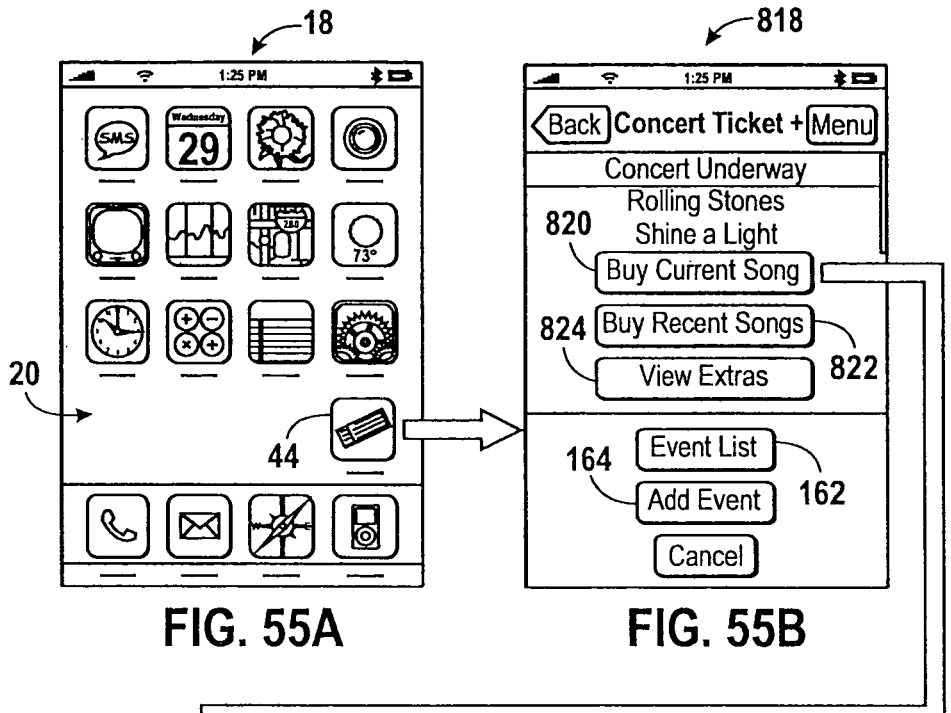
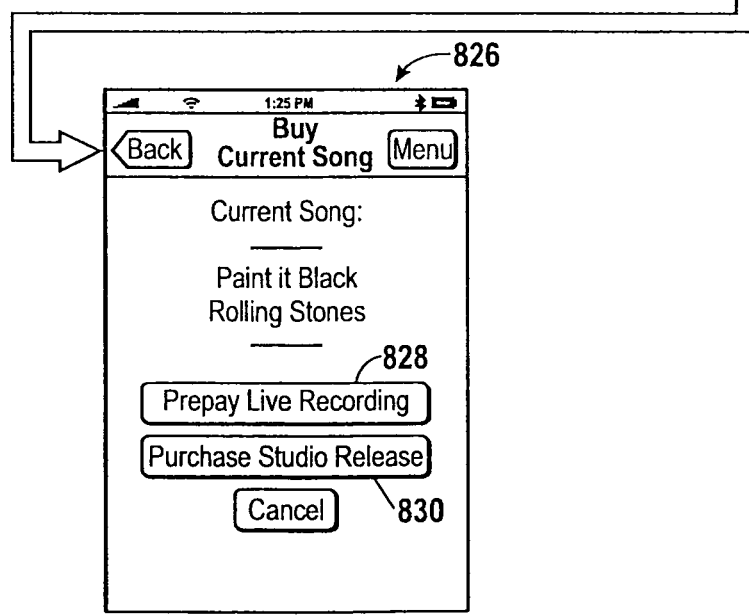
FIG. 55A  FIG. 55B
FIG. 55C

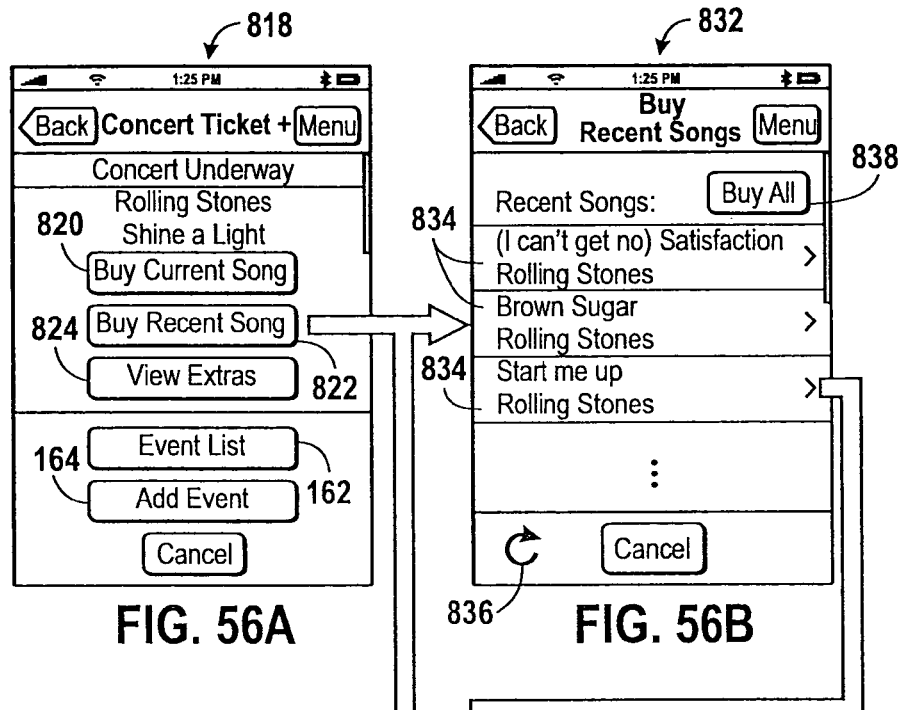
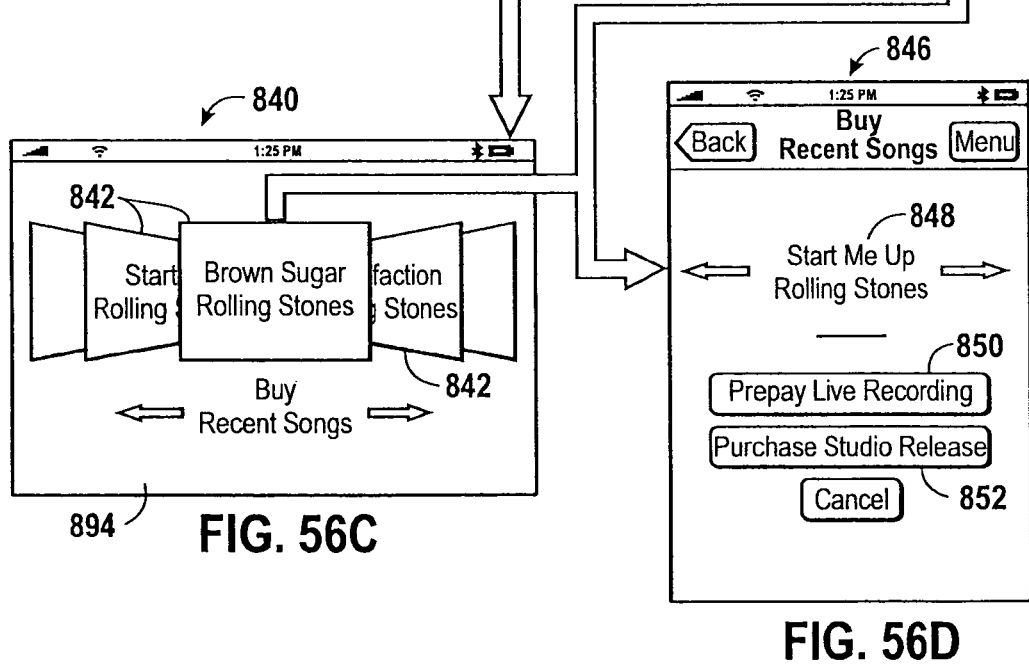
FIG. 56A  FIG. 56B  FIG. 56C  FIG. 56D (to FIG. 67E and 67F)

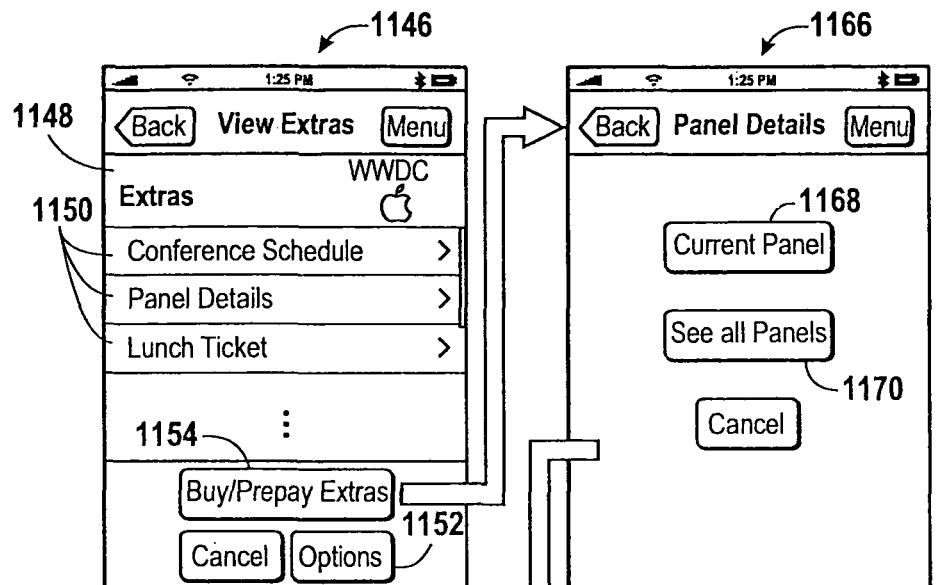
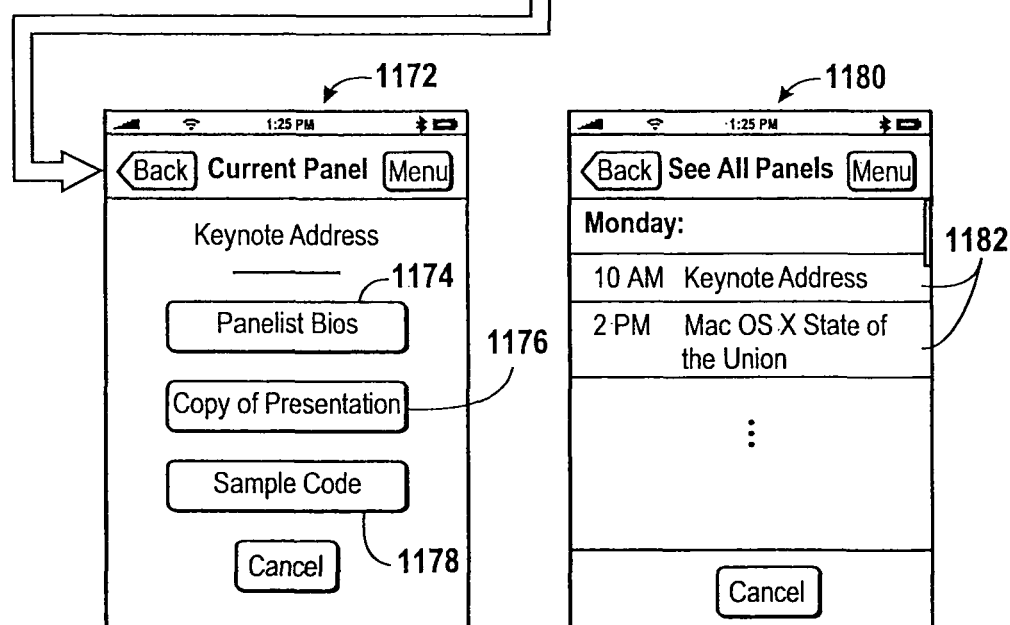
FIG. 74A  FIG. 74B  FIG. 74C  FIG. 74D

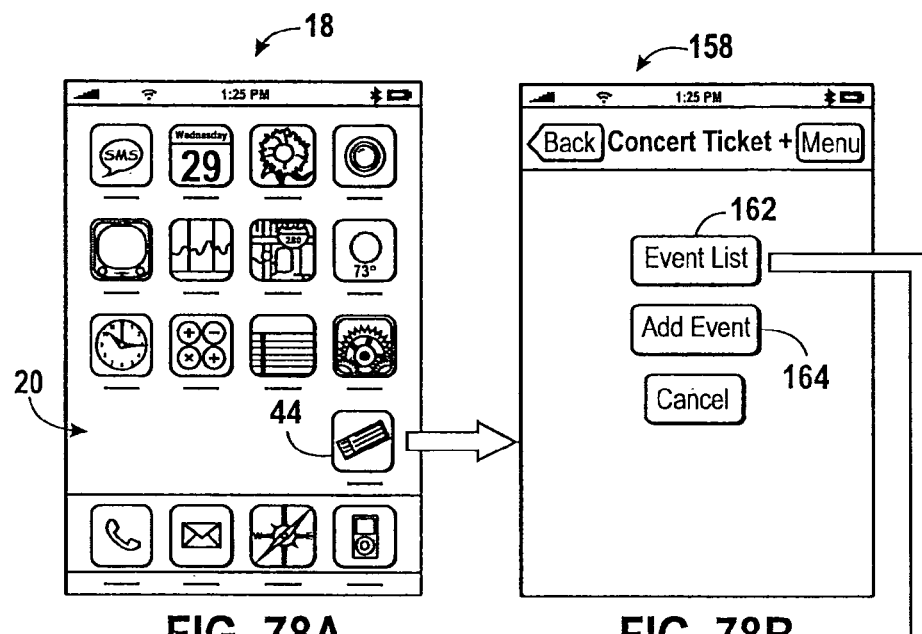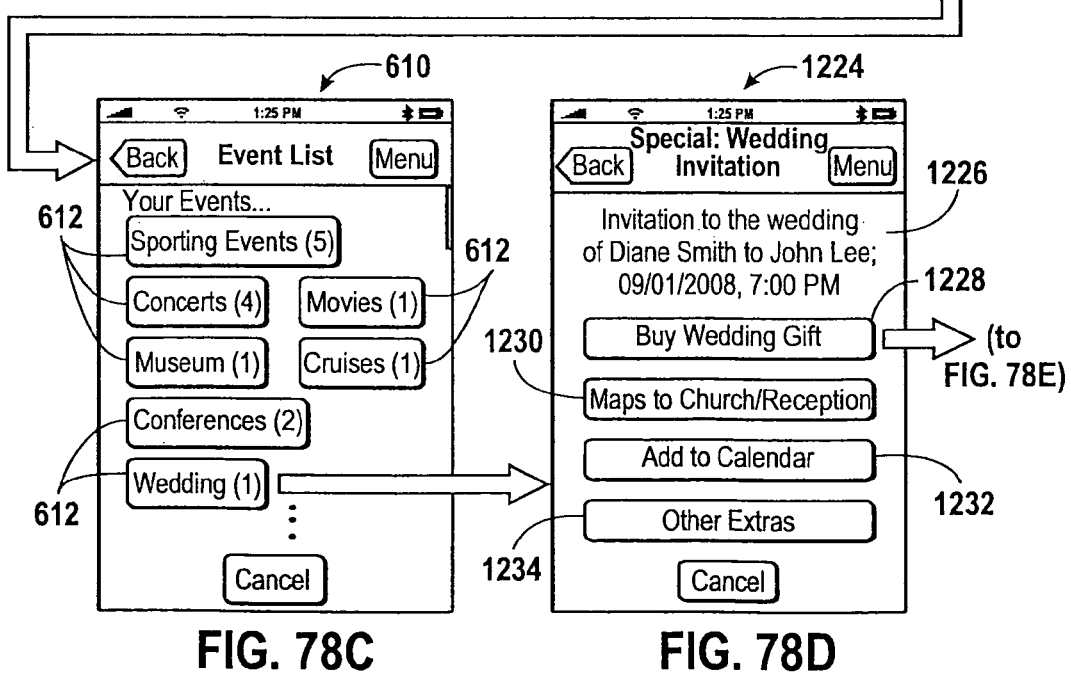

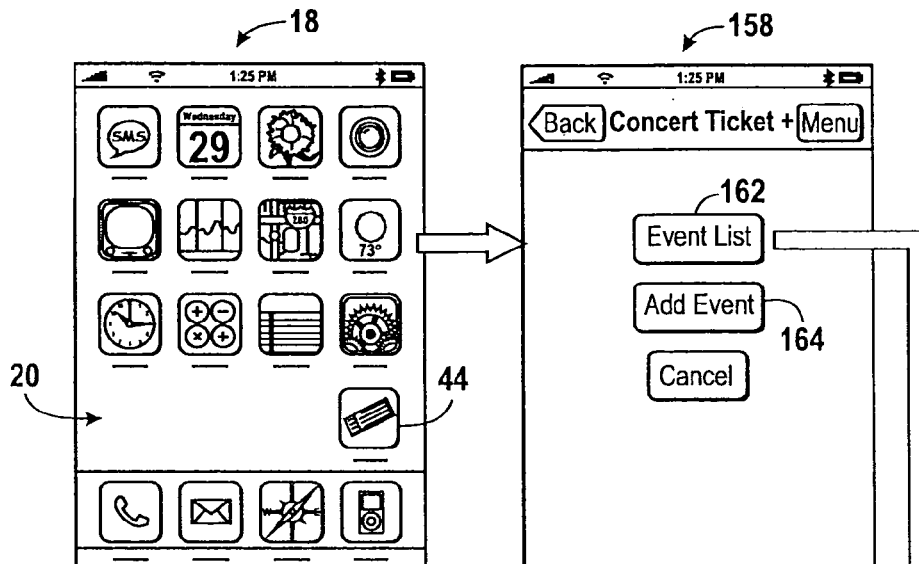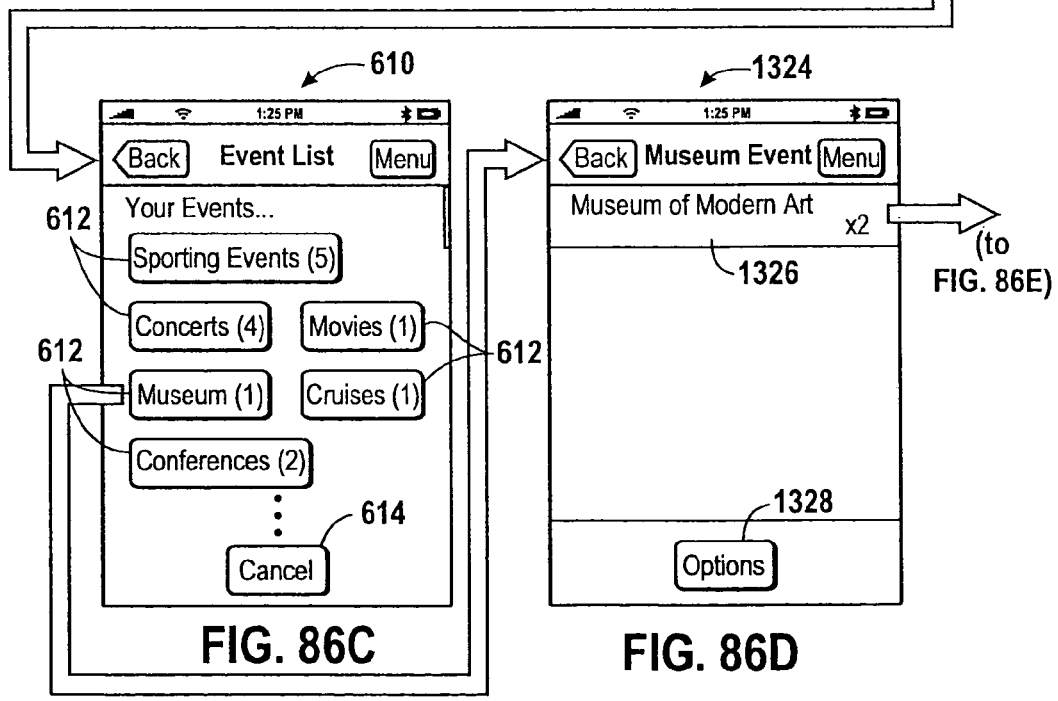
FIG. 86A  FIG. 86B  FIG. 86C  FIG. 86D

SYSTEM AND METHOD FOR PROVIDING ELECTRONIC EVENT TICKETS

BACKGROUND

1. Technical Field

The present disclosure relates generally to tickets to events and, more particularly, to obtaining, storing, and accessing tickets to events and benefits associated with such tickets using an electronic device.

2. Description Of The Related Art

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

Event tickets may provide entry to events as well as other benefits. A person using an event ticket may also have one or more electronic devices. However, event tickets may be lost or misplaced, may not easily be transferred between distant individuals, and may provide a limited range of benefits. Moreover, those benefits associated with event tickets may not provide additional functionality to a user of one or more electronic devices.

SUMMARY

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may be set forth below.

By way of example, a device for managing an electronic event ticket may include a processor configured to run an electronic ticket management application, a memory device configured to store data associated with the electronic ticket management application, an electronic display configured to display at least a portion of the data associated with the electronic ticket management application, and an input/output interface configured to receive an electronic ticket and the data associated with the electronic ticket for management by the electronic ticket management application. The electronic ticket management application may be configured to enable the electronic device to gain entry to an event and to obtain at least one other event-related benefit after the electronic ticket is received by the input/output interface.

BRIEF DESCRIPTION OF THE DRAWINGS

Advantages of the invention may become apparent upon reading the following detailed description and upon reference to the drawings in which:

FIGS. 8A-B are schematics representing benefits that may be associated with electronic tickets;

FIGS. 12A-F are schematics of screens that may be displayed on the electronic device of FIG. 1 for obtaining an electronic ticket;

FIG. 13 is a schematic of a ticket-scanning operation for obtaining an electronic ticket using the ticket of FIGS. 9A-B;

FIGS. 24A-C are schematics of screens that may be displayed on the electronic device of FIG. 1 for obtaining an electronic ticket from the kiosks of FIGS. 5 and 6;

FIGS. 36A-G are schematics of screens that may be displayed on the electronic device of FIG. 1 for obtaining an electronic ticket wirelessly from one of the kiosks of FIGS. 5-6;

FIGS. 37A-I are schematics of screens that may be displayed on the electronic device of FIG. 1 for obtaining electronic tickets from an online vendor;

FIGS. 40A-D are schematics of screens that may be displayed on the electronic device of FIG. 1 for receiving an electronic ticket from another of the electronic devices of FIG. 1;

FIGS. 41A-J are schematics of screens that may be displayed on the electronic device of FIG. 1 for viewing and accessing electronic tickets on the electronic device of FIG. 1;

FIGS. 42A-B are schematics of screens that may be displayed on the electronic device of FIG. 1 representing benefits associated with an electronic ticket;

FIGS. 43A-C are schematics of screens that may be displayed on the electronic device of FIG. 1 for transferring an electronic ticket to another electronic device;

FIGS. 44A-B are schematics of screens that may be displayed on the electronic device of FIG. 1 for transferring an electronic ticket to another electronic device;

FIG. 48 is a schematic of a turnstile-scanning operation for gaining entry to an event with an electronic ticket;

FIGS. 55A-C are schematics of screens that may be displayed on the electronic device of FIG. 1 representing a manner of obtaining music associated with the event;

FIGS. 56A-D are schematics of screens that may be displayed on the electronic device of FIG. 1 representing a manner of obtaining music associated with the event;

FIGS. 67A-F are schematics of screens that may be displayed on the electronic device of FIG. 1 for accessing player e-cards, which may represent a benefit of the block diagram of FIG. 66;

FIGS. 74A-D are schematics of screens that may be displayed on the electronic device of FIG. 1 when conference panel benefits are accessed;

FIGS. 78A-H are schematics of screens that may be displayed on the electronic device of FIG. 1 when certain benefits associated with the electronic wedding invitation or program are accessed;

FIGS. 86A-F are schematics of screens that may be displayed on the electronic device of FIG. 1 when benefits associated with an electronic museum ticket are accessed;

DETAILED DESCRIPTION OF SPECIFIC EMBODIMENTS

Many people use a personal electronic device each day, as portable phones and digital media players become commonplace. When attending various ticketed events, people may bring a personal electronic device. Using the techniques, systems, and devices described in the disclosure below, a user may obtain, store, or use a ticket in a personal electronic device to gain entry to the event, as well as to gain a number of additional benefits.

One or more specific embodiments of the present invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
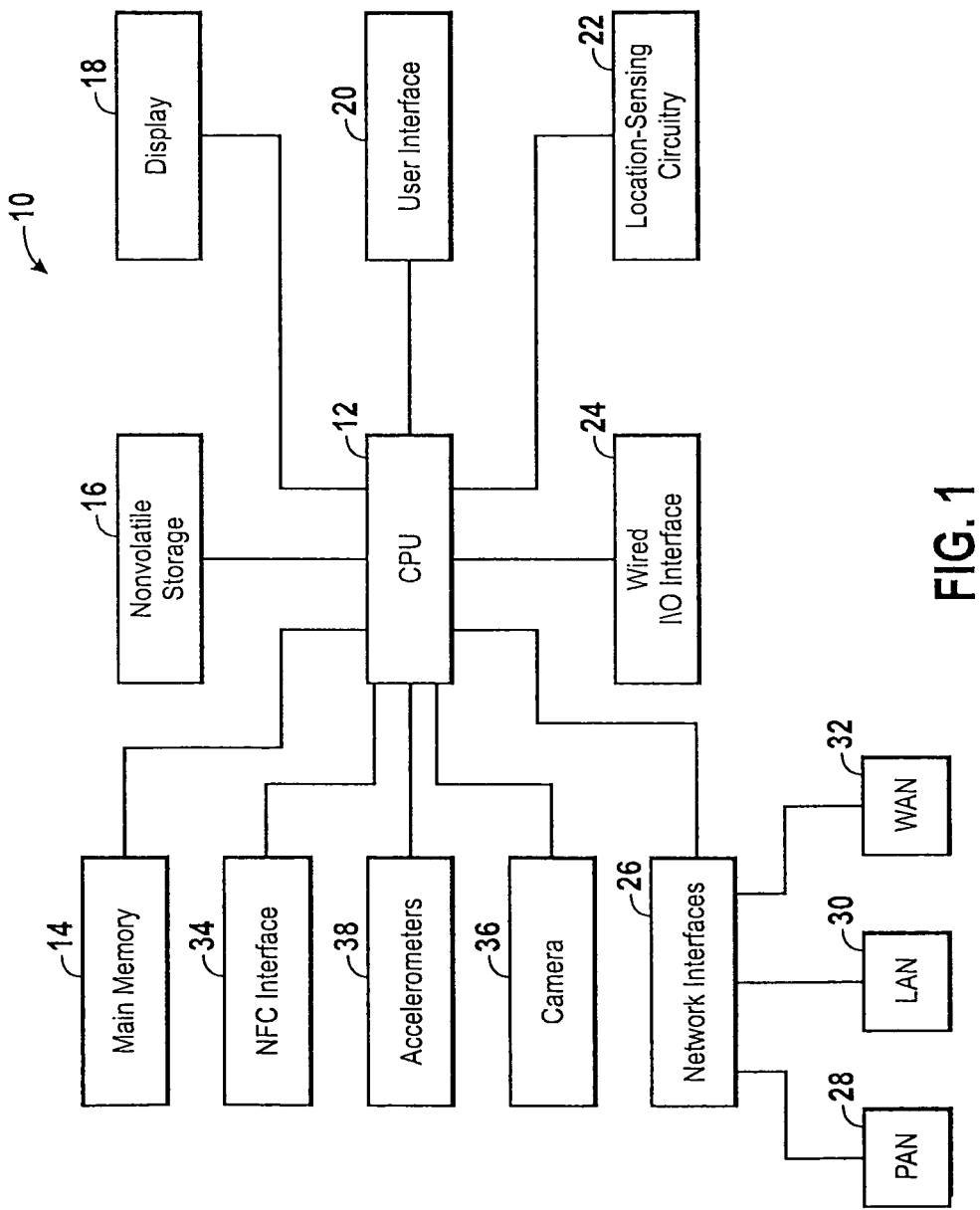
FIG. 1 is a block diagram illustrating an electronic device 10 configured to process electronic tickets.

Turning first to FIG. 1, an electronic device 10 may be configured for obtaining, storing, or using electronic tickets to gain entry to events and for associated benefits. As discussed below with reference to FIGS. 2-7, the electronic device 10 may represent, among other things, a handheld device, a computer, or a media player adapted to obtain, store, or use electronic tickets using techniques described in greater detail below; a manned or unmanned kiosk to sell or distribute electronic tickets to another electronic device 10; or a ticket turnstile to provide entry to an event upon receipt of an electronic ticket from another electronic device 10. As such, the electronic device 10 may represent, for example, an iPhone®, iPod®, iMac®, MacBook®, or AppleTV® available from Apple, Inc., or other devices by any manufacturer. It should be appreciated that embodiments of the electronic device 10 may include more or fewer elements than depicted in FIG. 1.

The electronic device 10 may include at least one central processing unit (CPU) 12. For example, the CPU 12 may represent one or more microprocessors, and the microprocessors may be "general purpose" microprocessors, a combination of general and special purpose microprocessors, or ASICS. Additionally or alternatively, the CPU 12 may include one or more reduced instruction set (RISC) processors, video processors, or related chip sets. The CPU 12 may provide processing capability to execute an operating system, run various applications, and/or provide processing for one or more of the techniques described herein. Applications that may run on the electronic device 10 may include, for example, software for managing and playing audiovisual content, software for managing a calendar, software for controlling telephone capabilities, and software for managing electronic tickets, as noted below.

A main memory 14 may be communicably coupled to the CPU 12, which may store data and executable code. The main memory 14 may represent volatile memory such as RAM, but may also include nonvolatile memory, such as read-only memory (ROM) or Flash memory. In buffering or caching data related to operations of the CPU 12, the main memory 14 may store data associated with applications running on the electronic device 10.

The electronic device 10 may also include nonvolatile storage 16. The nonvolatile storage 16 may represent any suitable nonvolatile storage medium, such as a hard disk drive or nonvolatile memory, such as Flash memory. Being well-suited to long-term storage, the nonvolatile storage 16 may store data files such as media (e.g., music and video files), software (e.g., for implementing functions on the electronic device 10), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that maintains a record of podcasts or television shows or other media a user subscribes to), as well as telephone information (e.g., telephone numbers). It should be appreciated that certain ticket data may be saved in the nonvolatile storage 16, as discussed further below.

A display 18 may display images and data for the electronic device 10. It should be appreciated that only certain embodiments may include the display 18. The display 18 may be any suitable display, such as liquid crystal display (LCD), a light emitting diode (LED) based display, an organic light emitting diode (OLED) based display, a cathode ray tube (CRT) display, or an analog or digital television. In some embodiments, the display 18 may function as a touch screen through which a user may interact with the electronic device 10.

The electronic device 10 may further include a user interface 20. The user interface 20 may represent indicator lights and user input structures, but may also include a graphical user interface (GUI) on the display 18. In practice, the user interface 20 may operate via the CPU 12, using memory from the main memory 14 and long-term storage in the nonvolatile storage 16. In an embodiment lacking the display 18, indicator lights, sound devices, buttons, and other various input/output (I/O) devices may allow a user to interface with the electronic device 10. In an embodiment having a GUI, the user interface 20 may provide interaction with interface elements on the display 18 via certain user input structures, user input peripherals such as a keyboard or mouse, or a touch sensitive implementation of the display 18.

As should be appreciated, one or more applications may be open and accessible to a user via the user interface 20 and displayed on the display 18 of the electronic device 10. The applications may run on the CPU 12 in conjunction with the main memory 14, the nonvolatile storage 16, the display 18, and the user interface 20. As will be discussed in greater detail below, instructions stored in the main memory 14, the nonvolatile storage 16, or the CPU 12 of the electronic device 10 may obtain, store, and use electronic tickets. Rather than manage paper tickets and any benefits associated with electronic tickets manually, a user may employ the electronic device 10 to manage tickets electronically. As such, it should be appreciated that the instructions for carrying out such techniques may represent a standalone application, a function of the operating system of the electronic device 10, or a function of the hardware of the CPU 12, the main memory 14, the nonvolatile storage 16, or other hardware of the electronic device 10.

In certain embodiments, the electronic device 10 may include location sensing circuitry 22. The location sensing circuitry 22 may represent global positioning system (GPS) circuitry, but may also represent one or more algorithms and databases, stored in the nonvolatile storage 16 or main memory 14 and executed by the CPU 12, which may be used to infer location based on various observed factors. For example, the location sensing circuitry 22 may represent an algorithm and database used to approximate geographic location based on the detection of local 802.11x (Wi-Fi) networks or nearby cellular phone towers. As discussed below, the electronic device 10 may employ the location sensing circuitry 22 as a factor for carrying out certain ticket management techniques. By way of example, the location sensing circuitry 22 may be used by the electronic device 10 to determine a user's location during an event; the location during the event may cause different information to be displayed on the electronic device 10.

With continued reference to FIG. 1, the electronic device 10 may also include a wired input/output (I/O) interface 24 for a wired interconnection between one electronic device 10 and another electronic device 10. The wired I/O interface 24 may represent, for example, a universal serial bus (USB) port or an IEEE 1394 or FireWire® port, but may also represent a proprietary connection. Additionally, the wired I/O interface 24 may permit a connection to user input peripheral devices, such as a keyboard or a mouse.

One or more network interfaces 26 may provide additional connectivity for the electronic device 10. The network interfaces 26 may represent, for example, one or more network interface cards (NIC) or a network controller. In certain embodiments, the network interface 26 may include a personal area network (PAN) interface 28. The PAN interface 28 may provide capabilities to network with, for example, a Bluetooth® network, an IEEE 802.15.4 (e.g., ZigBee) network, or an ultra wideband network (UWB). As should be appreciated, the networks accessed by the PAN interface 28 may, but do not necessarily, represent low power, low bandwidth, or close range wireless connections. The PAN interface 28 may permit one electronic device 10 to connect to another local electronic device 10 via an ad-hoc or peer-to-peer connection. However, the connection may be disrupted if the separation between the two electronic devices 10 exceeds the range of the PAN interface 28.

The network interface 26 may also include a local area network (LAN) interface 30. The LAN interface 30 may represent an interface to a wired Ethernet-based network, but may also represent an interface to a wireless LAN, such as an IEEE 802.11x wireless network. The range of the LAN interface 30 may generally exceed the range available via the PAN interface 28. Additionally, in many cases, a connection between two electronic devices 10 via the LAN interface 30 may involve communication through a network router or other intermediary device.

For some embodiments of the electronic device 10, the network interfaces 26 may include the capability to connect directly to a wide area network (WAN) via a WAN interface 32. The WAN interface 32 may permit a connection to a cellular data network, such as the Enhanced Data rates for GSM Evolution (EDGE) network or other 3G network. When connected via the WAN interface 32, the electronic device 10 may remain connected to the Internet and, in some embodiments, to another electronic device 10, despite changes in location that might otherwise disrupt connectivity via the PAN interface 28 or the LAN interface 30. As will be discussed below, the wired I/O interface 24 and the network interfaces 26 may represent high-bandwidth communication channels for transferring user data using the simplified data transfer techniques discussed herein.

Certain embodiments of the electronic device 10 may also include a near field communication (NFC) interface 34. The NFC interface 34 may allow for extremely close range communication at relatively low data rates (e.g., 464 kb/s), and may comply with such standards as ISO 18092 or ISO 21521, or it may allow for close range communication at relatively high data rates (560 Mbps), and may comply with the TransferJet® protocol. The NFC interface 34 may have a range of approximately 2 to 4 cm. The close range communication with the NFC interface 34 may take place via magnetic field induction, allowing the NFC interface 34 to communicate with other NFC interfaces 34 or to retrieve information from tags having radio frequency identification (RFID) circuitry. As discussed below, the NFC interface 34 may provide a manner of initiating or facilitating a transfer of user data from one electronic device 10 to another electronic device 10.

The electronic device 10 of FIG. 1 may also include a camera 36. With the camera 36, the electronic device 10 may obtain digital images or videos. In combination with optical character recognition (OCR) software, barcode-reading software, or Matrix-code-reading software running on the electronic device 10, the camera 36 may be used to input data from printed materials having text or barcode information. Such data may include electronic ticketing data from a paper ticket, as described below.

In certain embodiments of the electronic device 10, one or more accelerometers 38 may sense the movement or orientation of the electronic device 10. The accelerometers 38 may provide input or feedback regarding the position of the electronic device 10 to certain applications running on the CPU 12. By way of example, the accelerometers 38 may include a 3-axis accelerometer from ST Microelectronics.

Figure 2:
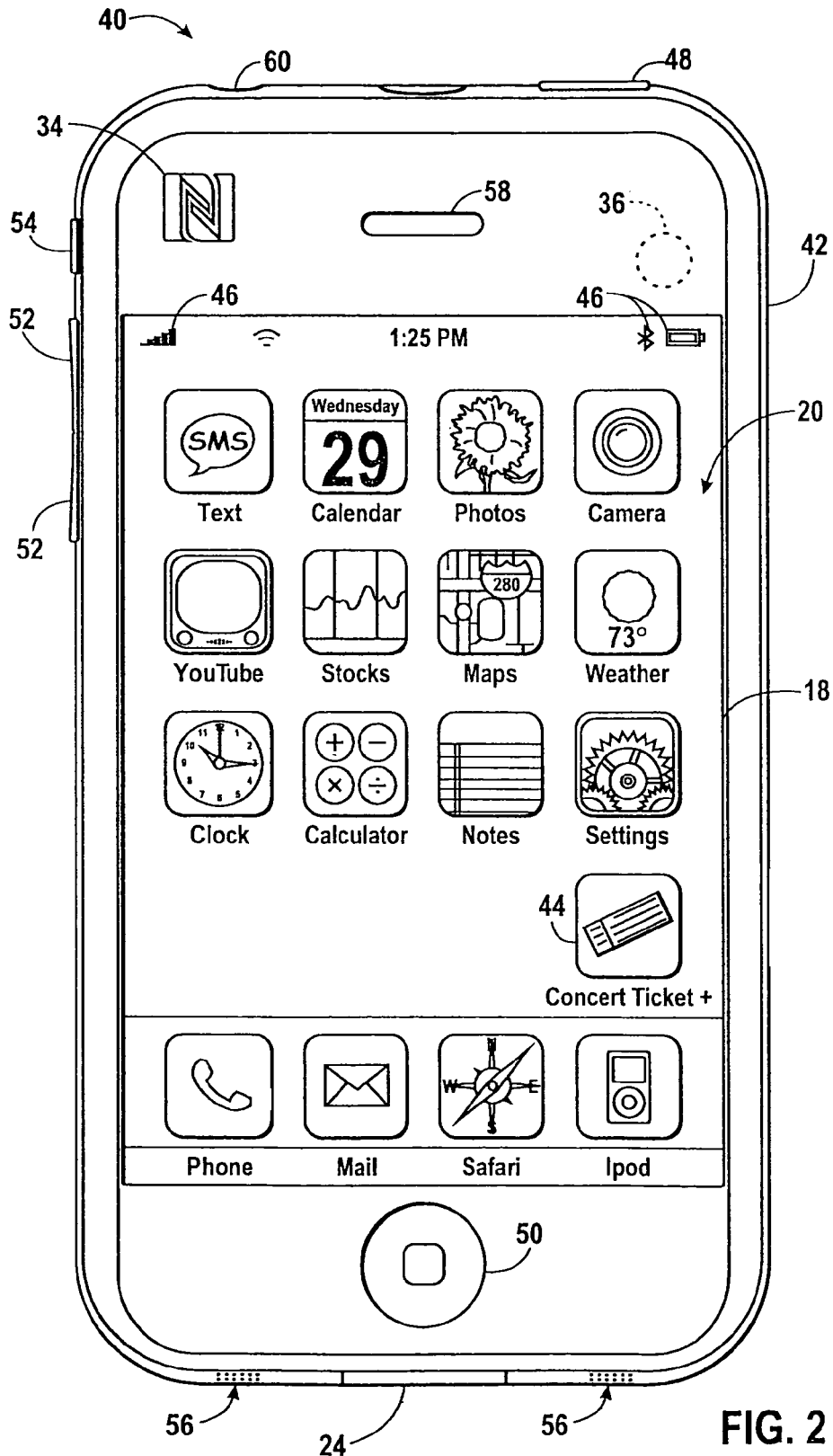
FIG. 2 is a schematic of a handheld device representing an embodiment of the electronic device of FIG. 1.

FIGS. 2-7 illustrate various specific embodiments of the electronic device 10 of FIG. 1. It should be appreciated that the specific embodiments of the electronic device 10 depicted in FIGS. 2-7 are representative only and should not be understood as exclusive. Turning first to FIG. 2, a handheld device 40 may represent an embodiment of the electronic device 10 of FIG. 1. By way of example, the handheld device 40 may be a portable phone or a portable media player, such as an iPhone® or an iPod® available from Apple Inc. The handheld device 40, such as an iPhone®, may have a height of approximately 5.0 inches, a width of approximately 2.5 inches, a depth of approximately 0.5 inches, and a weight of approximately 5 ounces. The handheld device 40, such as an iPod®, may have a height of approximately 4.0 inches, a width of approximately 2.5 inches, a depth of approximately 0.5 inches, and a weight of approximately 5 ounces.

The handheld device 40 may have an enclosure 42 of plastic, metal, composite materials, or other suitable materials in any combination. The enclosure 42 may protect the interior components of the handheld device 40 from physical damage and electromagnetic interference (EMI). Additionally, the enclosure 42 may allow certain frequencies of electromagnetic radiation to pass through to wireless communication circuitry within the handheld device 40 to facilitate wireless communication.

The display 18 of the handheld device 40 may include the user interface 20 in the form of a GUI, which may have a number of individual icons representing applications that may be activated. In some embodiments of the handheld device 40, the display 18 may serve as a touch-sensitive input device and the icons may be selected by touch. In some embodiments, a ticket management application icon 44 may be selectable by a user. Here, the ticket management application is designated as "Concert Ticket +" to indicate to a user that selection of the icon 44 will allow the user to store and use tickets for concerts and more.

When the ticket management application icon 44 is selected, the ticket management application may open, as described further below. The ticket management application may enable a user to obtain, store, or use tickets to gain entry to an event or to access other benefits associated with the ticket using the techniques described herein. The user interface 20 on the display 18 of the handheld device 40 may also include certain status indicator icons 46, which may indicate the status of various components of the handheld device 40. For example, the status indicator icons may include a cellular reception meter, an icon to indicate when the PAN interface 28 is active (e.g., when a Bluetooth network is in use), or a battery life meter.

The handheld device 40 may connect to another electronic device 10, such as a computer, through the wired I/O interface 24 located at the bottom of the device. For example, the wired I/O interface 24 may be a proprietary connection for interconnecting the handheld device 40 and another electronic device 10 via USB or FireWire®. Once connected, the devices may synchronize and/or transfer certain data, such as an electronic ticket. The wired I/O interface 24 on the handheld device 40 may be understood to represent a communication channel to another electronic device 10 for communication of an electronic ticket or other data in accordance with techniques discussed herein.

User input structures 48, 50, 52, and 54 may supplement or replace the touch-sensitive input capability of the display 18 for interaction with the user interface 20. By way of example, the user input structures 48, 50, 52, and 54 may include buttons, switches, a control pad, keys, knobs, a scroll wheel, or any other suitable input structures. The user input structures 48 and 50 may work in conjunction with the display 18 to control functions of the device. Particularly, the user input structure 48 may be a lock/unlock sliding button to lock or unlock the handheld device 40; the user input structure 50 may be a navigation button for navigating the user interface 20 to a default or home screen; the user input structures 52 may be a pair of buttons for navigating up or down a screen of the user interface 20 or for controlling volume; and the user input structure 54 may be an on/off button.

Certain embodiments of the handheld device 40 may include telephone functionality. As such, the handheld device 40 may include audio input structures 56 and an audio output structure 58. The audio input structures 56 may be one or more microphones for receiving voice data from a user, and the audio output structure 58 may be a speaker for outputting audio data, such as data received by the handheld device 40 over a cellular network. In certain embodiments, an audio port 60 may facilitate peripheral audio input and output devices, such as headsets, speakers, or microphones for use with the handheld device 40. It should be appreciated that telephone functionality associated with the handheld device 40 may also include emitting a ringtone through the audio output structure 58, causing the handheld device 40 to vibrate, or changing images on the display to indicate an incoming phone call.

As noted above, some embodiments of the electronic device 10 may include the NFC interface 34. The handheld device 40 depicted in FIG. 2 may include the NFC interface 34 in any suitable location within the enclosure 42. Because the NFC interface 34 may permit communication at a very short range, the location of the NFC interface 34 in the handheld device 40 may be indicated on exterior of the enclosure 42, as illustrated in FIG. 2. The NFC interface 34 may enable the handheld device 40 to engage in near field communication (NFC) with RFID tags or other NFC enabled electronic devices 10. For example, the NFC interface 34 may provide a manner of receiving electronic ticket data from an RFID tag located on a ticket, as described further below.

The handheld device 40 of FIG. 2 may additionally include the camera 36, which may be located, for example, on the back of the handheld device 40. As discussed further below, the camera 36 may be used to obtain a digital image of a ticket. The handheld device 40 may thereafter employ optical character recognition (OCR) software, barcode-reading software, or Matrix-code-reading software to extract ticket information from the image, as described further below.

It should also be appreciated that the handheld device 40 may include the location sensing circuitry 22 or the accelerometers 38. Certain applications running on the handheld device 40 may obtain information relating to the position, orientation, or movement of the handheld device from the location sensing circuitry 22 or the accelerometers 38. The position, orientation, or movement information may enable applications to display personalized data or to display data in an innovative manner in response to user movement.

Figure 3:
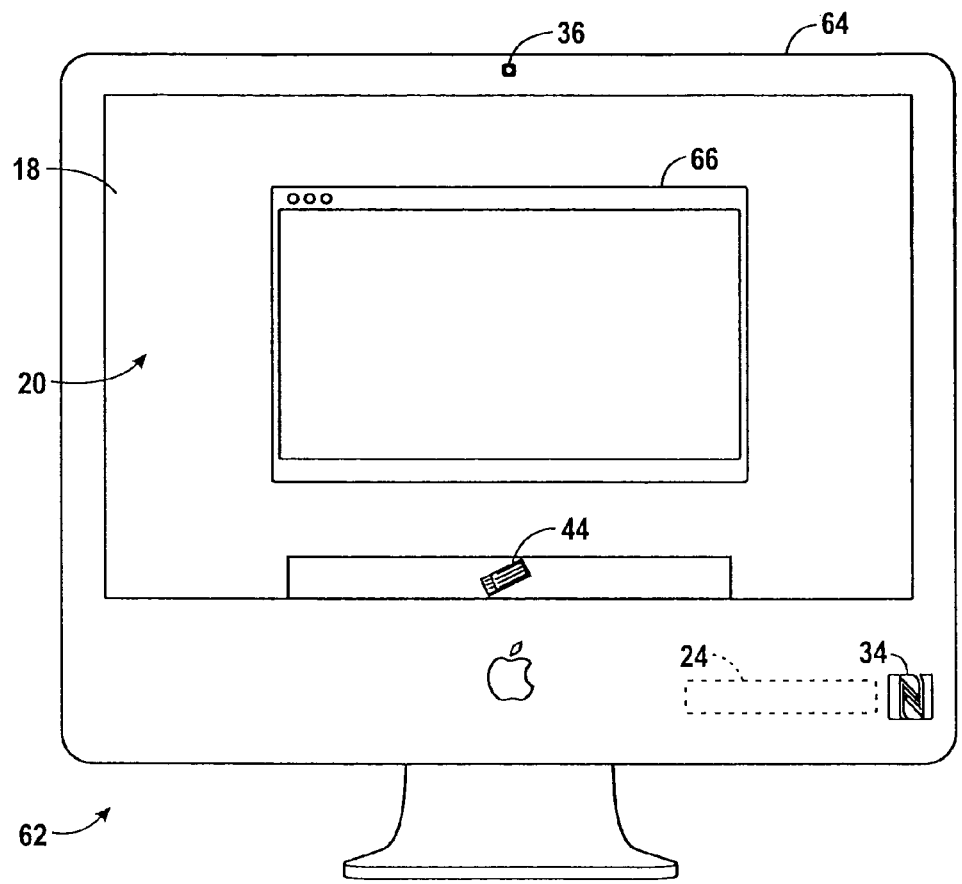
FIG. 3 is a schematic of a computer representing an embodiment of the electronic device of FIG. 1.

Turning to FIG. 3, a computer 62 may represent another embodiment of the electronic device 10 of FIG. 1. The computer 62 may be any computer, such as a desktop computer, a server, or a notebook computer, but may also be a standalone media player or video gaming machine. By way of example, the computer 62 may be an iMac®, a MacBook®, or an AppleTV® by Apple Inc. It should be noted that the computer 62 may also represent a personal computer (PC) by another manufacturer. An enclosure 64 may protect internal components of the computer 62. Such internal components may include, for example, the CPU 12, the main memory 14, the nonvolatile storage 16, certain network interfaces 26, and/or the NFC interface 34.

The location of the NFC interface 34 may be noted by a label on the exterior of the enclosure 64. The NFC interface 34 may permit near field communication between the computer 62 and other NFC enabled electronic devices 10, such as the handheld device 40. As should be appreciated, the NFC interface 34 may also enable the computer 62 to receive electronic ticket data from an RFID tag located on a ticket, as described further below.

The display 18 of the computer 62 may display the user interface 20 in the form of a GUI. The user interface 20 of the computer 62 may depict any user data associated with applications 66 running on the computer 62. Additionally, the user interface 20 may include a variety of icons related to applications installed on the computer 62. One such icon may be the ticket management application icon 44. When the ticket management application icon 44 is selected, the ticket management application may open. The ticket management application may enable a user to obtain, store, or use tickets to gain entry to an event or to access other benefits associated with the ticket using the techniques described herein.

A user of the computer 62 may interact with the user interface 20 with various peripheral input devices, such as a keyboard or mouse, which may connect to the computer 62 via the wired I/O interface 24. The wired I/O interface 24 may also provide a high bandwidth communication channel for interconnecting other electronic devices 10, such as the handheld device 40, to the computer 62.

The computer 62 may also include the camera 36. As discussed further below, the camera 36 may obtain, among other things, a digital image of a ticket. With the digital image, the handheld device 40 may employ optical character recognition (OCR) software, barcode-reading software, or matrix-code-reading software to extract ticket information from the image.

Figure 4:
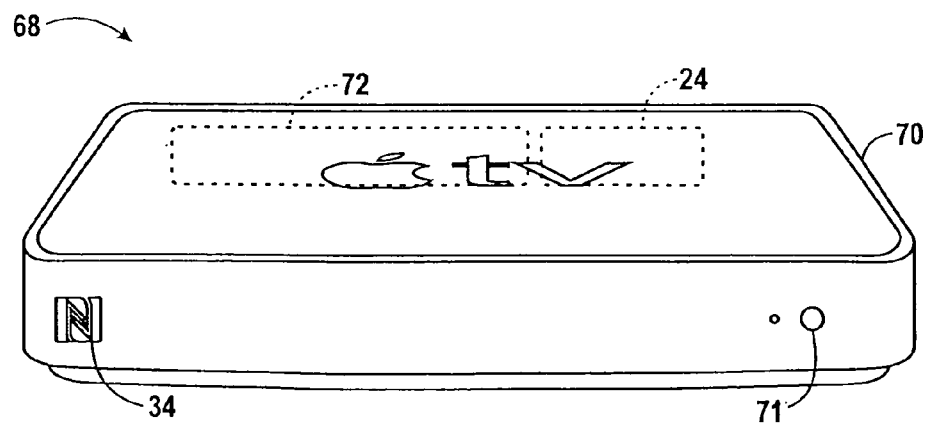
FIG. 4 is a schematic of a standalone media player representing an embodiment of the electronic device of FIG. 1.

FIG. 4 depicts a standalone media player 68 representing another embodiment of the electronic device 10 of FIG. 1 that may be configured to operate using the techniques described herein. By way of example, the standalone media player 68 may be an AppleTV® device by Apple, Inc. However, the standalone media player 68 may also represent a media player or video game console by another manufacturer.

Within an enclosure 70 of the standalone media player 68 may reside various components of the electronic device 10. For example, the enclosure 70 may house the nonvolatile storage 16 for storing media files and media playback software and the CPU 12 for processing the media files. Wireless network interfaces 26, such as the PAN interface 28 and LAN interface 30, may also be located within the enclosure 70, allowing the standalone media player 68 to communicate with other electronic devices 10 or to connect to the Internet. Using the wireless network interfaces 26, the standalone media player 68 may obtain or exchange media content as well as gain access to the Internet.

The standalone media player 68 may also include, among other things, an indicator light and infrared (IR) port 72 and audio/video (A/V) outputs 74. The indicator light and IR port 72 may receive an IR control signal from a remote control and may indicate to a user when the standalone media player 68 is on, off, receiving or exchanging content, or obtaining data in accordance with techniques described herein. The A/V outputs 74 may provide a manner for connecting the standalone media player 68 to an analog or digital television or other media display devices. The standalone media player 68 may additionally include the wired I/O interface 24, which may permit the standalone media player 68 to communicate rapidly with a wired connection to another electronic device 10.

The standalone media player 68 may also include the NFC interface 34. With the NFC interface 34, the standalone media player 68 may communicate with another electronic device 10 having another NFC interface 34. Additionally, as described further below, the NFC interface 34 may also enable the standalone media player 68 to receive electronic ticket data from an RFID tag located on a ticket, as described further below.

Figure 5:
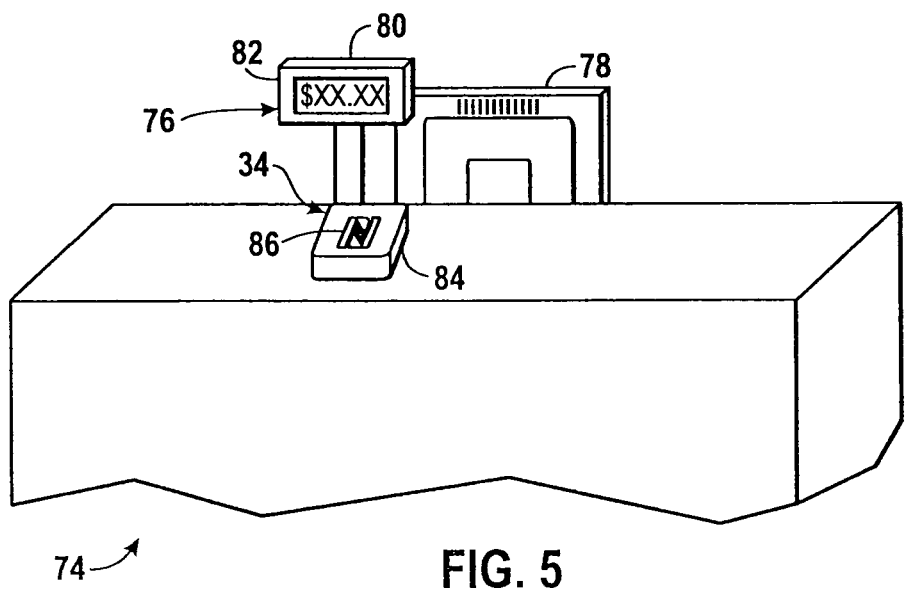
FIG. 5 is a schematic of a kiosk representing an embodiment of the electronic device of FIG. 1.

Turning to FIG. 5, an NFC enabled kiosk 74 may represent an embodiment of the electronic device 10 of FIG. 1, which may be configured to enable a user of another electronic device 10, such as the handheld device 40, to obtain or redeem an electronic ticket or a benefit associated with an electronic ticket. For example, as described further below, a user may purchase or otherwise obtain an electronic ticket to an event from the kiosk 74; the user may use an electronic ticket at the kiosk 74 to gain entry to an event; or the user may use a benefit associated with an electronic ticket, such as an electronic coupon for merchandise, at the kiosk 74. Additionally, the kiosk 74 may be used to credit the account of the holder of an electronic ticket or a paper ticket with certain media content, as described further below.

The kiosk 74 may generally include a point of sale device 76 with a communicably attached NFC interface 34. The point of sale device 76 may include a touch screen display 78, which may serve as an operator interface, and a customer interface 80, which may include a point of sale display 82. The point of sale display 82 may display, for example, an amount owed, a product being purchased, or a quantity of change due to the customer in a transaction. The NFC interface 34 may be housed within an enclosure 84. The exterior of the enclosure 84 may include an NFC label 86 to indicate that the customer may interact with the kiosk 74 using a NFC enabled electronic device 10 or an NFC enabled card.

To provide functionality for obtaining or redeeming an electronic ticket or a benefit associated with an electronic ticket, the kiosk 74 may communicate with various other computers over a variety of networks using the network interfaces 26. By way of example, the kiosk 74 may communicate with a local server over a local network or a web service over the Internet. The local server or the web service may track, for example, whether an electronic ticket or a benefit associated with an electronic ticket has been used by a particular user.

Figure 6:
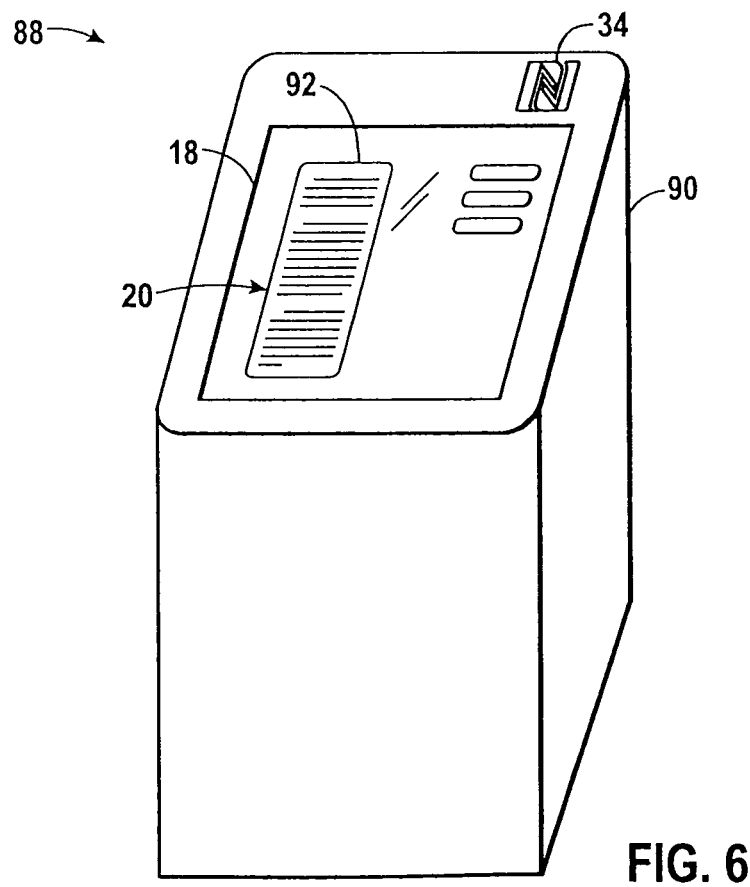
FIG. 6 is a schematic of an unmanned kiosk representing an embodiment of the electronic device of FIG. 1.

FIG. 6 illustrates an NFC enabled unmanned kiosk 88, which may represent another embodiment of the electronic device 10 configured to enable a user of another electronic device 10, such as the handheld device 40, to obtain or redeem an electronic ticket or a benefit associated with an electronic ticket. The unmanned kiosk 88 may function largely in the same manner as the kiosk 74 of FIG. 5, but may operate without a human cashier. For example, as described below, a user may purchase or otherwise obtain an electronic ticket to an event from the unmanned kiosk 88; the user may use an electronic ticket at the unmanned kiosk 88 to gain entry to an event; or the user may use a benefit associated with an electronic ticket, such as an electronic coupon for merchandise, at the unmanned kiosk 88. Additionally, the unmanned kiosk 88 may be used to credit the account of the holder of an electronic ticket or a paper ticket with certain media content, as described further below.

An enclosure 90 may protect the internal components of the unmanned kiosk 88 from its particular environment. For example, the enclosure 90 may include weather resistant material and sealant if the unmanned kiosk 88 is to be located outdoors. Among the components housed within the enclosure 90 may be the NFC interface 34. The NFC interface may enable a user to interact with the unmanned kiosk 88 using an NFC enabled electronic device 10 or an NFC enabled card.

The unmanned kiosk 88 may also include other elements of the electronic device 10 described above with reference to FIG. 1, such as the display 18 having the user interface 20. As the display 18 may be a touch sensitive display, a user may interact with certain on-screen elements 92 to conduct a transaction. Such transactions may include, for example, purchasing electronic tickets or obtaining credit for certain content associated with a user account.

As noted above with reference to the kiosk 74 of FIG. 5, the unmanned kiosk 88 may also communicate with various other computers over a variety of networks to provide functionality for obtaining or redeeming an electronic ticket or a benefit associated with an electronic ticket. By way of example, the unmanned kiosk 88 may communicate with a local server over a local network or a web service over the Internet using the network interfaces 26. The local server or the web service may track, for example, whether an electronic ticket or a benefit associated with an electronic ticket has been used by a particular user.

Figure 7:
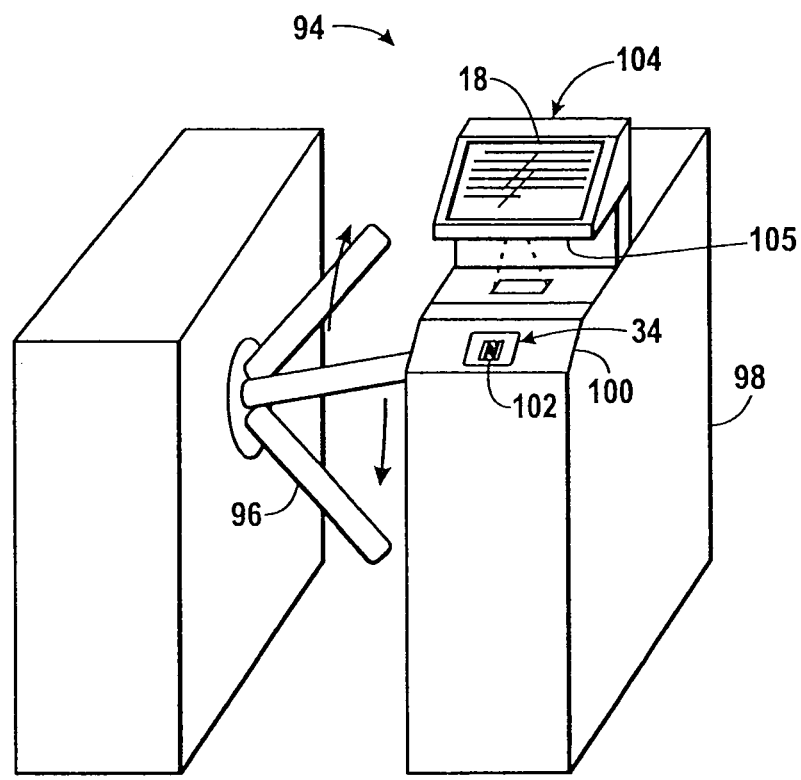
FIG. 7 is a schematic of a ticket turnstile representing an embodiment of the electronic device of FIG. 1.

Turning to FIG. 7, a ticket turnstile 94 may represent an embodiment of the electronic device 10 which may be configured to allow entry to certain events when a user of another electronic device 10 "uses" an electronic ticket stored on the other electronic device 10. The ticket turnstile 94 may regulate entry with a turnstile arm 96, which may fold inward to permit entry once an electronic ticket has been received and/or verified and authenticated. Techniques for permitting entry upon receipt of an electronic ticket are described further below.

The electronic components of the ticket turnstile 94 may be housed within an enclosure 98. Such components may include, among other things, the CPU 12, the main memory 14, the nonvolatile storage 16, and the network interfaces 26. As noted above with reference to the kiosk 74 of FIG. 5 or the unmanned kiosk 88 of FIG. 6, the ticket turnstile 94 may also communicate with various other computers over a variety of networks to provide functionality for redeeming an electronic ticket to gain entry to an event.

The ticket turnstile 94 may include various equipment for obtaining an electronic ticket from another electronic device 10. For example, one manner of obtaining an electronic ticket may involve the NFC interface 34, which may be housed in an enclosure 100. An NFC label 102 may indicate the location of the NFC interface 34 to users passing through the ticket turnstile 94. Another manner of obtaining an electronic ticket may involve an alternative ticket reader 104. The alternative ticket reader 104 may include, for example, a barcode or matrix code reader 105.

Figure 8A:
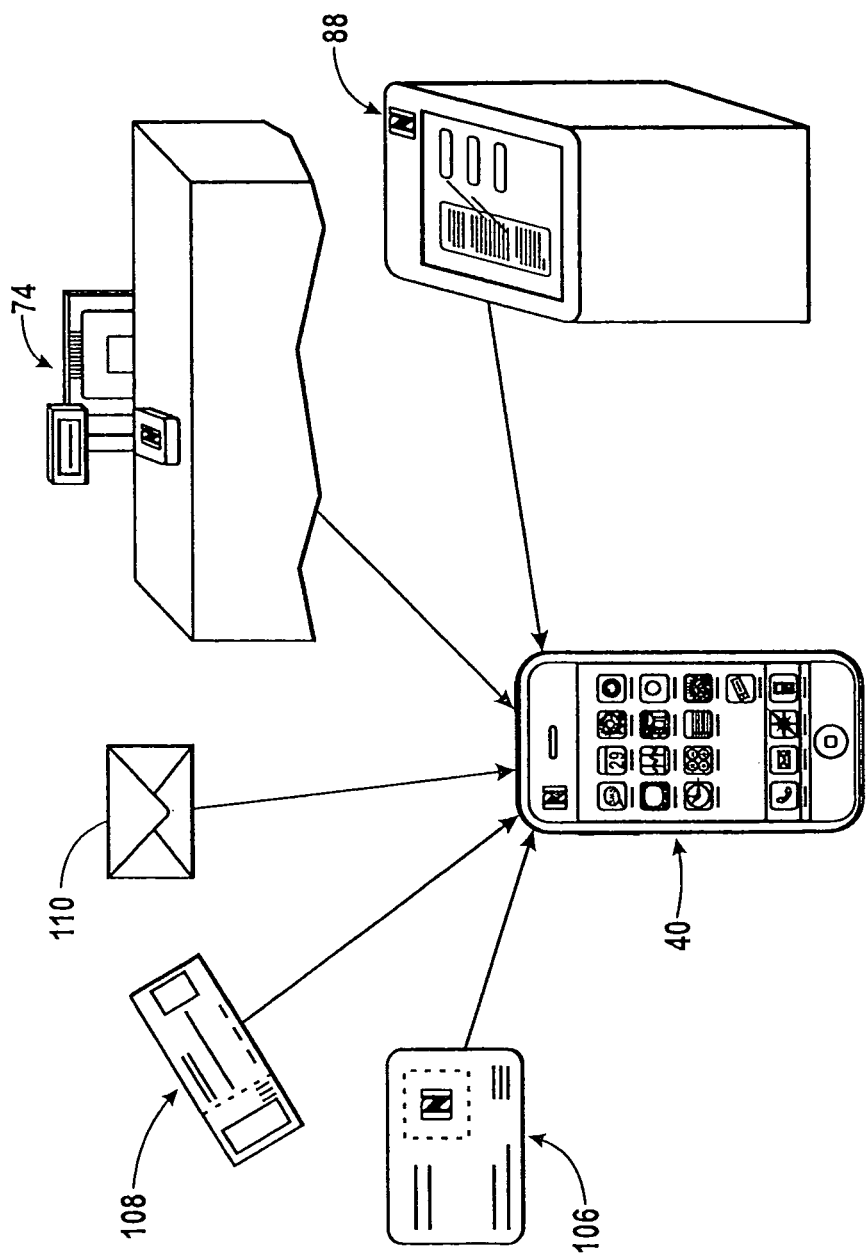

FIGS. 8A-B describe generally an electronic ticketing system for obtaining, storing, accessing, and using electronic tickets with an electronic device 10 such as the handheld device 40. It should be appreciated that while the handheld device 40 may be used in the electronic ticketing system, the techniques described herein should be understood as applicable to any electronic device 10 and are not limited to the handheld device 40.

Turning first to FIG. 8A, electronic tickets may be obtained and stored on the handheld device 40 or other electronic device 10 using a variety of techniques. The electronic tickets may be any data identified as electronic tickets and may include, for example, encrypted or unencrypted XML files which may be associated with a particular device or user account. As described in greater detail below, an electronic device 10, such as the handheld device 40, may obtain electronic tickets from an NFC enabled ticket 106, by scanning a paper ticket 108, by receiving an electronic ticket via e-mail 110 or via the Internet, or by purchasing an electronic ticket from the kiosk 74 or from the unmanned kiosk 88. It should be appreciated that the manner of obtaining electronic tickets is not limited to those described above. Further, obtaining an electronic ticket may also include communicating ticket information received as described above to a web service, which may authenticate the electronic ticket. A ticket management application, which may run on the electronic device 10, may store and provide access to the electronic tickets.

FIG. 8B illustrates a variety of benefits that may be associated with the electronic tickets stored on the handheld device 40 or other electronic device 10. After receiving electronic tickets using one of the manners depicted in FIG. 8A, additional benefits may be obtained by communicating information associated with the electronic tickets to a web service. The web service may transmit certain benefits back to the electronic device 10 in the form of supplemental ticket data, which may include, for example, encrypted or unencrypted XML files that may be associated with a particular device or user account.

As depicted in FIG. 8B, a primary benefit associated with electronic tickets stored on the handheld device 40 may be entry to an event through the ticket turnstile 94. Moreover, the tickets may provide additional benefits, such as digital content 112. As described below, such digital content 112 may include, for example, a live recording of an event, exclusive interviews with artists associated with the event, or studio recordings by artists associated with the event. The electronic tickets may offer other benefits, such as discounts 114 on merchandise related to the event, discounts or prepaid refreshments 116 for the event, discounts or prepaid merchandise 118 for the event, and other related content, such as a digital map 120 to the event. As should be appreciated, the benefits described above are exemplary only, and should not be understood as exclusive. Many other benefits may be associated with various electronic tickets that may be stored in the handheld device 40, as discussed further below.

To provide a brief example illustrating the electronic ticketing system of FIGS. 8A-B, a user may purchase an NFC-enabled ticket 106 for a concert. The user may tap the NFC-enabled ticket 106 to a handheld device 40 running a ticket management application, which may cause the handheld device 40 to receive ticket information from the NFC-enabled ticket 106. The handheld device 40 may next authenticate the ticket with a web service such as iTunes®. Thereafter, the user may use the handheld device 40 to gain entry to the concert, to obtain discounted refreshments at the concert, and to obtain a live recording of the concert once the concert is over.

Figure 9A:
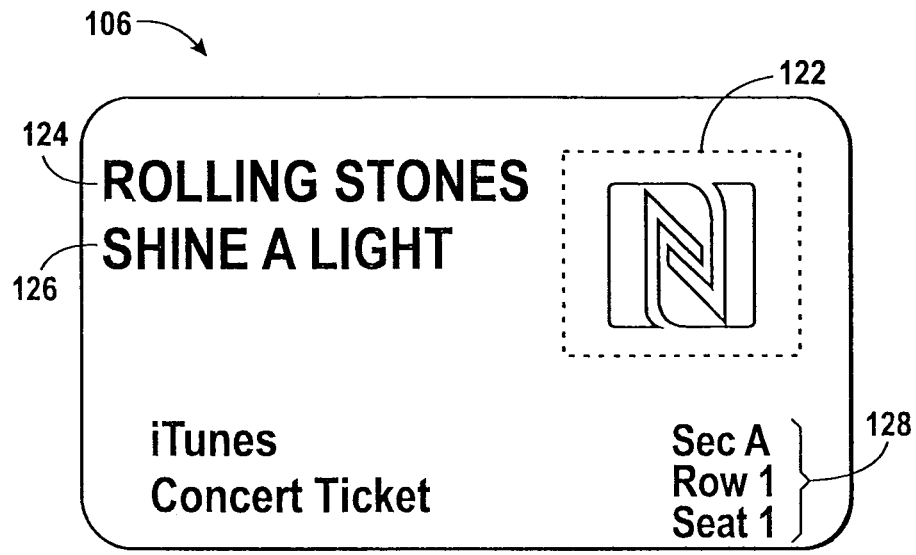
FIGS. 9A-B are schematics of a ticket with near field communication capabilities that may be stored in the electronic device of FIG. 1 as an electronic ticket.
Figure 9B:
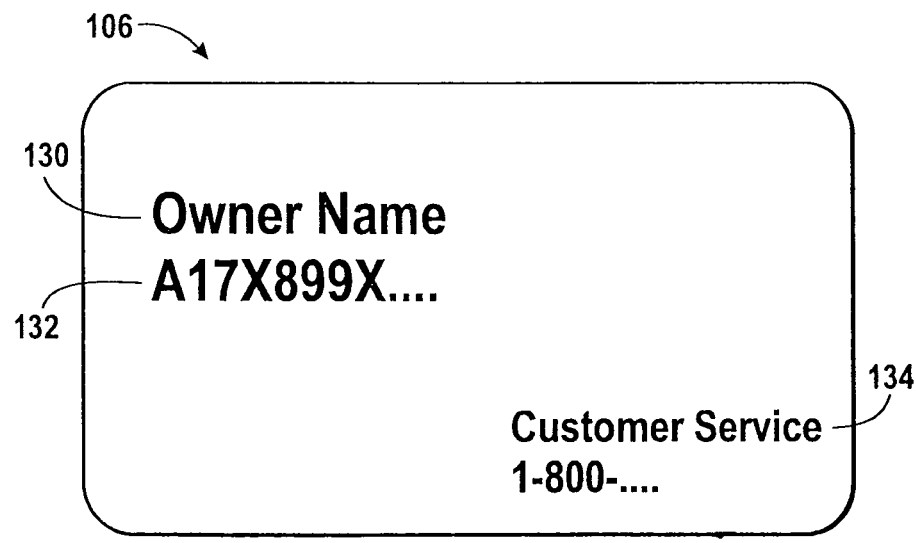

FIGS. 9A and 9B illustrate an embodiment of the NFC-enabled ticket 106 employing radio frequency identification (RFID), which may wirelessly transfer certain information to an NFC-enabled electronic device 10 such as the handheld device 40. FIG. 9A depicts a front side of the NFC-enabled ticket 106. As illustrated by FIG. 9A, the NFC enabled ticket 106 may be constructed of any material, such as paper or plastic, capable of holding an RFID tag 122. The RFID tag 122 may passively or actively transfer certain data when the NFC interface 34 of an electronic device 10 is placed nearby (e.g., within 2-4 cm). Accordingly, the RFID tag 122 may comply with such standards as ISO 14443 or ISO 15693 for proximity or vicinity RFID.

Stored on the RFID tag 122 may be information to identify the ticket to an electronic device 10 having the NFC interface 34. Such information may include, for example, a serial number representing a pointer to data located in an external database, or a data file, such as an XML file, describing the event to which the NFC-enabled ticket 106 pertains. The data file stored on the RFID tag 122 may include fields describing the category of event, artist name, tour title, venue, seating information, and/or a hash pertaining to an account, such as an iTunes® account, associated with the user. The face of the ticket 106 may additionally indicate, for example, an artist name 124, a tour title 126, or seating information 128.

FIG. 9B illustrates a back side of the NFC-enabled ticket 106, and may include additional text related to the event. For example, the text may include a purchaser name 130, serial number 132, and additional information 134, which may include various customer service numbers, time and date information, and/or account information. It should be appreciated that the serial number 132 may be a series of characters corresponding to the serial number that may be present on the RFID tag 122, but may alternatively represent a different number. The NFC-enabled ticket 106 depicted in FIGS. 9A and 9B may be stored in an electronic device 10, such as the handheld device 40, using a variety of techniques. As discussed below, such techniques may include tapping the NFC interface 34 of the electronic device 10 to the RFID tag 122 or using the camera 36 of the electronic device 10 to scan the serial number 132.

Figure 10:
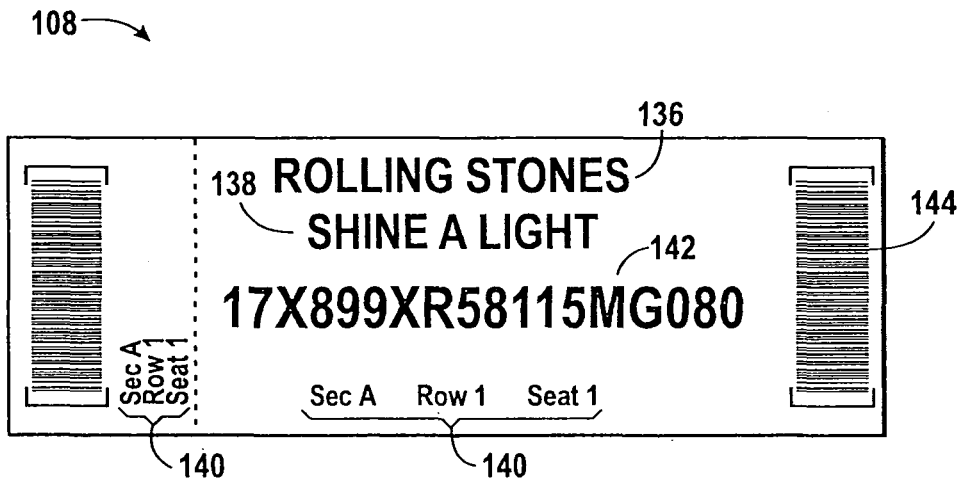
FIG. 10 is a schematic of a paper ticket that may be stored in the electronic device of FIG. 1 as an electronic ticket.
Figure 11:
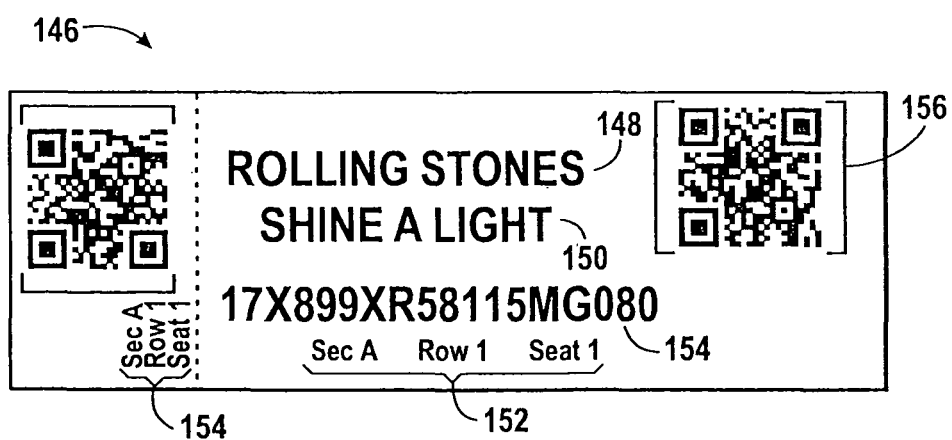
FIG. 11 is a schematic of a paper ticket that may be stored in the electronic device of FIG. 1 as an electronic ticket.

FIGS. 10 and 11 may illustrate embodiments of non-NFC-enabled tickets for use as electronic tickets stored on an electronic device 10 such as the handheld device 40. In a manner similar to the NFC-enabled ticket 106 of FIGS. 9A-B, the paper ticket 108 of FIG. 10 may display a variety of textual information regarding the event. Such information may include an artist name 136, tour title 138, seating location information 140, and/or a serial number 142. The serial number 142 of the paper ticket 108 may correspond to the serial number 132 of the NFC-enabled ticket 106, and may perform a similar role. A barcode 144 on the paper ticket 108 may provide a manner of gaining entry to an event or inputting the electronic ticket on the electronic device 10. It should be appreciated that the paper ticket 108 of FIG. 10, like the NFC-enabled ticket 106 of FIGS. 9A-B, may be stored in an electronic device 10 using a variety of techniques. As discussed below, such techniques may include, for example, using the camera 36 of the electronic device 10 to scan the serial number 142 or the barcode 144.

Turning next to FIG. 11, a paper ticket 146 may represents another embodiment of a ticket which may be stored in an electronic device 10 such as the handheld device 40. In the manner of the paper ticket 108 of FIG. 10, the paper ticket of FIG. 11 may display a variety of textual information regarding the event. Such information may include an artist name 148, tour title 150, seating location information 152, and/or a serial number 154. The serial number 154 of the paper ticket 146 may correspond to the serial number 132 of the NFC-enabled ticket 106 or the serial number 142 of the paper ticket 108. As such, the serial number 154 may perform a similar role.

A matrix code 156 on the paper ticket 146 may provide a manner of gaining entry to an event or inputting the electronic ticket on the electronic device 10. The matrix code 156 may be any 2-D matrix code capable of encoding the serial number 152 or other data pertaining to the paper ticket 146. By way of example, the matrix code 156 may be a QR code, an Aztec Code, or a Data Matrix code. It should be appreciated that the paper ticket 146 may also be stored in an electronic device 10 using a variety of techniques. As discussed below, such techniques may include, for example, using the camera 36 of the electronic device 10 to scan the serial number 154 or the matrix code 156.

As noted above, the electronic ticketing system described herein enables electronic tickets to be obtained, stored, accessed, and/or used with an electronic device 10 such as the handheld device 40. In the disclosure which follows, FIGS. 12-40 below may generally describe techniques for obtaining and storing electronic tickets, while FIGS. 41-96 may generally describe techniques for accessing and using electronic tickets. It should be appreciated that although the handheld device 40 may serve an exemplary role in illustrating certain techniques described below, the techniques should not be understood as limited to the handheld device 40; indeed, the techniques should be understood to encompass the use of any appropriately configured electronic device 10.

Figures 12A, 12B:
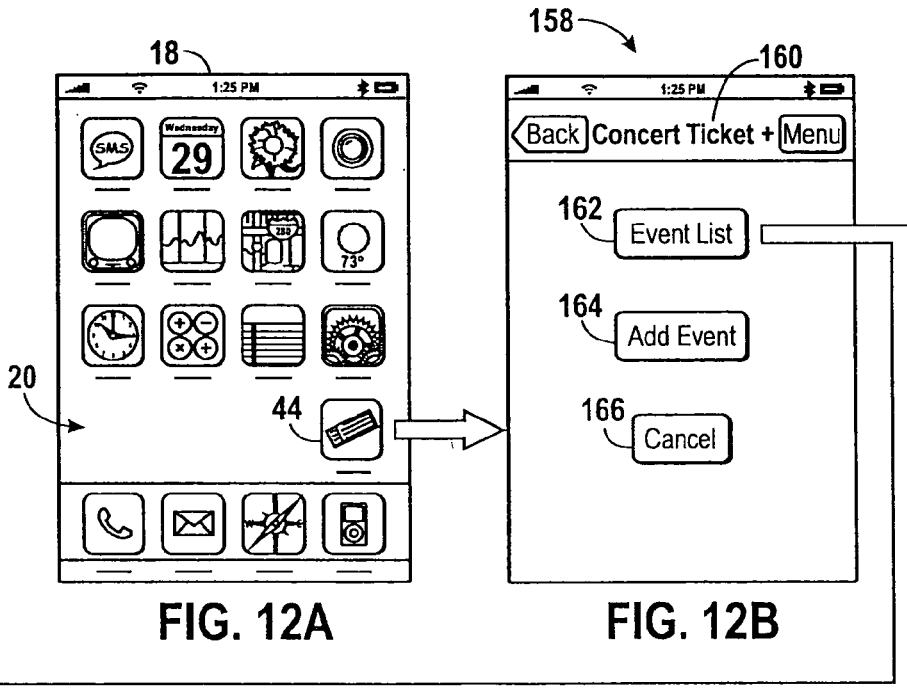

FIGS. 12A-F illustrate a manner of obtaining an electronic ticket on an electronic device 10 such as the handheld device 40. Turning first to FIG. 12A, a home screen is depicted on the display 18 of the handheld device 40, as shown on FIG. 2 above. On the graphical user interface 20 of the handheld device 40, a ticket management application icon 44 may be available for selection by a user. As noted above, the ticket management application icon 44 is labeled "concert ticket +" to indicate that the ticket management application icon 44 represents an application for managing concert tickets and more. Upon selection of the ticket management application icon 44, the ticket management application may begin to run on the handheld device 40, as shown in FIG. 12B.

FIG. 12B represents a screen 158 that may be displayed when the ticket management application begins to run on the handheld device 40. The opening screen 158 may include a title bar 160, which may assist with navigation through the application. The opening screen 158 may additionally include a number of user selectable buttons 162, 164, and 166. The button 162 may be labeled "Event List," and may provide access to a list of events for which the user has stored tickets; the button 164 may be labeled "Add Event," and may enable a user to add a stored ticket for an event, as described further below; the button 166 may be labeled "Cancel," and may enable a user to exit the application, returning the user to the home screen depicted in FIG. 12A.

Figures 12C, 12D:
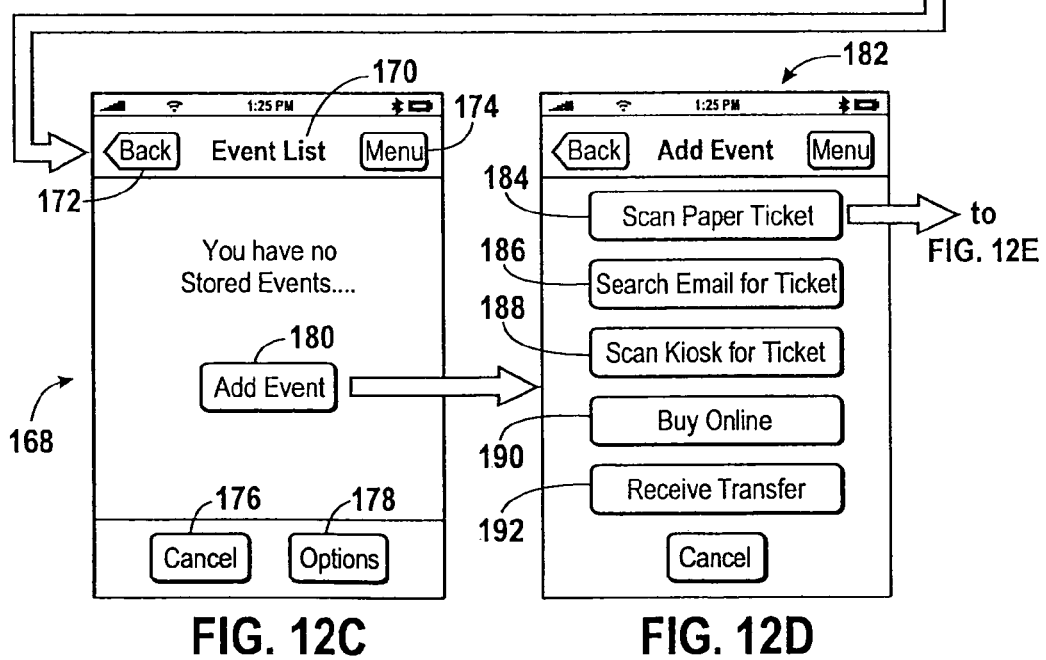

Turning to FIG. 12C, selection of the button 162 may cause the handheld device 40 to display a screen 168 with a title bar 170 labeled "Event List." Navigation buttons 172 and 174 may enable a user to navigate back to the prior screen 158 or to a main menu of the application, respectively. User selectable buttons 176 and 178 may allow a user to cancer the current operation or to change various options and user preferences, as described in greater detail below. If any electronic tickets are stored on the handheld device 40, a list of available events may be displayed. However, as depicted in FIG. 12C, if no electronic tickets have been obtained and/or stored on the handheld device 40, the screen 168 may display a message noting that no events are stored on the device. Additionally, the screen 168 may display a button 180 to prompt the user to add an event by inputting an electronic ticket.

Selecting the button 164 of the screen 158 of FIG. 12B or the button 180 of the screen 168 of FIG. 12C may navigate to a screen 182, as shown in FIG. 12D. The screen 182 may be entitled "Add Event," and may enable a user to add an electronic ticket for an event into the handheld device 40 using a variety of techniques, as indicated by user selectable buttons 184-192. As depicted in FIG. 12D, the button 184 may be labeled "Scan Paper Ticket," the button 186 may be labeled "Search Email For Ticket," the button 188 may be labeled "Scan Kiosk For Ticket," the button 190 may be labeled "Buy Online," and the button 192 may be labeled "Receive Transfer."

Selecting each of the buttons 184-192 may enable the user to input an electronic ticket according to different techniques. Particularly, techniques relating to inputting an electronic ticket by scanning a paper ticket, such as by selecting the button 184 labeled "Scan Paper Ticket," may be described with reference to FIGS. 12E-21 below. Techniques relating to inputting an electronic ticket received via email, such as by selecting the button 186 labeled "Search Email For Ticket," may be described with reference to FIGS. 22-23 below. Techniques relating to inputting an electronic ticket from a kiosk, such as by selecting the button 188 labeled "Scan Kiosk for Ticket," may be described with reference to FIGS. 24-36 below. Techniques relating to inputting an electronic ticket via an online purchase, such as by selecting the button 190 labeled "Buy Online," may be described with reference to FIGS. 37A-I below. Techniques relating to inputting an electronic ticket received from another electronic device 10 such as another handheld device 40, such as by selecting the button 192 labeled "Scan Kiosk for Ticket," may be described with reference to FIGS. 38-40 below.

It should be appreciated that although the "Back," "Menu," and "Cancel" buttons are not labeled with numerals in FIG. 12D or subsequent figures below, the buttons may function in the manners described above. As such, the "Back" button may navigate a user to a prior screen, the "Menu" button may navigate a user to the main screen 158 of the ticket management application, and the "Cancel" button may cancel a pending transaction or return a user to a prior screen.

Turning to FIG. 12E, a screen 194 labeled "Scan Paper Ticket" may be displayed on the handheld device 40 following the selection the button 184 of the screen 182 of FIG. 12D. As indicated by the screen 194, a paper ticket may be scanned in at least two different ways. Two user selectable buttons 196 and 198 may allow the user of an electronic device 10 to scan a paper ticket, such as the NFC-enabled ticket 106, the paper ticket 108, or the paper ticket 146, using the NFC interface 34 or the camera 36, respectively. Techniques relating to scanning the NFC-enabled ticket 106 using the NFC interface 34 may be described with reference to FIGS. 12F-15 below. Techniques relating to scanning the NFC-enabled ticket 106, the paper ticket 108, or the paper ticket 146 using the camera 36 may be described with reference to FIGS. 16-21.

Selecting the button 196 may navigate the user to a screen 200 labeled "Scan with NFC," as depicted in FIG. 12F. The screen 200 may instruct the user to tap the NFC interface 34 of the handheld device 40 to the NFC enabled ticket 106 using text and/or images.

FIG. 13 depicts a ticket-scanning operation 202 for obtaining ticket information from the NFC-enabled ticket 106 via the NFC interface 34 of the handheld device 40. By tapping the NFC interface 34 of the handheld device 40 to the RFID tag 122 of the NFC enabled ticket 106, ticket information stored on the RFID tag 122 may be transferred to the handheld device 40 via an NFC communication channel 204. The NFC communication channel 204 may be an inductive electromagnetic communication channel that may result after the NFC interface 34 sends an electromagnetic pulse to the RFID tag 122. The RFID tag 122 may become energized and transmit certain data stored on the RFID tag 122 the NFC interface 34 of the handheld device 40.

Figure 14:
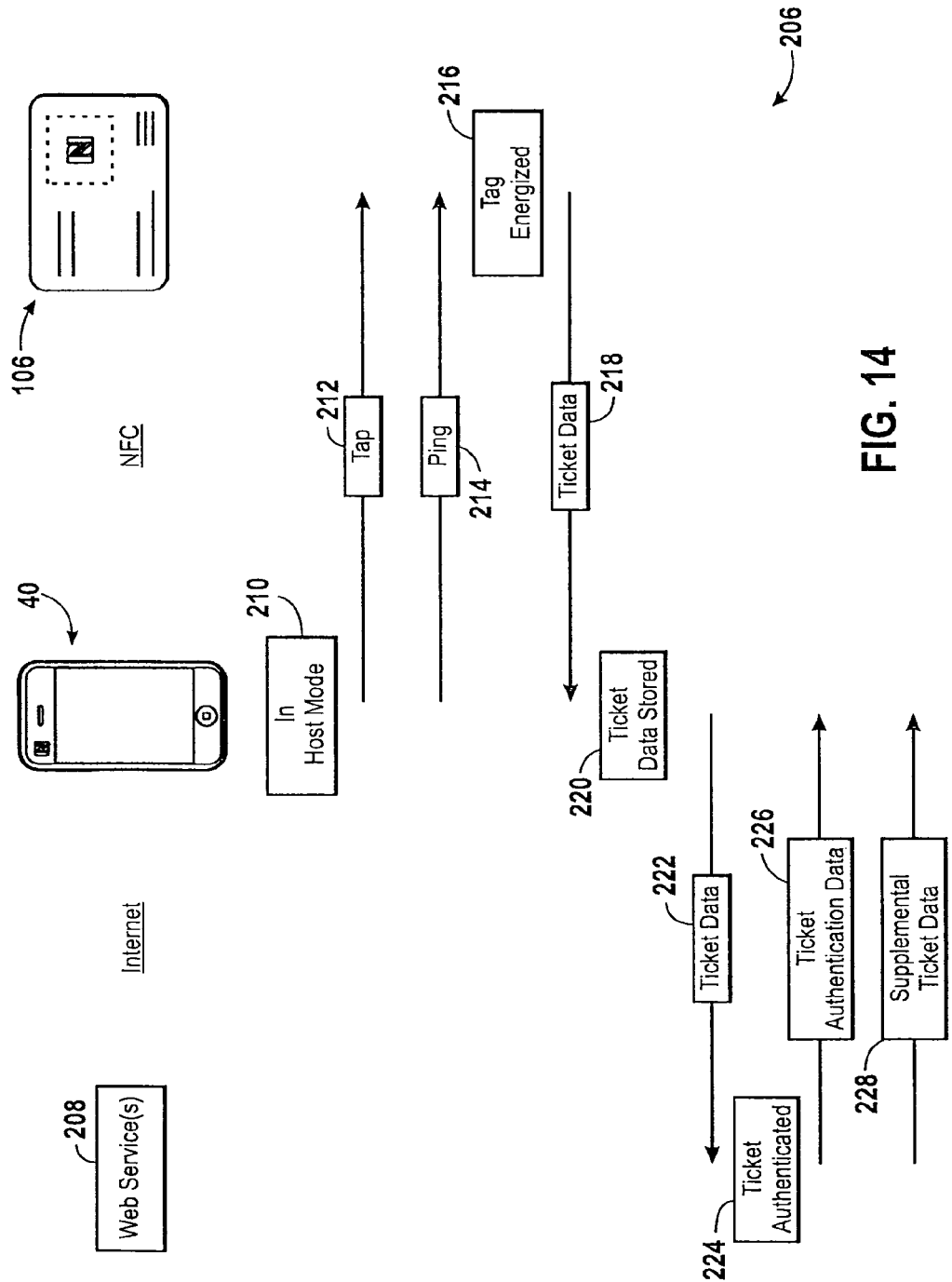
FIG. 14 is a block diagram representing communication that may take place during the ticket-scanning operation of FIG. 13.

Turning next to FIG. 14, a communication diagram 204 describes communication that may place during the ticket-scanning operation 202 of FIG. 13. At the start of the communication diagram 206, the NFC interface 34 of the handheld device 40 may be in a "host mode," as indicated by block 210. The NFC interface 34 of the handheld device 40 may enter the "host mode" when the button 196 of the screen 194 of FIG. 12E is selected.

As shown by block 212 of the communication diagram 206 and illustrated in the ticket-scanning operation 202 of FIG. 13, a user may tap the NFC interface 34 of the handheld device 40 to the NFC enabled ticket 106. Because the NFC interface 34 of the handheld device 40 may be operating in the "host mode," the NFC interface 34 may periodically emit an NFC ping, as illustrated by block 214. The NFC ping may energize the RFID tag 122 of the NFC-enabled ticket 106, as noted by block 216. Subsequently, as shown by block 218, the RFID tag 122 of the NFC enabled ticket 106 may transfer certain stored ticket data to the handheld device 40.

The ticket data may be stored in the main memory 14 or the nonvolatile storage 16 of the handheld device 40. As noted above, the ticket data may include, for example, a unique identifying serial number representing a pointer to data located in an external database, or a data file, such as an XML file, describing the event to which the NFC-enabled ticket 106 pertains. The data file may include fields describing the category of event, artist name, tour title, venue, seating information, and/or a hash pertaining to an account, such as an iTunes® account, associated with the user. In some cases, the ticket data may additionally include a hyperlink to the web service 208 or other identifying information for the handheld device 40 to locate the web service 208.

The handheld device 40 may transmit the ticket data via the Internet or another communication channel to a web service 208, as shown by block 222. The web service 208 may represent any online network capable of relating the ticket data with other information for carrying out the techniques disclosed herein. The handheld device 40 may discover the location of the web service 208 through a hyperlink embedded in the ticket data to the web service 208, with a predetermined hyperlink associated with the ticket management application that may run on the handheld device 40, or by contacting another web service that may point the handheld device 40 to the web service 208 based on information that may be stored in the ticket data. The web service 208 may have access to a database relating ticket data to certain other information, such as an account associated with the purchaser of the ticket (e.g., an iTunes® account), a device which may pertain to the purchaser, the location of the event, the starting time and duration of the event, or the schedule of the event, etc., or other benefits that may be associated with the ticket. With such capabilities, the web service 208 may authenticate the ticket, as shown in block 224.

The authentication procedure of block 224 may involve, for example, verifying that the purchaser of the ticket and the owner of the handheld device 40 are the same, if the ticket has not been transferred to another owner, or verifying that the ticket has not previously been stored electronically on another electronic device 10 or used to gain entry to the event. Authentication may rely on a private key known to both the web service 208 and the handheld device 40, which may have been exchanged prior to communication or, additionally or alternatively, a combination of a public key and a private key. Under the latter scheme, the web service 208 and the handheld device 40 may each exchange public keys associated with one another prior to or during the authentication procedure of block 224, or may obtain public keys from another source. The web service 208 and the handheld device 40 may verify the public keys with a certificate authority over the Internet or via a web of trust. In certain variations, the web service 208 may represent the certificate authority. If there is any link broken in the chain of trust, the authentication procedure of block 224 may be terminated.

Following the ticket authentication of block 224, the web service 208 may respond to the handheld device 40 by transmitting ticket authentication data and/or supplemental ticket data, as illustrated by blocks 226 and 228, respectively. As described herein, the ticket authentication data of block 226 may represent a passcode or other data to permit a user to gain entry to the event or to gain certain other benefits. The supplemental ticket data of block 228 may represent data describing certain other benefits which may be associated with the ticket data, as well as providing additional information regarding the event.

The benefits described in the supplemental ticket data of block 228 may be listed in a data file, such as an XML file, which may include each of the benefits as well as a local or online location where data associated with the benefits may be obtained. By way of example, the benefits may include free or discounted music downloads or discounted or prepaid refreshments at the event. As such, the data file listing the benefits may also include a link to a page of an online music vendor, such as iTunes®, where the music may be obtained, or a link to an online coupon for discounted or prepaid refreshments. To supplement the listing of benefits, the supplemental ticket data of block 228 may also include certain other data, such as authentication data associated with the coupon or images associated with each benefit from the data file listing the benefits.

It should be appreciated that the supplemental ticket data of block 228 may additionally include information regarding the event to which the ticket pertains; such information may provide greater detail about the event than may be noted in the ticket data obtained from the NFC-enabled ticket 106. For example, the supplemental ticket data may include a data file such as an XML file describing the starting and ending time of the event, GPS coordinates or other information denoting the location of the event or of certain sub-events at the event, whether a ringtone of the handheld device 40 should be quieted during the event, etc. If not included in the ticket data obtained from the NFC-enabled ticket 106, the supplemental ticket data of block 228 may additionally include the category of event, artist name, tour title, venue, seating information, and/or a hash pertaining to an account, such as an iTunes® account, associated with the user, etc.

Figure 15A:
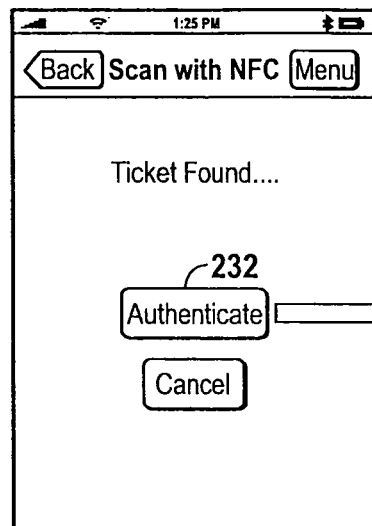
FIGS. 15A-D are schematics of screens that may be displayed on the electronic device of FIG. 1 during an electronic ticket authentication procedure.

Turning next to FIG. 15A, a prompt 230 may be displayed upon receipt and storage of the ticket data, as generally noted by the block 220 of the communication diagram 206 of FIG. 14. It should be appreciated that the handheld device 40 may or may not display the prompt 230 depending on user preferences. The prompt 230 of FIG. 15A may indicate that a ticket has been received by the handheld device 40, and a button 232, labeled "Authenticate," may enable a user to authenticate the ticket 106. Selecting the button 232 may cause the communication of the communication diagram 206 to continue from the block 220.

The handheld device 40 may thus attempt to establish communication with the web service 208. If the Internet communication channel is not available, the user may be presented with a screen 234 of FIG. 15B, which may indicate that Internet access is unavailable. Such a situation may arise, for example, if the handheld device 40 lacks the WAN interface 32 and is outside the range of an accessible Wi-Fi network for Internet access. A button 236 labeled "Authenticate Later" on the screen 234 may permit the user to choose to authenticate the ticket at another time when Internet access is available.

Figure 15B:
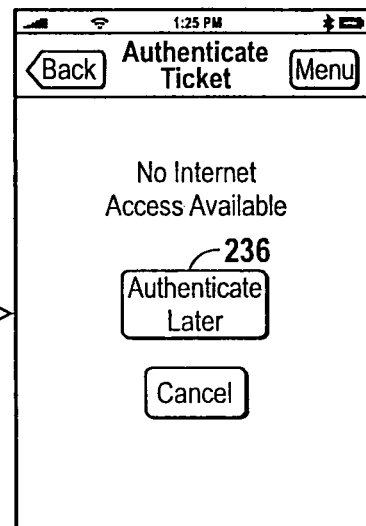
Figure 15C:
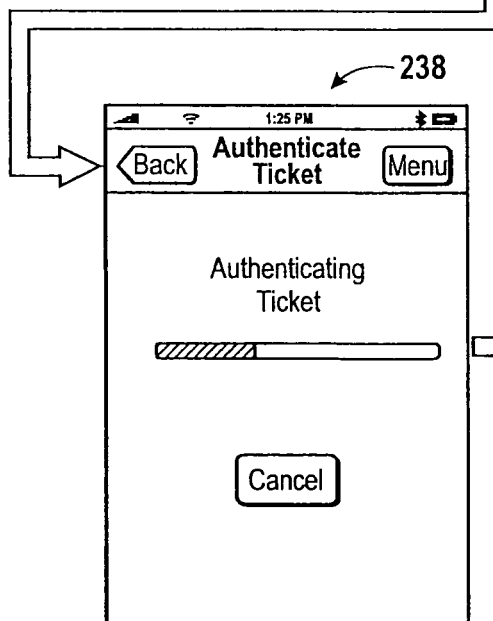

If Internet access is available when the button 232 of the screen 230 of FIG. 15A is selected, or if Internet access later becomes available following the selection of the button 236 of the screen 234 of FIG. 15B, a screen 238 of FIG. 15C may be displayed. The screen 238 may be displayed while the communication illustrated by blocks 222-228 of the communication chart 206 takes place. To indicate that the ticket 106 is being authenticated, the screen 238 may include a status bar that may advance as the authentication data of block 226 and the supplemental ticket data of block 228 are received.

Figure 15D:
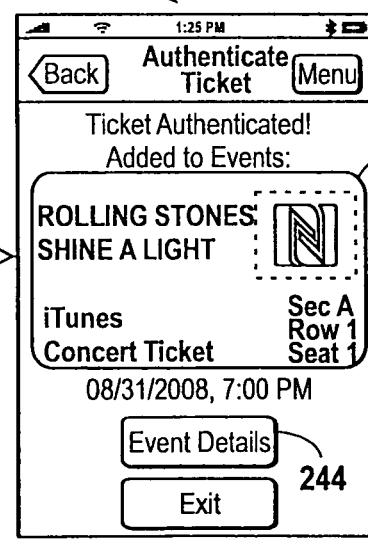

When the ticket authentication data and/or supplemental ticket data of blocks 226 and 228 have been received, a screen 240 may be displayed, as shown by FIG. 15D. The screen 240 may include an indication that the event associated with the ticket 106 has been added to the handheld device 40, and a ticket image 242 may be displayed. It should be appreciated that the ticket image 242 may represent data received among the supplemental ticket data of block 228 of FIG. 14. A button 244 labeled "Event Details" may enable the user to view additional ticket details, including the various benefits that may be associated with the event, described in greater detail below.

FIGS. 16 through 21 depict an alternative technique for obtaining an electronic ticket from a paper ticket. Turning first to FIG. 16A, the screen 194 may present the user with the button 198 labeled "Scan With Camera." Selecting the user selectable button 198 may cause the handheld device 40 to display a screen 246, as illustrated in FIG. 16B.

The screen 246 may include a camera window 248 and a user selection prompt 250. The camera window 248 may present video images from the camera 36 of the handheld device 40. As noted in FIG. 16B, the user selection prompt 250 may instruct the user to align a paper ticket, such as the paper ticket 108, on the camera screen 248 to acquire an image of the ticket. Image boundaries 252 may indicate the portion of the camera window 248 that may be saved as an image; selecting a user selectable button 254 labeled "Acquire" may cause the image of the paper ticket 108 currently within the image boundaries 252 to be acquired.

Figures 16A, 16B:
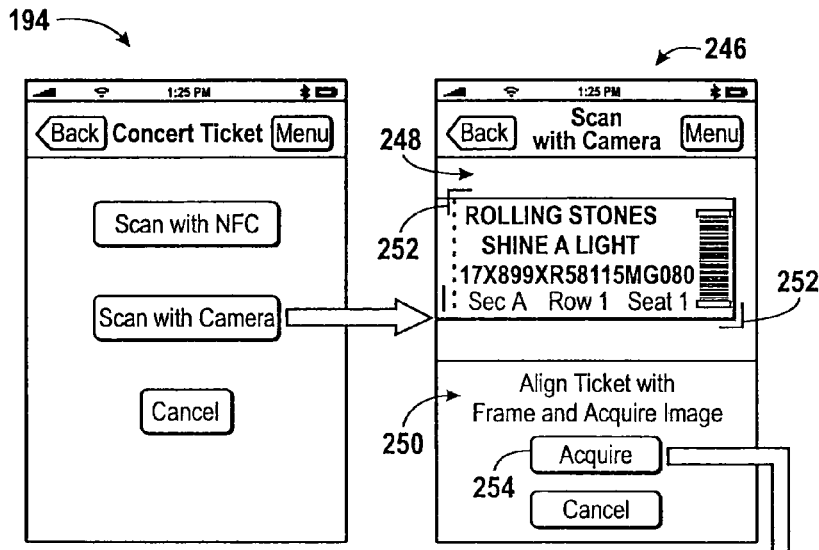
FIGS. 16A-C are schematics of screens that may be displayed for an alternative manner of obtaining a electronic ticket from the tickets of FIGS. 9-11.
Figure 16C:
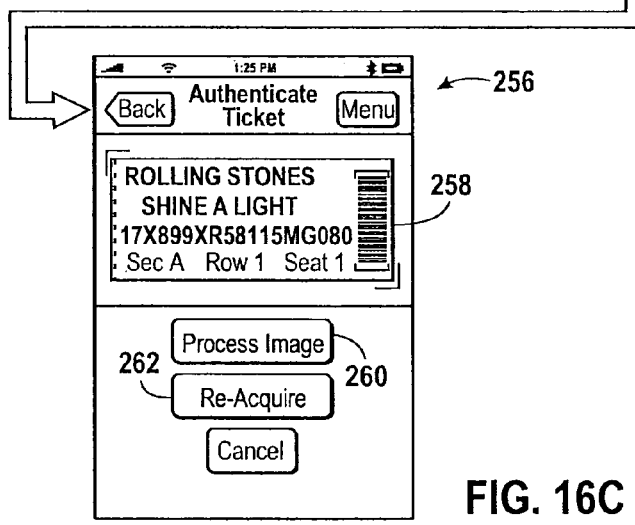

A screen 256, shown in FIG. 16C, may be displayed when the button 254 is selected. A still image 258 may represent the image acquired by the camera 36. Two buttons 260 and 262 may be labeled "Process Image" and "Re-Acquire," respectively. The button 260 may allow a user to proceed with the still image 258, while the button 262 may allow the user to acquire another image of the paper ticket 108 by returning to the screen 246 of FIG. 16B.

Figure 17:
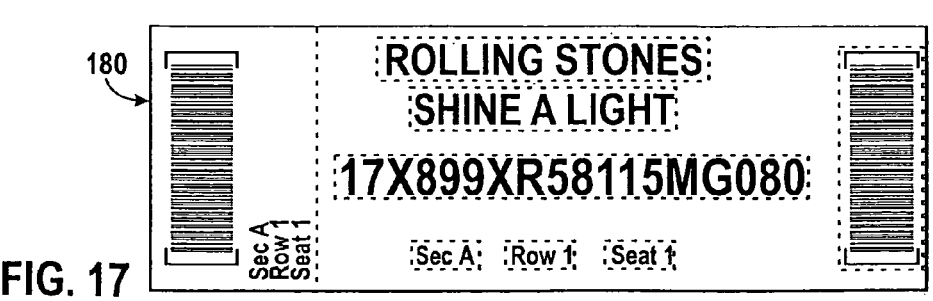
FIG. 17 is a schematic illustrating the use of optical character recognition to obtain an electronic ticket from the ticket of FIG. 10.

The acquired image 258 is shown in greater detail in FIG. 17. As noted schematically, the handheld device 40 may identify text displayed on the ticket 108 using optical character recognition (OCR) software that may run on the handheld device 40. As discussed further below, the text obtained by the OCR software on the handheld device 40 may represent ticket data which may be authenticated and stored in the handheld device 40.

Figures 18A, 18B:
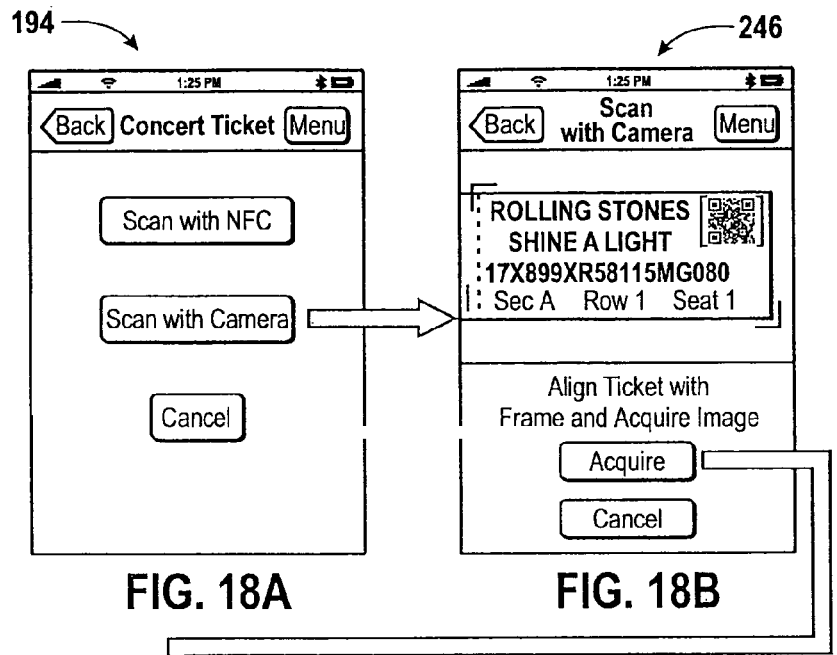
FIGS. 18A-C are schematics of screens that may be displayed for an alternative manner of obtaining a electronic ticket from the tickets of FIGS. 9-11.
Figure 18C:
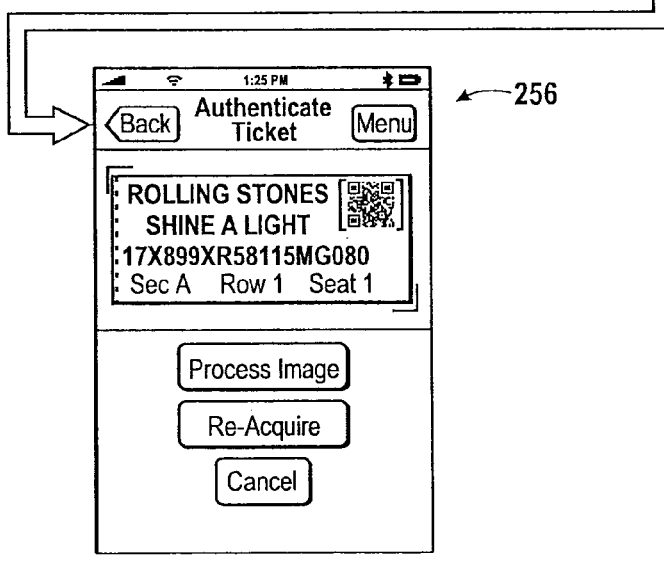
Figure 19:
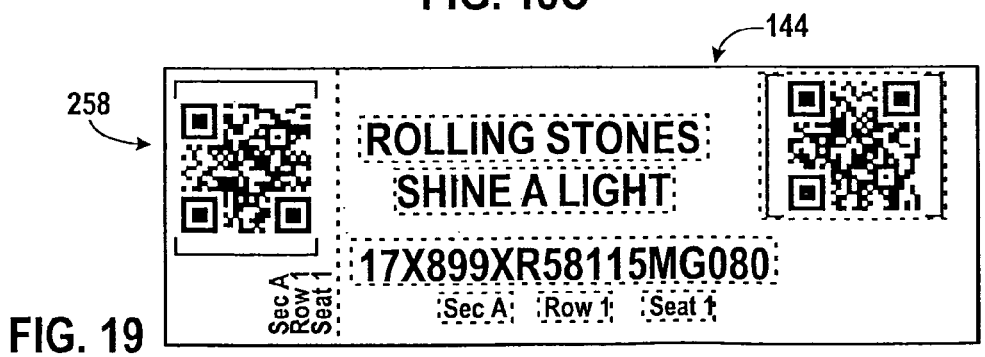
FIG. 19B is a schematic illustrating the use of optical character recognition to obtain an electronic ticket from the ticket of FIG. 11.

FIGS. 18 and 19 illustrate a similar manner of inputting ticket data optically from a paper ticket to the handheld device 40. More specifically, FIGS. 18 and 19 represent a manner of inputting ticket data encoded in the barcode 144 of the paper ticket 108 or the matrix code 156 of the paper ticket 146. Turning first to FIG. 18A, selecting the button 198 of the screen 194 may be used to access the screen 246. Rather than acquiring an image of the text of the ticket 106, 108, or 146, as shown by FIGS. 16-17 above, an image of the barcode 144 of the paper ticket 108 or the matrix code 156 of the paper ticket 146 may be acquired. From selecting the button 254 labeled "Acquire" when the barcode 144 or the matrix code 156 is located within the image boundaries 252, the subsequent screen 256 of FIG. 18C may display the barcode 144 or the matrix code 156 in the acquired image 258.

FIG. 19 illustrates the image 258 in greater detail. As noted schematically, the handheld device 40 may decode data stored in the matrix code 156 of the paper ticket 146 using matrix-code-reading software which may run on the handheld device 40. It should be appreciated that the handheld device 40 may alternatively decode data stored in the barcode 144 of the paper ticket 108 using barcode-reading software. As discussed further below, the information obtained by the matrix-code-reading software or the barcode-reading software may represent ticket data which may be authenticated and stored in the handheld device 40.

Figure 20:
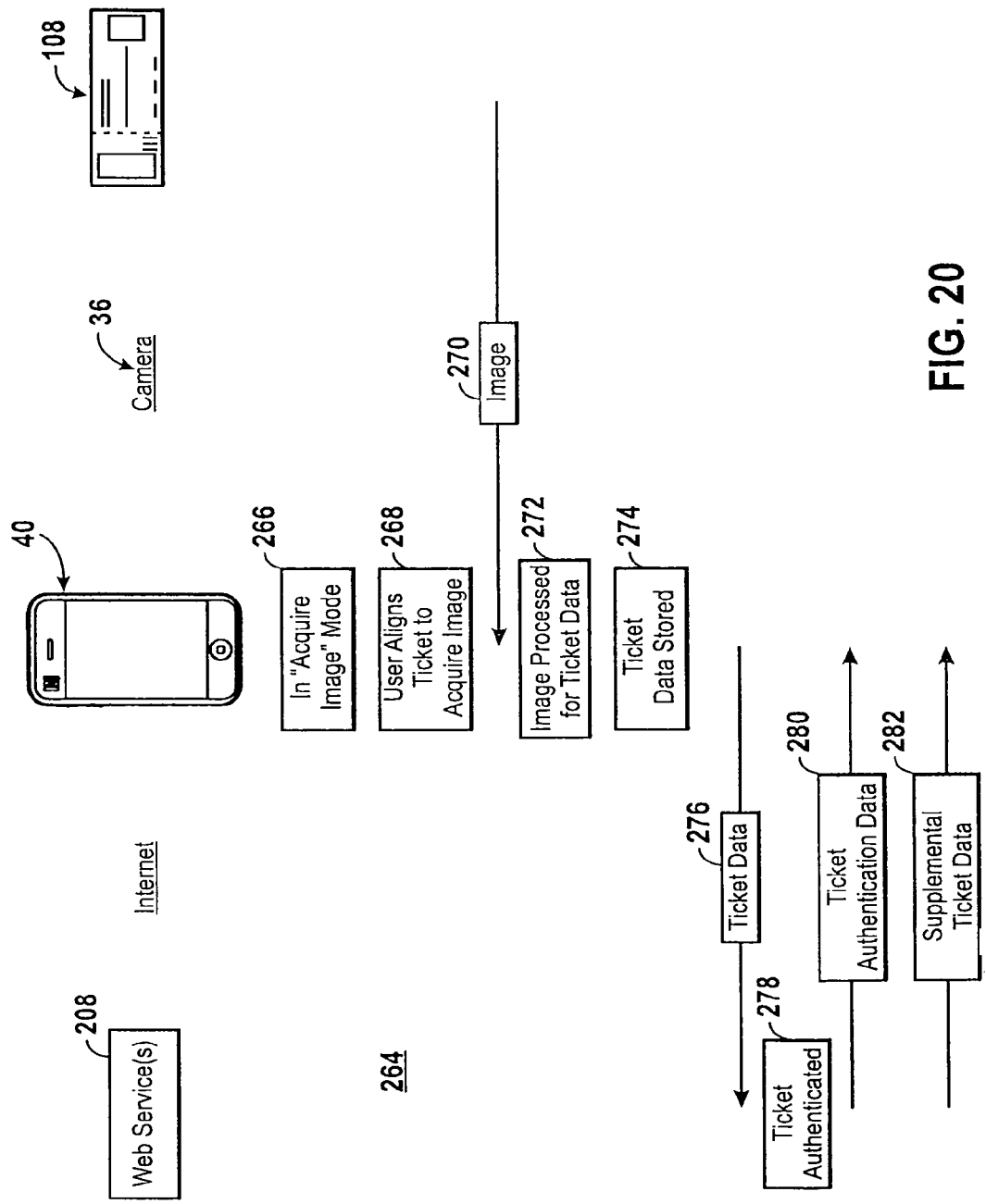
FIG. 20 is a block diagram illustrating communication that may take place during the ticket scanning operations of FIGS. 16-19.

Turning next to FIG. 20, a communication diagram 264 illustrates another manner of obtaining ticket data from the ticket 106, 108, or 146. As noted by the communication diagram 264, an initial data transfer may occur from the ticket 108 to the handheld device 40 via the camera 36, and further communication may take place between the handheld device 40 and the one or more web services 208 via the Internet. At the outset of the communication diagram 264, the handheld device 40 may enter an "acquire image" mode, as indicated by block 266. The "acquire image" mode of the handheld device 40 may be represented by the screen 246 shown in FIGS. 16B and 18B. As noted by block 268, the user may next align the paper ticket in the camera to acquire an image of the ticket. If the ticket data is to be obtained from text, the user may align the ticket 106, 108, or 146 such that the relevant text is clearly visible and within the image boundaries 252 of the camera window 248. If the ticket data is to be obtained from the barcode 144 of the paper ticket 108 or the matrix code 156 of the paper ticket 146, the user may align the ticket such that the barcode 144 or the matrix code 156 are visible.

As illustrated by block 270, the image 258 of the ticket may be acquired. The image 258 may be represented on the screen 256 of FIGS. 16C and 18C above. When the user selects the button 260 of the screen 256, the handheld device 40 may process the image 258 using OCR, barcode-reading, or matrix-code-reading software in block 274, the ticket data may be stored in the main memory 14 or the nonvolatile memory 16 of the handheld device 40. As noted above, the ticket data may include, for example, a unique identifying number representing a pointer to data located in an external database, or a data file, such as an XML file, describing the event to which the ticket 106, 108, or 146 pertains. The data file may include fields describing the category of event, artist name, tour title, venue, seating information, and/or a hash pertaining to an account, such as an iTunes® account, associated with the user.

After processing and storing the ticket data, but prior to authenticating the ticket data with the web service 208, the handheld device may display a prompt, as described below with reference to FIG. 21 below. Upon a selection by a user, the handheld device 40 may transmit the ticket data via the Internet or another communication channel to the web service 208, as shown by block 276. As noted above, the web service 208 may have access to a database relating ticket data to certain other information, such as an account associated with the purchaser of the ticket (e.g., an iTunes® account), a device which may pertain to the purchaser, the location of the event, the starting time and duration of the event, the schedule of the event, etc., as well as various benefits that may be associated with the ticket. With such capabilities, the web service 208 may authenticate the ticket, as shown in block 278.

In the same manner as the authentication procedure of block 224 described above with reference to FIG. 14, the authentication procedure of block 278 of FIG. 20 may involve, for example, verifying that the purchaser of the ticket and the owner of the handheld device 40 are the same, if the ticket has not been transferred to another owner, or verifying that the ticket has not previously been stored electronically on another electronic device 10 or used to gain entry to the event. Authentication may rely on a private key known to both the web service 208 and the handheld device 40, which may have been exchanged prior to communication or, additionally or alternatively, a combination of a public key and a private key. Under the latter scheme, the web service 208 and the handheld device 40 may each exchange public keys associated with one another prior to or during the authentication procedure of block 278, or may obtain public keys from another source. The web service 208 and the handheld device 40 may verify the public keys with a certificate authority over the Internet or via a web of trust. In certain variations, the web service 208 may represent the certificate authority. If there is any link broken in the chain of trust, the authentication procedure of block 278 may be terminated.

Subsequent to the ticket authentication of block 278, the web service 208 may respond to the handheld device 40 by transmitting ticket authentication data and/or supplemental ticket data, as illustrated by blocks 280 and 282, respectively. As described herein, the ticket authentication data of block 280 may represent a passcode or other data to permit a user to gain entry to the event or to gain certain other benefits. The supplemental ticket data of block 282 may represent data describing certain other benefits which may be associated with the ticket data.

The benefits described in the supplemental ticket data of block 282 may be listed in a data file, such as an XML file, which may include each of the benefits as well as a local or online location where data associated with the benefits may be obtained. By way of example, the benefits may include free or discounted music downloads or discounted or prepaid refreshments at the event. As such, the data file listing the benefits may also include a link to a page of an online music vendor, such as iTunes®, where the music may be obtained, or a link to an online coupon for discounted or prepaid refreshments. To supplement the listing of benefits, the supplemental ticket data of block 282 may also include certain other data, such as authentication data associated with the coupon or images associated with each benefit from the data file listing the benefits.

It should be appreciated that the supplemental ticket data of block 282 may additionally include information regarding the event to which the ticket pertains; such information may provide greater detail about the event than may be noted in the ticket data obtained from the ticket 106, 108, or 146. For example, the supplemental ticket data may include a data file such as an XML file describing the starting and ending time of the event, GPS coordinates or other information denoting the location of the event or of certain sub-events at the event, whether a ringtone of the handheld device 40 should be quieted during the event, etc. If not included in the ticket data obtained from the ticket 106, 108, or 146, the supplemental ticket data of block 282 may additionally include the category of event, artist name, tour title, venue, seating information, and/or a hash pertaining to an account, such as an iTunes® account, associated with the user, etc.

It should further be appreciated that the communication represented by blocks 276-282 may take place while a series of authentication prompts or screens are displayed on the handheld device. Such screens may include those described above with reference to FIGS. 15A-D above.

Figure 21:
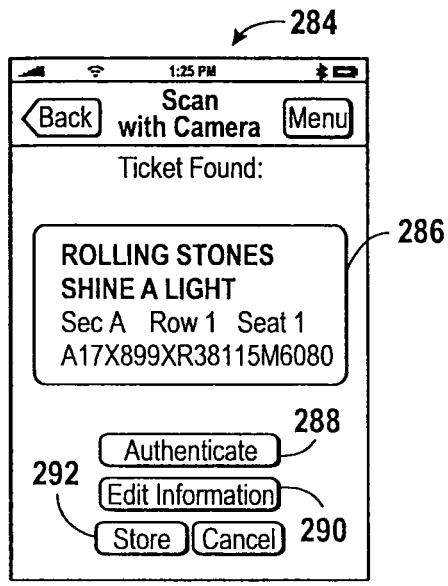
FIG. 21 is a schematic of a screen that may be displayed on the electronic device of FIG. 1 when an electronic ticket is obtained from the tickets of FIGS. 10-11.

As noted above, when the handheld device 40 has processed the image 258 for ticket data, as illustrated by block 272, and has stored the ticket data in the main memory 14 or nonvolatile storage 16, a screen 284 of FIG. 21 may be displayed. Because the OCR, barcode-reading, or matrix-code-reading software that may run on the handheld device could mistranscribe the ticket data, the screen 284 may list the extracted ticket data 286 acquired from the image 258 of the ticket 106, 108, or 146. If the extracted ticket data 286 is correct, a user may choose to authenticate the ticket by selecting a button 288, labeled "Authenticate." If the button 288 is selected, the authentication procedure may take place in the manner described in the communication diagram 264 and the handheld device 40 may display the screens illustrated in FIGS. 15A-D.

If the extracted ticket data 286 is not correct, a user may choose to edit the ticket data manually by selecting a button 290, labeled "Edit Information." If the ticket data 286 is correct, but authentication is not desired or necessary, a user may choose only to store the extracted ticket data 286 without initiating an authentication procedure by selecting a button 292, labeled "Store."

Figures 22A, 22B:
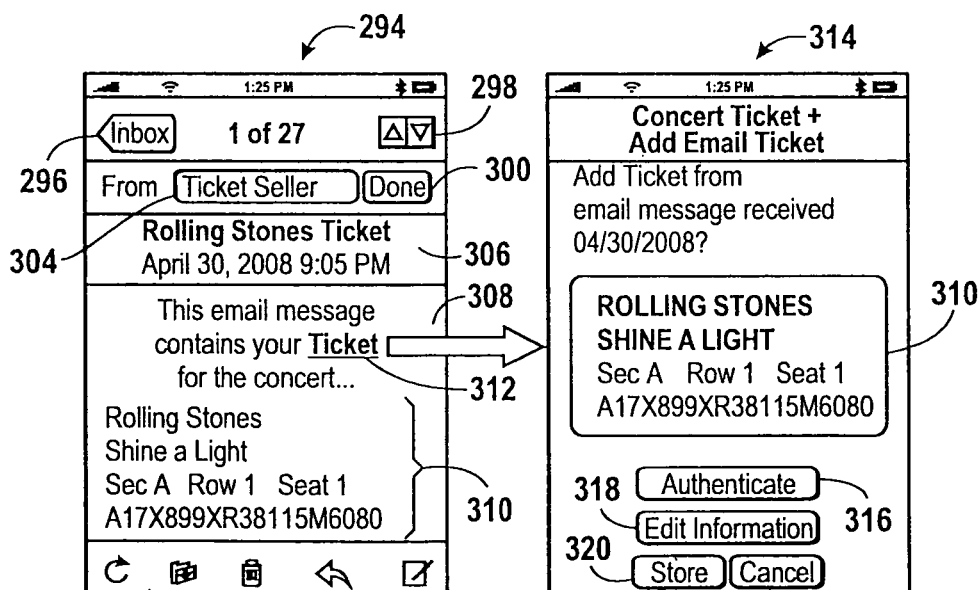
FIGS. 22A-B are schematics of screens that may be displayed on the electronic device of FIG. 1 when an electronic ticket is received in an e-mail message.

FIGS. 22 and 23 illustrate a manner of obtaining an electronic ticket received in an email message. Turning first to FIGS. 22A-B, an electronic ticket may be obtained directly from a hyperlink embedded in an e-mail message. As illustrated in FIG. 22A, an e-mail message 294 may be displayed in an e-mail client on the handheld device 40. As such, the e-mail client may include buttons 296 and 298 to navigate to the inbox and to other messages, respectively, as well as a button 300 to exit the message. A refresh button 302 may cause the handheld device 40 to check for new messages.

The e-mail message 294 may be received from, for example, a ticket vendor, such as iTunes®. As indicated by numeral 304, the name of the vendor may be noted in the "From" line of the e-mail message as indicated by numeral 304. A subject line 306 of the e-mail message may indicate that the message includes tickets to a concert or other event, such as a Rolling Stones concert. A body 308 of the e-mail message may include text 310 representing ticket data for use by the handheld device 40. It should be appreciated that the ticket data may also be transmitted in the form of an attached file, such as an image file or XML file. Moreover, the ticket data transmitted in the e-mail message may or may not include authenticated ticket data. A hyperlink 312 may launch the ticket management application and automatically add the ticket data onto the handheld device 40.

Turning next to FIG. 22B, a screen 314 may be displayed upon selection of the hyperlink 312. The screen 314 may prompt the user to choose whether to automatically add the ticket data from the e-mail message 294 onto the handheld device 40. Buttons 316, 318, and 320 may be labeled "Authenticate," "Edit Information," and "Store," respectively. If the text 310 correctly reflects the ticket data, the button 316 may enable a user to authenticate the ticket data. The authentication procedure begun by selecting the button 316 may mirror the communication represented by the blocks 222-228 of the communication diagram 206 of FIG. 14, during which the handheld device 40 may also display the screens illustrated in FIGS. 15A-D. If the information is not correct, the user may choose to edit the information by selecting the button 318. To store the ticket data without authentication, the user may select the button 320.

Figures 23A, 23B:
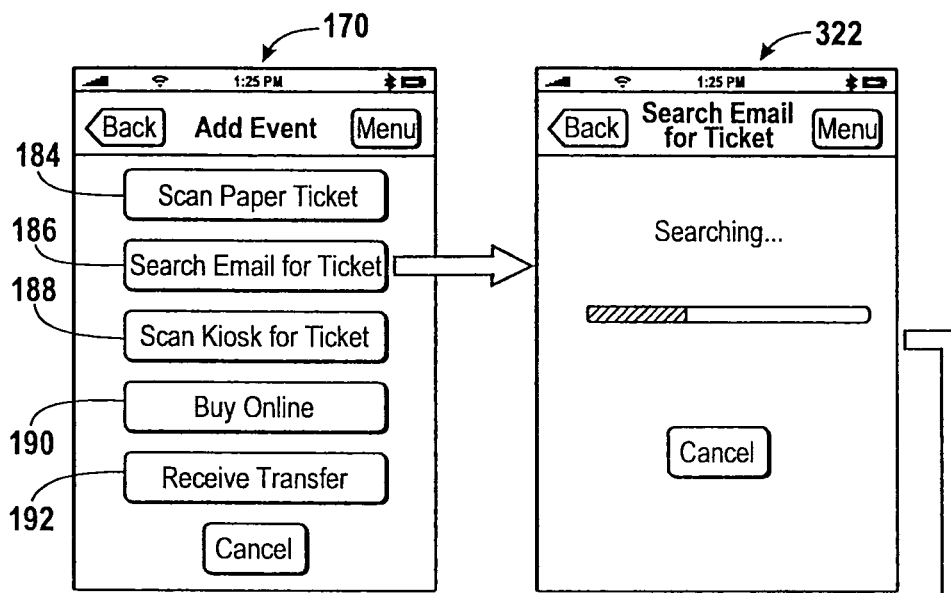
FIGS. 23A-D are schematics of screens that may be displayed on the electronic device of FIG. 1 during an e-mail-scanning operation to obtain an electronic ticket received in an e-mail message.

FIGS. 23A-D illustrate an alternative manner of obtaining an electronic ticket received in an e-mail message. Turning first to FIG. 23A, selecting the button 186 from the screen 182 may initiate a search for an electronic ticket through the e-mail client. As shown in FIG. 23B, the initiation of the search may cause the handheld device 40 to display a screen 322. The screen 322 may indicate that the handheld device 40 is searching through an e-mail database stored in the nonvolatile storage 16 or the main memory 14 of the handheld device 40.

Figures 23C, 23D:
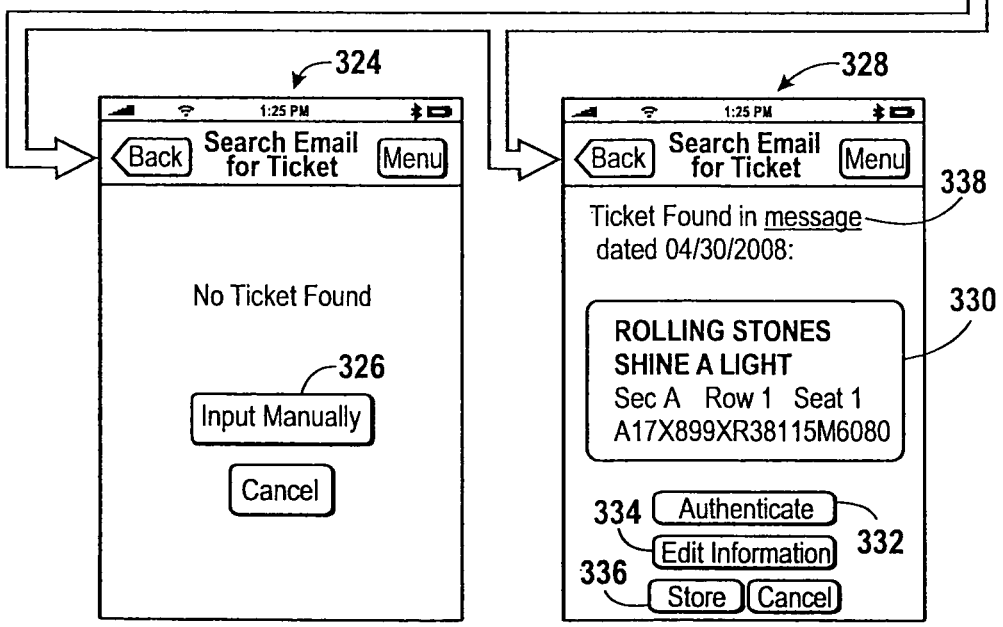

A subsequent screen 324, illustrated in FIG. 23C, may be displayed if no ticket is found in the e-mail database located on the handheld device 40. A button 324 may allow the user to input ticket information manually. Alternatively, a screen 328, illustrated in FIG. 23D, may be displayed if an electronic ticket is found in the e-mail database on the handheld device 40. The screen 328 may prompt the user to choose whether to automatically add the electronic ticket, indicated generally as text 330, found in from the e-mail database onto the handheld device 40. Buttons 332, 334, and 336 may be labeled "Authenticate," "Edit Information," and "Store," respectively. If the text 330 correctly reflects the ticket data, the button 316 may enable a user to authenticate the ticket data. The authentication procedure begun by selecting the button 332 may mirror the communication represented by the blocks 222-228 of the communication diagram 206 of FIG. 14, during which the handheld device 40 may also display the screens illustrated in FIGS. 15A-D. If the information is not correct, the user may choose to edit the information by selecting the button 334. To store the ticket data without authentication, the user may select the button 336. A hyperlink 338 may enable a user to view the message in which the ticket data was obtained.

FIGS. 24 through 36 illustrate a manner of obtaining an electronic ticket from a kiosk, such as the kiosk 74 or the unmanned kiosk 88. Turning first to FIG. 24A, selecting the button 188 labeled "Scan Kiosk For Ticket" may cause the handheld device 40 to display a screen 340, as illustrated in FIG. 24B. The screen 340 may present a user with a variety of options for obtaining an electronic ticket from the kiosk 74 or the unmanned kiosk 88. By way of example, a user may obtain an electronic ticket by scanning the kiosk using NFC, as illustrated by a button 342 labeled "Scan Kiosk With NFC;" the user may scan the kiosk using the camera 36, as illustrated by a button 344 labeled "Scan Kiosk With Camera;" or the user may obtain a ticket wirelessly as indicated by a button 346 labeled "Find Kiosk Wirelessly." Each technique is discussed in greater detail below.

FIGS. 24C-32B relate to techniques for obtaining an electronic ticket via the kiosk 74 or unmanned kiosk 88 involving NFC communication. Turning first to FIG. 24C, a screen 348 may be displayed when the button 342 is selected. The screen 348 may instruct the user, "Tap Kiosk to Add Ticket . . . ," which may enable the handheld device 40 to obtain ticket data from the kiosk 74 or the unmanned kiosk 88 via an NFC communication channel.

Figure 25:
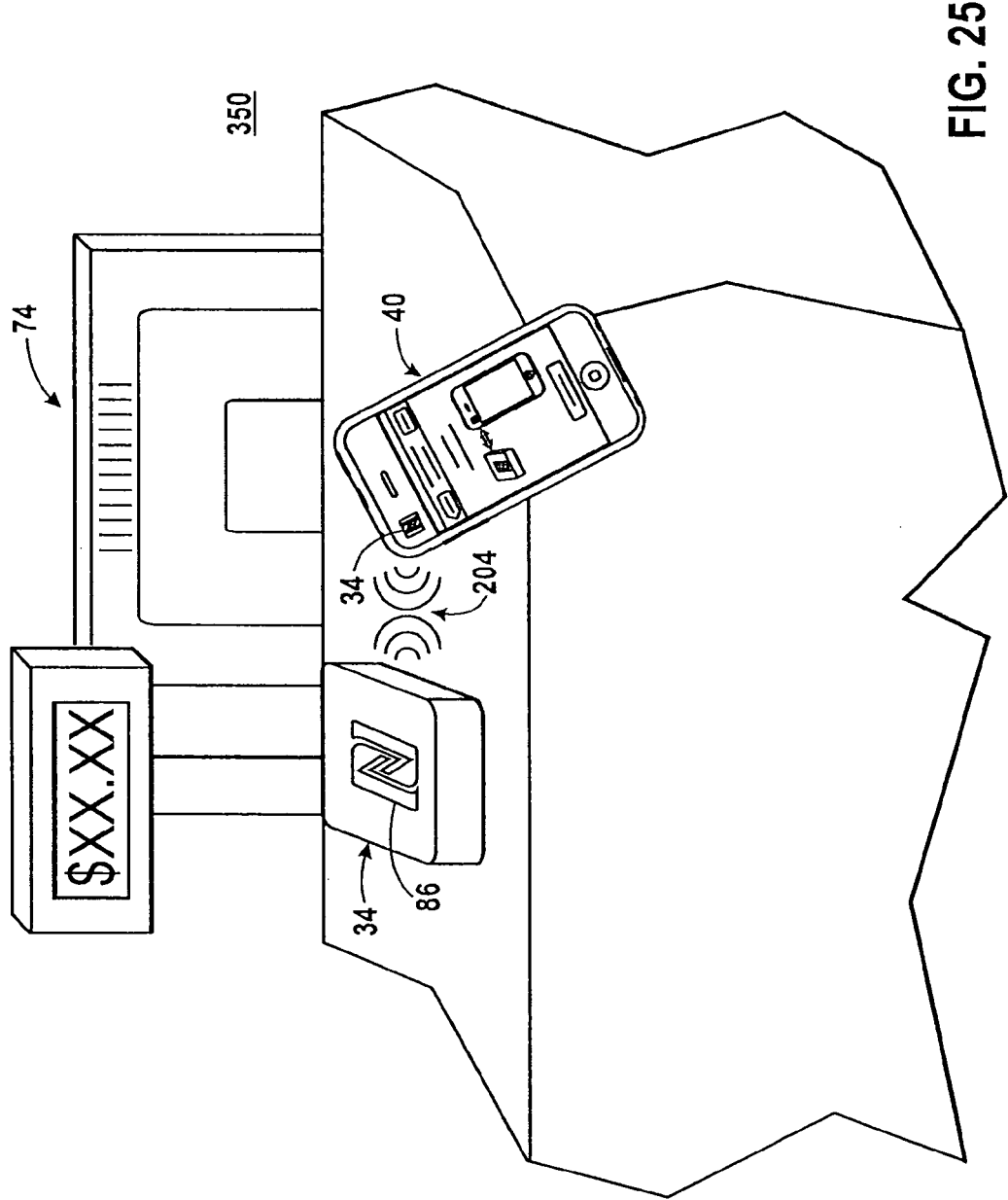
FIG. 25 is a schematic illustrating a kiosk-scanning operation for obtaining an electronic ticket from one of the kiosks of FIGS. 5-6.

FIG. 25 represents a kiosk-scanning operation 350. Though the kiosk-scanning operation 350 of FIG. 25 illustratively depicts the kiosk 74 and the handheld device 40, it should be understood that any NFC-enabled kiosk, including the unmanned kiosk 88, and any electronic device 10 may be employed. To perform the kiosk-scanning operation 350, the NFC interface 34 of the handheld device 40 may be tapped against the NFC interface 34 of the kiosk 74 after the button 342 of the screen 340 has been selected. When the handheld device 40 is tapped to the NFC interface 34 of the kiosk 74, the NFC communication channel 204 may be established and certain communication may be exchanged, as described in greater detail below.

Figure 26:
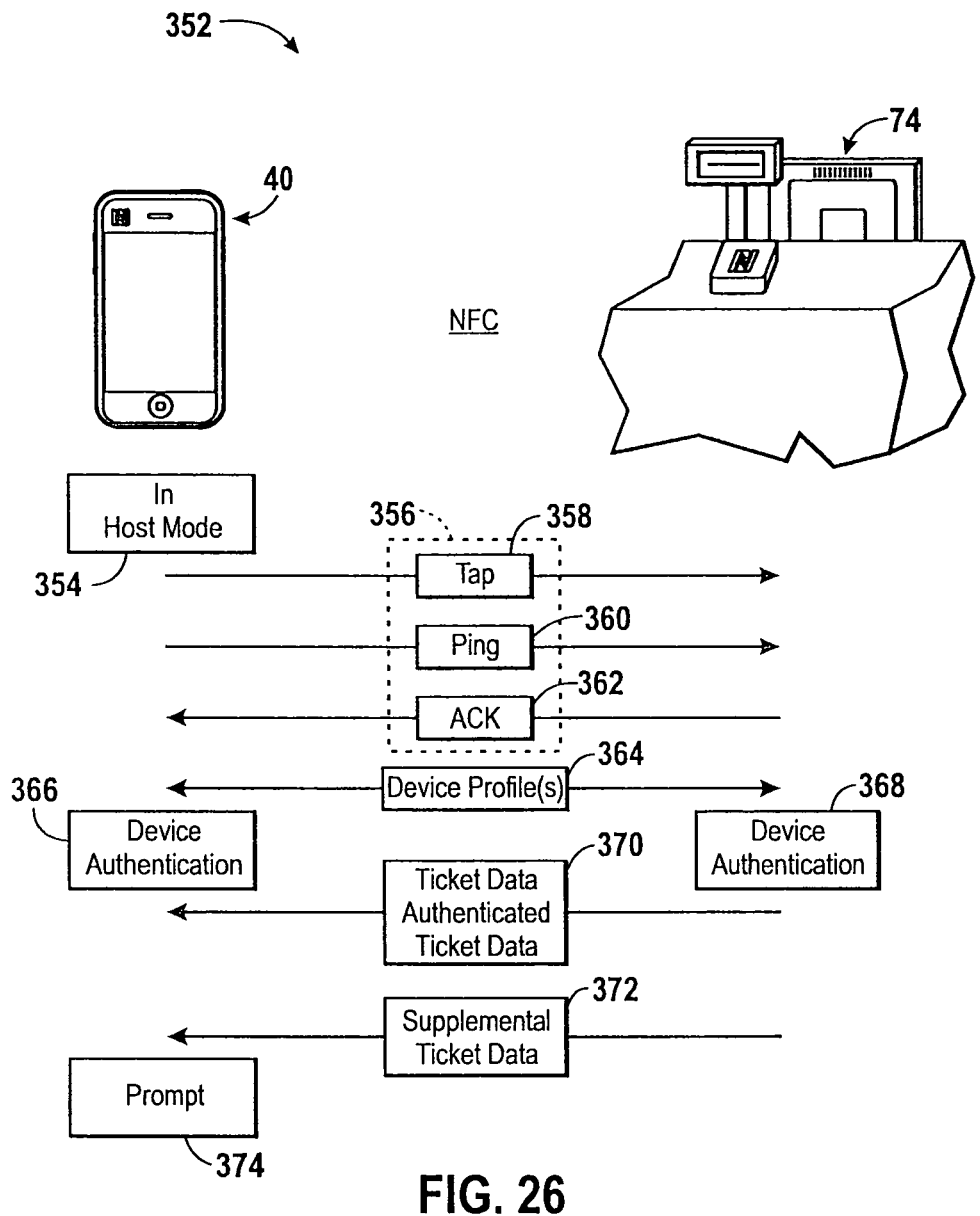
FIG. 26 is a block diagram representing communication that may take place during the kiosk-scanning operation of FIG. 25.

Turning to FIG. 26, a communication diagram 352 may illustrate an embodiment of communication that may take place between the handheld device 40 and the kiosk 74. Though the communication diagram 352 of FIG. 26 illustratively depicts communication between the kiosk 74 and the handheld device 40, it should be understood that the communication diagram 352 may apply to communication between any NFC-enabled kiosk and another electronic device 10. The communication diagram 352 may begin when the NFC interface 34 of the handheld device 40 is placed in a "host mode," as indicated by block 354. The NFC interface 34 of the handheld device 40 may enter the "host mode" when the button 342 of the screen 340 of FIG. 24B is selected by the user.

An NFC handshake 356 may next take place between the handheld device 40 and the kiosk 74 over the NFC communication channel 204. To begin the NFC handshake 356, a user may tap the NFC interfaces 34 of the handheld device 40 and the kiosk 74, as indicated by the block 358. Because the handheld device 40 may be operating in the "host mode," as discussed above, the handheld device 40 may emit periodic NFC pings. One of the NFC pings may be transmitted to the kiosk 74, as indicated by block 360. After receiving the NFC ping of the block 360, the kiosk 74 may reply with an NFC acknowledgement packet, as indicated by block 362 labeled "ACK."

With NFC communication established between the devices, the handheld device 40 and the kiosk 74 may exchange device profiles, as shown by the block 364. The device profiles may include a variety of information regarding the capabilities of the handheld device 40 and the kiosk 74. For example, the device profiles may include messages of any form, including extensible markup language (XML), which may denote the device name, serial number, owner name, type of device, as well as other identifying information. The other identifying information may include, for example, a hash of the user's account for a web service, such as iTunes®, or a public or private encryption key. The device profiles may additionally denote capabilities of the handheld device 40 or the kiosk 74 by indicating which applications, drivers, or services may be installed on each device.

Subsequently, the handheld device 40 and the kiosk 74 may authenticate one another based at least in part on the information from the device profiles. The authentication procedures of blocks 366 and 368 of FIG. 26 may involve, for example, verifying that the purchaser of the ticket and the owner of the handheld device 40 are the same. Authentication may rely on a private key known to both the kiosk 74 and the handheld device 40, which may have been exchanged prior to communication or, additionally or alternatively, a combination of a public key and a private key. Under the latter scheme, the kiosk 74 and the handheld device 40 may each exchange public keys associated with one another prior to or during the authentication procedure of blocks 366 and 368, or may obtain public keys from another source. The kiosk 74 and the handheld device 40 may verify the public keys with a certificate authority over the Internet or via a web of trust. In certain variations, the web service 208 may represent the certificate authority. If there is any link broken in the chain of trust, the authentication procedure of blocks 366 and 368 may be terminated.

Following the device authentication procedure of blocks 366 and 368, the kiosk 74 may transmit unauthenticated ticket data and/or ticket authentication data and/or supplemental ticket data to the handheld device 40, as illustrated by blocks 370 and 372, respectively. As noted above, the ticket data may represent a variety of information related to the event to which the ticket pertains, and the authenticated ticket data of block 370 may represent a passcode or other data to permit a user to gain entry to the event or to gain certain other benefits. The supplemental ticket data of block 372 may represent data describing certain other benefits which may be associated with the ticket data.

The benefits described in the supplemental ticket data of block 372 may be listed in a data file, such as an XML file, which may include each of the benefits as well as a local or online location where data associated with the benefits may be obtained. By way of example, the benefits may include free or discounted music downloads or discounted or prepaid refreshments at the event. As such, the data file listing the benefits may also include a link to a page of an online music vendor, such as iTunes®, where the music may be obtained, or a link to an online coupon for discounted or prepaid refreshments. To supplement the listing of benefits, the supplemental ticket data of block 372 may also include certain other data, such as authentication data associated with the coupon or images associated with each benefit from the data file listing the benefits.

It should be appreciated that the supplemental ticket data of block 372 may additionally include information regarding the event to which the ticket pertains; such information may provide greater detail about the event than may be noted in the ticket data obtained from the ticket 106, 108, or 146. For example, the supplemental ticket data may include a data file such as an XML file describing the starting and ending time of the event, GPS coordinates or other information denoting the location of the event or of certain sub-events at the event, whether a ringtone of the handheld device 40 should be quieted during the event, etc. If not included in the ticket data obtained from the ticket 106, 108, or 146, the supplemental ticket data of block 372 may additionally include the category of event, artist name, tour title, venue, seating information, and/or a hash pertaining to an account, such as an iTunes® account, associated with the user, etc.

When the handheld device 40 receives the ticket data and/or authenticated ticket data of the block 370 and the supplemental ticket data of the block 372, the handheld device 40 may display a prompt 374. A screen representing the prompt 374 may be described below with reference to FIG. 29. It should further be appreciated that the handheld device 40 may additionally authenticate the ticket data received in the block 370. Such ticket authentication may take place in the manner described above with reference to the blocks 222-228 of FIG. 14.

In certain instances, information may be communicated between the handheld device 40 and the kiosk 74 over a communication channel other than the NFC communication channel 204. In such cases, a variety of communication channels may become available, as illustrated by FIG. 27.

Figure 27:
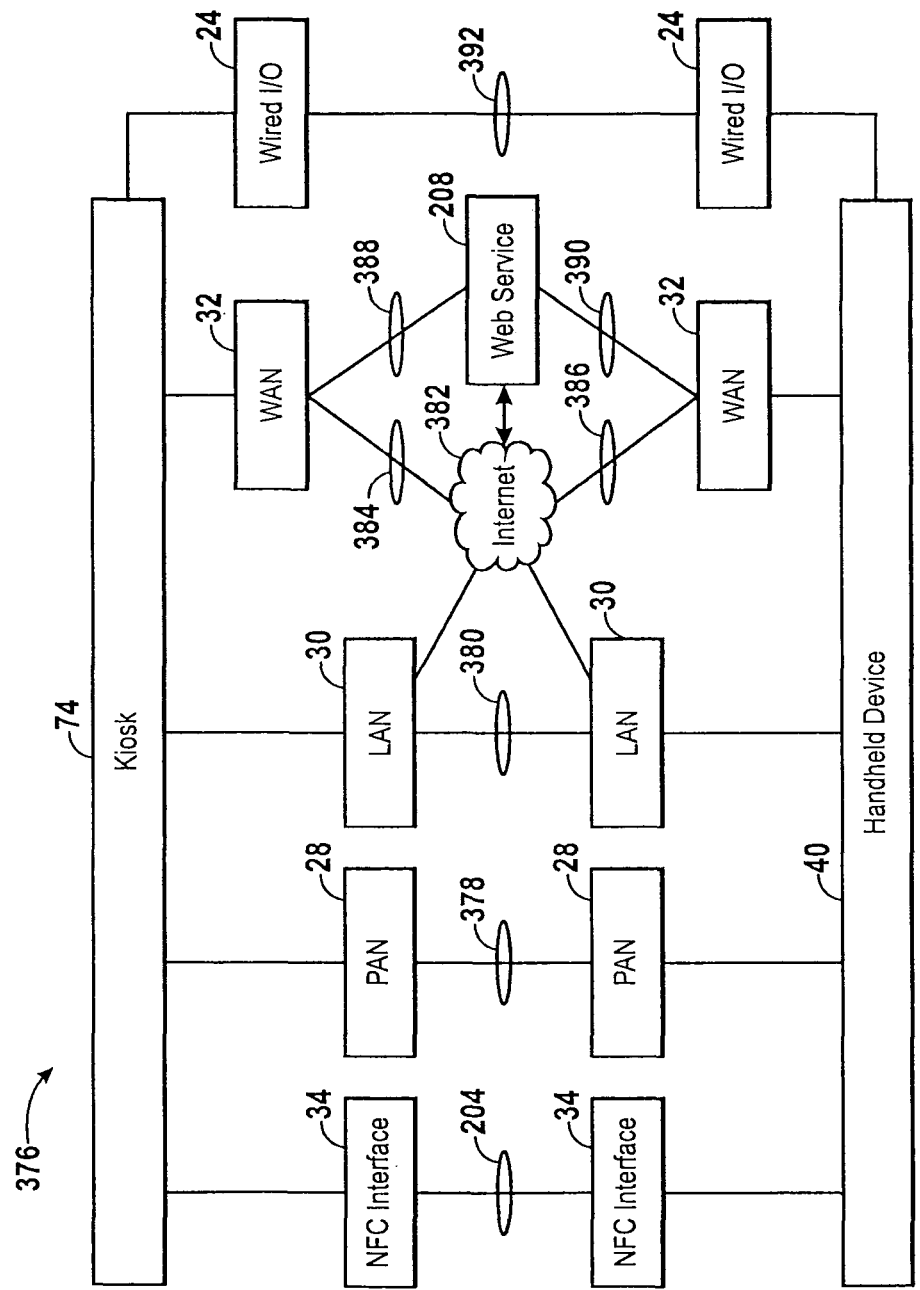
FIG. 27 is a block diagram representing communication channels that may be established between two of the electronic devices of FIG. 1.

FIG. 27 is a schematic view of potential communication channels 376 over which communication between the kiosk 74 and the handheld device 40. It should be appreciated that while the communication channels 376 of FIG. 27 illustratively interconnect the kiosk 74 and the handheld device 40, the communication channels 376 may be formed between any two electronic devices 10. Each communication channel 376 shared between the kiosk 74 and the handheld device 40 may be used for any data transfer that may take place between the handheld device 40 and the kiosk 74.

Discussing each of the communication channels 376 in turn, the NFC communication channel 204 may be employed for data transfer between the handheld device 40 and the kiosk 74. The NFC communication channel 204 may arise if both the kiosk 74 and the handheld device 40 have NFC interfaces 34 that are placed in close proximity, such as may occur when the devices are tapped together. It should be appreciated that the NFC communication channel 204 may generally remain open for a relatively short period of time and may operate at a lower bandwidth. As such, the NFC communication channel 204 may generally accommodate a relatively small amount of initial data transfer; a follow-up data transfer may generally take place via another of the communication channels 376 described below.

As noted above, the kiosk 74 and the handheld device 40 may additionally be connected through any of the communication channels 376 other than the NFC channel 162. Particularly, if either device lacks the NFC interface 34, data transfer instead may take place over the other of the communication channels 376, as described below with reference to FIGS. 36A-G. As noted below, such a data transfer may begin when a user initiates a transfer using the ticket management application on the handheld device 40. In some embodiments, although the kiosk 74 and the handheld device 40 may both include the NFC interface 34, a user may elect to have the data transfer take place over another one of the communication channels 376.

Among the possible communication channels 376 other than the NFC communication channel 204 is a personal area network (PAN) communication channel 378, connected through the PAN interfaces 28 of each device. By way of example, the PAN communication channel 378 may represent a peer-to-peer Bluetooth® connection, an IEEE 802.15.4 (e.g., ZigBee) network, or an ultra wideband network (UWB) between the kiosk 74 and the handheld device 40.

The kiosk 74 and the handheld device 40 may additionally or alternatively be connected via a local area network (LAN) communication channel 380. The respective LAN interfaces 30 of the kiosk 74 and the handheld device 40 may share a peer-to-peer connection directly to one another via the LAN communication channel 380, or may connect to one another via a router or a network controller along the LAN communication channel 380. The LAN communication channel 380 may represent a wired connection, such as an Ethernet connection, but may also represent a wireless connection, such as an IEEE standard 802.11.x wireless network, or Wi-Fi.

It should be appreciated that the kiosk 74 and the handheld device 40 may establish the PAN communication channel 378 or the LAN communication channel 380 using a device identification networking protocol. By way of example, the device identification networking protocol may be Bonjour® by Apple Inc. Each of the kiosk 74 and the handheld device 40 may broadcast using internet protocol (IP) their identifications and services, programs, and/or communication capabilities that each device may have. The kiosk 74 or the handheld device 40 may receive information via the device identification networking protocol so as to open peer-to-peer connections via the PAN communication channel 378 or the LAN communication channel 380. As should be appreciated, more than one electronic device 10 may be broadcasting information using the device identification networking protocol. As such, the handheld device 40 may select based on preferences with which electronic device 10 to connect.

While the kiosk 74 or the handheld device 40 may be connected via the PAN communication channel 378 or the LAN communication channel 380, the devices may also be connected by way of the Internet 382. By connecting to one another via the Internet 382, the kiosk 74 and the handheld device 40 may remain physically remote from one another while the data transfer occurs. Connecting via the Internet 382 may also allow the kiosk 74 and the handheld device 40 to retain communicative capabilities if a local peer-to-peer connection over the communication channel 378 or 380 is disrupted or lost.

To locate one another over the Internet 382, the kiosk 74 or the handheld device 40 may first query the web service 208 to obtain an internet protocol (IP) address of the other. The web service 208 may represent a dynamic domain name system (DNS) service, which may maintain the current IP address of each device by communicating with a plugin associated with the simplified data transfer application residing on each device. By way of example, the web service 208 may be a function of the Back to My Mac® service from Apple, Inc.

With further reference to FIG. 27, the kiosk 74 may reach the Internet 382 via its LAN interface 30 or via a wide-area network (WAN) communication channel 384, which may represent, for example, a cellular data network such as EDGE or a 3G network. Similarly, the handheld device 40 may connect to the Internet 382 via its LAN interface 30 or its WAN interface 32. If the handheld device 40 connects to the Internet via the WAN interface 32, it may do so via a wide area network (WAN) communication channel 386, which may also represent, for example, a cellular data network such as EDGE or a 3G network.

It should be appreciated that the kiosk 74 and the handheld device 40 may also establish a connection directly to the web service 168 directly via the respective WAN interfaces 32 of the devices. The kiosk 74 may connect to the web service 208 via a wide area network (WAN) communication channel 388, which may represent, for example, a cellular data network such as EDGE or a 3G network. Similarly, the handheld device 40 may connect to the web service 208 via a wide area network (WAN) communication channel 390, which may also represent, for example, a cellular data network such as EDGE or a 3G network.

The kiosk 74 and the handheld device 40 may also be connected to one another via a wired input/output (I/O) communication channel 180. The wired I/O communication channel 180 may generally permit an exceptionally rapid transfer of data between the kiosk 74 and the handheld device 40. As discussed below, any of the potential communication channels 376 may provide a manner of communicating during an initial data transfer or a subsequent data transfer involving obtaining an electronic ticket.

Figure 28A:
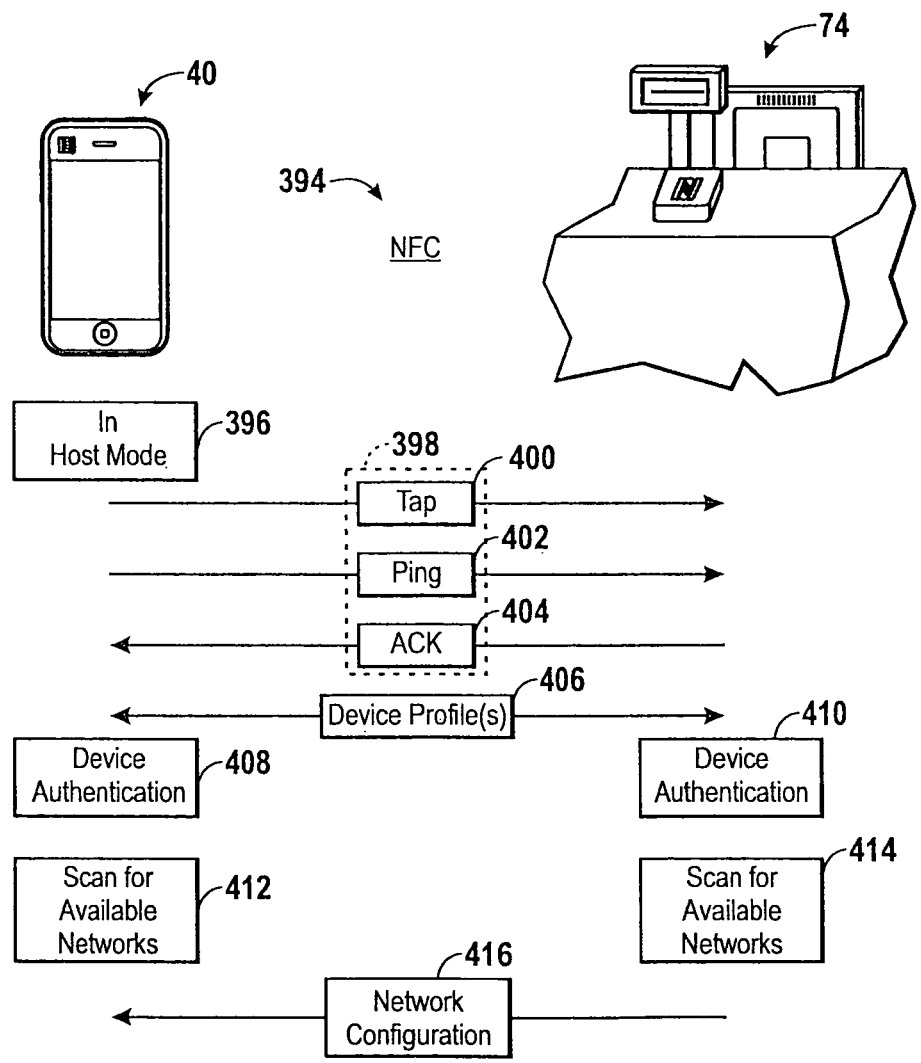
FIGS. 28A-B are block diagrams representing communication that may take place during the kiosk-scanning operation of FIG. 25.
Figure 28B:
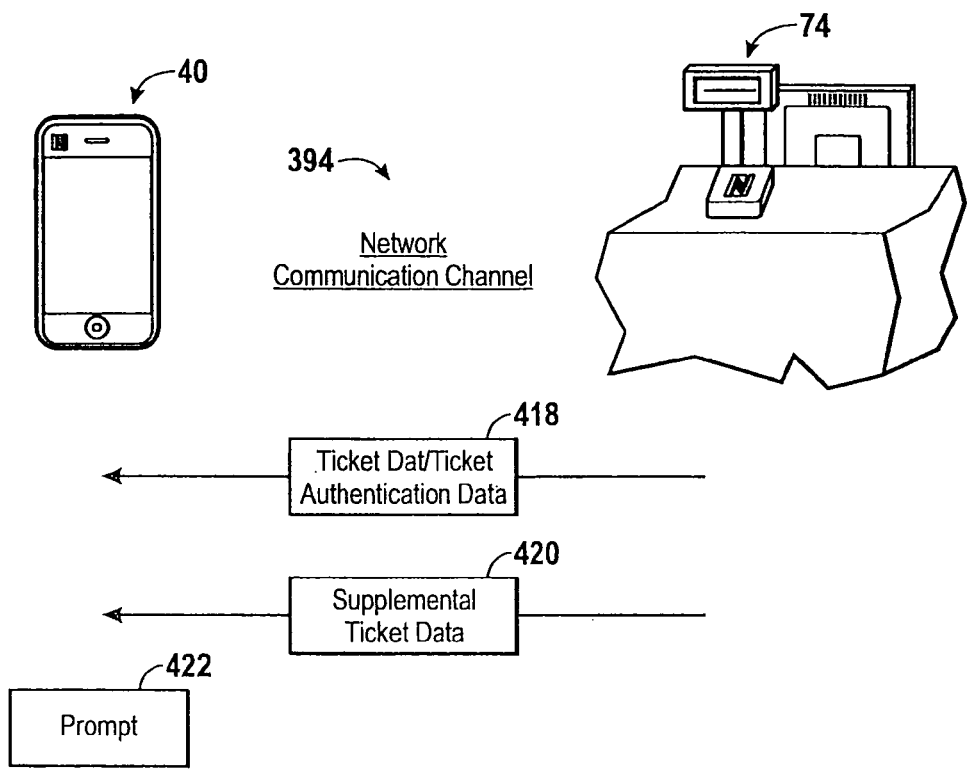

An alternative manner of obtaining an electronic ticket to the handheld device 40 from the kiosk 74 may be illustrated by FIGS. 28A-B, which represent a communication diagram 394 describing communication between the handheld device 40 and the kiosk 74 during a transfer of ticket data. Turning first to FIG. 28A, the communication diagram 394 may begin when the NFC interface 34 of the handheld device 40 is placed in a "host mode," as indicated by block 396. The NFC interface 34 of the handheld device 40 may enter the "host mode" when the button 342 of the screen 340 of FIG. 24B is selected by the user.

An NFC handshake 398 may next take place between the handheld device 40 and the kiosk 74 over the NFC communication channel 204. To begin the NFC handshake 398, the user may tap the NFC interfaces 34 of the handheld device 40 and the kiosk 74, as indicated by the block 400. Because the handheld device 40 may be operating in the "host mode," as discussed above, the handheld device 40 may emit periodic NFC pings. One of the NFC pings may be transmitted to the kiosk 74, as indicated by block 402. After receiving the NFC ping of the block 402, the kiosk 74 may reply with an NFC acknowledgement packet, as indicated by block 404 labeled "ACK."

With NFC communication established between the devices, the handheld device 40 and the kiosk 74 may exchange device profiles, as shown by the block 406. The device profiles may include a variety of information regarding the capabilities of the handheld device 40 and the kiosk 74. For example, the device profiles may include messages of any form, including extensible markup language (XML), which may denote the device name, serial number, owner name, type of device, as well as other identifying information. The other identifying information may include, for example, a hash of the user's account for a web service, such as iTunes®, or a public or private encryption key. The device profiles may additionally denote capabilities of the handheld device 40 or the kiosk 74 by indicating which applications, drivers, or services may be installed on each device.

Subsequently, the handheld device 40 and the kiosk 74 may authenticate one another based at least in part on the information from the device profiles. The authentication procedures of blocks 408 and 410 of FIG. 28A may involve, for example, verifying that the purchaser of the ticket and the owner of the handheld device 40 are the same. Authentication may rely on a private key known to both the kibsk 74 and the handheld device 40, which may have been exchanged prior to communication or, additionally or alternatively, a combination of a public key and a private key. Under the latter scheme, the kiosk 74 and the handheld device 40 may each exchange public keys associated with one another prior to or during the authentication procedure of blocks 408 and 410, or may obtain public keys from another source. The kiosk 74 and the handheld device 40 may verify the public keys with a certificate authority over the Internet or via a web of trust. In certain variations, the web service 208 may represent the certificate authority. If there is any link broken in the chain of trust, the authentication procedure of blocks 408 and 410 may be terminated.

Following device authentication, the handheld device 40 and the kiosk 74 may scan for available network communication channels 376 for the other to join for further communication, as indicated by blocks 412 and 414. After scanning for the available network communication channels 376, the handheld device 40 and the kiosk 74 may exchange network configuration information, as shown by block 416. The network configuration information of block 416 may include, for example, XML messages denoting lists of network communication channels 376 accessible via the kiosk 74 or the handheld device 40. Among other things, the network configuration information of block 416 may include known authorization keys and service set identifier (SSID). By way of example, the network configuration information may include PAN interface 28 configuration information, such as a Bluetooth serial number, MAC address, and an associated password, as well as LAN interface 30 configuration information, such as a WiFi IP address, a WiFi MAC address, and a WiFi SSID. The network configuration information may be stored for use at a later time to permit the handheld device 40 and the kiosk 74 to ascertain a higher bandwidth connection.

Turning next to FIG. 28B, the handheld device 40 and the kiosk 74 may next initiate a subsequent data transfer via another network communication channel 376 other than the NFC communication channel 204. Over the newly established network communication channel 376, the kiosk 74 may transfer, as appropriate, ticket data or ticket authentication data, as shown in block 418, or supplemental ticket data, as shown by block 420. Upon receipt, the handheld device 40 may display a prompt as indicated in block 422. The prompt of block 422, like the prompt of block 374 of FIG. 26, may be represented by a screen illustrated by FIG. 29.

Figure 29:
FIG. 29 is a schematic of a screen that may be displayed on the electronic device of FIG. 1 when an authenticated electronic ticket is received.

FIG. 29 depicts a screen 424, which may represent a prompt displayed upon receipt of certain ticket data, as shown by block 374 of FIG. 26 and block 422 of FIG. 28B. The screen 424 may indicate to the user that an authenticated ticket has been received from the kiosk 74. The screen 424 may additionally display information related to the received ticket, and may provide the button 244 for additional event details.

Figure 30:
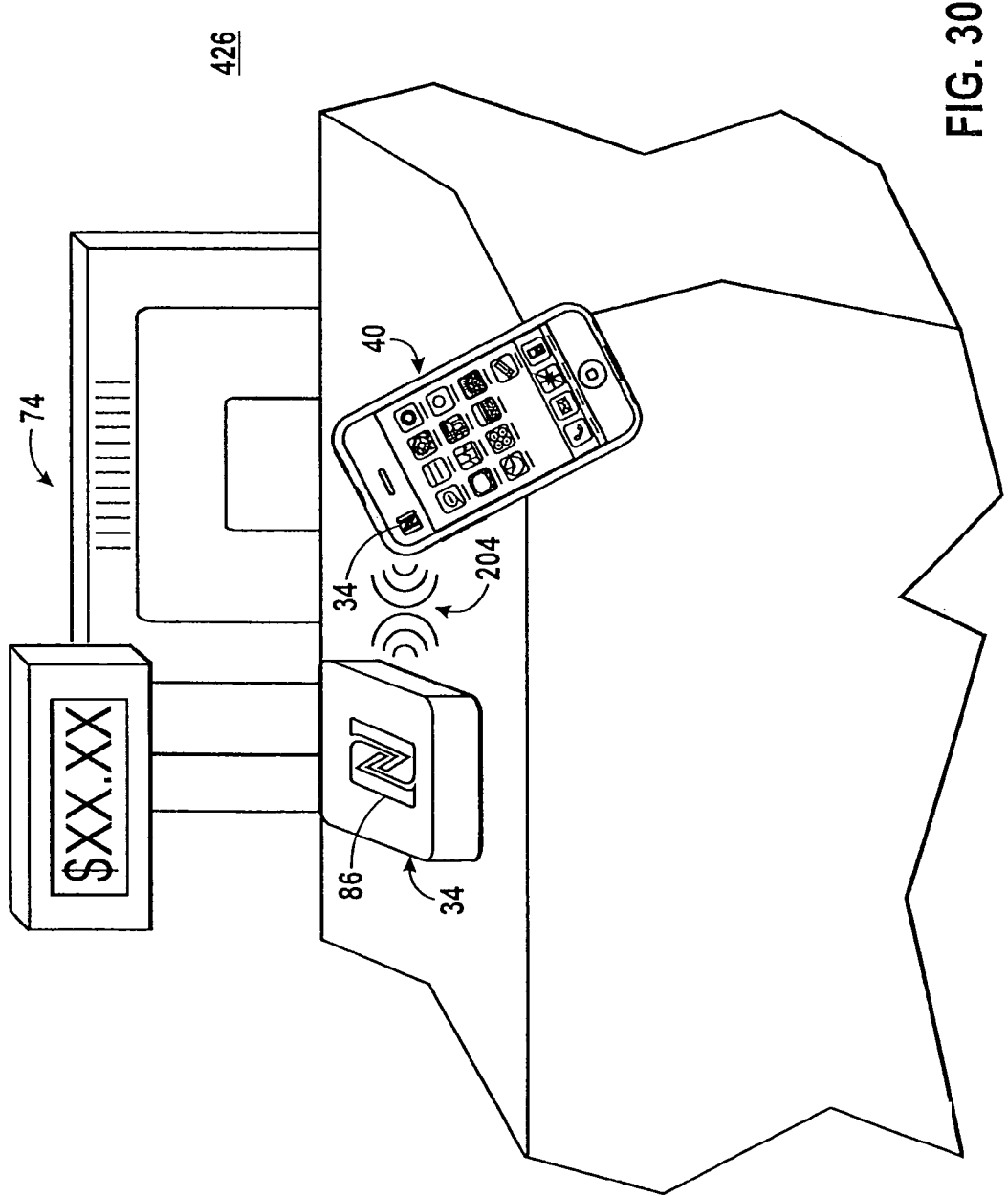
FIG. 30 is a schematic of an alternative kiosk-scanning operation for obtaining an electronic ticket from one of the kiosks of FIGS. 5-6.

FIG. 30 illustrates a kiosk-scanning operation 426 for obtaining an electronic ticket from the kiosk 74 onto the handheld device 40. It should be appreciated that in the kiosk-scanning operation 426, the ticket management application may not have been activated, and the button 342 of the screen 340 of FIG. 24B may not have been selected by the user. As such, the handheld device may not be in a "host mode" and may display the home screen. When the NFC interface 34 of the handheld device 40 is tapped to the NFC interface 34 of the kiosk 74, the kiosk 74 may initiate communication with the handheld device 40, described below.

Figure 31:
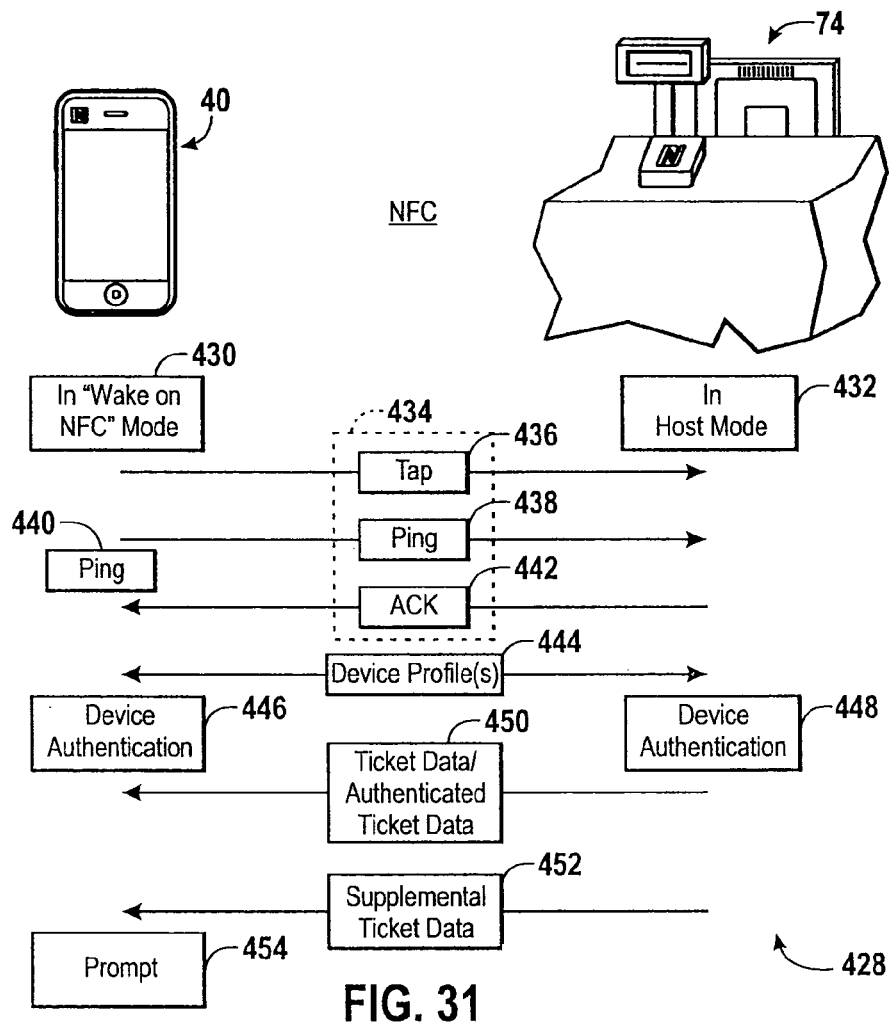
FIG. 31 is a block diagram describing communication that may take place during the kiosk-scanning operation of FIG. 30.

Turning to FIG. 31, a communication diagram 428 may illustrate communication that may take place during the kiosk-scanning operation 426 of FIG. 30. As indicated by the communication diagram 428, the NFC interface 34 of the handheld device 40 may initially remain in a "wake on NFC" mode as indicated by block 430. The "wake on NFC" mode may be the default mode for the NFC interface 34. By contrast, the NFC interface 34 of the kiosk 74 may operate in a "host mode," as indicated by block 432.

Communication between the handheld device 40 and the kiosk 74 may become established in an NFC handshake 434. To begin the NFC handshake 434, the user may tap the NFC interfaces 34 of the handheld device 40 and the kiosk 74, as indicated by the block 436. Because the kiosk 74, rather than the handheld device 40, may be operating in the "host mode," the kiosk 74 may emit periodic NFC pings. One of the NFC pings may be transmitted from the kiosk 74 to the handheld device, as indicated by block 438. Receiving the NFC ping may cause the NFC interface 34 of the handheld device 40 to awaken, as noted by block 440, and the handheld device 40 may reply with an NFC acknowledgement packet, as noted by block 442, labeled "ACK."

With NFC communication established between the devices, the handheld device 40 and the kiosk 74 may exchange device profiles, as shown by block 444. As noted above, the device profiles may include a variety of information regarding the capabilities of the handheld device 40 and the kiosk 74. For example, the device profiles may include messages of any form, including extensible markup language (XML), which may denote the device name, serial number, owner name, type of device, as well as other identifying information. The other identifying information may include, for example, a hash of the user's account for a web service, such as iTunes®, or a public or private encryption key. The device profiles may additionally denote capabilities of the handheld device 40 or the kiosk 74 by indicating which applications, drivers, or services may be installed on each device.

Subsequently, the handheld device 40 and the kiosk 74 may authenticate one another based at least in part on the information from the device profiles. The authentication procedures of blocks 446 and 448 of FIG. 31 may involve, for example, verifying that the purchaser of the ticket and the owner of the handheld device 40 are the same. Authentication may rely on a private key known to both the kiosk 74 and the handheld device 40, which may have been exchanged prior to communication or, additionally or alternatively, a combination of a public key and a private key. Under the latter scheme, the kiosk 74 and the handheld device 40 may each exchange public keys associated with one another prior to or during the authentication procedure of blocks 446 and 448, or may obtain public keys from another source. The kiosk 74 and the handheld device 40 may verify the public keys with a certificate authority over the Internet or via a web of trust. In certain variations, the web service 208 may represent the certificate authority. If there is any link broken in the chain of trust, the authentication procedure of blocks 446 and 448 may be terminated.

Following the device authentication procedure of blocks 446 and 448, the kiosk 74 may transmit unauthenticated ticket data and/or ticket authentication data as well as supplemental ticket data to the handheld device 40, as illustrated by blocks 450 and 452, respectively. When the handheld device 40 receives the data from the kiosk 74, the handheld device 40 may display a prompt, as noted by block 454, which may be represented by screens depicted in FIGS. 32A-B. It should further be appreciated that although the communication diagram 428 of FIG. 31 depicts the ticket data and/or authenticated ticket data of block 450 and the supplemental ticket data of block 452 as transferred via the NFC communication channel 204, other communication channels 376 may alternatively be used. For example, the handheld device 40 and the kiosk 74 may instead communicate network configuration information and establish another network communication channel 376 before transferring the data, as illustrated in the communication diagram 394 of FIGS. 28A-B.

Figures 32A, 32B:
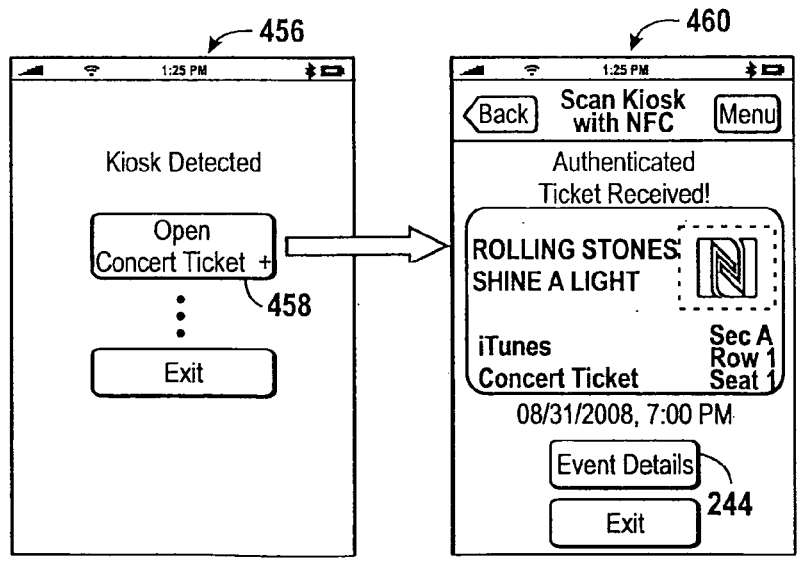
FIGS. 32A-B are schematics of screens that may be displayed on the electronic device of FIG. 1 during the kiosk-scanning operation of FIG. 30.

FIGS. 32A-B illustrate screens that may represent the prompt of block 454 of FIG. 31. Turning first to FIG. 32A, the handheld device 40 may display a screen 456 following the kiosk-scanning operation 426 of FIG. 30, as generally illustrated in the communication diagram 428 of FIG. 31 as the prompt of block 454. The screen 456 may indicate to the user that the kiosk 74 has been detected and may provide a number of options to the user in the form of a button 458 labeled "Open Concert Ticket +," among others. The button 458 may enable a user to automatically open the ticket management application and add an event by receiving an electronic ticket from the kiosk 74. Selecting the button 458 may cause the handheld device 40 to display a screen 460, shown in FIG. 32B, after launching the ticket management application.

The screen 460 of FIG. 32B may indicate to the user that ticket data has been received from the kiosk 74. Such information may represent the data received during the communication of blocks 450 and 452, above. Additionally, the screen 460 may include the button 244 labeled "Event Details," which may enable the user to review additional event details associated with the ticket.

Figures 33A, 33B:
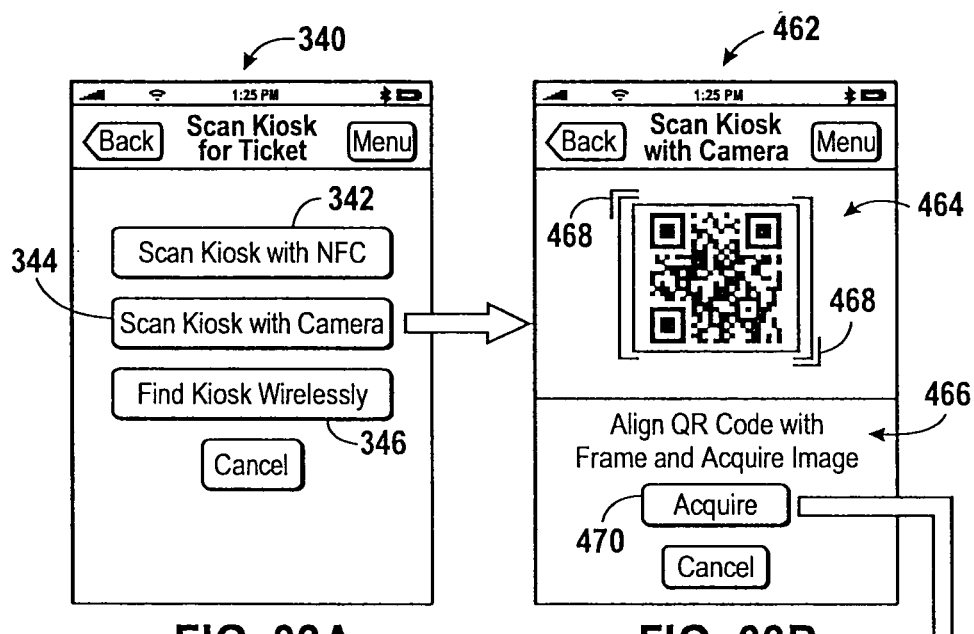
FIG. 33A-C are schematics of screens that may be displayed on the electronic device of FIG. 1 for obtaining an electronic ticket from one of the kiosks of FIGS. 5-6 by scanning an image with the camera.

FIGS. 33A-35 may represent a manner of obtaining an electronic ticket from a kiosk having a display 18 visible to the customer, such as the unmanned kiosk 88. A user may purchase or otherwise select an electronic ticket from the unmanned kiosk 88, which may display text, a barcode, or a matrix code for the handheld device 40 to scan using the camera 36. Turning first to FIG. 33A, the screen 340 may present the user with the button 344 labeled "Scan Kiosk With Camera." Selecting the button 344 may cause the handheld device 40 to display a screen 462, as illustrated in FIG. 33B.

The screen 462 of FIG. 33B may include a camera window 464 and a user selection prompt 466. The camera window 464 may present video images from the camera 36 of the handheld device 40. As illustrated in FIG. 33B, the user selection prompt 466 may instruct the user to align an image of text, a barcode, or a matrix code from the display 18 of the unmanned kiosk 88, on the camera window 464 to acquire an image of the ticket. Image boundaries 468 may indicate the portion of the camera window 464 that may be saved as an image; selecting a user selectable button 470, labeled "Acquire," may cause the image currently within the image boundaries 468 to be acquired.

Figure 33C:
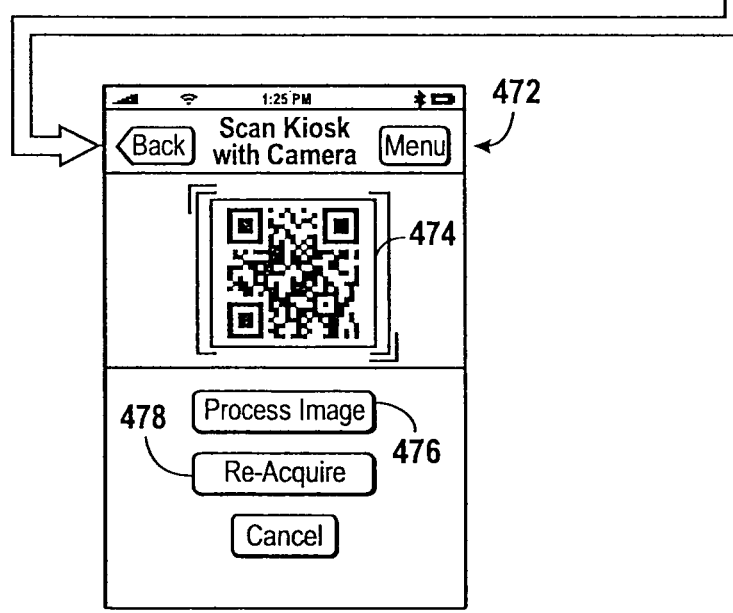

A screen 472, shown in FIG. 33C, may be displayed when the button 254 is selected. A still image 474 may represent the image acquired by the camera 36. Two buttons 476 and 478 may be labeled "Process Image" and "Re-Acquire," respectively. The button 476 may allow a user to proceed with the still image 474, while the button 478 may allow the user to acquire another image by returning to the screen 462 of FIG. 33B.

Figure 34:
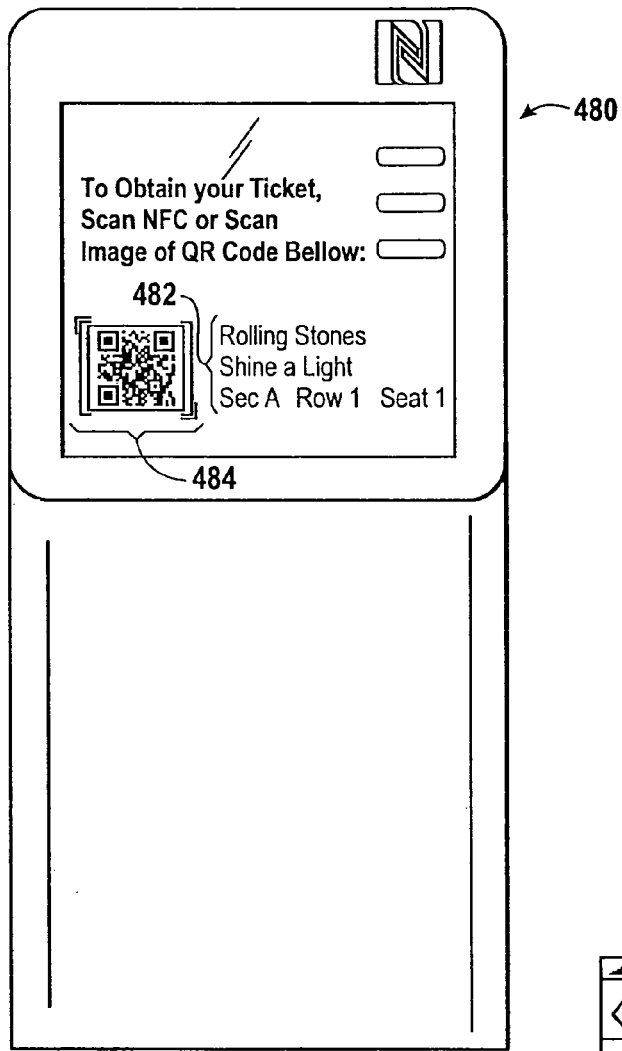
FIG. 34 is a schematic of a screen that may be displayed on the kiosk of FIG. 6 for use in an alternative manner of obtaining the electronic ticket.

The unmanned kiosk 88 may display screen 480, as shown in FIG. 34, having elements which the camera 36 of the handheld device 40 may scan. For example, the screen 480 may include text 482 and/or a matrix code 484 or, alternatively, a barcode, which may include encoded ticket data. The handheld device 40 may scan the text 482 and/or the matrix code 484 to obtain ticket data and/or authenticated ticket data, as shown by FIGS. 33A-C above.

Figure 35:
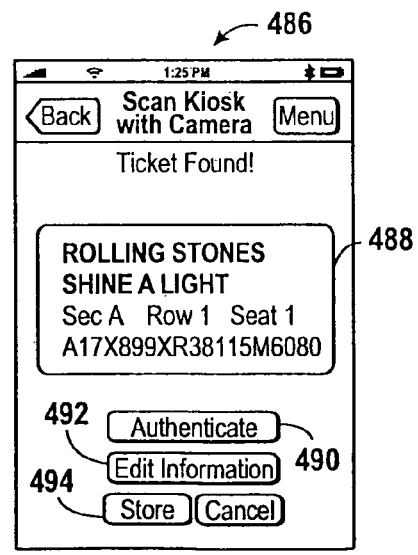
FIG. 35 is a schematic of a screen that may be displayed on the electronic device of FIG. 1 when an electronic ticket is obtained in the manner of FIGS. 33-34.

Turning to FIG. 35, a screen 486 may be displayed upon receipt of the electronic ticket by optically scanning the screen 480 of FIG. 34. The handheld device 40 may process the image 474 for ticket data in the manner illustrated by block 272 of FIG. 20. When the extracted ticket data has been stored in the main memory 14 or nonvolatile storage 16 of the handheld device 40, the screen 486 of FIG. 35 may be displayed. Because the OCR, barcode-reading, or matrix-code-reading software that may run on the handheld device could mistranscribe the ticket data, the screen 486 may list the extracted ticket data 488 acquired from the image 474 on the screen 480 of the unmanned kiosk 88. If the extracted ticket data 488 is correct, a user may choose to authenticate the ticket by selecting a button 490, labeled "Authenticate." If the button 490 is selected, the authentication procedure may take place in the manner described in the communication diagram 264 of FIG. 20 and the handheld device 40 may display the screens illustrated in FIGS. 15A-D.

If the extracted ticket data 488 is not correct, a user may choose to edit the ticket data manually by selecting a button 492, labeled "Edit Information." If the ticket data 488 is correct, but authentication is not desired or necessary, a user may choose only to store the extracted ticket data 488 without initiating an authentication procedure by selecting a button 494, labeled "Store."

FIGS. 36A-F illustrate another manner of obtaining an electronic ticket from the kiosk 74 or unmanned kiosk 88. Rather than obtain the electronic ticket via the NFC interface 34 or the camera 36 of the handheld device 40, the handheld device 40 may obtain the electronic ticket from the kiosk 74 or the unmanned kiosk 88 over a wireless communication channel 376. Turning first to FIG. 36A, a user may select the button 346, labeled "Find Kiosk Wirelessly" to begin to search for a kiosk which may be available over a wireless communication channel 376.

Upon selection of the button 346, a screen 496 may be displayed, as depicted in FIG. 36B. The handheld device 40 may employ a device identification networking protocol to search for other electronic devices 10 having wireless network access. By way of example, the device identification networking protocol may be Bonjour® by Apple Inc. Each of the kiosk 74 or unmanned kiosk 88 and the handheld device 40 may broadcast using internet protocol (IP) their identifications and services, programs, and/or communication capabilities that each device may have. The handheld device 40 may receive information via the device identification networking protocol so as to open peer-to-peer connections via the PAN communication channel 164 or the LAN communication channel 166 with an available kiosk 74 or unmanned kiosk 88. As should be appreciated, more than one electronic device 10 may be broadcasting information using the device identification networking protocol. As such, the handheld device may select the kiosk 74 or unmanned kiosk 88 based on an identification as such or based on user preferences for certain characteristics of the kiosks, which may include owner, manufacturer, etc.

Information about various kiosks obtained using the device identification networking protocol may be displayed on a screen 498, as illustrated by FIG. 36C. The screen 498 may list various local kiosks available for wireless ticket transfer, as indicated generally by a numeral 500. A user may refresh the list 500 of ticket vendors by pressing a refresh button 502. Selecting a button 504 labeled "Options" may enable a user to set various user preferences related to displaying the list 500 of wireless kiosks.

FIG. 36D illustrates a visually descriptive screen 506 displaying the list 500 of available wireless kiosks. The screen 506 of FIG. 36D may be displayed when a user turns the handheld device 40 sideways, causing the accelerometers 38 to register a change in device orientation. The screen 506 may illustrate the list 500 of ticket vendors in a format such as the Cover Flow format by Apple Inc. The available ticket vendors may be displayed visually with a series of descriptive images 508 and the name of a presently displayed ticket vendor may appear in text 510. By dragging a finger across the screen, a user may easily flip between ticket vendors. Turning the handheld device 40 upright may navigate the user back to the screen 498 of FIG. 36C.

With reference again to the screen 498 of FIG. 36C, if a user selects the button 504, labeled "Options," a screen 512 may be displayed on the handheld device 40, as shown by FIG. 36E. Options 514 which may be available for a user to change may include to display the list 500 of ticket vendors by proximity, by wireless capabilities, or by the type of ticket which may be for sale (e.g., movie tickets, concert tickets, museum tickets, etc.), to list only those kiosks 74 or unmanned kiosk 88 which employ a threshold security scheme, as well as other preferences which may provide an enhanced purchasing experience for the user.

Referring to the screen 498 of FIG. 36C or the screen 506 of FIG. 36D, a user may select a ticket vendor from the list 500 or the descriptive images 508 to cause the handheld device 40 to display a ticket sales screen 516, as illustrated in FIG. 36F. The screen 516 may allow a user to purchase an electronic ticket. Text 518 may provide details regarding the ticket, such as the artist name, tour title, date and time of the event, as well as the venue, the type of event, etc. A user may elect to purchase a certain number of tickets based on a ticket quantity button 520. By selecting a button 522 labeled "Buy Ticket," the user may purchase the quantity of tickets for the chosen event.

After the tickets have been purchased, the handheld device 40 may display a screen 524, as shown in FIG. 36G, indicating that the electronic tickets have been received. The text 518 indicating the ticket information and the quantity 520 may verify that the correct number of electronic tickets has been received. It should be appreciated that the received ticket data may be authenticated as sent, or may be authenticated separately by the handheld device 40 according to the techniques described above. The screen 524 may further include the button 244 labeled "Event Details" to enable the user to view the details of the event pertaining to the recently purchased ticket.

FIGS. 37A-I illustrate a manner in which an electronic ticket may be obtained through an online purchase. Turning first to FIG. 37A, if a user selects the button 190 of the screen 182, the handheld device 40 may display a screen 526, as illustrated in FIG. 37B. The screen 526 may display a number of online ticket vendors, the list of which may be provided to the handheld device 40 by the web service 208. Available ticket vendors may be selectable with buttons 528 and 530, labeled "iTunes Tickets" and "Ticket Vendor 2," respectively. When a user selects a ticket vendor by pressing one of the buttons 528 or 530, the handheld device 40 may establish a connection with the online ticket vendor listed on the button. As such, selecting the button 528 may navigate the user to a 532, as illustrated by FIG. 37C.

The screen 532 may allow a user to specify various preferences regarding tickets which may be available for sale from the online ticket vendor. For example, a button 534, labeled "Current Location," may allow the user to specify whether the user would like to view upcoming events at the user's current location, as may be generally indicated by the location sensing circuitry 22 or predefined by user preferences. Alternatively, a button 536, labeled "Specify Location," may allow the user to specify whether the user would like to view upcoming events available at a different location.

Selecting either the button 534 or 536 may navigate the user to a screen 538, as illustrated in FIG. 37D, which may permit the user to specify a particular type of event for which the user intends to purchase tickets. By way of example, the screen 538 may include buttons 540 and 542, labeled "Concert" and "Movie," respectively. Additional types of events may include, for example, musicals, plays, symphonies, sporting events, school sponsored activities, cruises or tours, industry conferences, museum events, theme park events, etc.

By way of example, a user may select the button 540 to purchase concert tickets from the online ticket vendor. In response, the handheld device 40 may display a screen 544, as illustrated by FIG. 37E, which may list available concert tickets as list items 546, 548, and 550. A button 552, labeled "Options," may enable a user to set a variety of user preferences regarding the display of the concert tickets listed.

A screen 554, shown in FIG. 37F, may be displayed when a user turns the handheld device 40 sideways, causing the accelerometers 38 to register a change in device orientation.

The screen 554 may illustrate the list of concert tickets 546, 548, and 550 in a format such as the Cover Flow format by Apple Inc. The available tickets may be displayed visually with a series of descriptive images 556, 558, and 560, and the name of a presently displayed ticket vendor may appear in text 562. By dragging a finger across the screen, a user may easily flip between ticket vendors. Turning the handheld device 40 upright may navigate the user back to the screen 544 of FIG. 37E.

Referring again to the screen 544 of FIG. 37E, when a user selects the button 552 labeled "Options," a screen 564 may be displayed, as shown by FIG. 37G. A user may set various user preferences 566, for example, to list the concert tickets in order of genre, by venue, by popularity, by price, by availability of adjacent seats, in order of event date, venue proximity, association of certain benefits with the ticket (e.g., a live recording of the event), availability of certain types of seats, whether a concert is family-friendly, etc. A button 568, labeled "Save," may enable the user to save selected preferences.

Referring to the screen 544 of FIG. 37E or the screen 554 of FIG. 37F, a user may select a ticket from among those listed to cause the handheld device 40 to display a ticket sales screen 570, as illustrated in FIG. 37H. The screen 570 may allow a user to purchase an electronic ticket via the Internet. Text 572 may provide details regarding the ticket, such as the artist name, tour title, date and time of the event, as well as the venue, the type of event, etc. A user may elect to purchase a certain number of tickets based on a ticket quantity button 574. By selecting a button 576 labeled "Buy Ticket," the user may purchase the quantity of tickets for the chosen event.

After the tickets have been purchased, the handheld device 40 may display a screen 578, as shown in FIG. 37I, indicating that the electronic tickets have been received. The text 572 indicating the ticket information and the quantity 574 may verify that the correct number of electronic tickets has been received. It should be appreciated that the received ticket data may be authenticated as sent, or may be authenticated separately by the handheld device 40 according to the techniques described above. The screen 578 may further include the button 244 labeled "Event Details" to enable the user to view the details of the event pertaining to the recently purchased ticket.

Figure 38A:
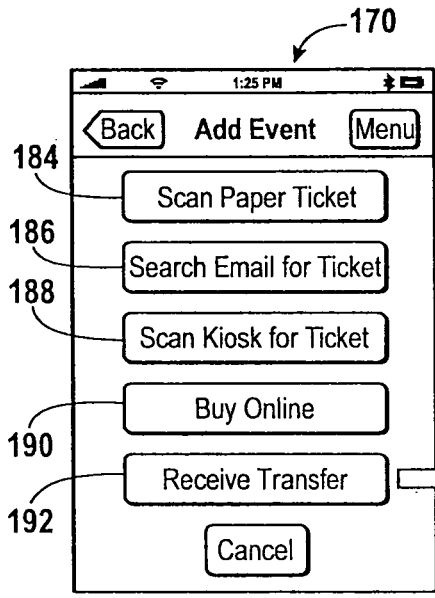
FIGS. 38A-C are schematics of screens that may be displayed on the electronic device of FIG. 1 for receiving an electronic ticket from another of the electronic devices of FIG. 1.
Figure 38B:
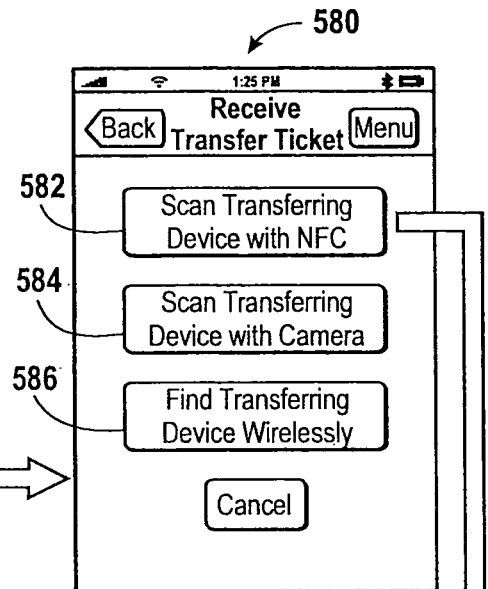

FIGS. 38-40 illustrate a manner of obtaining an electronic ticket from another electronic device 10 which may have stored the electronic ticket. Turning first to FIG. 38A, a user may select the 192 of the screen 182. In response, the handheld device 40 may display a screen 580, as shown in FIG. 38B. The screen 580 may list a series of ways in which the ticket may be received from the other electronic device 10, with a button 582 labeled "Scan Transferring Device With NFC," a button 584 labeled "Scan Transferring Device With Camera," and a button 586 labeled "Scan Transferring Device Wirelessly."

Figure 38C:
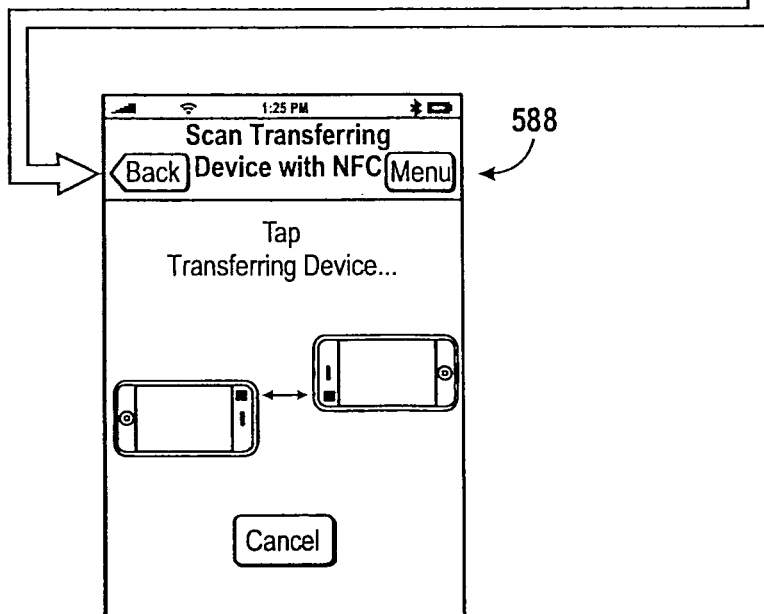

FIG. 38C represents a screen 588 which may be displayed when the user selects the button 582 of the screen 580. The screen 588 may include text stating, "Tap Transferring Device . . . " and may instruct the user to tap the NFC interface 34 of the handheld device 40 with the NFC interface 34 of a transferring handheld device 40. It should be appreciated, however, that the transferring electronic device 10 may be another handheld device 40, but may alternatively be any electronic device 10, such as the computer 62 or the standalone media player 68.

Receiving the electronic ticket from the other handheld device 40 via NFC may occur in a similar manner as receiving the ticket from the kiosk 74. As such, the kiosk scanning operation 350 illustrated by FIG. 25, as well as the communication diagram 352 of FIG. 26 and the communication diagram of FIGS. 28A-B may effectively describe the communication which may take place in such a transfer. Moreover, as discussed further below, the NFC interface 34 transferring handheld device 40 may be operating in a "host mode." Accordingly, the techniques described above with reference to FIGS. 30-32, in which the receiving handheld device 40 may remain in a "wake on NFC," mode may also apply.

Figures 39A, 39B:
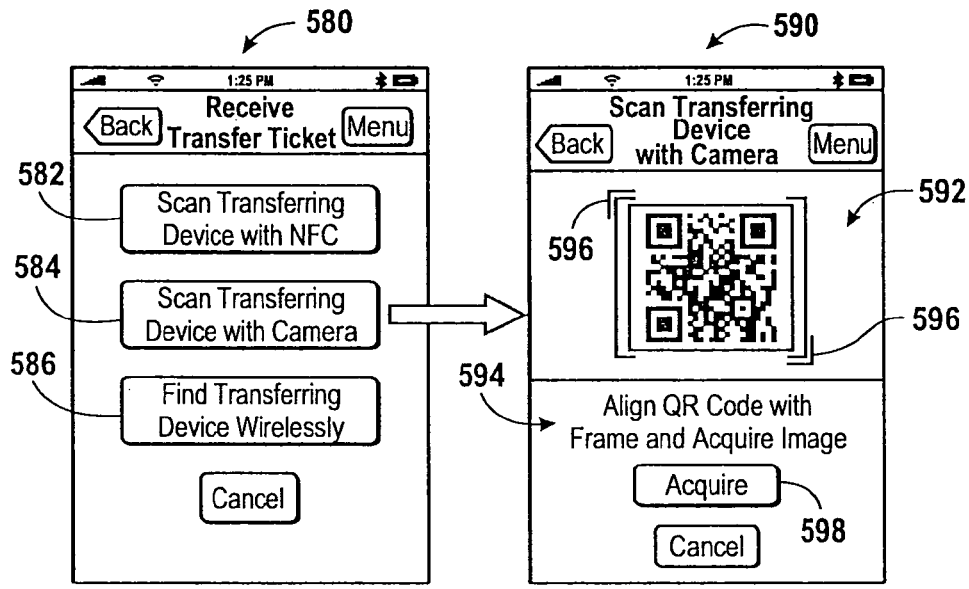
FIGS. 39A-B are schematics of screens that may be displayed on the electronic device of FIG. 1 for receiving an electronic ticket from another of the electronic devices of FIG. 1.

Turning next to FIG. 39A, the user may select the button 584 of the prompt 580, labeled "Scan Transferring Device With Camera," to cause the handheld device 40 to display a screen 590, as shown in FIG. 39B. The screen 590 may include a camera window 592 and a user selection prompt 594. The camera window 592 may present video images from the camera 36 of the handheld device 40. As illustrated in FIG. 39B, the user selection prompt 594 may instruct the user to align an image of text, a barcode, or a matrix code from the display 18 of the transferring handheld device 40 in the camera window 592 to acquire an image of the ticket. Image boundaries 596 may indicate the portion of the camera window 592 that may be saved as an image; selecting a user selectable button 598, labeled "Acquire," may cause the image currently within the image boundaries 468 to be acquired.

In the same manner described above with reference to FIGS. 16B and 33B above, the acquired image may be processed to obtain certain ticket data. It should be appreciated that the ticket data from the transferring handheld device 40 may include additional information noting that the ticket has been transferred. Further, the ticket data may be authenticated in the manner described above with reference to the communication diagram 264 of FIG. 20.

Figures 40A, 40B:
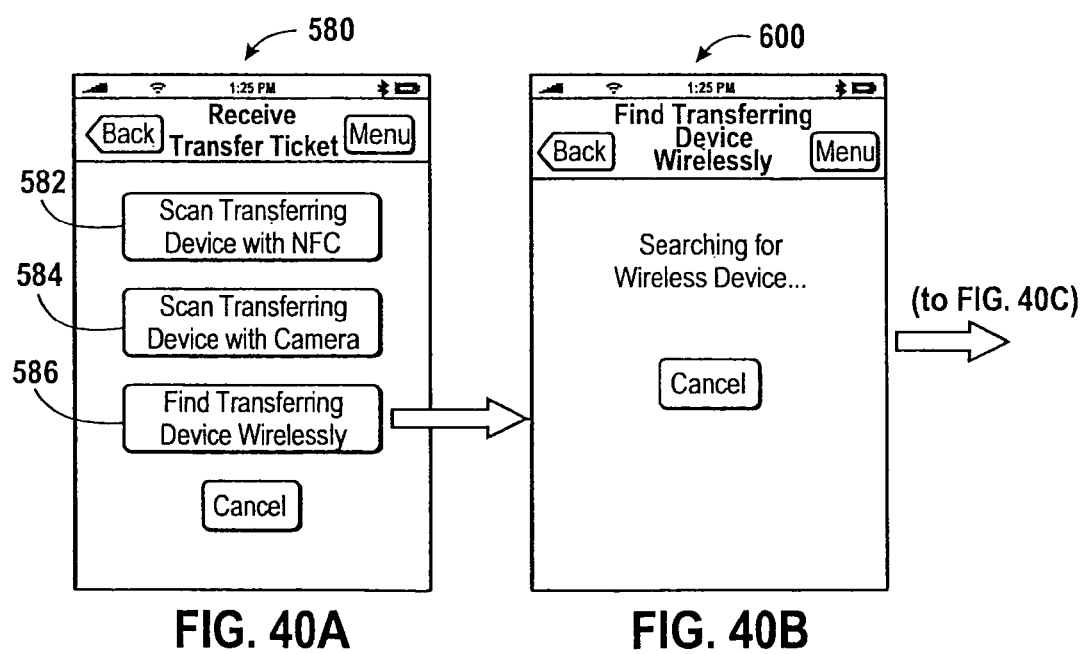

Turning to FIG. 40A, the user may alternatively select the button 586 of the prompt 580. Upon selection of the button 586, a screen 600 may be displayed, as depicted in FIG. 40B. The handheld device 40 may employ a device identification networking protocol to search for other electronic devices 10 having wireless network access. By way of example, the device identification networking protocol may be Bonjour® by Apple Inc. Each of the handheld device 40 and the transferring handheld device 40 may broadcast using internet protocol (IP) their identifications and services, programs, and/or communication capabilities that each device may have. The receiving handheld device 40 may receive information via the device identification networking protocol so as to open peer-to-peer connections via the PAN communication channel 164 or the LAN communication channel 166 with the transferring handheld device 40.

FIG. 40C depicts a screen 602 that may be displayed when the receiving handheld device 40 successfully establishes a wireless connection with the transferring handheld device 40. The ticket to be transferred may be generally illustrated as an image 604, and a button 606, labeled "Receive Ticket," may enable the user to download the ticket from the transferring handheld device 40.

Turning to FIG. 40D, a screen 608 may represent a prompt displayed upon receipt of the electronic ticket from the transferring handheld device 40. The screen 608 may indicate with the image 604 to the user that a ticket has been received from the transferring handheld device 40. The screen 608 may additionally display information related to the received ticket, and may provide the button 244 to enable the user to view additional details associated with the event. It should be appreciated that the electronic ticket received from the transferring handheld device 40 may represent ticket data or authenticated ticket data, as well as supplemental data from the transferring electronic device 10. Thus, the receiving handheld device 40 may or may not communicate with the web service 208 to authenticate the ticket. Further, it should be understood that the wireless transfer described with reference to FIGS. 40A-D may take place over any of the wireless communication channels 376.

It should be noted that the discussion above described a variety of techniques of obtaining an electronic ticket with an electronic device 10. The discussion that follows may describe a variety of techniques for using the electronic ticket once the ticket has been obtained. More particularly, FIGS. 41-42 may illustrate techniques for accessing and displaying electronic tickets and benefits associated with the electronic tickets; FIGS. 43-45 may illustrate techniques for transferring a stored electronic ticket to another electronic device 10; FIGS. 46-52 may illustrate techniques for using a stored electronic ticket to gain entry to an event; FIGS. 53-64 may illustrate benefits that may be associated with events such as concerts; and FIGS. 65-96 may illustrate benefits that may be associated with various events such as musicals, plays, or symphonies, sporting events, school-sponsored activities or events, movies, cruises or tours, conferences, weddings, museum events, or theme park events.

Figure 41C:
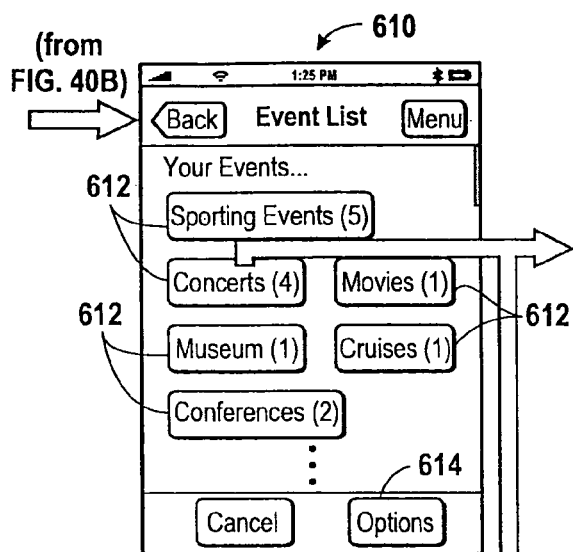

With at least one electronic ticket stored on the handheld device 40, FIGS. 41A-J may illustrate a manner in which an electronic ticket may be accessed or used. Turning first to FIG. 41A, the display 18 of the handheld device 40 may include the graphical user interface 20. Among the icons which may be present on the home screen of the handheld device 40 may be the ticket management application icon 44. Selecting the ticket management application icon 44 may cause the handheld device 40 to display the screen 158. As described above, the screen 158 may include a variety of user selectable buttons 162 and 164, which may enable the user to view a list of stored events, or to add an event, respectively.

Turning next to FIG. 41C, when a user selects the button 162 of screen 158, events stored on the handheld device 40 may be displayed on a screen 610. By way of example, the events may be listed based on a variety of categories, as indicated by a series of buttons 612. Moreover, a button 614 may enable a user to vary the manner in which the stored events are displayed. By way of example, the events may be listed sequentially, in order of quantity, in order of current popularity, in order of most recently selected, in order of newly available benefits (e.g., a free music download prior to a concert).

Figure 41D:
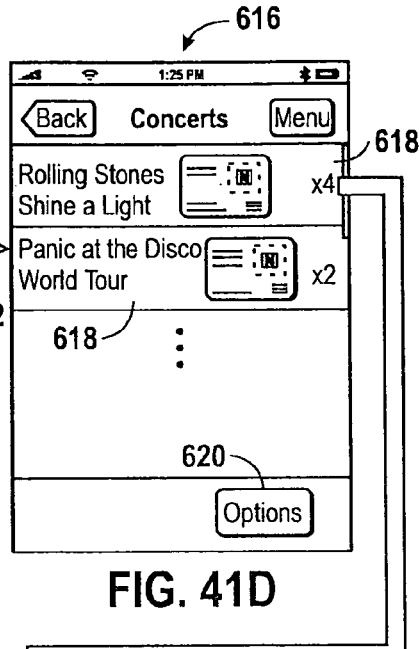

If the user selects, for example, the button 612 labeled "Concerts," the handheld device 40 may display a screen 616, as illustrated in FIG. 41D. The screen 616 may display list items 618 having text and images related to any concert tickets which may be stored on the handheld device 40. For example, the list items 618 may include an artist name, tour title, an image of the stored ticket, the quantity of tickets, etc. The screen 616 may additionally include a button 620, labeled "Options," which may vary the manner in which the list items 618 are displayed. By way of example, a user may vary the list items 618 such that the concerts are listed sequentially, in order of quantity, by time of day, by popularity, by most recently selected, by newly available benefits (e.g., a free music download prior to a concert), etc. It should be appreciated that the options available by way of the button 620 may be the same or different from those available by way of the button 614.

Figure 41E:
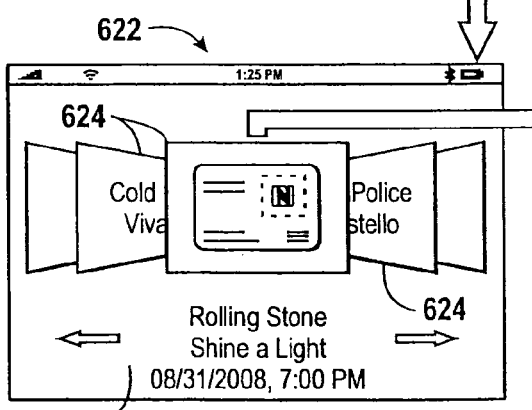
Figure 41F:
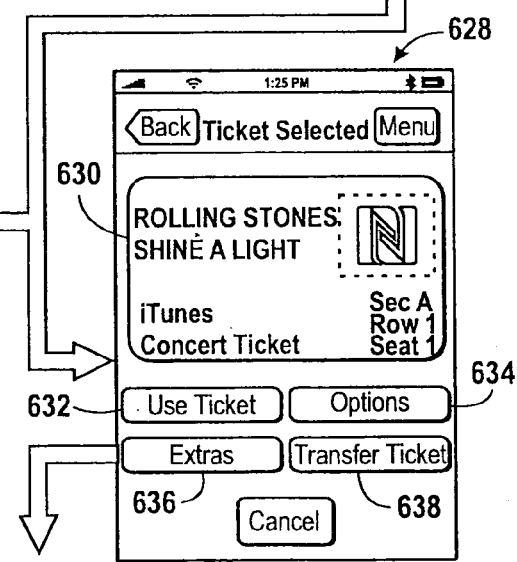

FIG. 41E illustrates a visually descriptive screen 622 displaying the list items 618 of stored concert tickets. The screen 622 may be displayed when a user turns the handheld device 40 sideways, causing the accelerometers 38 to register a change in device orientation. The screen 622 may illustrate the list items 618 of stored concert tickets in a format such as the Cover Flow format by Apple Inc. The stored concert tickets may be displayed visually with a series of descriptive images 624 and the name of a presently displayed ticket, as shown by text 626. By dragging a finger across the screen, a user may easily flip between ticket vendors. Turning the handheld device 40 upright may navigate the user back to the screen 616 of FIG. 41D.

By selecting one of the list items 618 or images 624, the user may select a ticket, causing the handheld device 40 to display a screen 628. The screen 628 may provide, for example, ticket information 630 and various options for accessing features associated with the ticket via user-selectable buttons 632-638. The user may, for example, use the ticket to gain entry to the event, as indicated by the button 632 labeled "Use Ticket." The user may select certain options associated with the display of the ticket, as indicated by the button 634 labeled "Options." The user may view and make use of benefits other than entry that may be associated with the ticket, as indicated by the button 636 labeled "Extras." The user may further transfer the ticket to another electronic device 10, as indicated by the button 638 labeled "Transfer Ticket."

By selecting the button 634 labeled "Options," a user may change a variety of options which may be available with the associated ticket. Such options may include, for example, an option to set a calendar reminder for the event, to set a particular ringtone or to silence the ringtone on the handheld device 40 for the duration of the event, to automatically-set an out-of-office reply for the duration of the event, to periodically check for changes in the event, etc. It should be appreciated that many options may become available based on information received in the supplemental ticket data, as described above with reference to the communication diagrams 206 of FIG. 14 or 264 of FIG. 20. Such information may include, for example, the starting and ending time of the event, GPS coordinates or other information denoting the location of the event or of certain sub-events at the event, whether a ringtone of the handheld device 40 should be quieted during the event, etc. If not included in the ticket data obtained from the NFC-enabled ticket 106, the supplemental ticket data may additionally include the category of event, artist name, tour title, venue, seating information, and/or a hash pertaining to an account, such as an iTunes® account, associated with the user, etc The selection of the button 636, labeled "Extras," may cause the handheld device 40 to display a screen 640, as illustrated in FIG. 41G. The screen 640 may indicate that the user has or does not have "extras," or additional benefits associated with the ticket. The screen 640 may include a button 642, labeled "View Extras," and a button 644, labeled "Buy/Prepay Extras." The buttons 642 and 644 may cause the handheld device 40 to display a list of complimentary benefits or benefits which may be purchased, respectively.

Selecting the user selectable button 642 may introduce a variety of "extras" associated with the selected ticket on a screen 646, as illustrated by FIG. 41H. The screen 646 may indicate a title of the event 648 and may include a variety of selectable benefits as list items 650. As described further below with particular reference to FIG. 64, additional benefits associated with a concert ticket may include, for example, an expected concert setlist or free or discounted downloads of certain songs or exclusive content relating to the event, such as a free interview video with the band. Such content may be displayable, for example, in a web browser, such as Safari®, a digital content management application, such as iPod® or iTunes®, or a video application on the handheld device 40, such as a YouTube application. A button 652, labeled "Options," may enable a user to set a variety of options related to the screen 646. Such options may include displaying "extras" in order of expiration, popularity, type (e.g., digital content, coupon for refreshments, etc.), whether the benefit is currently available or will not become available until the start or finish of the event, etc. A button 654, labeled "Buy/Prepay Extras" may enable a user to toggle to another screen to prepay for certain benefits associated with the event.

FIG. 41I illustrates a visually descriptive screen 656 displaying the list items 650 of "extras" associated with the electronic ticket. The screen 656 of FIG. 41I may be displayed when a user turns the handheld device 40 sideways, causing the accelerometers 38 to register a change in device orientation. The screen 656 may illustrate the list items 650 of ticket "extras" in a format such as the Cover Flow format by Apple Inc. The benefits may be displayed visually with a series of descriptive images 658 and the name of a presently displayed ticket benefit may appear in text 660. By dragging a finger across the screen, a user may easily flip between ticket benefits. Turning the handheld device 40 upright may navigate the user back to the screen 646 of FIG. 41H.

A user may select from the list items 650 of FIG. 41H or the images 658 of FIG. 41I to select one of the benefits associated with the electronic ticket. It should be appreciated, however, that certain benefits associated with electronic tickets stored in the handheld device 40 may become available without first selecting the benefits in this manner. For example, a benefit of a free digital download may be credited automatically to a user account, such as an iTunes® account when the electronic ticket is initially obtained. From among the list items 650 or the images 658, if a user selects the first list item 650, the handheld device 40 may display a screen 662, as illustrated in FIG. 41J, which may represent a complimentary song download associated with the ticket. The screen 662 may state, for example, that the handheld device 40 has received credit to purchase online music. In the present example, the screen 662 indicates that iTunes credit has been received to download "Jumping Jack Flash" by the Rolling Stones, which corresponds to the electronic ticket selected. The credit may be associated with a user account for an online music vendor, such as iTunes®, and thus the user may or may not choose to download the song immediately; the user may instead download the song at any time via the online music vendor. To accommodate a user who may desire to download the song immediately, the screen 662 may additionally include a button 664, labeled "Download Now," which may allow the user to download the song from the ticket management application.

As noted above, certain benefits or "extras" associated with an electronic ticket may be available to purchase or prepay. FIGS. 42A-B illustrate a manner of purchasing or prepaying for additional benefits associated with the electronic ticket stored on the handheld device 40. Turning first to FIG. 42A, a user may select the button 644 on the screen 640. In response, the handheld device 40 may display a screen 666, as illustrated in FIG. 42B. The screen 666 may display a title of the event 648 and may include a variety of selectable benefits as list items 650. As described further below with particular reference to FIG. 64, additional benefits associated with a concert ticket may include, for example, an option to purchase recent albums by the artist associated with the event, to prepay for a live recording of the event, or to prepay for certain concert attire to be obtained at the event. Some content available for purchase may be displayable, for example, in a web browser, such as Safari®, a digital content management application, such as iPod® or iTunes®, or a video application on the handheld device 40, such as a YouTube application. A button 672, labeled "Options," may enable a user to set a variety of options related to the screen 666. Such options may include displaying "extras" in order of expiration, popularity, type (e.g., digital content, coupon for refreshments, etc.), whether the benefit is currently available or will not become available until the start or finish of the event, etc. A button 674, labeled "View Extras," may enable a user to toggle to the screen 646 to view the other benefits associated with the event. It should further be appreciated that tilting the handheld device sideways may cause the list items 670 to be displayed in a visual manner, as described above with reference to FIG. 41I.

The discussion associated with FIGS. 38-40 above may describe techniques for receiving an electronic ticket from another electronic device 10. Similarly, FIGS. 43-45 may describe techniques for transferring an electronic ticket to another electronic device 10. More particularly, FIGS. 43A-C may illustrate transferring an electronic ticket to another electronic device 10 via NFC, FIGS. 44A-B may illustrate transferring an electronic ticket to another electronic device 10 via imagery to be scanned by the camera 36, and FIGS. 45A-B may illustrate transferring an electronic ticket to another electronic device 10 via wireless network communication.

Turning first to FIG. 43A, a user may choose to transfer an electronic ticket stored on the handheld device 40 by selecting the button 638, labeled "Transfer Ticket," of the screen 628. Selecting the button 638 may cause the handheld device 40 to display a screen 676, as illustrated in FIG. 43B. The screen 676 may include a variety of user-selectable buttons 678-686 to provide such ticket transfer options as "NFC," "Barcode/Image," "Wireless," "Email," or "Print," respectively. For example, selecting the button 684 may allow the user to send the electronic ticket to another electronic device 10 via email, while selecting the button 686 may allow the user to print the electronic ticket such that the printed ticket may be used for entry to the event or scanned into another electronic device 10.

If the user selects the button 678 labeled "NFC," the handheld device 40 may display a screen 688, as illustrated by FIG. 43C. The screen 688 may instruct the user to tap the NFC interfaces 34 of the handheld devices 40 together to initiate the transfer. It should be appreciated that transferring the electronic ticket to the other handheld device 40 via. NFC may occur in a manner similar to that for obtaining an electronic ticket from the kiosk 74. As such, the kiosk scanning operation 350 illustrated by FIG. 25, as well as the communication diagram 352 of FIG. 26 and the communication diagram of FIGS. 28A-B may effectively describe the communication which may take place in such a transfer. Moreover, as discussed further below, the NFC interface 34 transferring handheld device 40 may be operating in a "host mode." Accordingly, the techniques described above with reference to FIGS. 30-32, in which the receiving handheld device 40 may remain in a "wake on NFC," mode may also apply Turning to FIG. 44A, if the user selects the button 680 labeled "Barcode/Image," the handheld device 40 may display a screen 690, as illustrated in FIG. 44B. The handheld device 40 may display the screen 690 by generating a barcode or matrix code 692 having encoded ticket information associated with the electronic ticket. As described above with reference to FIGS. 39A-B above, the receiving handheld device 40 may scan the barcode or matrix code 692 to obtain the electronic ticket from the transferring handheld device 40 displaying the screen 690. When the transfer has completed, the user may select a button 694, labeled "Done," to return to the main menu of the ticket management application.

Figures 45A, 45B:
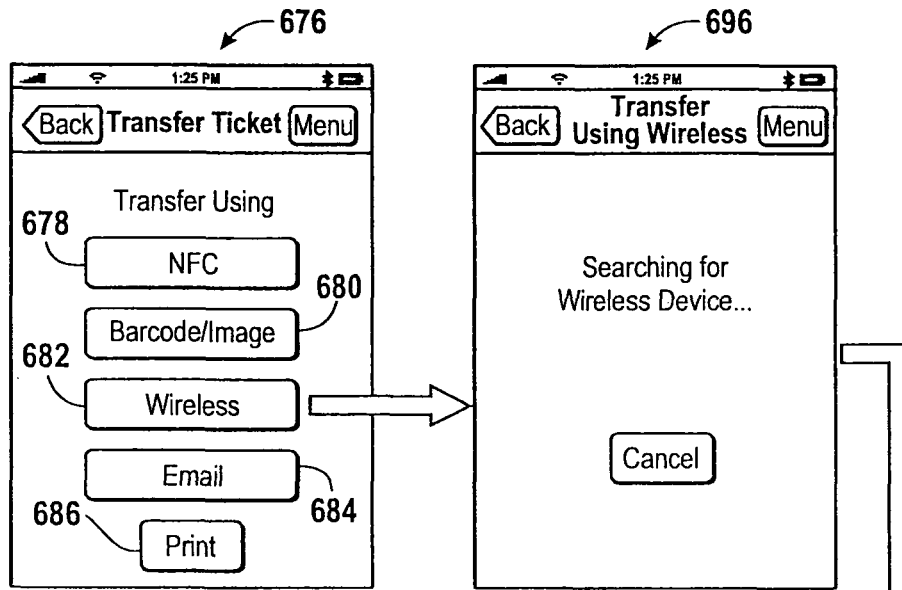
FIGS. 45A-D are schematics of screens that may be displayed on the electronic device of FIG. 1 for transferring an electronic ticket to another electronic device.

FIGS. 45A-D illustrate a manner of transferring the ticket to another electronic device 10 wirelessly. Turning first to FIG. 45A, by selecting the button 682, labeled "Wireless," the handheld device 40 may begin to broadcast information relating to transferring the electronic ticket using the device identification networking protocol, which may be described above with reference to FIG. 27. Simultaneously, the handheld device 40 may begin searching for the receiving electronic device 10.

Figures 45C, 45D:
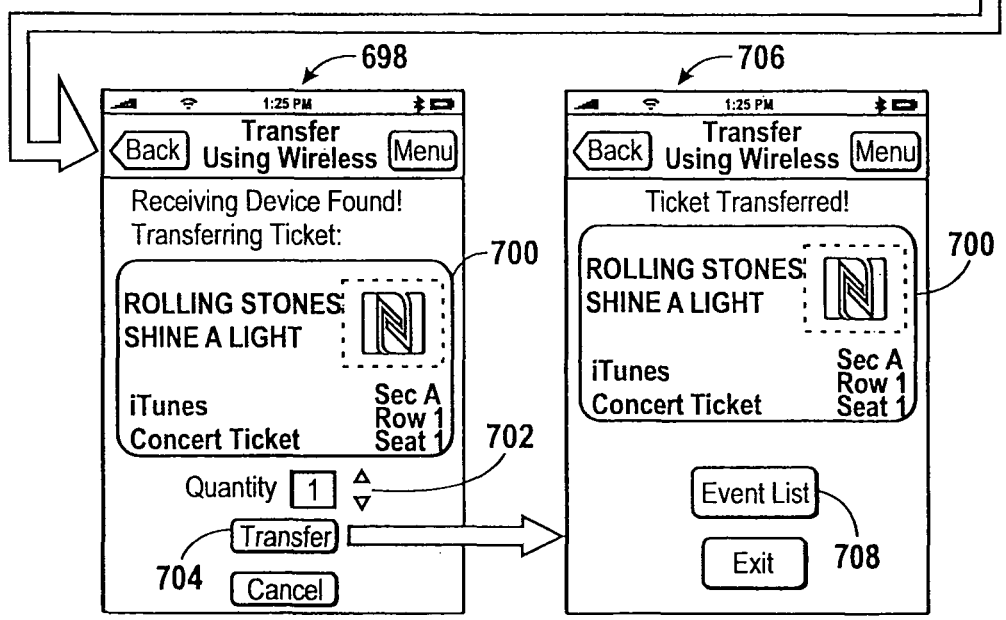
Figures 46A, 46B:
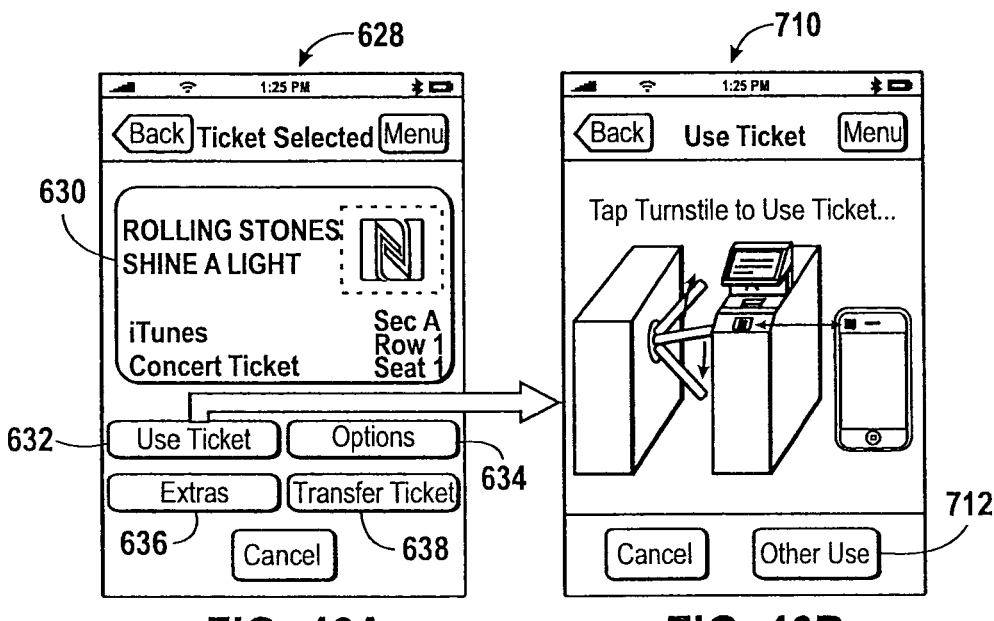
FIGS. 46A-B are schematics of screens that may be displayed on the electronic device of FIG. 1 when an electronic ticket is used to gain entry to an event.

Accordingly, the handheld device 40 may subsequently display a screen 696, as illustrated in FIG. 45B, which may indicate that the handheld device 40 is announcing wirelessly that a ticket is available for transfer or that the handheld device 40 is searching for the receiving electronic device 10. When the receiving electronic device 10 is discovered wirelessly and a wireless connection to the electronic device 10 is established, the handheld device 40 may display a screen 698, as illustrated by FIG. 45C. The screen 698 may denote with an image 700 the ticket to be transferred. Further, the screen 698 may enable the user to transfer a quantity of tickets, as indicated by a numeral 702. Selecting a button 704 may enable the user to complete the transaction and the electronic ticket may be transferred wirelessly to the receiving electronic device 10. Accordingly, when the button 704 is selected, the handheld device 40 may display a screen 706, as illustrated by FIG. 45D. The screen 706 may restate the recently-transferred ticket with the image 700, and may further state in text that the ticket has been transferred from the handheld device 40 to the receiving electronic device 10. A button 708, labeled "Event List," may allow the user to return to the screen 610.

FIGS. 46 through 53 may describe techniques for using the electronic ticket to gain entry to an event. Turning first to FIG. 46A, a user may select the button 632, labeled "Use Ticket," of the screen 628. Selecting the button 632 may cause the handheld device 40 to display a screen 710, as illustrated by FIG. 46B. The screen 710 may instruct the user to tap the NFC interface 34 of the handheld device 40 to that of the ticket turnstile 94. Using NFC to gain entry to the event is discussed further below with reference to FIGS. 48-50. Because other techniques may allow the user to gain access to the event, a button 712, labeled "Other Uses," may provide entry with techniques not involving NFC.

Figure 47A:
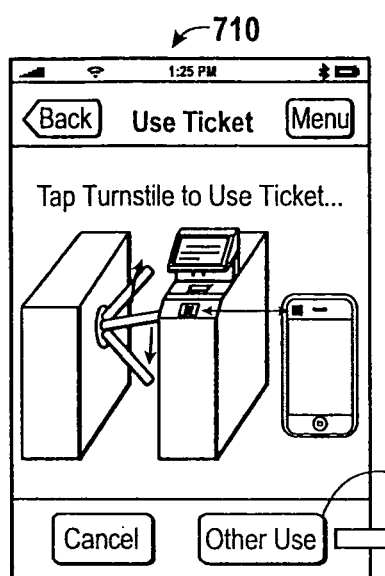
FIGS. 47A-C are schematics of screens that may be displayed on the electronic device of FIG. 1 when an electronic ticket is used to gain entry to an event.
Figure 47B:
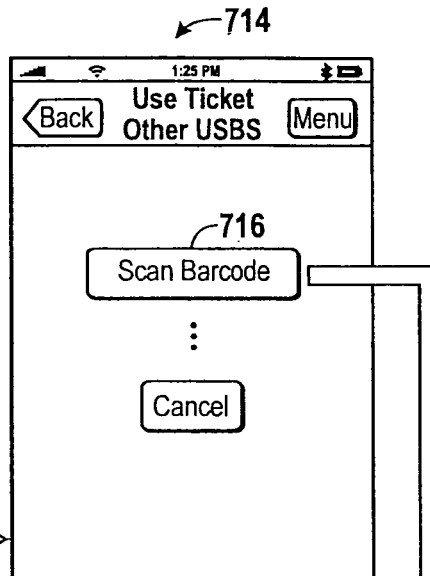
Figure 47C:
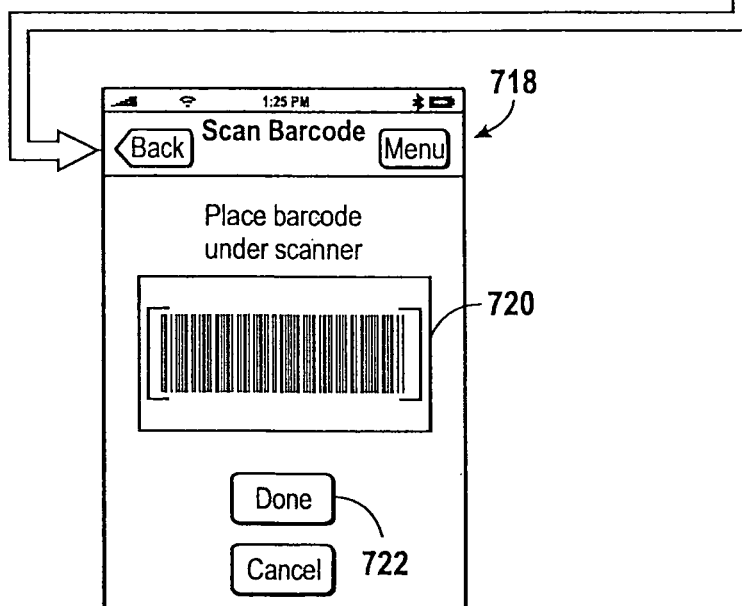

FIGS. 47A-C depict an alternative manner of using the electronic ticket stored on the handheld device 40 to gain entry to an event. A user may select the button 712 of the screen 710, as illustrated in FIG. 47A. The handheld device 40 may illustrate a variety of manners in which the ticket may be used on a screen 714, as shown in FIG. 47B. For example, selecting a button 716, labeled "Scan Barcode," may enable the user to gain entry to an event by displaying a barcode or matrix code encoding authenticated ticket information to the ticket turnstile 94. Accordingly, as shown in FIG. 47C, the handheld device 40 may display a screen 718 when the button 716 is selected. The screen 718 may display a barcode or matrix code 720 that may encode the ticket data or authenticated ticket data associated with the electronic ticket.

Turning to FIG. 48, an event-entry operation 724 depicts using the NFC interface 34 of the handheld device 40 to gain entry to an event through the ticket turnstile 94. To pass through the ticket turnstile 94, which may serve as a gateway to an event, the NFC interface 34 of the handheld device may be tapped to the NFC interface 34 of the ticket turnstile 94. Doing so may establish the NFC communication channel 204, through which authenticated ticket data may be transferred from the handheld device 40 to the ticket turnstile 94.

Figure 49:
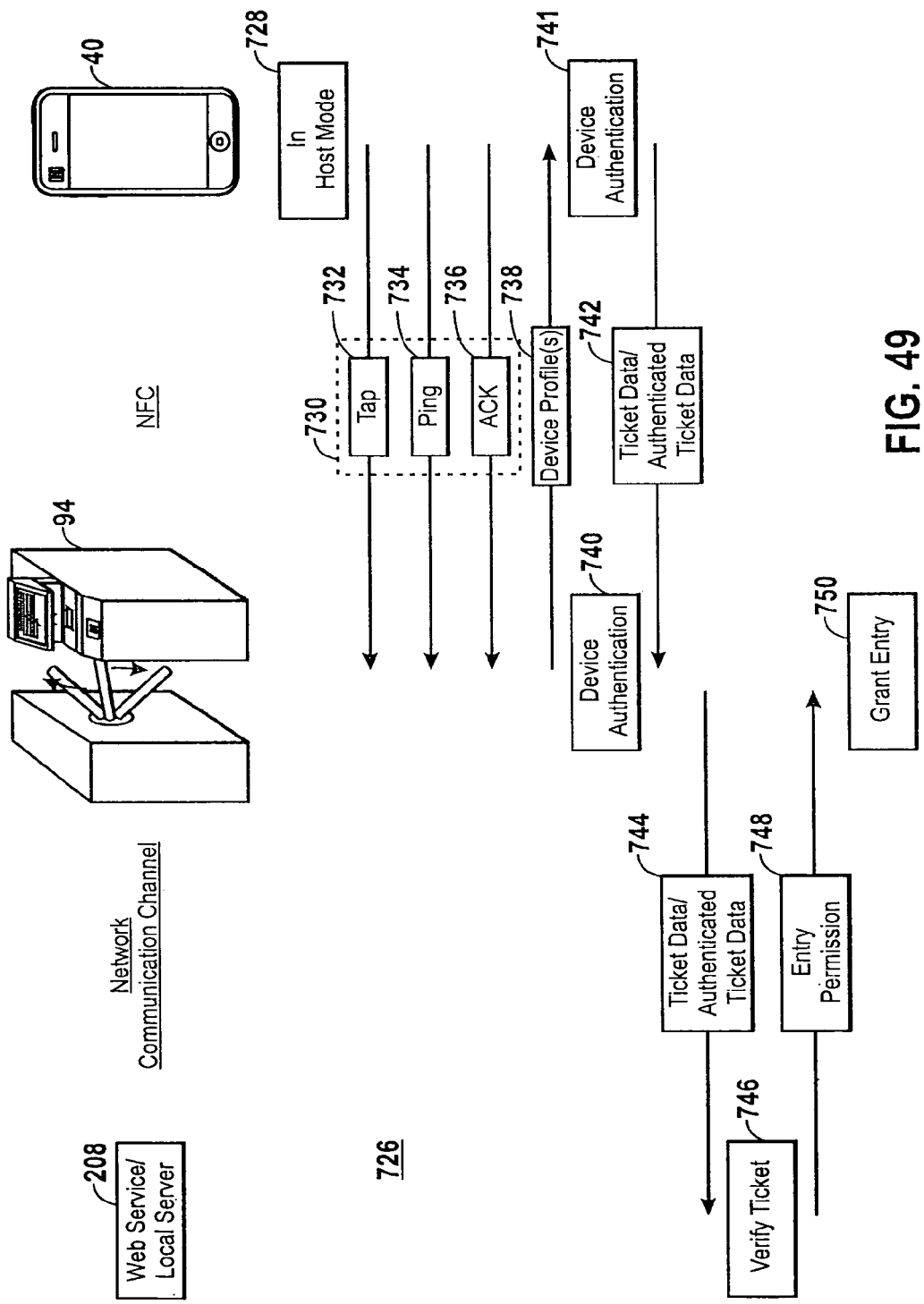
FIG. 49 is a block diagram describing communication that may take place during the turnstile-scanning operation of FIG. 48.

Communication that may occur during the event-entry operation 724 of FIG. 48 is described in a communication diagram 726 of FIG. 49. As noted in the communication diagram 726, communication may initially take place between the turnstile 94 and the handheld device 40 via the NFC communication channel 204. The communication diagram 726 may begin when the NFC interface 34 of the handheld device 40 is placed in a "host mode," as indicated by block 728. The NFC interface 34 of the handheld device 40 may enter the "host mode" when the button 632 of the screen 628 is selected by the user.

An NFC handshake 730 may next take place between the handheld device 40 and the ticket turnstile 94 over the NFC communication channel 204. To begin the NFC handshake 730, the user may tap the NFC interfaces 34 of the handheld device 40 and the ticket turnstile 94, as indicated by a block 732. Because the handheld device 40 may be operating in the "host mode," as discussed above, the handheld device 40 may emit periodic NFC pings. One of the NFC pings may be transmitted to the ticket turnstile 94, as indicated by block 734. After receiving the NFC ping of the block 734, the ticket turnstile 94 may reply with an NFC acknowledgement packet, as indicated by block 736 labeled "ACK."

With NFC communication established between the devices, the handheld device 40 and the ticket turnstile 94 may exchange device profiles, as shown by the block 738. The device profiles may include a variety of information regarding the capabilities of the handheld device 40 and the ticket turnstile 94. For example, the device profiles may include messages of any form, including extensible markup language (XML), which may denote the device name, serial number, owner name, type of device, as well as other identifying information. The other identifying information may include, for example, a hash of the user's account for a web service, such as iTunes®, or a public or private encryption key. The device profiles may additionally denote capabilities of the handheld device 40 or the ticket turnstile 94 by indicating which applications, drivers, or services may be installed on each device.

Subsequently, the handheld device 40 and the ticket turnstile 94 may authenticate one another based at least in part on the information from the device profiles. The authentication procedures of blocks 740 and 741 of FIG. 49 may involve, for example, verifying that the purchaser of the ticket and the owner of the handheld device 40 are the same. Authentication may rely on a private key known to both the ticket turnstile 94 and the handheld device 40, which may have been exchanged prior to communication or, additionally or alternatively, a combination of a public key and a private key. Under the latter scheme, the ticket turnstile 94 and the handheld device 40 may each exchange public keys associated with one another prior to or during the authentication procedure of blocks 740 and 741, or may obtain public keys from another source. The ticket turnstile 94 and the handheld device 40 may verify the public keys with a certificate authority over the Internet or via a web of trust. In certain variations, the web service 208 may represent the certificate authority. If there is any link broken in the chain of trust, the authentication procedure of blocks 740 and 741 may be terminated.

Following the device authentication procedure of blocks 740 and 741, the handheld device 40, upon recognizing the turnstile 94, may send the ticket data or authenticated ticket data to the turnstile 94, as illustrated in block 742. It should be appreciated that if more than one electronic ticket for the event is stored on the handheld device 40, the handheld device 40 may transfer ticket data or authenticated ticket data for any or all of the electronic tickets. To verify that the ticket information is correct and that the user of the handheld device 40 and any other people associated with electronic tickets stored on the handheld device 40 have permission to enter the event, the turnstile 94 may communicate via any of the network communication channels 376 with the web service 208 or a local server. The turnstile 94 may transfer the ticket data or authenticated ticket data as shown in block 744 to the web service 208. Subsequently, the web service 208 may verify that the user of the handheld device 40 has permission to enter the event. If the ticket is verified, as shown in block 746, the web service 208 may reply with data indicating that entry should be granted, as shown in block 748. The turnstile 94 may thereafter grant entry to the user of the handheld device 40, as illustrated by block 750. Entry may be granted by permitting the user and any other people associated with electronic tickets stored on the handheld device 40 to pass through the ticket turnstile 94, which may occur, for example, by opening of the turnstile arm 96.

Figure 50A:
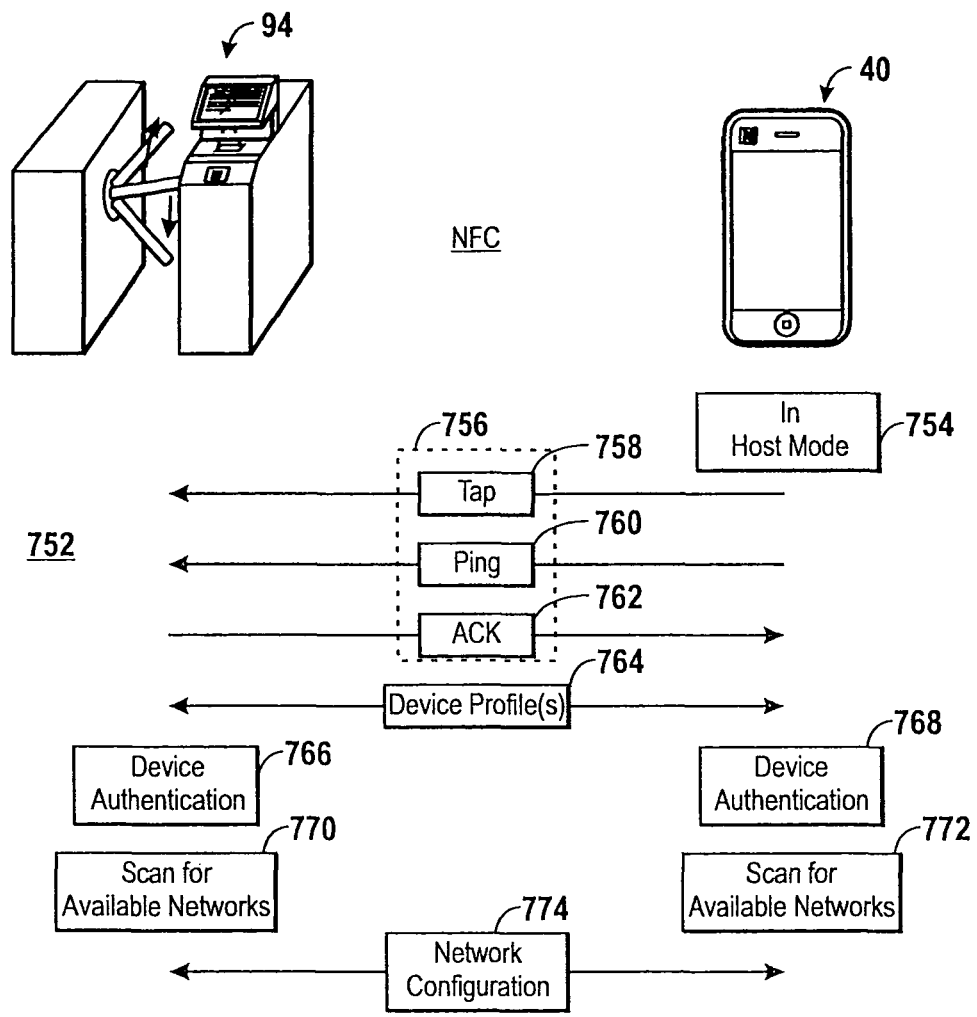
FIGS. 50A-B are block diagrams describing other communication that may take place during the turnstile-scanning operation of FIG. 48.
Figure 50B:
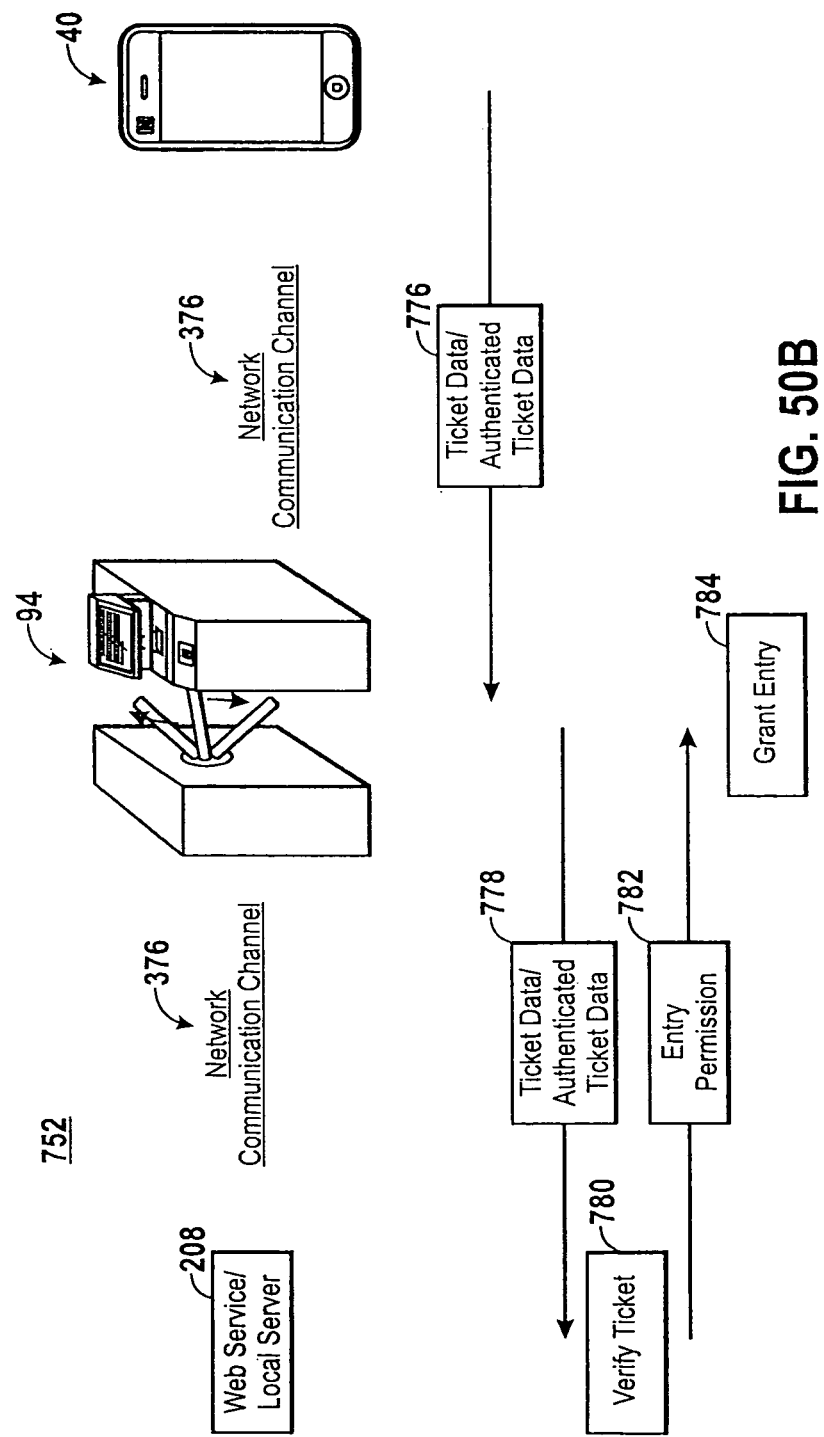

FIGS. 50A-B represent an alternative manner of gaining access to the event using the event entry operation 724 of FIG. 48. Turning first to FIG. 50A, a communication diagram 752 may begin when the NFC interface 34 of the handheld device 40 is placed in a "host mode," as indicated by block 754. The NFC interface 34 of the handheld device 40 may enter the "host mode" when the button 632 of the screen 628 is selected by the user.

An NFC handshake 756 may next take place between the handheld device 40 and the ticket turnstile 94 over the NFC communication channel 204. To begin the NFC handshake 756, the user may tap the NFC interfaces 34 of the handheld device 40 and the ticket turnstile 94, as indicated by block 758. Because the handheld device 40 may be operating in the "host mode," as discussed above, the handheld device 40 may emit periodic NFC pings. One of the NFC pings may be transmitted to the ticket turnstile 94, as indicated by block 760. After receiving the NFC ping of the block 402, the ticket turnstile 94 may reply with an NFC acknowledgement packet, as indicated by block 762 labeled "ACK."

With NFC communication established between the devices, the handheld device 40 and the ticket turnstile 94 may exchange device profiles, as shown by the block 764. The device profiles may include a variety of information regarding the capabilities of the handheld device 40 and the ticket turnstile 94. For example, the device profiles may include messages of any form, including extensible markup language (XML), which may denote the device name, serial number, owner name, type of device, as well as other identifying information. The other identifying information may include, for example, a hash of the user's account for a web service, such as iTunes®, or a public or private encryption key. The device profiles may additionally denote capabilities of the handheld device 40 or the ticket turnstile 94 by indicating which applications, drivers, or services may be installed on each device.

Subsequently, the handheld device 40 and the ticket turnstile 94 may authenticate one another based at least in part on the information from the device profiles. The authentication procedures of blocks 766 and 768 may involve, for example, verifying that the purchaser of the ticket and the owner of the handheld device 40 are the same. Authentication may rely on a private key known to both the ticket turnstile 94 and the handheld device 40, which may have been exchanged prior to communication or, additionally or alternatively, a combination of a public key and a private key. Under the latter scheme, the ticket turnstile 94 and the handheld device 40 may each exchange public keys associated with one another prior to or during the authentication procedure of blocks 766 and 768, or may obtain public keys from another source. The ticket turnstile 94 and the handheld device 40 may verify the public keys with a certificate authority over the Internet or via a web of trust. In certain variations, the web service 208 may represent the certificate authority. If there is any link broken in the chain of trust, the authentication procedure of blocks 766 and 768 may be terminated.

Following device authentication, the handheld device 40 and the ticket turnstile 94 may scan for available network communication channels 376 for the other to join for further communication, as indicated by blocks 770 and 772. After scanning for the available network communication channels 376, the handheld device 40 and the ticket turnstile 94 may exchange network configuration information, as shown by block 774. The network configuration information of block 774 may include, for example, XML messages denoting lists of network communication channels 376 accessible via the ticket turnstile 94 or the handheld device 40. Among other things, the network configuration information of block 774 may include known authorization keys and service set identifier (SSID). By way of example, the network configuration information may include PAN interface 28 configuration information, such as a Bluetooth serial number, MAC address, and an associated password, as well as LAN interface 30 configuration information, such as a WiFi IP address, a WiFi MAC address, and a WiFi SSID. The network configuration information may be stored for use at a later time to permit the handheld device 40 and the ticket turnstile 94 to ascertain a higher bandwidth connection.

Turning next to FIG. 50B, the handheld device 40 and the ticket turnstile 94 may next initiate a subsequent data transfer via another network communication channel 376 other than the NFC communication channel 204. Over the newly established network communication channel 376, the handheld device 40 may transfer ticket data or ticket authentication data to the ticket turnstile 94, as shown in block 776. It should be appreciated that if more than one electronic ticket for the event is stored on the handheld device 40, the handheld device 40 may transfer ticket data or authenticated ticket data for any or all of the electronic tickets. To verify that the ticket information is correct and that the user of the handheld device 40 and any other people associated with electronic tickets stored on the handheld device 40 have permission to enter the event, the turnstile 94 may communicate via any of the network communication channels 376 with the web service 208 or a local server. The turnstile 94 may transfer the ticket data or authenticated ticket data as shown in block 778 to the web service 208. Subsequently, the web service 208 may verify that the user of the handheld device 40 has permission to enter the event. If the ticket is verified, as shown in block 780, the web service 208 may reply with data indicating that entry should be granted, as shown in block 782. The turnstile 94 may thereafter grant entry to the user of the handheld device 40, as illustrated by block 784. Entry may be granted by permitting the user and any other people associated with electronic tickets stored on the handheld device 40 to pass through the ticket turnstile 94, which may occur, for example, by opening of the turnstile arm 96.

Though the communication illustrated with reference to FIGS. 49-50 above describe a transfer of ticket data or authenticated ticket data when the NFC interface 34 of the handheld device 40 is in a "host mode," it should be understood that the ticket transfer may also be initiated when the handheld device 40 is in a "wake on NFC" mode. As such, communication described above with reference to FIGS. 30-32 above may similarly apply to gaining entry to an event using an electronic ticket.

Figure 51:
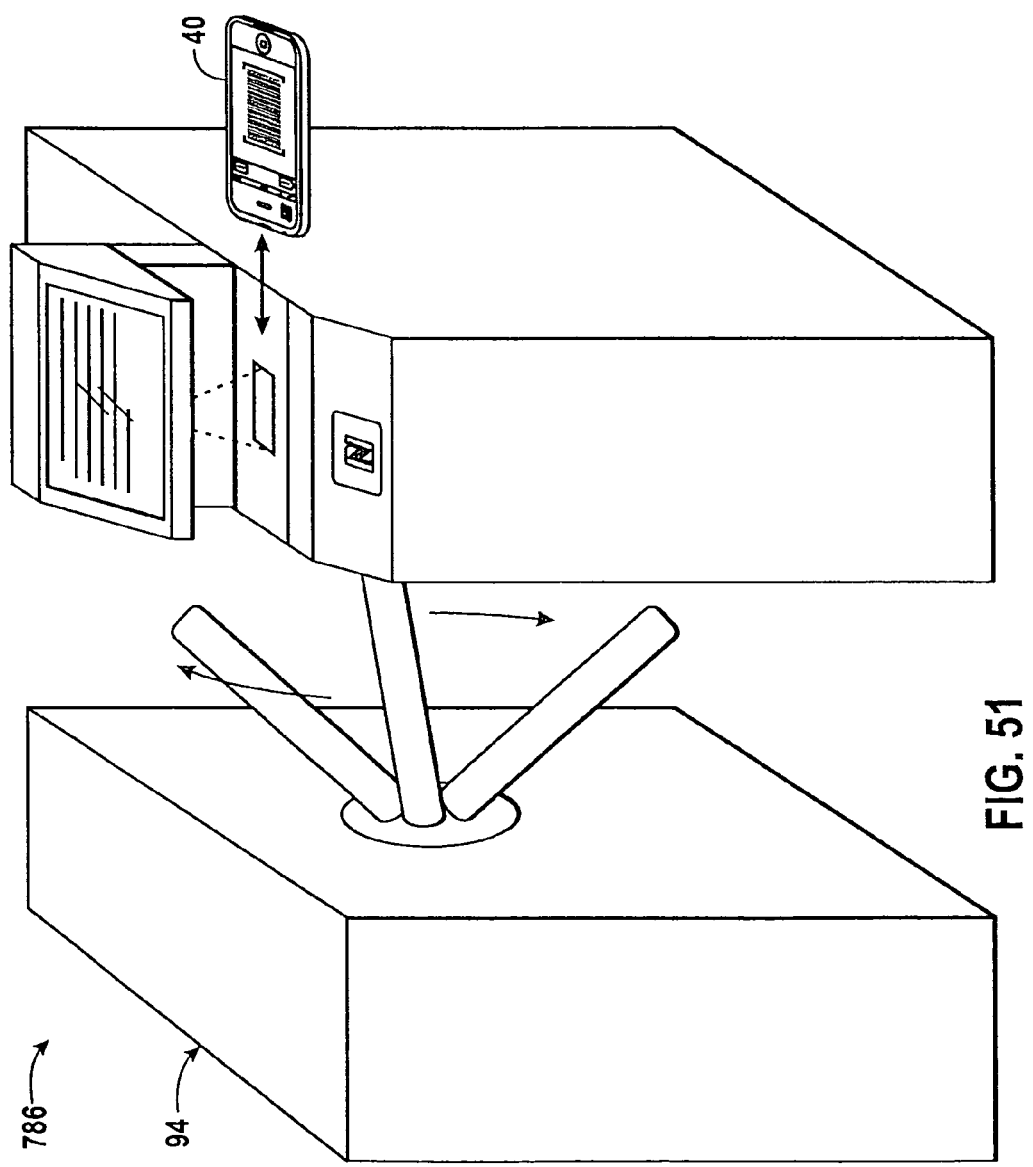
FIG. 51 is a schematic of an alternative turnstile-scanning operation for gaining entry to an event with an electronic ticket.

FIG. 51 represents an alternative manner of gaining entry to an event by scanning a barcode or matrix code from the handheld device 40 on the ticket turnstile 94. As indicated by the event entry operation 786, the handheld device 40 may display the barcode or matrix code representing the ticket information stored on the handheld device for the given event. The barcode may be displayed on the handheld device 40 when the user selects a button 718 from the screen 714 of FIG. 47B, causing the screen 720 of FIG. 47C to be displayed on the handheld device 40. The barcode or matrix code reader 105 of the ticket turnstile 94 may read ticket data or authenticated ticket data encoded in the barcode or matrix code displayed on the handheld device 40 to effectively obtain the electronic ticket from the handheld device 40.

Figure 52:
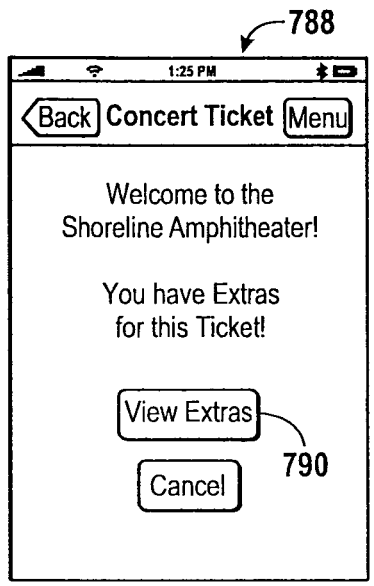
FIG. 52 is a schematic of a screen that may be displayed on the electronic device of FIG. 1 after entry has been gained to an event using an electronic ticket.

When the electronic ticket has been transferred to the turnstile 94 to gain entry to the event using either of the techniques described above, or when the handheld device 40 has recognized that the user's location has moved within the venue for the event, the handheld device 40 may display a screen 788, as shown in FIG. 52. The screen 788 may welcome the user to the venue by providing a message customized by the venue, which may represent, for example, advertisements for other messages. The message customized by the venue or a link to the message may have previously been received and stored by the handheld device 40 in the supplemental ticket data. The screen 788 may also include a user selectable button 790 to enable the user to view other benefits that may be associated with the electronic ticket.

FIGS. 53-56 represent embodiments of benefits which may be associated with the electronic ticket which may be available upon entry to the event. Turning first to FIG. 53A, the handheld device 40 may display a screen 792 When a user elects to view "extras" by selecting the button 790 of screen 788 or by selecting the button 642 of the screen 640. The screen 792 may include a number of list items 794-798 that may represent, for example, an option to obtain the live recording of the event, a coupon for refreshments, or a coupon to obtain concert attire purchased prior to the event, respectively. Additionally, a button 800 labeled "Options" may enable a user to set a variety of options related to the screen 792. Such options may include displaying "extras" in order of expiration, popularity, type (e.g., digital content, coupon for refreshments, etc.), whether the benefit is currently available or will not become available until the start or finish of the event, etc. It should be appreciated that turning the handheld device 40 sideways may cause the handheld device 40 to display the list in a visually descriptive format, such as the Cover Flow format by Apple Inc.

Figures 53A, 53B:
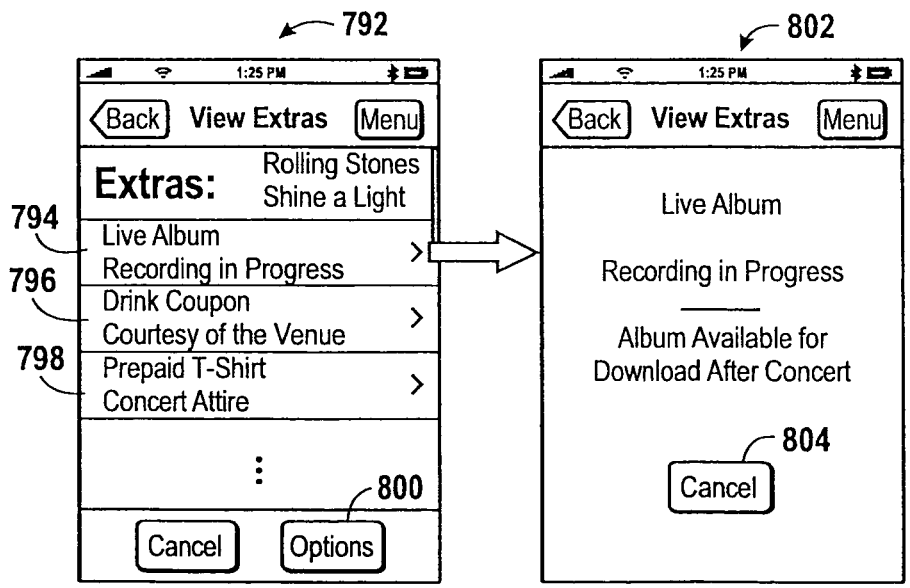
FIGS. 53A-B are schematics of screens that may be displayed on the electronic device of FIG. 1 when certain benefits associated with an electronic ticket are accessed on the device.

If a user selects, for example, the list item 794 for a live recording of the event, the handheld device 40 may display a screen 802, as illustrated in FIG. 53B. The screen 802 may indicate that the recording of the event is still in progress, as the event has not terminated. However, once the event has ended, the live recording of the concert may be uploaded to an online music vendor, such as iTunes®, at which point the live recording may become available for download. A button 804 may return the user to the screen 792 of FIG. 53A. It should be appreciated that the live recording may alternatively be credited to an account of the user with the online music vendor, and the user may obtain the live recording any time after it becomes available.

Figures 54A, 54B:
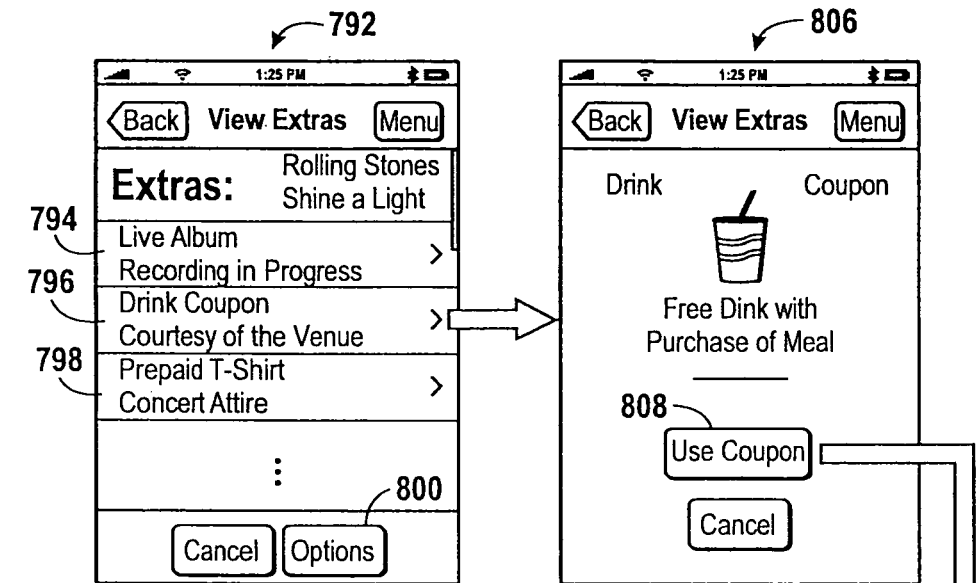
FIGS. 54A-D are schematics of screens that may be displayed on the electronic device of FIG. 1 when certain benefits associated with an electronic ticket are accessed on the device.

Turning to FIG. 54A, a user may select a list item 796, labeled "Drink Coupon," to display a screen 806 that may provide additional details regarding the benefit, as shown in FIG. 54B. The screen 806 may describe, for example, a coupon for a free drink with purchase of a meal for use in the concession stands of the venue. A button 808, labeled "Use Coupon," may allow the user to make use of the coupon when the refreshments are purchased.

Figures 54C, 54D:
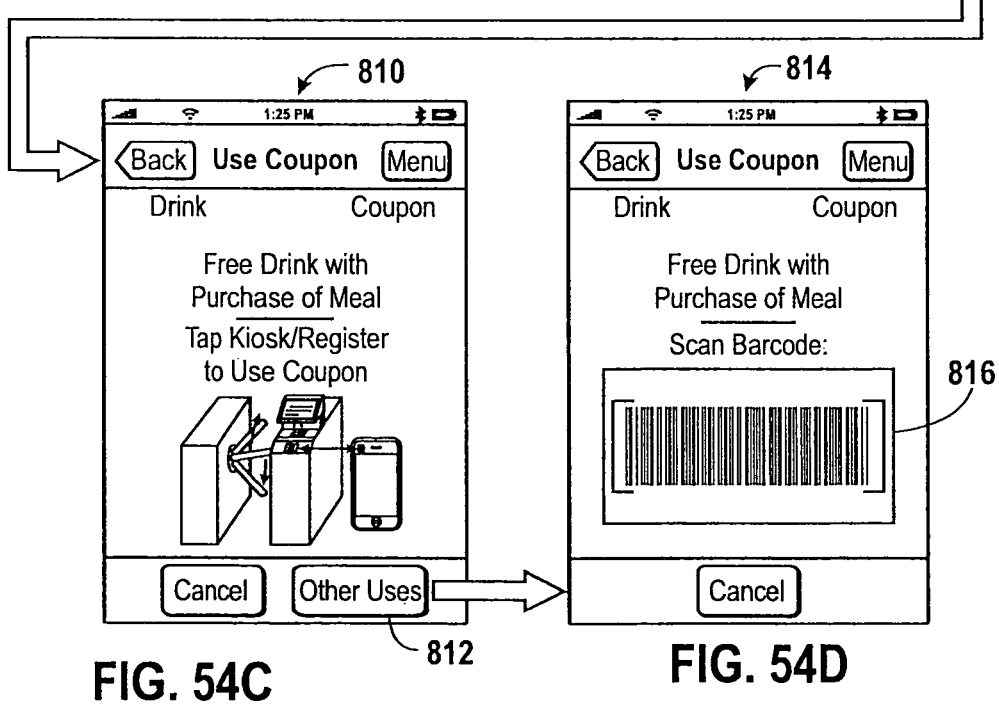

Selecting the button 808 may prepare the handheld device 40 to use the coupon. For example, the handheld device 40 may display a screen 810, as illustrated by FIG. 54C. The screen 810 may include instructions to the user to tap the handheld device 40 to the cash register or the kiosk where the refreshments are being purchased. While the handheld device 40 displays screen 810, it should be understood that the NFC interface 34 of the handheld device 40 may be in a "host mode" and may be prepared to transfer the electronic coupon to the kiosk or cash register. When the user taps the kiosk or cash register, the handheld device 40 may transfer a coupon code to the cash register via the NFC communication channel 204. Additionally or alternatively, the handheld device 40 may transfer the ticket data or the authenticated ticket data associated with the handheld device 40. In either case, the kiosk or cash register may use the data transferred from the handheld device 40 to provide a discount on certain food items, such as offering a free drink.

The screen 810 may also include a button 812, labeled "Other Uses," to enable using the coupon in other ways. By way of example, when the user selects the button 812, the handheld device 40 may display a screen 814, as illustrated by FIG. 54D. The screen 814 may display a barcode or matrix code 816 that encodes a coupon code or the ticket data or authenticated ticket data associated with the event. The user may thereafter scan the generated barcode or matrix code 816 at the cash register or kiosk to obtain the discount.

FIGS. 55-56 may describe another embodiment of using various benefits that may be displayed by the ticket management application while the event is taking place. Turning first to FIG. 55A, while the user is attending the event, the user may initiate the ticket management application by selection the ticket management application icon 44, which may be displayed on a home screen of the handheld device 40.

Selecting the ticket management application icon 44 may cause the ticket management application to launch on the handheld device 40. Identifying that the event is underway, the handheld device 40 may display a screen 818, as illustrated in FIG. 55B. The handheld device 40 may identify that the event is taking place, for example, based on whether the current time falls within the duration outlined in the supplemental ticket data. Additionally or alternatively, the handheld device 40 may identify that the event is taking place based on whether the location of the handheld device 40, as determined by the location-sensing circuitry 22, remains within the location of the venue as defined in the supplemental ticket data. Thus, the handheld device 40 may display the screen 818 for the duration of the concert instead of the main menu screen 158 of FIG. 12B.

The screen 818 may indicate to the user that the concert is underway and provide various song purchasing options. For example, the screen 818 may provide options to buy a current song being played in the concert, to buy recent songs being played in the concert, and to view additional benefits associated with the event currently underway by selecting buttons 820, 822, and 824, respectively. The screen 818 may additionally include the main menu buttons 162 and 164 of the screen 158 of FIG. 12B.

Selecting the button 820, labeled "Buy Current Song," may cause the handheld device 40 to display a screen 826, as illustrated by FIG. 55C. Simultaneously, the handheld device 40 may communicate with the web service 208 or to establish communication with a local server or another Internet location, the link for which may be described in the supplemental ticket data. The web service 208, the local server, or the other Internet location may provide the handheld device 40 with data regarding the song currently being played. With such data, the screen 826 may display text describing the name of the current song and provide additional options for purchasing the song. For example, a button 828, labeled "Prepay Live Recording," may provide an option to prepay for the live recording of the song. Selecting the button 828 may charge an account to an online music vendor, such as iTunes®, which may pertain to the user. When the live recording becomes available after the concert, the handheld device 40 may automatically download the live recording of the song. Additionally or alternatively, a button 830, labeled "Purchase Studio Release," may provide an option to purchase the studio release of the song from an online music vendor, such as iTunes®. Selecting the button 830 may charge an account to an online music vendor, such as iTunes®, which may pertain to the user, and may automatically download the current song or credit the account for download at a later time.

Turning next to FIG. 56A, a user may choose to select the button 822 of the screen 818 to buy recent songs. Selecting the button 822 may cause a screen 832 to be displayed on the handheld device, as shown in FIG. 56B. The handheld device 40 may communicate with the web service 208 or to establish communication with a local server or another Internet location, the link for which may be described in the supplemental ticket data. The web service 208, the local server, or the other Internet location may provide the handheld device 40 with data regarding the songs recently played. With such data, the screen 832 may display text describing the name of the recent songs in a series of list items 834. A refresh button 836 may enable a user to refresh the list items 834 by reestablishing communication with the web service 208, the local server, or the other Internet location. A button 838, labeled "Buy All," may allow a user to purchase all of the recent songs at once. Selecting one of the list items 838 may allow a user to purchase each song individually. By turning the handheld device 40 sideways, the handheld device 40 may display a visual representation 840 of the list items 834, as illustrated by FIG. 56C.

FIG. 56C illustrates a visually descriptive screen 840 displaying the list items 834 of recent songs. The screen 840 may be displayed when a user turns the handheld device 40 sideways, causing the accelerometers 38 to register a change in device orientation. The screen 840 may illustrate the list items 834 of recent songs in a format such as the Cover Flow format by Apple Inc. The recent songs may be displayed visually with a series of descriptive images 842 and the name of a presently displayed recent song may appear in text 844. By dragging a finger across the screen, a user may easily flip between recent songs. Turning the handheld device 40 upright may navigate the user back to the screen 832 of FIG. 56B.

When one of the list items 834 or images 844 is selected, such as the list item 834 labeled "Start Me Up," the handheld device 40 may display a screen 846, as illustrated in FIG. 56D. The screen 846 may include song and artist information 848. Arrows surrounding the song and artist information 848 may indicate that the user may scroll right and left between recent songs. Additionally, the screen 846 may include buttons 850 and 852 to prepay for the live recording of the song or to purchase the studio release, respectively, which may take place in the same manner as described above with reference to FIG. 55C.

FIGS. 57-60 may describe techniques for obtaining content credited to a user's account using the ticket 106, 108, or 146, which may be purchased from a kiosk or from a cash register at the event. In particular, the techniques described with reference to FIGS. 57-60 may be performed with the ticket 106, 108, or 146, regardless of whether the tickets have been stored as electronic tickets on the handheld device 40. By way of example, after gaining entry to an event through any means, a ticketholder may choose to purchase digital content, such as a live recording of the event, from a kiosk 74 or unmanned kiosk 88. By tapping the NFC-enabled ticket 106 or scanning the paper ticket 108 or 146 to the kiosk 74 or unmanned kiosk 88, digital content purchased at the kiosk may be automatically credited to the user's account with an online music vendor, such as iTunes®, as described below with reference to FIGS. 57-60.

Figure 57:
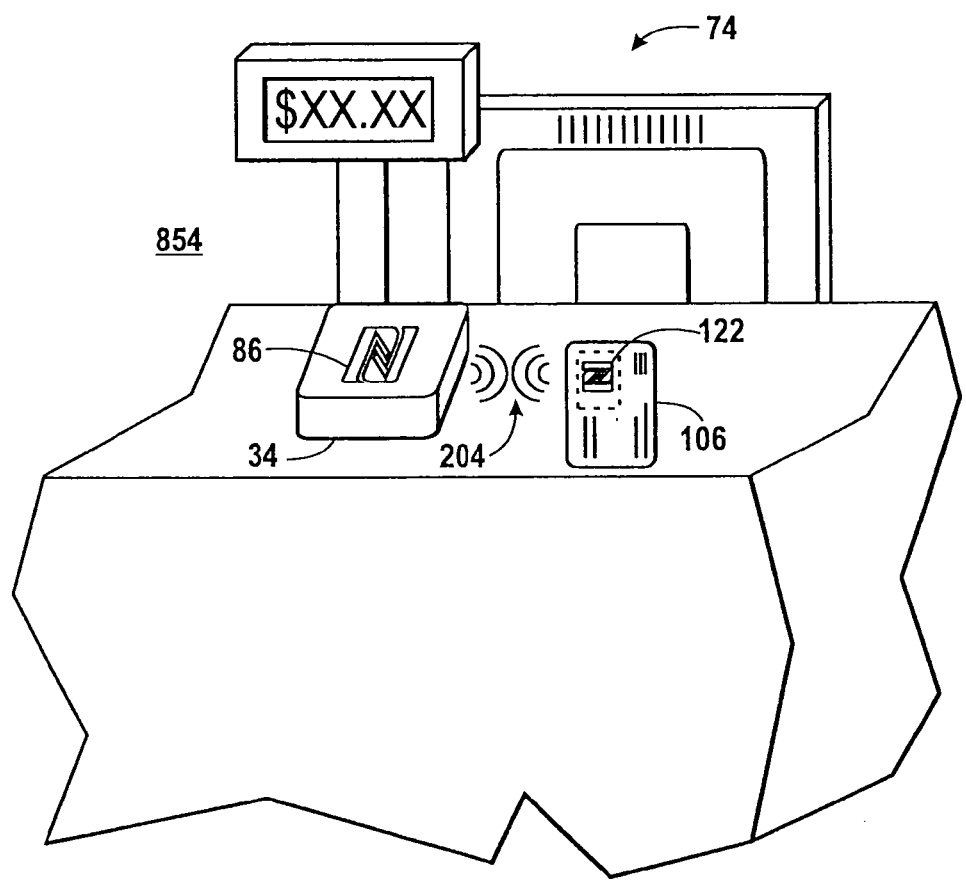
FIG. 57 is a schematic of a ticket-scanning operation for obtaining digital content associated with the event.

FIG. 57 illustrates a ticket-scanning operation 854. The operation 854 may allow a user to provide a vendor, such as the kiosk 74 or the unmanned kiosk 88, with proper information to automatically credit the user's account with an online music vendor, such as iTunes, through which the digital content may be delivered. After purchasing or selecting digital content at the kiosk 74, a user may, for example, tap the NFC-enabled ticket 106 to the NFC interface 34 of the kiosk 74. As the RFID tag 122 of the NFC-enabled ticket 106 approaches the NFC interface 34 of the kiosk 74, the RFID tag 122 may transmit certain ticket data associated with the ticket 106, which may include the serial number associated with the ticket. As depicted, the information may be transferred over the temporary NFC communication channel 204.

Figure 58:
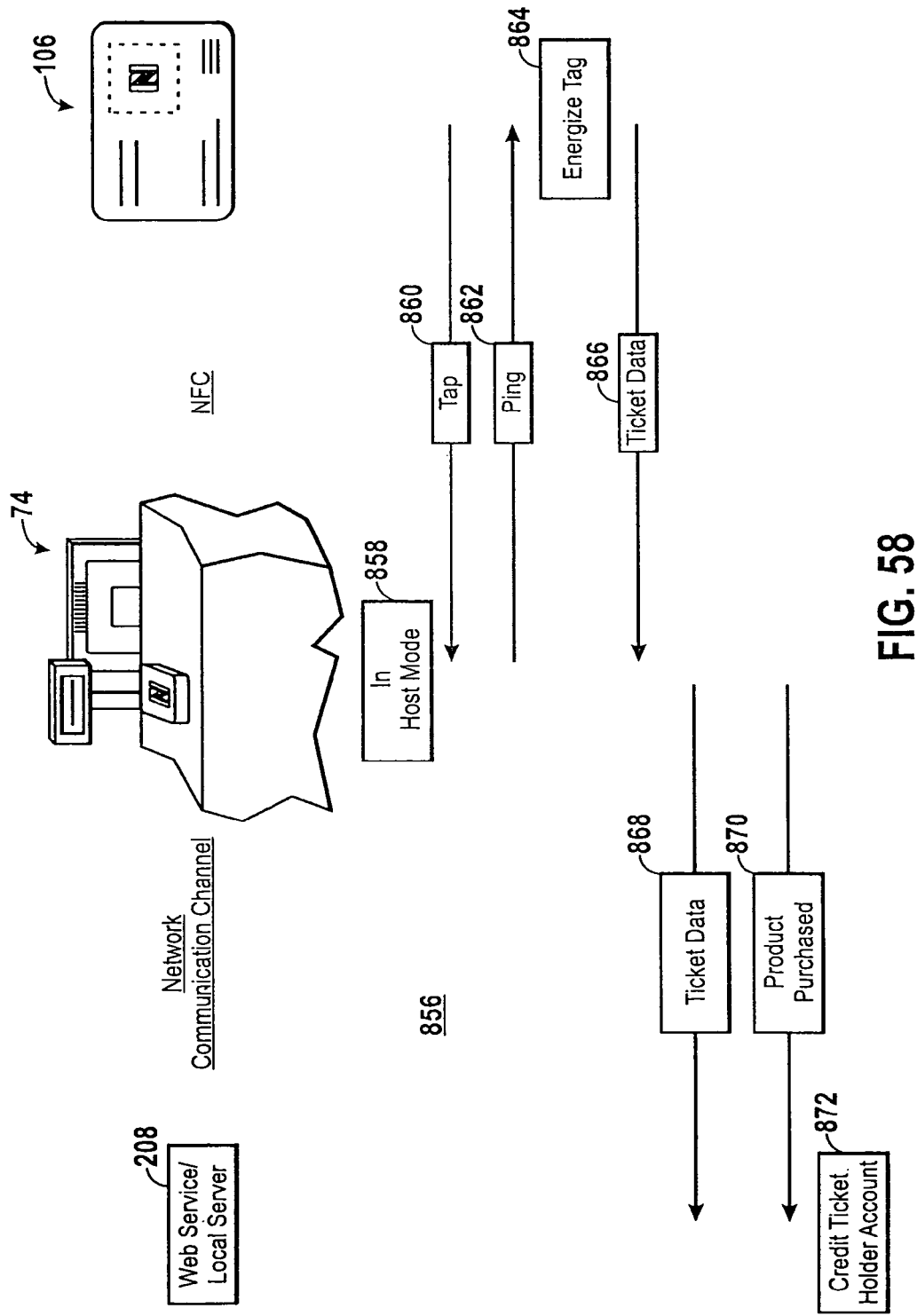
FIG. 58 is a block diagram describing communication that may take place during the ticket-scanning operation of FIG. 57.

FIG. 58 is a communication diagram 856, which may represent a manner of crediting digital content to a user account via the operation 854 depicted in FIG. 57. Initially, the NFC interface 34 of the kiosk 74 may be in a "host mode," as indicated by block 858. As such, when the NFC-enabled ticket 106 approaches the NFC interface 34 of the kiosk 74, as occurs when the ticket is tapped according to block 860, the NFC interface 34 of the kiosk 74 may emit a ping, as shown in block 862. When the RFID tag 122 on the ticket 106 receives the ping of block 862, the RFID tag 122 may become energized, as shown in block 864. Subsequently, the RFID tag 122 may respond by sending stored ticket data, as indicated by block 866, to the kiosk 74. As noted above, the ticket data from the NFC-enabled ticket 106 may include, for example, a serial number associated with the ticket 106. The kiosk 74 may subsequently communicate with the web service 208, which may be, for example, an online digital content vendor such as iTunes®. The kiosk 74 may transmit the ticket data to the web service 208 with an indication of the digital content product purchased, as shown in blocks 868 and 870, respectfully.

When the web service 208 receives the ticket data, the web service 208 may link the received ticket data to an associated user account. Thereafter, the web service 208 may credit the account for the digital content product purchased, as illustrated by block 872. Alternatively, the web service 208 may save digital content credits for the product purchased without associating the content with an account. Such action may be particularly taken if the ticket is not associated with a user account with the web service 208. The ticket holder may later log onto the web service 208 from an electronic device 10 and activate the NFC-enabled ticket 106 by providing the ticket data to the web service using the techniques described above, and the web service will transfer the credits associated with the ticket data of the NFC-enabled ticket 106 to the account of the user. Thus, a concertgoer may purchase digital content, such as the live recording of the event, even without having brought an electronic device 10 to the event, using the NFC-enabled ticket 106.

Figure 59:
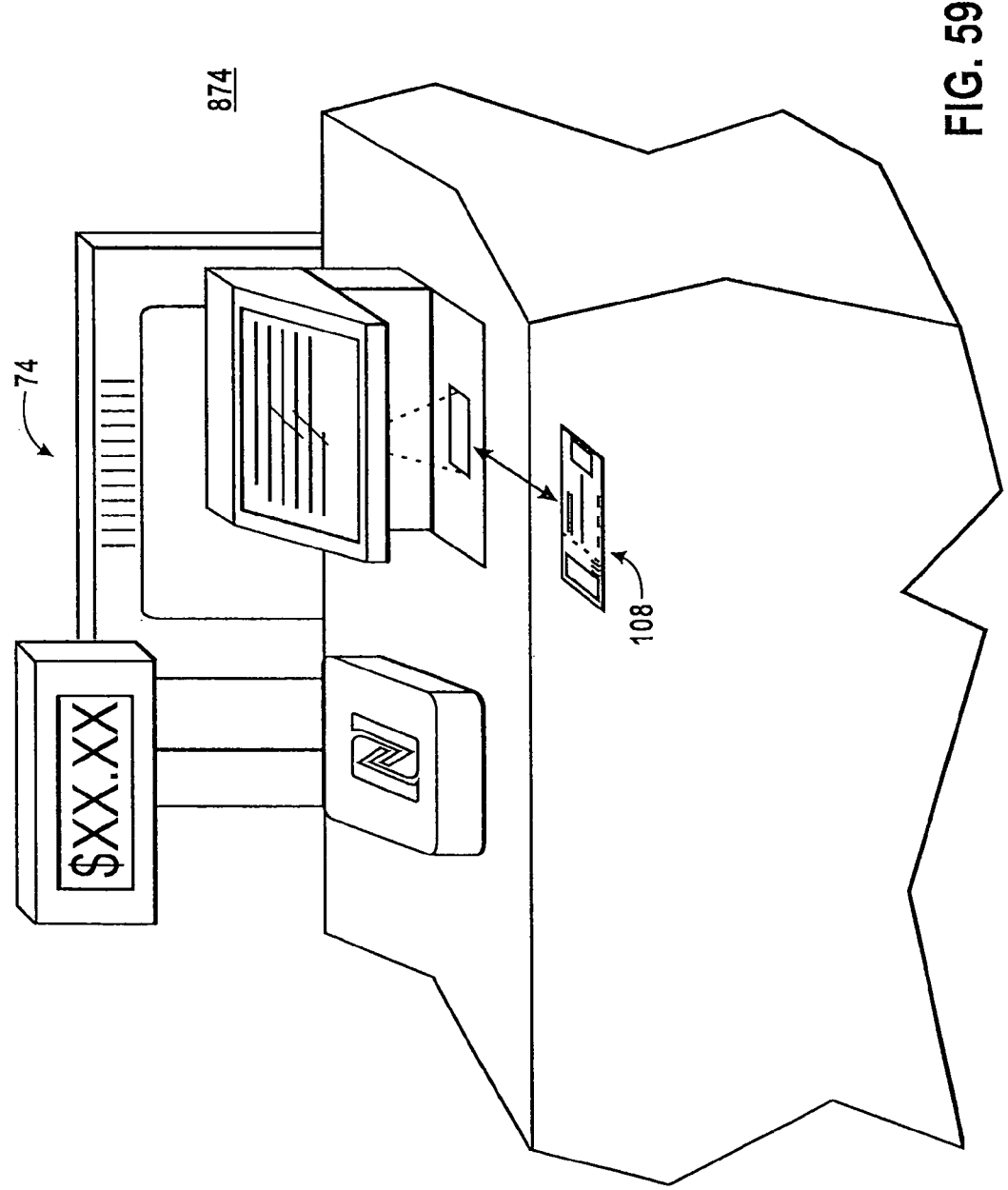
FIG. 59 is a schematic of an alternative ticket-scanning operation for obtaining music associated with the event using the ticket of FIGS. 10-11.

FIG. 59 displays an alternative manner of obtaining digital content to an account using a paper ticket. A ticket-scanning operation 874 may allow a user to provide a vendor, such as the kiosk 74 or the unmanned kiosk 88, with proper information to automatically credit the user's account with an online music vendor, such as iTunes, through which the digital content may be delivered. After purchasing or selecting digital content at the kiosk 74, a user may, for example, scan the paper ticket 108 or 146 with the barcode or matrix code reader 105 of the kiosk 74. The kiosk 74 may decode from the paper ticket 108 or 146 certain ticket data associated therewith, such as a ticket serial number. Having obtained the ticket data from the paper ticket 108 or 146, the kiosk 74 may, in the manner illustrated with reference to blocks 868-872 of FIG. 58, credit a user account associated with the ticket.

Figure 60:
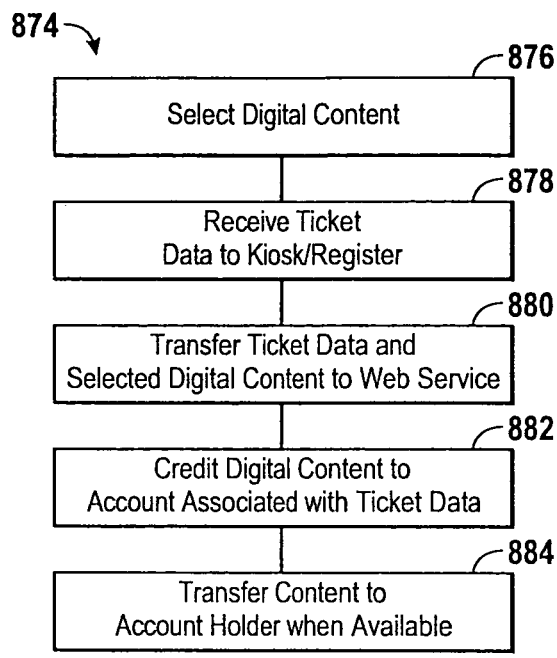
FIG. 60 is a flowchart describing a technique for obtaining digital content associated with the event using the tickets of FIGS. 9-11.

FIG. 60 is a flow chart 874 that may describe the techniques discussed above with reference to FIGS. 57-59. In a first step 876, a user may select digital content to be purchased or given away free at the event at a cash register, a kiosk 74, or unmanned kiosk 88. The content may include, for example, a live recording of the event that the user is currently attending. The selection may be made on the kiosk 74 or the unmanned kiosk 88, for example, but may also be made on any electronic device 10, and may be input by an attendant, such as a cashier. In certain cases the user may be required to pay prior to continuing.

In a next step 878, the user may offer the ticket 106, 108, or 146, to a cashier or the kiosk 74 or unmanned kiosk 88. For example, the user may tap the ticket to the kiosk 74 or unmanned kiosk 88, as illustrated in the operation 854 of FIG. 57, or the user may scan the ticket in the kiosk 74 or unmanned kiosk 88, as illustrated in the operation 874 of FIG. 59. Alternatively, the ticket may be handed to an attendant for manual entry into a cash register or computer 62.

In step 880, the kiosk 74, the unmanned kiosk 88, the cash register, or the computer 62 may transmit the ticket data and an indication of the selected digital content to the web service 208. This step may be illustrated with reference to blocks 868 and 870 of the communication diagram 856 of FIG. 58. In a next step 882, the web service 208 may credit the account associated with the ticket data with the selected digital content or may associate the ticket data with credits for the selected digital content. By way of example, if the user had elected to purchase a live recording of an event, the user's account may be credited with the live recording for a subsequent download when it became available after the concert. Alternatively, the live recording may be associated with ticket data, such as a serial number, associated with the ticket 106, 108, or 146.

As indicated by step 884, the user may later download the selected content to the user's electronic device 10 once the content is made available. If the selected digital content had been credited to the user account of the web service 208, which may be, for example, an online digital content vendor such as iTunes®, the user may simply log into the web service 208 to obtain the content. If, alternatively, the selected digital content had been credited to ticket data of the ticket 106, 108, or 146, such as the serial number of the ticket, the user may activate the ticket with the web service 208 to obtain digital content. Activating the ticket may involve providing the web service 208 with the ticket data associated with the ticket 106, 108, or 146 using the techniques described above.

Figure 61:
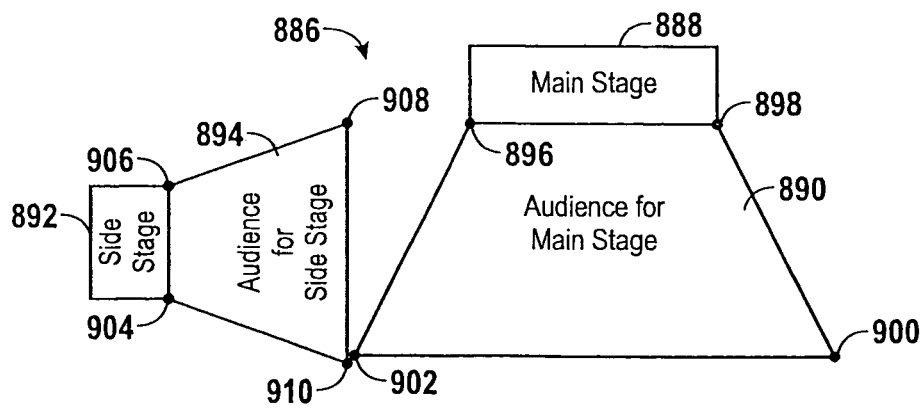
FIG. 61 is a schematic view of an event venue having more than one stage and audience accommodations.

FIGS. 61-63 describe a manner of obtaining digital content specific to the location of the user during an event. Such a situation may particularly arise when more than one artist may be performing at an event at a given time, such as a music festival. For example, an event may include a main act on a main stage 888 with an associated audience 890. The event may further include a side act on a side stage 892 with a similarly associated audience 894. Artists may be performing on the main stage 888 and the side stage 892 concurrently. Using the techniques described below, a user may obtain content related to the artist the user may be currently listening to.

As noted above, it should be appreciated that the supplemental ticket data obtained by the handheld device 40 from the web service 208 or from the NFC-enabled ticket 106 may include GPS coordinates or other location information associated with particular locations in the venue holding the event. For example, the supplemental ticket data may include GPS coordinates for points 896, 898, 900, and 902 denoting the location for the audience 890 of the main stage 888. Similarly, the supplemental ticket data may include GPS coordinates 904, 906, 908, and 910 denoting the location of the audience 894 for the side stage 892. As should be appreciated, the GPS coordinates 896 through 910 may be employed by the handheld device 40 to determine which artist the user is currently listening to while in attendance at the event.

Figures 62A, 62B:
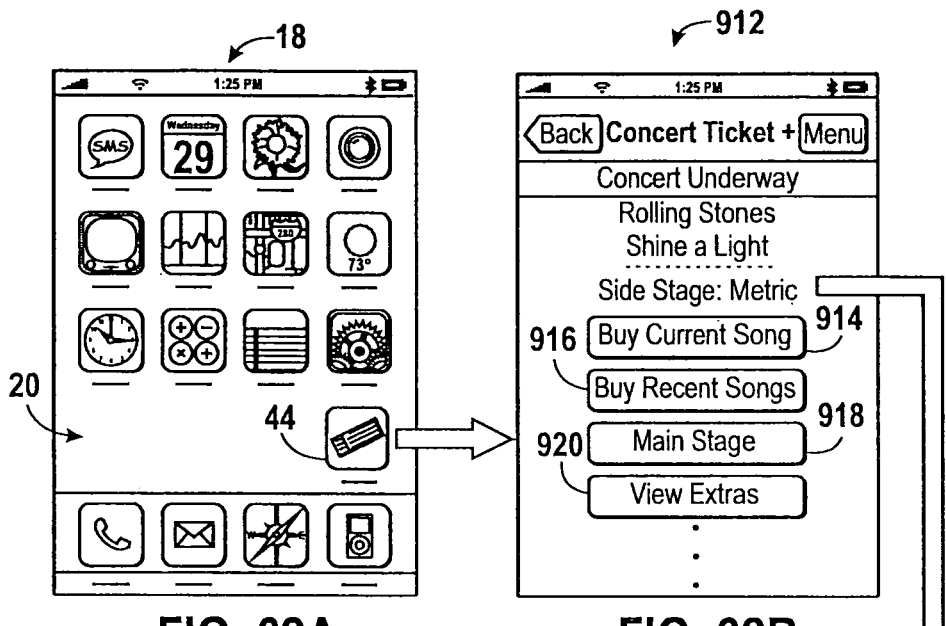
FIGS. 62A-C are schematics of screens that may be displayed on the electronic device of FIG. 1 when digital content is obtained while attending a venue such as described in FIG. 61.

Turning to FIG. 62A, a user may select the ticket management application icon 44 on the home screen of the handheld device 40 while attending a concert having multiple stages such as the main stage 888 and the side stage 892. The user may be located, for example, within the GPS coordinates 904-910, indicating that the user is listening to the artist on the side stage 892. Accordingly, the handheld device 40 may display a screen 912, which may state that the concert is underway and may provide the name of the event. The screen 912 may indicate that the user is listening to an artist on a side stage. Further, a user may elect to buy the current song being played on the side stage, as indicated by a button 914 labeled "Buy Current Song," to purchase recent songs played on the side stage, as indicated by a button 916 labeled "Buy Recent Songs," or to view the songs being played on main stage, as indicated by button 918 labeled "Main Stage." A user may also view other benefits associated with the electronic ticket associated with the current event by selecting a button 920 labeled "View Extras." Beneath the elements described above, the screen 912 may also include the buttons associated with the main menu to permit, for example, adding an event or viewing other events stored on the handheld device 40.

Figure 62C:
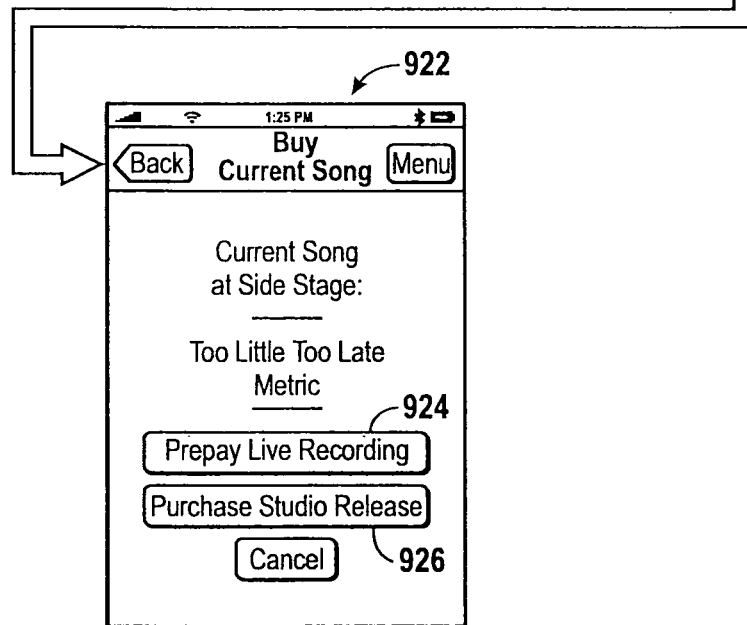

A user located in the audience 894 of the side stage 892 may select the button 914 to purchase content associated with the event currently unfolding. Thus, the handheld device 40 may display a screen 922 with an option to purchase the current song, as illustrated in FIG. 62C. The screen 922 may display the name of the current song being played on the side stage and the name of the artist playing the song. A button 924 may be labeled "Prepay Live Recording" and a button 926 may be labeled "Purchase Studio Release." The buttons 924 and 926 may permit a user to prepay for a live recording of the song or to purchase a prior studio release, respectively, in the manner described above with reference to FIG. 55C.

Figure 63A:
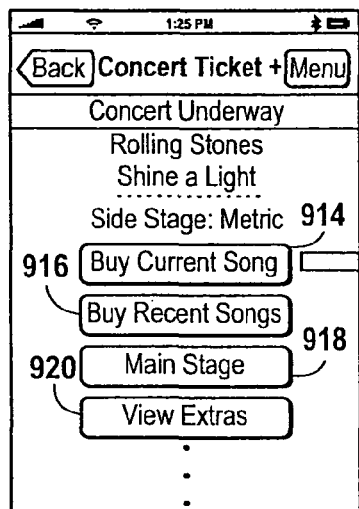
FIGS. 63A-D are schematics of screens that may be displayed on the electronic device of FIG. 1 when digital content is obtained while attending a venue such as described in FIG. 61.
Figure 63B:
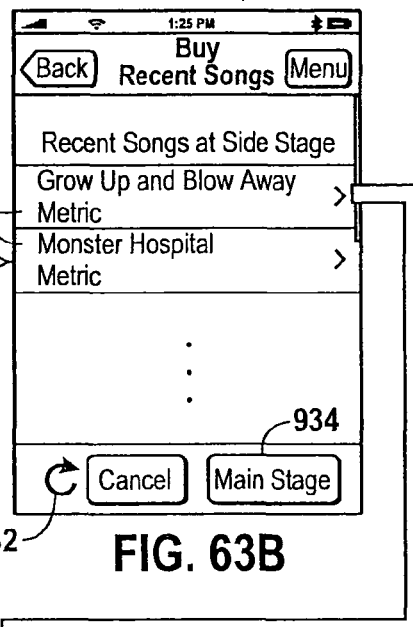

Turning next to FIG. 63A, if a user selects the button 916 of the screen 912, the handheld device 40 may display a screen 928 to enable a user to select from among recent songs to purchase, as shown in FIG. 63B. The screen 928 may include a variety of list items 930 naming the songs and the artist most recently playing on the side stage. A refresh button 932 may allow the user to refresh the recent songs played on the side stage, and a button 934 may display the recent songs played on the main stage instead.

Figure 63C:
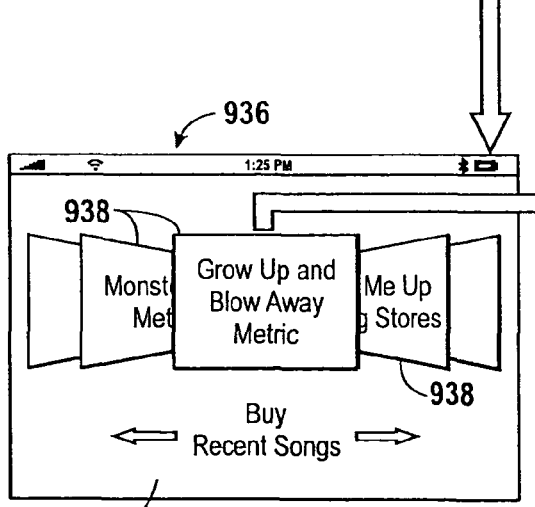

FIG. 63C illustrates a visually descriptive screen 936 displaying the list items 930 of recent songs. The screen 936 may be displayed when a user turns the handheld device 40 sideways, causing the accelerometers 38 to register a change in device orientation. The screen 936 may illustrate the list items 930 of recent songs in a format such as the Cover Flow format by Apple Inc. The recent songs may be displayed visually with a series of descriptive images 938 and the name of a presently displayed recent song may appear in text 940. By dragging a finger across the screen, a user may easily flip between ticket vendors. Turning the handheld device 40 upright may navigate the user back to the screen 928 of FIG. 63B.

Figure 63D:
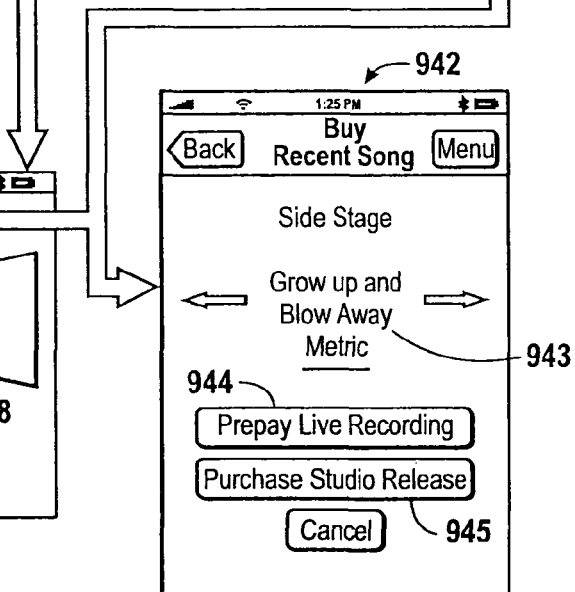

When one of the list items 930 or images 938 is selected, such as the list item 930 labeled "Grow Up and Blow Away/ Metric," the handheld device 40 may display a screen 942 to sell the song, as illustrated in FIG. 63D. The screen 942 may include song and artist information 943. Arrows surrounding the song and artist information 943 may indicate that the user may scroll right and left between recent songs. Additionally, the screen 942 may include buttons 944 and 945 to prepay for the live recording of the song or to purchase the studio release, respectively, which may take place in the same manner as described above with reference to FIG. 55C.

As should be appreciated, an electronic ticket stored in the handheld device 40 may include a broad variety of associated benefits. Certain types of events may be particularly suited to certain benefits. Accordingly, the following discussion may describe benefits that may be associated with electronic tickets for certain events. However, benefits described as associated with one type of event should not be understood as limited to the event discussed. Indeed, any benefit described below as associated with an event may also be associated with any other event.

It should further be appreciated that an promoter or manager for an event may desire to market the electronic ticketing system described above to a venue that may host the event. The promoter or manager may prepare a ticket benefit package to market to a venue management organization that may manage the venue, which may include a suite of various benefits that may be associated with a ticket to the event. Moreover, the ticket benefit package may vary depending on the type of event, capabilities or facilities of the venue, target demographic for the event, etc. For example, if the event is a rock concert, the ticket benefit package may include any number of the benefits described below with reference to FIG. 64, such as a live recording of the event or discounts on studio albums; if the event is a sporting event, the ticket benefit package may include any number of the benefits described below with reference to FIG. 66, such as prepaid or discount sports memorabilia or player e-cards on the electronic device.

Figures 64, 65:
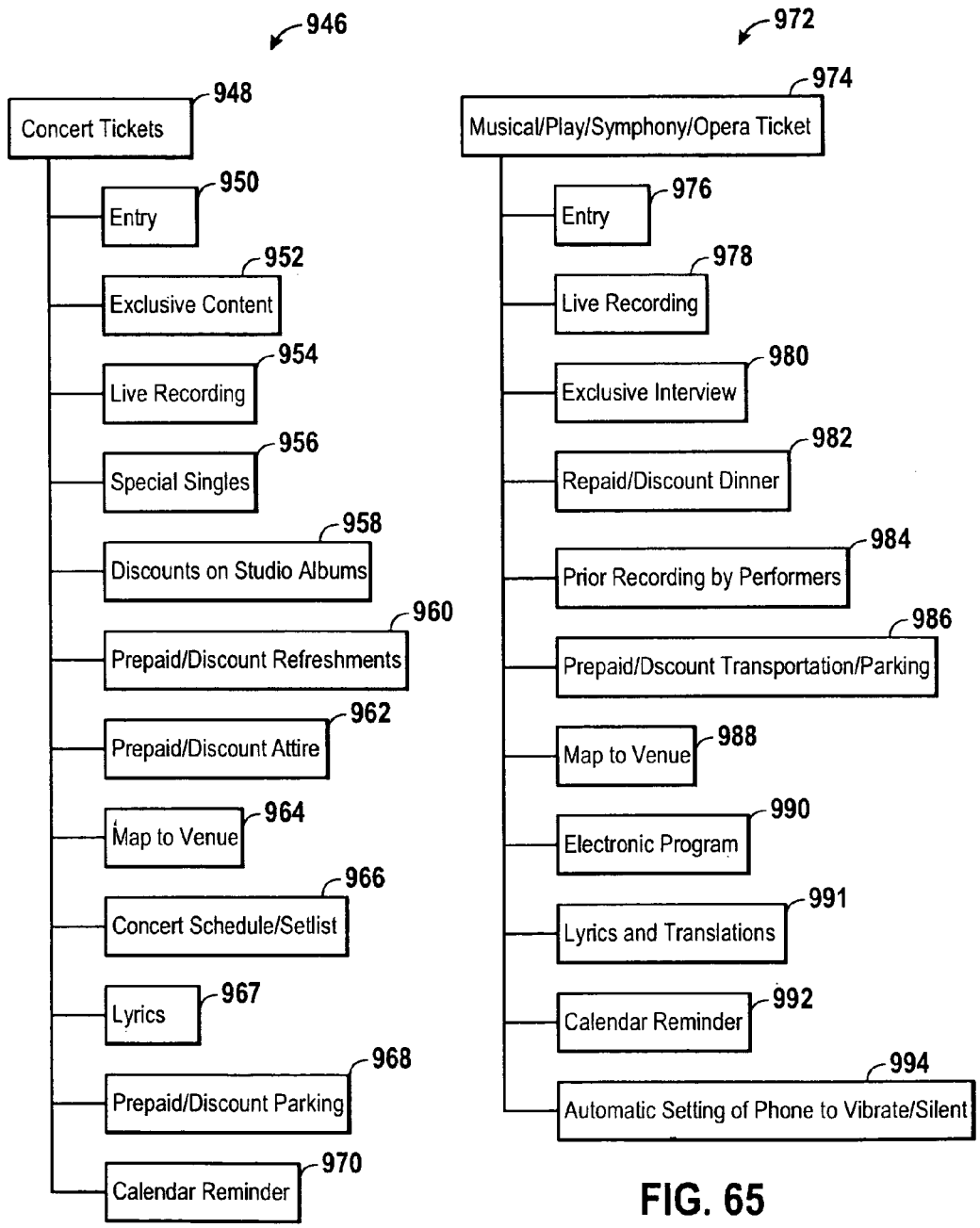
FIG. 64 is a block diagram representing benefits that may be associated with an electronic concert ticket.
FIG. 65 is a block diagram representing benefits that may be associated with an electronic musical, play, symphony, or opera ticket.

Turning to FIG. 64, a benefit diagram 946 illustrates various benefits that may be associated with an electronic concert ticket 948. It should be appreciated that the electronic concert ticket 948 may be obtained, stored, and used in any electronic device 10 according to the techniques described above. Moreover, it should be understood that the benefits described in the diagram 946 are intended to be exemplary and are not intended to be exclusive.

Among the benefits that may be associated with the electronic concert ticket 948 may be entry 950 into a concert event. As discussed above, entry 950 may be gained by transferring the electronic ticket to a ticket turnstile 94. It should be appreciated, however, that entry may also be gained by transferring the electronic ticket to the kiosk 74 or unmanned kiosk 88 using the techniques discussed above; permission to enter may thereafter be granted visually via the kiosk 74 or 88 or via an attendant.

The electronic concert ticket 948 may also include various exclusive content 952. The exclusive content 952 may be obtained by the user of the electronic device 10 on which the electronic concert ticket 948 is stored. As described above, the supplemental ticket data describing the exclusive content 952 may include, for example, credit for an online digital content account, such as iTunes®; links to certain websites for digital content, such as YouTube; or other links to proprietary private or public web servers which may transmit exclusive digital content. By way of example, the digital download described above with reference to FIGS. 41H and 41J may represent examples of exclusive content 952 which may be associated with the electronic concert ticket 948.

Additionally, a user of an electronic device 10 storing the electronic concert ticket 948 may obtain a live recording 954 of the event. As described above, the concert event to which the electronic concert ticket 948 pertains may be recorded. One benefit associated with the electronic ticket 948 may be the right to purchase a coupon or voucher for a digital live recording 954 of the concert. The live recording may represent a complimentary benefit or a benefit which may be prepaid or purchased via the handheld device 40. Credit for the live recording may be deposited to an account associated with the user for an online music vendor, such as iTunes®. Alternatively, the live recording 954 may be purchased and transferred to the user's account without the use of a personal electronic device 10 using techniques described above with reference to FIGS. 57-60.

The electronic concert ticket 948 may also include benefits such as special singles 956 or discounts on studio albums 958. As noted above, the electronic concert ticket 948 may enable a user to obtain exclusive content 952. The special singles 956 and discounts on studio albums 958 may represent specific exclusive content 952 available to the holder of the electronic concert ticket 948. The special singles 956 may represent, for example, certain recordings of songs by the concert artist, which may enable the user to become more familiar with the artist's music. By offering discounts on studio albums 958, the electronic concert ticket 948 may increase the likelihood that the user will purchase studio albums by the concert artist in anticipation of the upcoming concert.

Some benefits associated with the electronic concert ticket 948 may relate to items for sale at the concert event. Such benefits may include, for example, prepaid or discount refreshments 960 or prepaid or discount attire 962. The prepaid or discount refreshments 960 and prepaid or discount attire 962 may become available for purchase in advance of the concert, as described above with reference to FIG. 42B. The refreshments or attire subject to the benefits may be offered at a discount if purchased prior to the concert; at the concert, the prepaid refreshments or attire may be redeemable in the form of an electronic coupon on the electronic device 10, as illustrated with reference to FIGS. 54A-D. Alternatively, prepaid items may be redeemed by obtaining the ticket data associated with the electronic concert ticket 948 directly from the ticket 106, 108, or 146, in the manner described with reference to FIGS. 57-60. Instead of using the ticket data to credit an account associated with the user, a cashier or kiosk 74 at the concert event may use the ticket data to access a list of items prepaid by the user that may be associated with the user's account.

Among other things, the electronic concert ticket 948 may also include a map 964 to or of the venue, which may be received by the electronic device 10 in the supplemental ticket data as a web archive file or a hyperlink to an online map. The map.964 may be displayable in a web browser, such as Safari®, or a map application, such as Maps, on the electronic device 10. A concert schedule or setlist 966 and/or song lyrics 967 may be associated with the electronic concert ticket 948 and may be received by the electronic device 10 in a data file or as a hyperlink that may provide up-to-date information regarding which song may be currently playing. In certain situations, such as when more than one performance may take place at the same time, the setlist may be tied to certain GPS coordinates or other location information. If the concert schedule is received as a data file, the concert schedule may be viewable, for example, in a calendar application which may run on the electronic device 10. Prepaid or discount parking 968 that may be associated with the electronic concert ticket 948 may be purchased and used in the same manner as the prepaid or discount refreshments 960 or the prepaid or discount attire 962.

As noted above, supplemental ticket data associated with an electronic ticket may include the times for which the event begins and ends. With such information, the electronic device 10, upon receiving the electronic concert ticket 948, may also automatically input a calendar reminder 970 on a calendar application that may run on the electronic device 10. The calendar reminder may denote the duration of the concert schedule 966 and may be displayed when the user searches the calendar on the electronic device 10.

The following example may summarize the benefit diagram 946 of FIG. 64. To obtain the benefits of the electronic concert ticket 948, a user may first purchase an NFC-enabled ticket 106 from a vendor such as iTunes®. When the NFC-enabled ticket 106 arrives in the mail, the user may tap the NFC-enabled ticket 106 to the user's handheld device 40 to store the electronic concert ticket 948 on the handheld device 40. Based on user preferences, the handheld device 40 may automatically create a calendar reminder 970, and a number of the benefits that may be associated with the electronic concert ticket 948 may become available to the user.

Prior to attending the concert, the user may download exclusive content 952, special singles 956, or purchase discounted studio albums 958. Expecting to be thirsty and wanting a concert souvenir, the user may prepay for refreshments 960 and concert attire 962. Additionally, the user may prepay for parking 968 to take advantage of a prepayment discount offered by the venue. When the day of the concert arrives, the calendar reminder 970 on the handheld device 40 may alert the user. The user may drive to the concert assisted with a map to the venue 964, and because the user has prepaid for parking, the handheld device 40 may display an electronic coupon indicating the user has prepaid for parking 968 when the user arrives to the venue parking lot based on its GPS location. Alternatively, the prepaid parking may be redeemed by tapping the NFC-enabled concert ticket 106 to a kiosk 74 or unmanned kiosk 88, which may verify that the parking has been prepaid by contacting the web service 208.

The user may use the NFC-enabled ticket 106 or the electronic ticket 948 stored on the handheld device 40 to gain entry 950 to the concert. Once in attendance, the user may redeem the prepaid refreshments 960 and concert attire 962 in the same manner as the prepaid parking. Unsure of what song the band is currently playing, the user may check the handheld device 40 to obtain the lyrics 967 and the name of the currently playing song by way of the setlist 966 if such information is being updated live. Additionally, after listening to a few songs, the user may decide to purchase a live recording 954 of the concert. The user may prepay for the live recording via the handheld device 40 or by tapping the NFC-enabled ticket 106 to a kiosk 74 or unmanned kiosk 88, which may credit an account associated with the user with the live recording 954. After the concert has ended, the user may download the live recording 954 via the handheld device 40 or another electronic device 10.

Turning next to FIG. 65, a benefit diagram 972 illustrates benefits that may be associated with an electronic musical, play, symphony, or opera ticket 974. It should be appreciated that the electronic musical, play, symphony, or opera ticket 974 may be obtained, stored, and used in any electronic device 10 according to the techniques described above. Moreover, it should be understood that the benefits described in the diagram 972 are intended to be exemplary and are not intended to be exclusive. Such benefits may include, for example, entry 976 to the event. The entry 976 may be obtained using the techniques discussed above. The electronic ticket 974 may also include credit for a live recording or an option to purchase a live recording 978 of the event or may include exclusive interviews 980 with the artists, actors, playwrights, composers, or producers, etc. associated with the electronic musical, play, symphony, or opera ticket 974, which may be obtained in the manner described above with reference to FIG. 64.

Some embodiments of the electronic musical, play, symphony, or opera ticket 974 may include as a benefit a prepaid or discount dinner 982. The prepaid or discount dinner 982 may be obtained in the manner described above with reference to the prepaid or discount refreshments 960 or attire 962 that may be associated with the electronic concert ticket 948. Additionally, the electronic musical, play, symphony, or opera ticket 974 may include prior recordings of performances 984 by the same performers, theater company, orchestra, composer, etc. The prior recordings may include certain free or prepaid items, but may also include the option to purchase such prior recordings. As such, the recordings of performances 984 may be obtained in the manner described above with reference to FIG. 64.

To assist with arriving to the musical, play, symphony, or opera event, the ticket 974 may include prepaid or discount transportation or parking 986, or a map to the venue 988. The prepaid or discount transportation or parking 986 may be available for purchase via the electronic device 10 on which the ticket 974 is stored, but may also make available coupons which may be redeemed upon the use of certain transportation or parking. Like the map to the venue 964 associated with the electronic concert ticket 948, the map to the venue 988 associated with the electronic musical, play, symphony, or opera ticket 974 may be received by the handheld device 40 in a variety of forms in the supplemental ticket data, such as a web archive file or a hyperlink to an online map.

Prior to or upon arrival to the musical, play, symphony, or opera event, the electronic ticket 974 may include an electronic program 990. The electronic program 990 may be received in the supplemental ticket data, for example, as a data file, a web archive file, or a hyperlink to a website. The electronic program 990 may include information typical to a printed program for a musical, play, symphony, or opera. In association with the electronic program 990 or as a separate benefit, the handheld device 40 may display lyrics and translations 991 of songs and/or dialogue of the musical, play, symphony, or opera. Such a benefit may be particularly useful with foreign-language productions.

As noted above, the supplemental ticket data associated with an electronic ticket may include the times for which the event begins and ends. With such information, the electronic device 10, upon receiving the electronic musical, play, symphony, or opera ticket 974, may also automatically input a calendar reminder 992 on a calendar application that may run on the electronic device 10. The calendar reminder may denote the duration of the event and may be displayed when the user searches the calendar on the electronic device 10. In a similar fashion, the supplemental ticket data may also indicate to the electronic device 10 that the electronic device 10 should not make noise during the event. As such, a handheld device 40 having the electronic ticket 974 may automatically place audio features, such as a telephone ringtone, into a silent or vibrate mode for the expected duration of the event or while the user remains within the GPS coordinates of the venue.

The following example may illustrate the use of the benefits disclosed in the benefit diagram 972 of FIG. 65. To obtain the benefits of the electronic musical, play, symphony, or opera ticket 974, a user may first purchase two paper tickets 108, for example, to a Broadway musical. When the paper tickets 108 arrive in the mail, the user may scan the paper tickets 108 using the camera 36 of the user's computer 62 to store the electronic musical, play, symphony, or opera ticket 974 on the computer 62. Based on user preferences, the computer 62 may automatically create a calendar reminder 992, and a number of the benefits that may be associated with the electronic musical, play, symphony, or opera ticket 974 may become available to the user.

Prior to attending the Broadway musical, the user may download exclusive interviews 980 or purchase prior recordings by the same performers 984 onto the computer 62 currently storing the electronic musical, play, symphony, or opera ticket 974. Planning for a date, the user may prepay for dinner 982 at a recommended restaurant. Additionally, transportation 986 may be available for prepayment from the restaurant to the venue. To take advantage of a prepayment discount offered by the venue, the user may also prepay for parking 986 near the restaurant.

On the day of the Broadway musical, the calendar reminder 992 on the computer 62 may alert the user. To gain entry to the event, however, the user may prefer to use a handheld device 40. As such, the user may transfer the electronic ticket wirelessly from the computer 62 to the handheld device 40. After picking up a date, and with the electronic ticket stored on the handheld device 40, the user may drive to the restaurant with the aid of the map 988. Because the user had prepaid for dinner 982, the user may show the waiter an electronic coupon indicating such to receive the prepaid meal. After dinner, a shuttle bus may arrive at the restaurant to bring restaurant guests to the Broadway musical. The user may tap the handheld device 40 to another NFC-enabled handheld device 40 held by the driver of the shuttle bus to gain entry to the bus.

Arriving at the Broadway musical venue, the user and date may be admitted to the event when the user taps the handheld device 40 to a ticket turnstile 94 and elects to use two tickets. The user and date may take their seats and enjoy the show. In the middle of the first act, the user may receive a phone call on the handheld device 40; however, rather than interrupting the show with a loud ringtone, the handheld device 40 may have automatically set the ringtone to vibrate, and the user may simply choose to ignore the call. After the show ends, with both unable to get the songs of the Broadway musical out of their heads, the user and date may purchase a live recording from the handheld device 40 on their way out. The recording may be available to download by the time the user and date get home.

Figure 66:
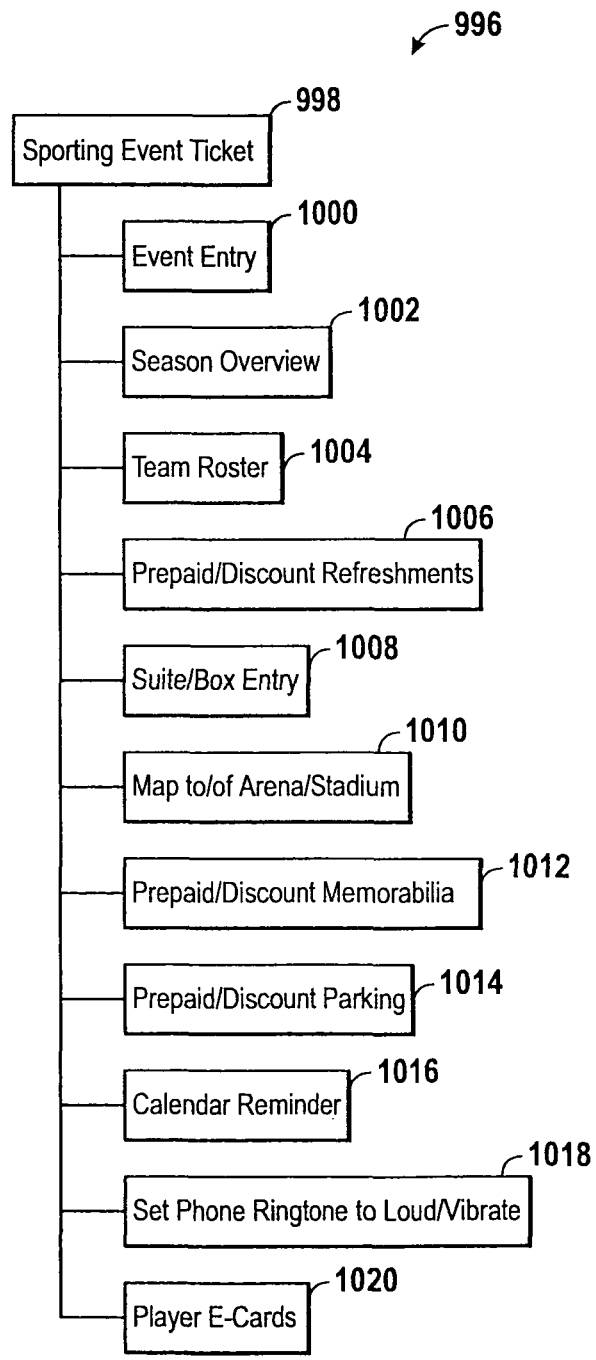
FIG. 66 is a block diagram representing benefits that may be associated with an electronic sporting event ticket.

FIG. 66 illustrates an associated benefits diagram 996 for a sporting event ticket 998. It should be appreciated that the electronic concert ticket 998 may be obtained, stored, and used in any electronic device 10 according to the techniques described above. Moreover, it should be understood that the benefits described in the diagram 996 are intended to be exemplary and not exclusive. Such benefits may include, for example, entry 1000 to the event. The entry 1000 may be obtained using the techniques discussed above. The benefits may further include a season overview 1002, which may represent, for example, links to various sports news reporting regarding both teams associated with the sporting event, as well as press releases released by the teams competing in the sporting event. Similarly, the electronic sporting event ticket 998 may also include as a benefit a released team roster 1004. The team roster 1004 may provide a listing of the players which may appear in the sporting event, as well as the known status of the players as the date of the event approaches. By way of example, the team roster 1004 may be received through the supplemental ticket data as a data file, a hyperlink to a server which may provide up-to-date information, a combination of the above, or a web archive file. The sporting event ticket 998 may also include prepaid or discount refreshments 1006. The prepaid or discount refreshments 1006 may be obtained in the manner described above with reference to FIG. 64.

With continued reference to the benefits diagram 996 of FIG. 66, the electronic sporting event ticket 998 may also include entry to a suite or to a box 1008 as a benefit. Entry to the suite or box may function in a similar manner to entry to the event itself. The user of the electronic device 10 storing the associated electronic sporting event ticket 998 may provide, for example, the ticket data, the authenticated ticket data, or an electronic coupon to the NFC-enabled kiosk 74 or unmanned kiosk 88 to unlock a door to the suite or to the box. Alternatively, an automatic networked lock on the door to the suite or box may allow the user to access the suite or box through the electronic device 10 by receiving such data from the electronic device 10 via an NFC interface 34; the automatic lock may verify over a network communication channel 376 that the user has permission to enter based on the received data and unlock the door. Gaining entry to the suite or box through the automatic lock may thus function largely in the manner described above with regard to using an electronic ticket to gain entry to an event.

As discussed above, the sporting event ticket 998 may also include as a benefit a map to the sporting event venue 1010. Like the map to the venue 964 associated with the electronic concert ticket 948, the map to the sporting event venue 1010 associated with the electronic sporting event ticket 998 may be received by the handheld device 40 in a variety of forms in the supplemental ticket data, such as a web archive file or a hyperlink to an online map, and may be displayed in a web browser, such as Safari®, or a dedicated map application, such as Maps for the Apple iPhone®.

The ticket 998 may include prepaid or discount memorabilia 1012 or prepaid or discount parking 1014. As should be appreciated, the prepaid or discount memorabilia 1012 and prepaid or discount parking 1014 may be accessible to the user in the same manner as the prepaid or discount refreshments 1006.

As noted above, the supplemental ticket data associated with an electronic ticket may include the times for which the event begins and ends. With such information, the electronic device 10, upon receiving the electronic sporting event ticket 974, may also automatically input a calendar reminder 1016 on a calendar application that may run on the electronic device 10. The calendar reminder 1016 may denote the duration of the event and may be displayed when the user searches the calendar on the electronic device 10. In a similar fashion, the supplemental ticket data may indicate to the electronic device 10 that the event may be particularly loud. As such, a handheld device 40 having the electronic ticket 998 may automatically place audio features, such as telephone ringtone, into a loud or vibrate mode 1018 for the expected duration of the event or while the user remains within the GPS coordinates of the venue.

The electronic sporting event ticket 998 may also include a capability to download certain other special benefits such as player e-cards 1020. The supplemental ticket data may include, for example, a hyperlink to a website, a web archive file, or any other data file providing information regarding the players of a team associated with the electronic sporting event ticket 998. Such player e-cards 1020 may function in a manner similar to paper sports player cards, as illustrated by FIGS. 67A-F.

Figures 67A, 67B:
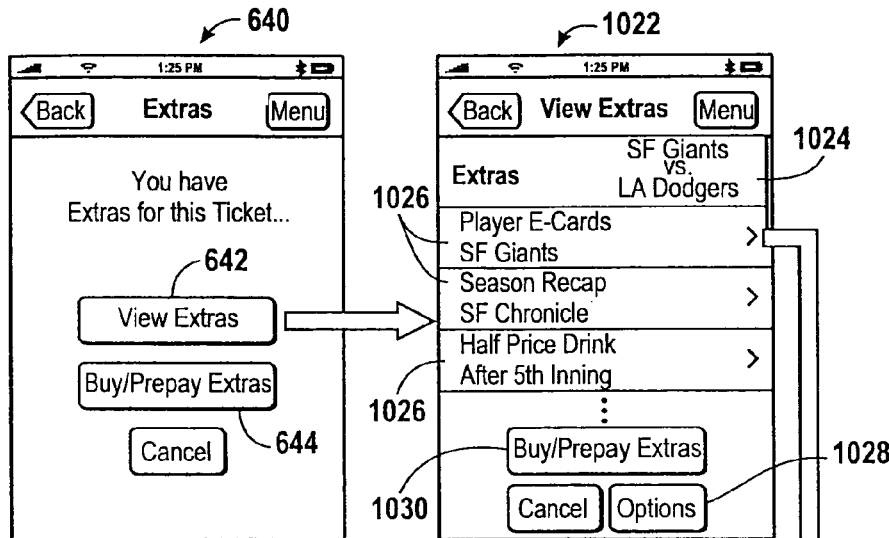

Turning first to FIG. 67A, if a user selects the button 642 of the screen 640 while attending a sporting event associated with the sporting event ticket 998, a screen 1022 may be displayed on the handheld device 40, as illustrated in FIG. 67B. Among other things, the screen 1022 may display the names of the teams 1024 and various list items 1026 that may represent benefits associated with the ticket 998. As shown in FIG. 67B, the list items 1026 may include player e-cards for the San Francisco Giants, a season recap provided by the San Francisco Chronicle, and a coupon to purchase a half-priced drink after the fifth inning. The screen 1022 may also include certain options available upon the selection of a button 1028. Selection of a button 1030 may enable a user to purchase or prepay for other benefits which may be associated with the ticket 998. If the user selects the first list item 1026 of the screen 1022, labeled "Player E-Cards/SF Giants," a screen 1032 shown in FIG. 67C may be displayed on the handheld device 40. The screen 1032 of FIG. 67C may list the players from one of the competing teams in the form of various player e-cards, shown as a series of list items 1034.

Figures 67C, 67D:
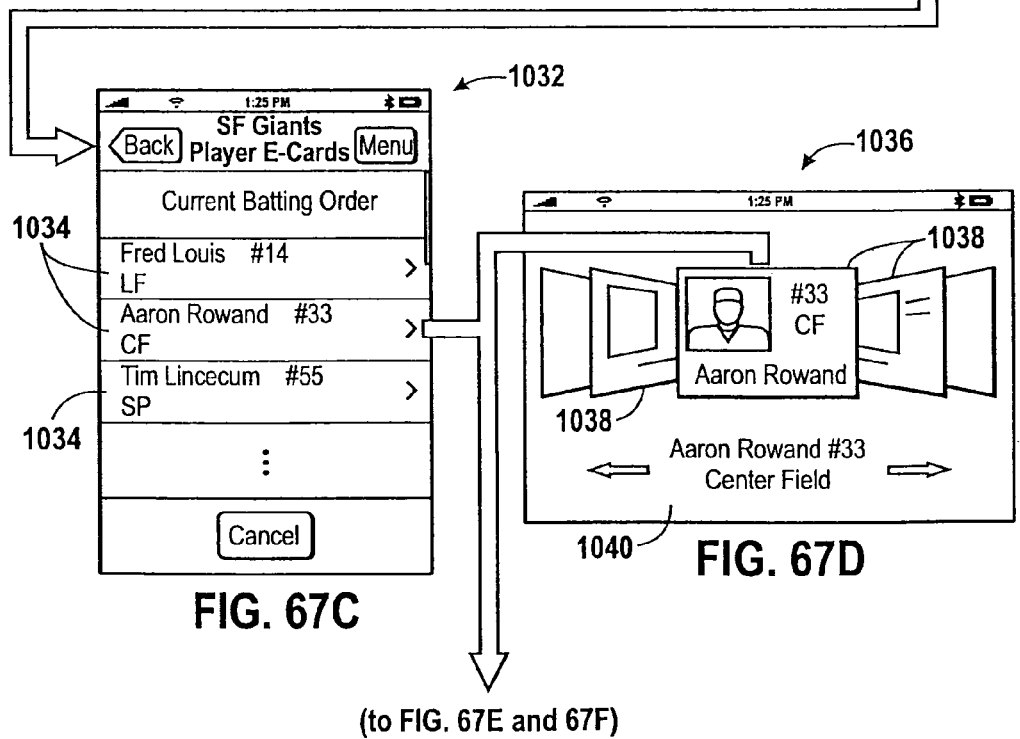

FIG. 67D illustrates a visually descriptive screen 1036 displaying the list items 1034 of player e-cards. The screen 1036 may be displayed when a user turns the handheld device 40 sideways, causing the accelerometers 38 to register a change in device orientation. The screen 1036 may illustrate the list items 1034 in a format such as the Cover Flow format by Apple Inc. The player e-cards may be displayed visually with a series of descriptive images 1038 and the name of a presently displayed player may appear in text 1040. By dragging a finger across the screen, a user may easily flip between player e-cards. Turning the handheld device 40 upright may navigate the user back to the screen 1032 of FIG. 67C.

Turning to FIG. 67E, a screen 1042 may represent an exemplary e-card for one player of a sports team. In the example of FIG. 67E, representing a player e-card for centerfielder Aaron Rowand, the screen 1042 may include, for example, the player's name, number and position in text 1044 and a digital photo 1046. Player statistics 1048 may be similarly displayed, along with a button 1050, labeled "Bio," that may lead to a short biography about the player.

A screen 1052, shown in FIG. 67F, may represent the exemplary player e-card described above when the handheld device 40 is tilted sideways, causing the accelerometers 38 to register a change in device orientation. The screen 1052 may similarly display the player's name, number and position in text 1044, though the digital photo 1046 may be enlarged or restyled. The player statistics 1048 and the button 1050 may be similarly displayed. By dragging a finger across the screen, a user may easily flip between player e-cards. Turning the handheld device 40 upright may navigate the user back to the screen 1042 of FIG. 67E.

The following example may illustrate the use of the benefits disclosed in the benefit diagram 996 of FIG. 66. To obtain the benefits of the electronic sporting event ticket 974, a user may first purchase several paper tickets 146, for example, to a baseball game. When the paper tickets 146 arrive in the mail, the user may scan the paper tickets 146 using the camera 36 of the user's handheld device 40 to store the electronic sporting event ticket 998 on the handheld device 40. Based on user preferences, the handheld device 40 may automatically create a calendar reminder 1016, and a number of the benefits that may be associated with the electronic sporting event ticket 998 may become available to the user.

Prior to attending the baseball game, the user may review what to expect with a season overview 1002 and a team roster 1004 on the handheld device 40. Expecting to be thirsty and wanting a souvenir, the user may prepay for refreshments 1006 and team memorabilia 1012. Additionally, the user may prepay for parking 968 to take advantage of a prepayment discount offered by the stadium. When the day of the baseball game arrives, the calendar reminder 1016 on the handheld device 40 may alert the user. The user may drive to the game assisted with a map to the stadium 1010, and because the user has prepaid for parking, the handheld device 40 may display an electronic coupon indicating the user has prepaid for parking 1014 when the user arrives to the venue parking lot based on its GPS location.

The user may use the handheld device 40 to gain entry 1000 to the baseball game. The handheld device 40 of the user may have been storing several tickets for friends, one of whom may be late. Rather than wait outside the stadium, the user may email the electronic sporting event ticket 998 to the tardy friend, who may enter with his own electronic device 10.

Once in attendance, the user may redeem the prepaid refreshments 1006 and team memorabilia 1012 in the same manner as the prepaid parking. The user may have bought tickets to be in a suite or box located in the stadium. Armed with a map 1010 of the stadium, the user may locate the suite or box and, upon arrival, may tap the lock with the handheld device 40. The door to suite or box may become unlocked, and the user may gain entry 1008. If the user receives any phone calls on the handheld device 40 during the game, the ringtone will not be too quiet to hear; indeed, based on user preferences, the handheld device 40 may set the ringtone to loud or to vibrate while the game is being played. Finally, each of the electronic tickets 998 stored on the handheld device 40 may have included one or more player e-cards 1020. The user may view and/or trade the player e-cards 1020 at slow points in the game.

Figure 68:
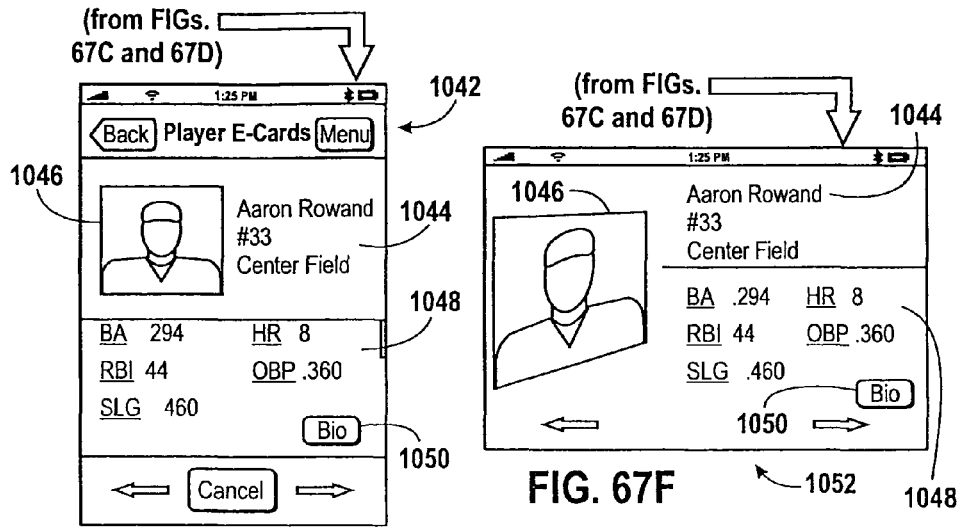
FIG. 68 is a block diagram representing benefits that may be associated with an electronic school event ticket.

It should be appreciated that the use of the electronic tickets in an electronic device 10 may extend to non-commercial ventures as well as commercial ventures. One such non-commercial venture may be exemplified in a benefit diagram 1054, as displayed in FIG. 68, representing various benefits that may be associated with an electronic school event ticket 1056. It should be appreciated that the electronic school event ticket 1056 may be obtained, stored, and used in any electronic device 10 according to the techniques described above. Moreover, it should be understood that the benefits described in the diagram 1054 are intended to be exemplary and not exclusive.

Among the benefits that may be associated with the electronic school event ticket 1056 may include, for example, entry 1057 to the event, a live recording 1058 of the event, or prepaid or discount refreshments 1059. The entry 1057, live recording 1058, and the prepaid or discount refreshments 1059 may be obtained using the techniques discussed above. Because many school events, such as concerts and sporting events, may be recorded on video, a video recording of the event 1060 may also be associated with the electronic school event ticket 1056. For example, a handheld device 40 having the electronic school event ticket 1056 may enable a user to purchase or reserve an electronic or hard copy of the video recording 1060 of such an event. To do so, the handheld device 40 may receive, for example, via the supplemental ticket data a hyperlink to a website, a data file, a web archive file, or an email address. With such data, the user may provide those responsible for recording the event an indication that the user would like a copy of the video recording 1060. Thus, the video recording 1060 may be made available to a user in largely the same manner as the live recording 1056.

Prior to or upon arrival to the school event, the electronic ticket 1056 may include an electronic program 1062. The electronic program 990 may be received in the supplemental ticket data, for example, as a data file, a web archive file, or a hyperlink to a website. It should be appreciated that such information may be input by the sponsors of the event into the data file or onto the website prior to its distribution to the users. The electronic school event ticket 1056 may also include as a benefit a map to the school or venue 1064. Like the map to the venue 964 associated with the electronic concert ticket 948, the map to the school or venue 1064 associated with the electronic school event ticket 1056 may be received by the handheld device 40 in a variety of forms in the supplemental ticket data, such as a web archive file or a hyperlink to an online map, and may be displayed in a web browser, such as Safari®, or a dedicated map application, such as Maps for the Apple iPhone®.

As noted above, the supplemental ticket data associated with an electronic ticket may include the times for which the event begins and ends. With such information, the electronic device 10, upon receiving the electronic school event ticket 1056, may also automatically input a calendar reminder 1066 on a calendar application that may run on the electronic device 10. The calendar reminder 1066 may denote the duration of the event and may be displayed when the user searches the calendar on the electronic device 10. In a similar fashion, the supplemental ticket data may indicate to the electronic device 10 that the event may be particularly loud or may demand silence. As such, a handheld device 40 having the electronic ticket 998 may automatically place audio features, such as telephone ringtone, into a loud, silent, or vibrate mode 1018 for the expected duration of the event or while the user remains within the GPS coordinates of the venue.

The following example may illustrate the use of the benefits disclosed in the benefit diagram 1054 of FIG. 68. Parents of high school students in band may receive electronic school event tickets 1056 to attend a band concert via email, which may be received on a computer 62 or a handheld device 40. Some parents may transfer the tickets 1056 to a handheld device 40, while others may print the tickets 1056 to obtain paper tickets 108 or 146. Based on user preferences, the computers 62 or handheld devices 40 may automatically create calendar reminders 1066, and a number of the benefits that may be associated with the electronic school event ticket 1056 may become available to the parents.

Prior to attending the band concert, some parents may be scheduled to prepare an audio recording 1058 or video recording 1060 of the concert. Others may be scheduled to bring coffee or cookies for sale during intermission as refreshments 1059. Those who plan to attend the concert may prepay for the refreshments 1059 prior to attending.

On the day of the band concert, the calendar reminders 1066 may remind the parents of the concert. If the concert is scheduled to take place at an unfamiliar location, parents having the electronic ticket 1056 stored on their handheld devices 40 may use the map 1064 to find the concert venue.

Upon arrival, the parents having the electronic ticket 1056 stored on their handheld devices 40 may gain entry to the concert by tapping them to other handheld devices 40 that may perform the same function as the ticket turnstile 94. Parents with the printed paper tickets 108 or 146 may scan the tickets at the other handheld devices 40 performing the same function as the ticket turnstile 94 to gain entry to the concert.

While sitting through the event, some parents may receive a phone call on their handheld devices 40; however, rather than interrupting the concert with a loud ringtone, the handheld devices 40 may have automatically set the ringtone to vibrate, and the parents may simply choose to ignore or leave the venue to take the call. At intermission, parents who prepaid for the refreshments 1059 may pick them up by providing an electronic coupon from their handheld device 40 to other electronic devices 10 that may perform the same function the kiosk 74. Finally, parents may choose to reserve a copy of the live recording 1058 or video recording 1060. The parents responsible for the recordings 1058 and 1060 may be sent a list of all such parents and may prepare the appropriate number of copies of the recordings 1058 and 1060.

Figure 69:
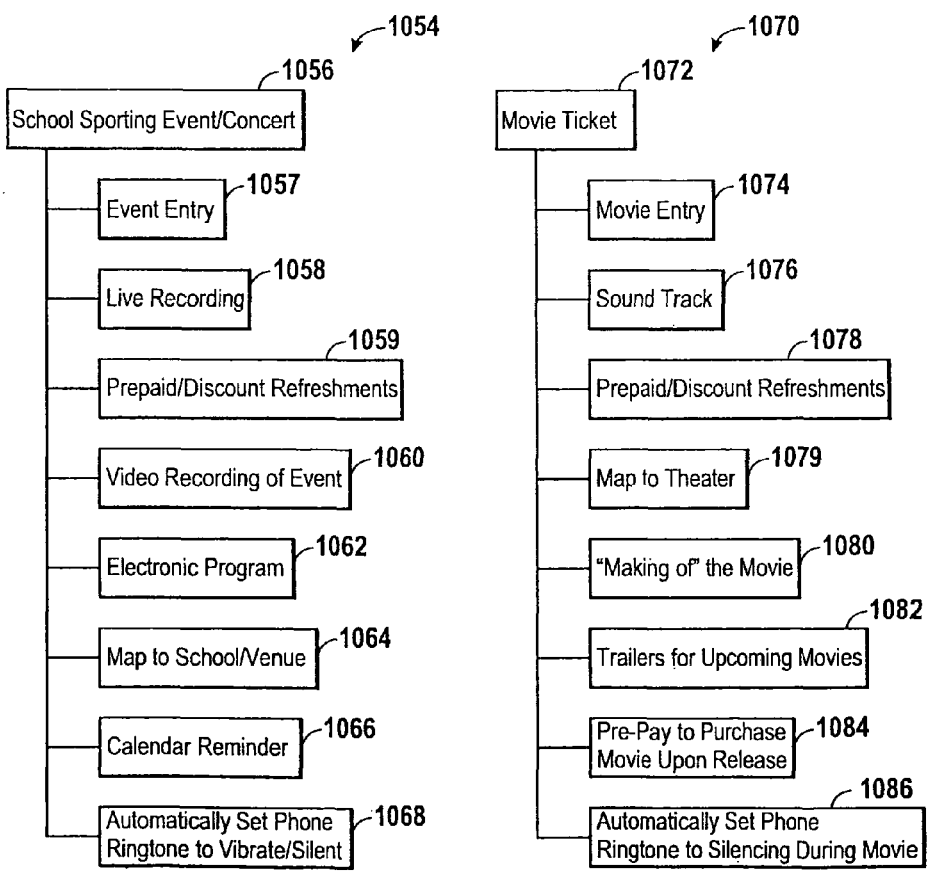
FIG. 69 is a block diagram representing benefits that may be associated with an electronic movie ticket.

Turning to FIG. 69, a benefit diagram 1070 describes various benefits which may be associated with an electronic movie ticket 1072. It should be appreciated that the electronic movie ticket 1072 may be obtained, stored, and used in any electronic device 10 according to the techniques described above. Moreover, it should be understood that the benefits described in the diagram 1070 are intended to be exemplary and not exclusive. As should be appreciated, one benefit which may be associated with the movie ticket 1072 is entry to a movie. The entry 1074 may take place using the techniques described above.

The electronic movie ticket 1072 may also include as a benefit the option to purchase the movie soundtrack 1076. The movie soundtrack 1076 may be obtained in the same manner as the live recording 954 described above with reference to FIG. 64. The electronic device 10 may further alert the user of the ability to purchase the soundtrack 1076 once the movie has ended. Prepaid or discount refreshments 1078 and various exclusive content, such as a "Making Of" video 1080 or upcoming movie trailers 1082, may also be associated with the electronic movie ticket 1072. The prepaid or discount refreshments 1078 and the various exclusive content may be obtained using the techniques for similar benefits associated with other electronic tickets described above.

Prior to or after the movie to which the electronic ticket 1072 pertains, the electronic device 10 may present a user with the option to prepay to purchase the movie upon its release 1084 to the general public. For example, following the end of the movie, the user may be prompted to pre-purchase the movie from iTunes® or from another on-line digital content distribution service; to encourage users to prepay for the movie, a discount may be offered prior to its release.

As noted above, the supplemental ticket data associated with an electronic ticket may include the times for which the event begins and ends and/or may indicate to the electronic device 10 that the event may be particularly loud. As such, a handheld device 40 having the electronic movie ticket 1072 may automatically place audio features, such as telephone ringtone, into a silent or vibrate mode 1086 for the expected duration of the event or while the user remains within the GPS coordinates of the movie theater.

The following example may illustrate the use of the benefits disclosed in the benefit diagram 1070 of FIG. 69. To obtain an electronic movie ticket 1072, a user of a handheld device 40 may purchase an electronic movie ticket 1072 from an online ticket vendor from the handheld device 40. After purchasing the ticket 1072, the user may view the trailer for the purchased movie or related movies 1082 or may watch a "making of" video 1080 on the handheld device 40. Prior to attending the movie, the user may prepay for refreshments 1078, and when the start time of the movie approaches, the user may get driving directions to the movie theater based on a map 1079.

Upon arrival, the user may gain entry to the movie theater by scanning a matrix code displayed on the handheld device 40 at a kiosk 74. The user may retrieve the prepaid refreshments 1078 from a refreshment stand in the same way. While sitting and watching the movie, the user may receive a phone call on the handheld device 40; however, rather than interrupting the movie with a loud ringtone, the handheld device 40 may have automatically set the ringtone to vibrate or silent 1086 when the user entered the movie theater, and the user may simply choose to ignore or leave the theater to take the call. When the movie ends, the handheld device 40 may vibrate to alert the user to other items related to the movie that the user may purchase. With discounts for imminent purchase, the user may feel compelled to purchase the soundtrack 1076 or reserve a copy of the movie 1084 from the handheld device 40 while the movie credits roll.

Figure 70:
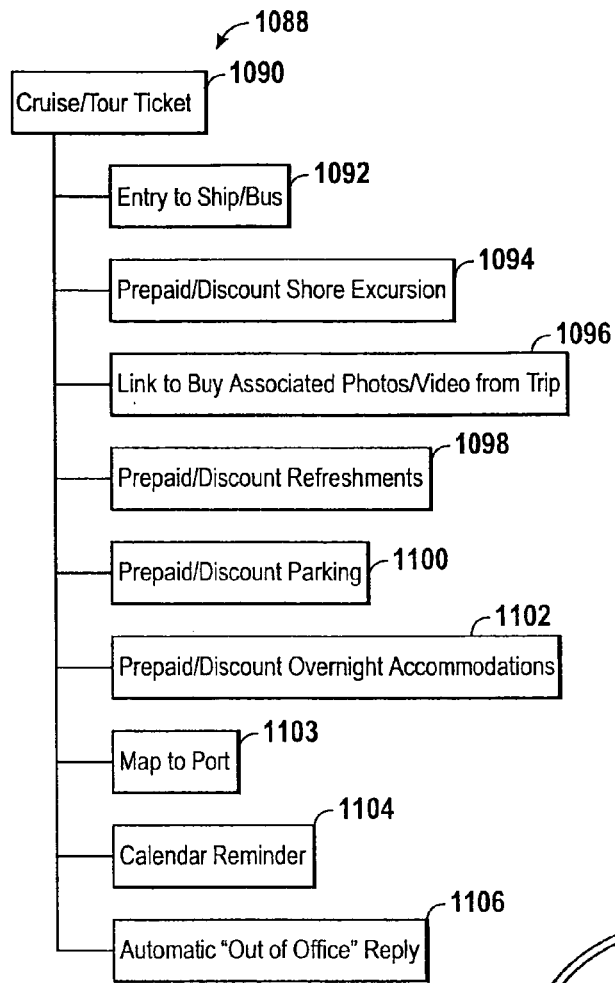
FIG. 70 is a block diagram representing benefits that may be associated with an electronic cruise or tour ticket.

As should be appreciated, an electronic ticket may be used in a variety of settings. Turning to FIG. 70, a benefit diagram 1088 may represent various benefits that may be associated with an electronic cruise or tour ticket 1090. It should be appreciated that the electronic cruise or tour ticket 1090 may be obtained, stored, and used in any electronic device 10 according to the techniques described above. Moreover, it should be understood that the benefits described in the diagram 1088 are intended to be exemplary and not exclusive. As should be appreciated, one benefit which may be associated with the cruise or tour ticket 1090 is entry to a cruise or tour. The entry 1092 may take place using the techniques described above.

As noted by the diagram 1088, the cruise or tour ticket 1090 may also enable a user of an electronic device 10 holding the cruise or tour ticket 1090, to obtain prepaid or discount shore excursions 1094, photos or videos from the cruise or tour 1096, prepaid or discount refreshments 1098, prepaid or discount parking 1100, and/or prepaid or discount overnight accommodations 1102. Such benefits may be accessible using the various techniques described above. By way of example, upon receiving the electronic cruise or tour ticket 1090, the user may be able to view various shore excursions that may be available and may be able to purchase such excursions from the electronic device 10. Further, as should be appreciated, the photos or video 1096 may be recorded by employees of the cruise or the tour company and made available when the cruise or tour ends. The electronic device 10 may include in the supplemental ticket data associated therewith a link to purchase or otherwise obtain the photos or videos from the private website.

As noted above, the supplemental ticket data associated with an electronic ticket may include the times for which the event begins and ends. With such information, the electronic device 10, upon receiving the electronic cruise or tour ticket 1090, may also automatically input a calendar reminder 1104 on a calendar application that may run on the electronic device 10. The calendar reminder 1104 may denote the duration of the event and may be displayed when the user searches the calendar on the electronic device 10. In a similar fashion, the supplemental ticket data may indicate to the electronic device 10 that the event may last a particularly long time. As such, a handheld device 40 having the electronic ticket 998 may automatically instate an "out of office" reply to all incoming email or phone calls, indicating that the user is currently unavailable for the expected duration of the event or while the user remains within certain GPS coordinates delineating where the cruise or tour is scheduled to visit.

The following example may illustrate the use of the benefits disclosed in the benefit diagram 1088 of FIG. 70. To obtain an electronic cruise or tour ticket 1090, a user of a handheld device 40 may order a pair of NFC-enabled tickets 106 for a cruise vacation. When the NFC-enabled tickets 106 are received in the mail, the user may tap the tickets 106 to the handheld device 40 to store two electronic cruise tickets 1090 on the handheld device 40. Based on user preferences, the handheld device 40 may automatically create a calendar reminder 1104, and a number of the benefits that may be associated with the electronic cruise ticket 1090 may become available to the user.

Prior to leaving for the cruise, the user may select and prepay for refreshments 1098, parking 1100, overnight accommodations 1102 near the cruise ship port, and various shore excursions 1094 that may be available at ports of call. When the time of the cruise approaches, the calendar reminder 1104 on the handheld device 40 may remind the user. The user may drive to overnight accommodations or to the port assisted with a map 1103, and because the user has prepaid for parking, the handheld device 40 may display an electronic coupon indicating the user has prepaid for parking 1100 when the user arrives. Alternatively, the prepaid parking may be redeemed by tapping the NFC-enabled cruise ticket 106 to a kiosk 74 or unmanned kiosk 88, which may verify that parking has been prepaid by contacting the web service 208.

The user may use the NFC-enabled ticket 106 or the electronic ticket 1090 stored on the handheld device 40 to gain entry 1092 to the cruise. Meanwhile, though the user may have forgotten to set an "out-of-office" reply before going on vacation, the handheld device 40 may have set an "out-of-office" reply 1106 automatically when the user entered the ship, based on user preferences. Once on the ship, the user may redeem the prepaid refreshments 1098 and, as ports of call are reached, the prepaid shore excursions 1094 in the same manner as the prepaid parking. Finally, cruise photographers and videographers may be taking photos cruise guests during the trip. The user may choose to purchase such photos or videos 1096 from the handheld device 40.

Figure 71:
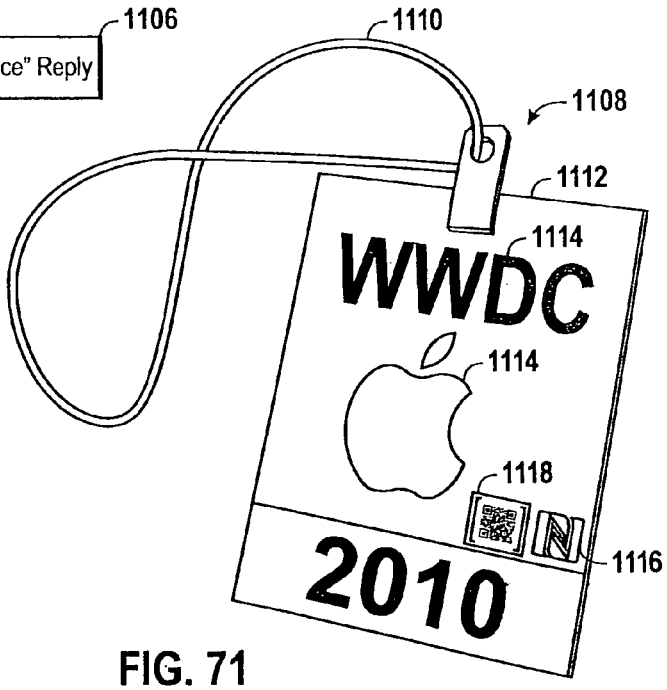
FIG. 71 is a schematic of a conference ticket configured to provide an electronic ticket.

FIGS. 71 through 74 may particularly address the use of an electronic ticket that may be associated with a conference event. Turning first to FIG. 71, a conference ticket 1108 may be associated with a conference, such as the Worldwide Developer's Conference (WWDC). The conference ticket 1108 may include a neck strap 1110 and a card 1112. The card 1112 may display easily identifiable text and imagery 1114 to enable conference attendees to easily identify each other.

The conference ticket 1108 may include, for example, an RFID tag 1116 or a matrix code or barcode 1118, which may store or encode ticket data associated with the conference ticket 1108. The data stored in the RFID tag 1116 or the matrix code or barcode 1118 may represent the same data as associated with the tickets 106, 108, and 146 described above with reference to FIGS. 9-11.

Figure 72:
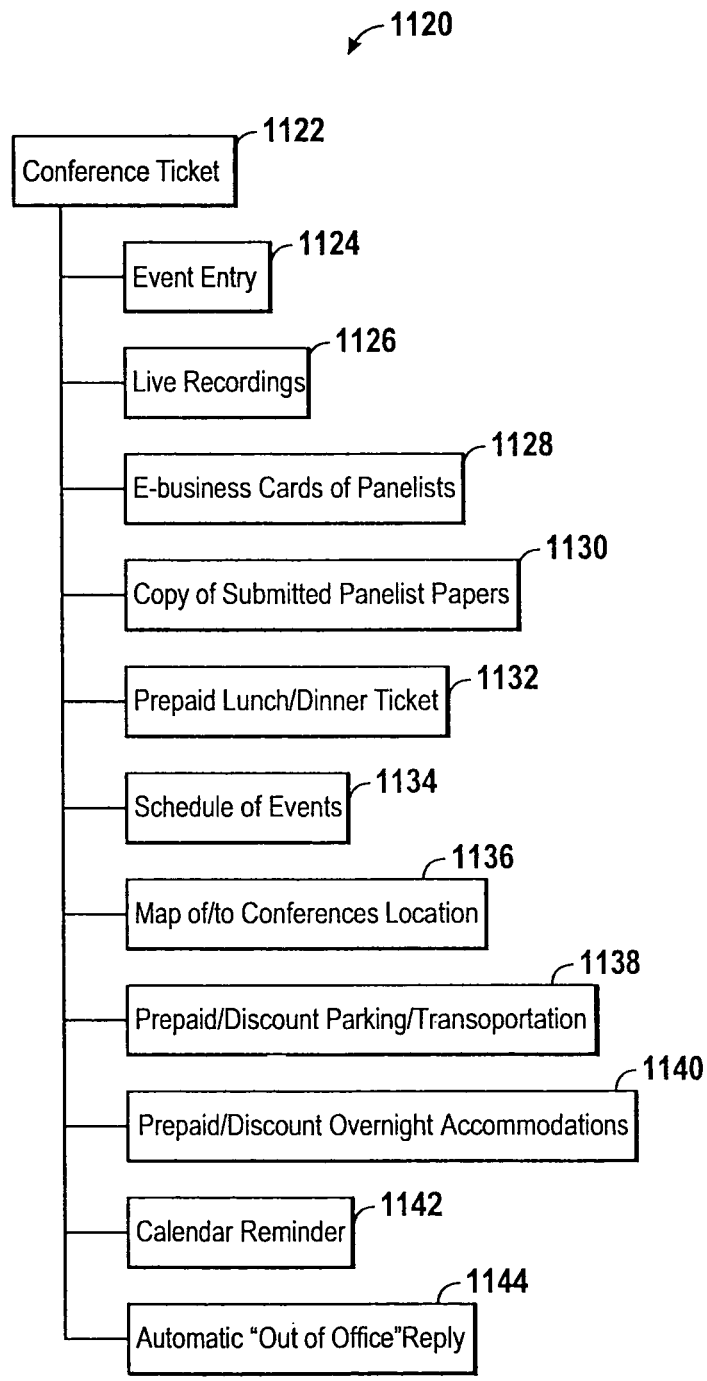
FIG. 72 is a block diagram representing benefits that may be associated with an electronic conference ticket.

FIG. 72 represents a diagram 1120 illustrating various benefits which may be associated with an electronic conference ticket 1122, such as may be associated with the conference ticket 1108. It should be appreciated that the electronic conference ticket 1122 may be obtained, stored, and used in any electronic device 10 according to the techniques described above. Moreover, it should be appreciated that the benefits associated with the electronic conference ticket 1122 are intended to be exemplary only and are not intended to be exclusive. Such benefits may include, for example, entry 1124 to the conference. The entry 1124 may be obtained using the techniques discussed above. In a similar manner, various sessions that may take place during the conference event may be recorded. A live recording 1126 may be obtained from the electronic device 10 or from a kiosk 74 or unmanned kiosk 88 located at the conference in the manner described above with reference to FIG. 64.

The electronic conference ticket 1122 may further include electronic business cards of panelists that may speak at the conference event. The electronic business cards 1128 may be obtained in the form of a downloadable document or a link from a website. Similarly, submitted panelist papers 1130 may also be associated as a benefit with the electronic conference ticket 1122. The papers 1130 may similarly be obtained in the form of downloadable documents or links from one or more websites. Certain events taking place at the conference may require prepayment, for such cases as for certain lunch or dinner panels or speeches. As such, discount or prepaid lunch or dinner 1132 may be associated with the electronic ticket 1122. By way of example, a user may prepay for a special lunch panel using the electronic device 10 having the electronic ticket 1122 in the same manner as other prepaid or discount benefits described above.

The electronic conference ticket 1122 may also include a schedule of events 1134. The schedule of events 1134 may be obtained as a data file transmitted among the supplemental ticket data or may be found from a link included in the supplemental ticket data. The electronic device 10 may place the schedule of events in a calendar program which may run on the electronic device 10. The user of the electronic device 10 may select which of the scheduled events to attend, and only the selected scheduled events may be loaded onto the calendar. The schedule of events 1134 may be described further below with reference to FIGS. 73A-D.

Additionally, the map of or to the conference location 1136 may be included as a benefit associated with the electronic conference ticket 1122. Like the map to the venue 964 associated with the electronic concert ticket 948, the map of or to the conference location 1136 associated with the electronic conference ticket 1122 may be received by the handheld device 40 in a variety of forms in the supplemental ticket data, such as a web archive file or a hyperlink to an online map, and may be displayed in a web browser, such as Safari®, or a dedicated map application, such as Maps for the Apple iPhone®. The electronic conference ticket 1122 may further include prepaid or discount parking and/or transportation 1138 or prepaid or discount overnight accommodations 1140. As should be appreciated, the prepaid or discount parking and/or transportation 1138 or prepaid or discount overnight accommodations 1140 may be accessible to the user in the manner described above with reference to FIG. 70.

As noted above, the supplemental ticket data associated with an electronic ticket may include the times for which the event begins and ends. With such information, the electronic device 10, upon receiving the electronic conference ticket 1122, may also automatically input a calendar reminder 1142 on a calendar application that may run on the electronic device 10. The calendar reminder 1142 may denote the duration of the event and may be displayed when the user searches the calendar on the electronic device 10. In a similar fashion, the supplemental ticket data may indicate to the electronic device 10 that the event may last a particularly long time. As such, a handheld device 40 having the electronic ticket 1122 may automatically instate an "out of office" reply to all incoming email or phone calls, indicating that the user is currently unavailable for the expected duration of the event or while the user remains within certain GPS coordinates delineating where the conference is scheduled.

Figures 73A, 73B:
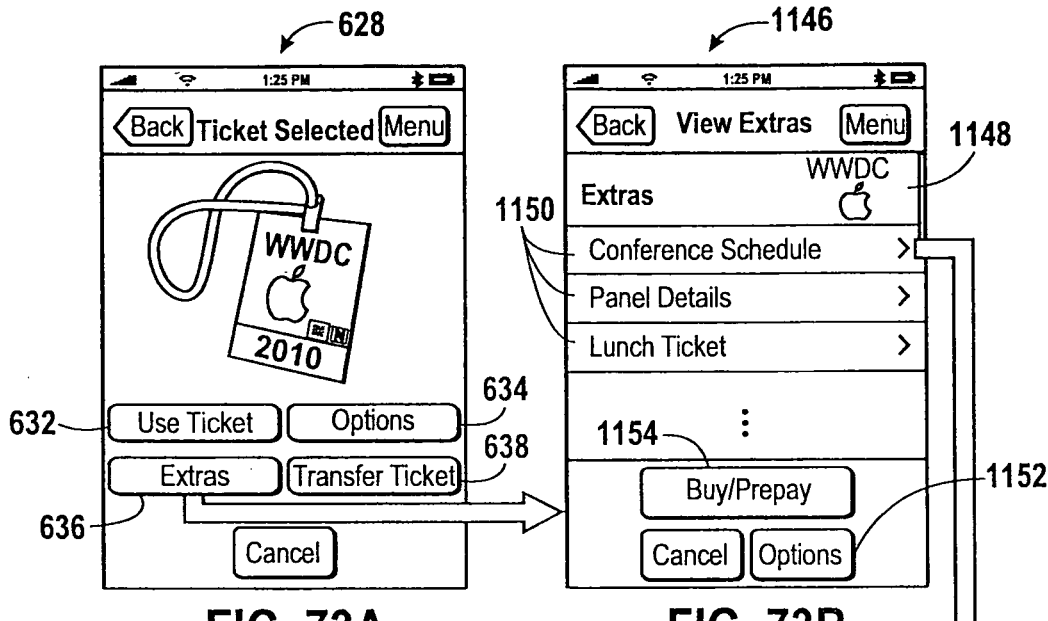
FIGS. 73A-D are schematics of screens that may be displayed on the electronic device of FIG.1 when conference schedule benefits are accessed.

FIGS. 73-74 illustrate certain benefits of the benefit diagram 1120 that may be associated with the electronic conference ticket 1122. Turning first to FIG. 73A, a screen 628 may appear after the electronic conference ticket 1122 is selected from among a list of electronic tickets stored in a ticket management application on the electronic device 10. A user may select the button 636, labeled "Extras," to display a screen 1146, as illustrated in FIG. 73B. The screen 1146 may include a title of the conference 1148 and a series of list items 1150 representing various benefits associated with the electronic conference ticket 1122. A button 1152, labeled "Options," may allow a user to select certain user preferences associated with benefits associated with the electronic conference ticket 1122, as described above. Additionally, certain benefits may be available for prepayment (e.g., a conference lunch or dinner 1132) as indicated by a button 1154, labeled "Buy/Prepay." As noted on the screen 1146 of FIG. 73B, the list items 1150 of benefits may include a link to the conference schedule, details regarding each panel, or complimentary or previously-purchased meal tickets.

Figures 73C, 73D:
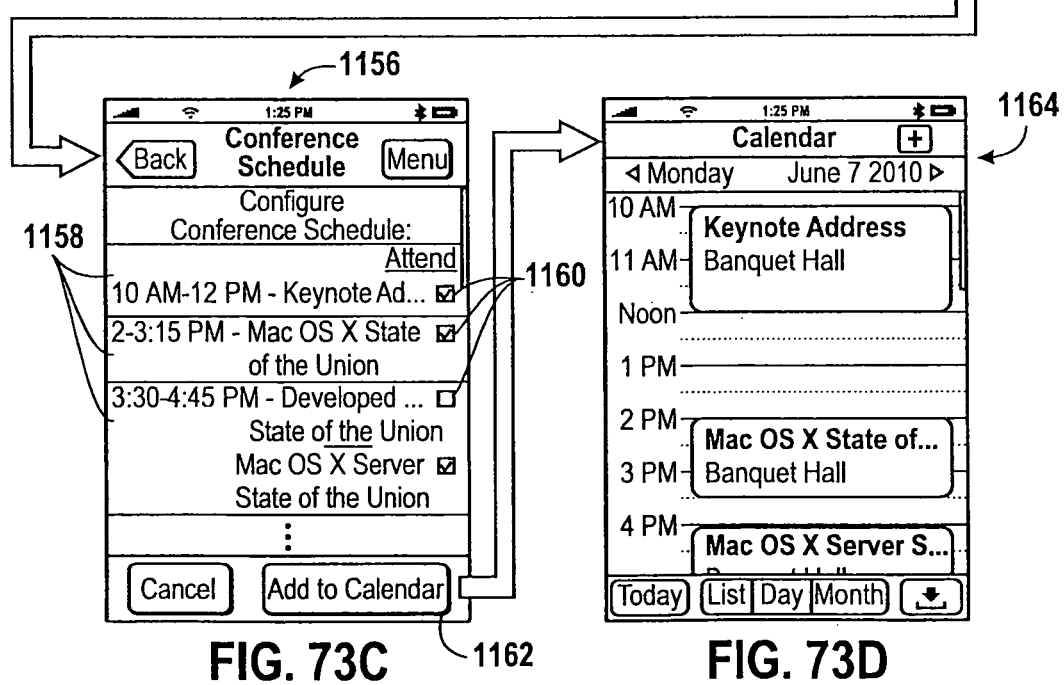

FIG. 73C illustrates a screen 1156 for automatically adding the portion of the schedule of the conference 1134 onto a calendar on the electronic device 10. The screen 1156 may be displayed on the electronic device 10 if the first list item 1150, labeled "Conference Schedule," on the screen 1146 is selected. The schedule of the conference may be displayed on the screen 1156 as a series of list items 1158. Associated with each list item 1158 may be check boxes or radio buttons 1160. As indicated on the screen 1156, panels may be selected based on whether or not a corresponding check box or radio button 1160 is selected. By selecting a check box or a radio button 1160, a user may select the conference events that the user plans to attend. When the conference events have been selected, the events may be added to a calendar application on the electronic device 10 by selecting a button 1162, labeled "Add to Calendar." A screen 1164, shown in FIG. 73D, may illustrate that the selected conference events may appear as items within the calendar application on the electronic device 10.

Turning next to FIG. 74A, if a user selects the second list item 1150 of the screen 1146, labeled "Panel Details," a screen 1166 may be displayed. As illustrated in FIG. 74B, the screen 1166 may enable a user to select between viewing details relating to a current panel or to all panels of the conference event. As such, the screen 1166 may include a button 1168, labeled "Current Panel," and a button 1170, labeled "See All Panels."

If a user selects the button 1168 labeled "Current Panel," the electronic device 10 may display a screen 1172, as illustrated by FIG. 74C. The electronic device 10 may determine which conference is currently underway based on the current time compared to the conference schedule and/or the location of the user as determined by the location sensing circuitry 22. The screen 1172 may include a series of user-selectable buttons 1174-1178. By way of example, the button 1174 may allow a user to view biographical information about panelists, the button 1176 may allow a user to obtain or view a copy of the presentation made by the panel, and the button 1178 may allow a user to obtain or view a sample of code discussed in the panel.

Alternatively, a user may select the button 1170 of the screen 1166, labeled "See All Panels." The electronic device 10 may thereafter display a screen 1180, as illustrated by FIG. 74D, which may include a series of list items 1122 representing all of the panels of the conference. By selecting from among the list items 1182, a user may obtain information relating to each panel from a screen such as the screen 1172 of FIG. 74C.

The following example may illustrate the use of the benefits disclosed in the benefit diagram 1120 of FIG. 72. To obtain an electronic conference ticket 1122, a user of a handheld device 40 may register for a conference online. When an NFC-enabled conference ticket 1108 is received in the mail, the user may tap the ticket 1108 to the handheld device 40 to store the electronic conference ticket 1122 on the handheld device 40. Based on user preferences, the handheld device 40 may automatically create a calendar reminder 1142, and a number of the benefits that may be associated with the electronic conference ticket 1122 may become available to the user.

Prior to the conference, the user may select from among the various panels, presentations, and meals that may be scheduled to take place in the conference schedule 1134. The user may prepay, taking advantage of a discount, for lunch or dinner tickets 1132, parking 1138, and overnight accommodations 1140. When the time of the conference approaches, the calendar reminder 1142 on the handheld device 40 may remind the user. The user may drive to overnight accommodations with a map 1136, and because the user has prepaid for parking, the handheld device 40 may display an electronic coupon indicating the user has prepaid for parking 1138 when the user arrives. Alternatively, the prepaid parking may be redeemed by tapping the NFC-enabled conference ticket 1108 to a kiosk 74 or unmanned kiosk 88, which may verify that parking has been prepaid by contacting the web service 208.

The user may use the NFC-enabled conference ticket 1108 or the electronic ticket 1122 stored on the handheld device 40 to gain entry 1124 to the conference. Meanwhile, though the user may have forgotten to set an "out-of-office" reply before arriving to the conference, the handheld device 40 may set an "out-of-office" reply 1144 automatically when the user begins attending the conference, based on user preferences. At the conference, the user may redeem the prepaid meals 1132 as they occur. Moreover, if a panel presentation is especially interesting, the user may obtain a live recording 1126 of the presentation, electronic business cards of panelists 1128, and/or copies of or hyperlinks to submitted panelist papers or sample code 1130.

Figure 75:
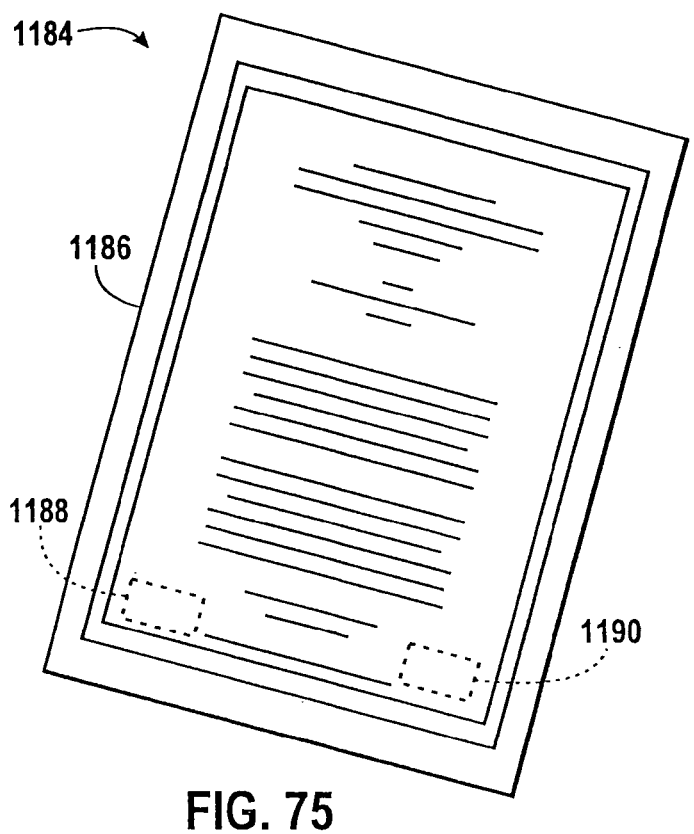
FIG. 75 is a schematic of a wedding invitation configured to provide an electronic ticket.

FIG. 75-82 may represent embodiments for using the techniques described above for a wedding event. Turning first to FIG. 75, a wedding invitation 1184 may be used to store ticket data associated with a wedding. The wedding invitation 1184 may be constructed of paper 1186 and may include various printed text. Embedded in or printed on the paper may be an RFID tag 1188; additionally, a barcode or matrix code 1190 may be printed discreetly on the paper 1186. Stored on the RFID tag 1188 or encoded in the barcode or matrix code 1190 may be ticket data pertaining to the wedding event. The ticket data may enable the user of an electronic device 10 to obtain and store an electronic wedding invitation or program, which may function in the manner of the electronic tickets described above.

Figure 76:
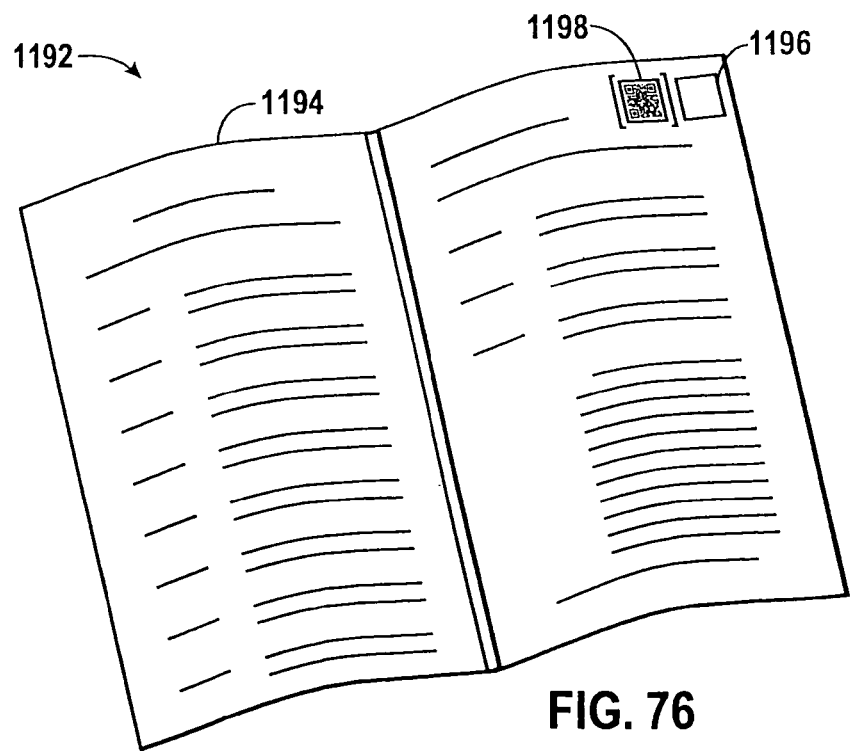
FIG. 76 is a wedding program configured to provide an electronic ticket.

FIG. 76 may represent an alternative embodiment involving a wedding program 1192. The wedding program 1192 may be constructed of paper 1194. Additionally, embedded in the paper 1194 may be an RFID tag 1196, or printed on the paper may be a barcode or matrix code 1198. In the manner described above, stored on the RFID tag 1196 or encoded on the barcode or matrix code 1198 may be ticket data associated with an electronic wedding invitation program.

Figure 77:
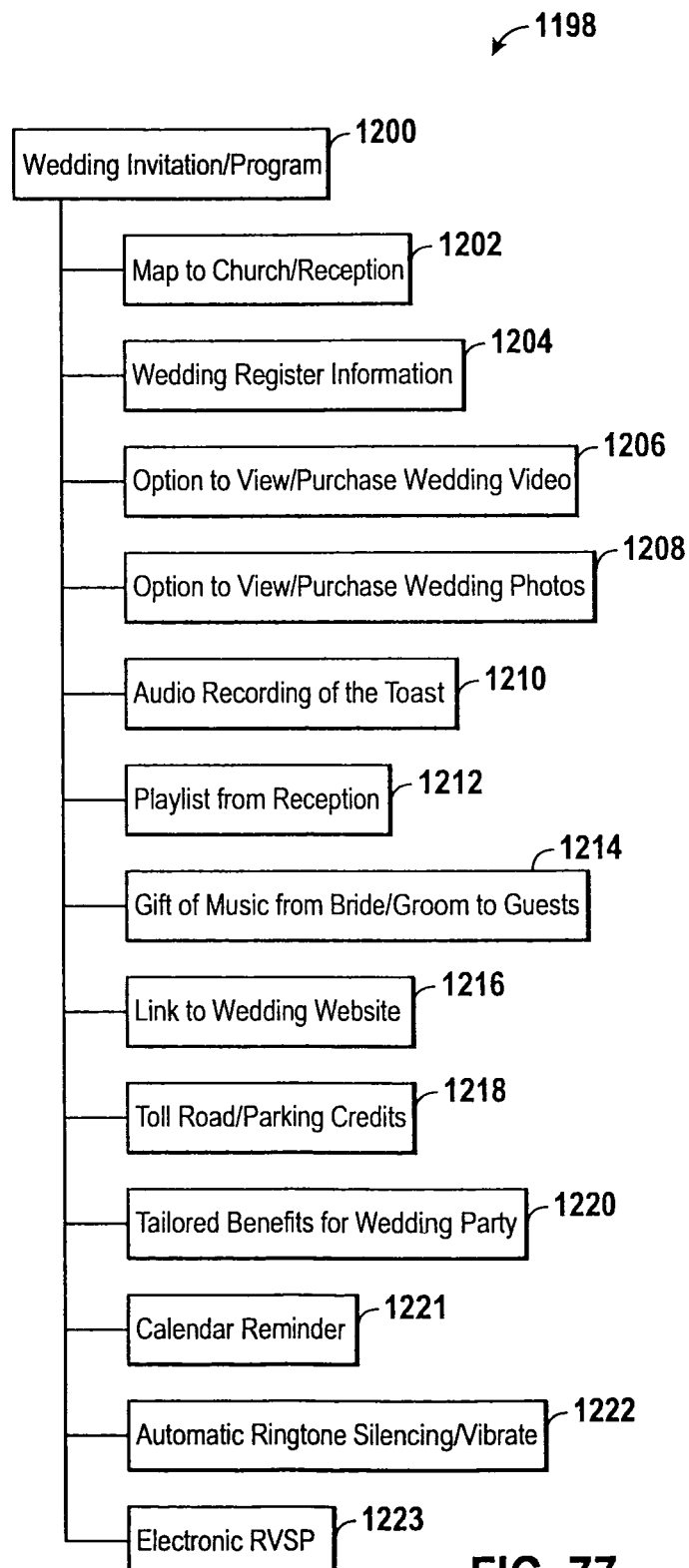
FIG. 77 is a block diagram representing benefits that may be associated with an electronic wedding invitation or program.

Turning to FIG. 77, a benefit diagram 1198 may describe various benefits that may be associated with an electronic wedding invitation or program 1200. The electronic wedding invitation or program 1200 may represent ticket data received from the wedding invitation 1184 or the wedding program 1192 and the associated supplemental and/or authenticated ticket data that may be associated therewith. It should be appreciated that the electronic wedding invitation or program 1200 may be obtained, stored, and used in any electronic device 10 according to the techniques described above relating to obtaining, storing, and using an electronic ticket. Moreover, it should be appreciated that the benefits associated with the electronic wedding invitation or program 1200 are intended to be exemplary only and are not intended to be exclusive.

Among other things, the electronic wedding invitation or program 1200 may include a map to the church, reception, and/or rehearsal dinner 1202. Like the map to the venue 964 associated with the electronic concert ticket 948, the maps 1202 associated with the electronic wedding invitation or program 1200 may be received by the handheld device 40 in a variety of forms in the supplemental ticket data, such as web archive files or hyperlinks to online maps, and may be displayed in a web browser, such as Safari®, or a dedicated map application, such as Maps for the Apple iPhone®. It should further be appreciated that because a wedding may take place in a number of different locations, many different maps 1202 may be included, such as a map to a church, a reception, a family home, overnight accommodations, or a restaurant hosting a rehearsal dinner, as may be illustrated further with reference to FIGS. 79A-B.

The wedding invitation or program 1200 may also, include linking a user to a wedding register 1204 of the couple to be married. As described further below with reference to FIGS. 78A-H, the electronic device 10 may provide a series of prompts or screens to enable the user of the electronic device 10 to easily obtain or purchase a wedding gift. The electronic device 10 may display such prompts or screens based on data received in the supplemental ticket data, which may include, for example, hyperlinks to online vendors where the couple may be registered, web archive files of websites for products that the couple may have registered for, or a data file representing a list of registered products.

Additionally, the electronic wedding invitation or program 1200 may include an option to view or purchase a wedding video 1206 or wedding photos 1208, to obtain an audio recording of the toast 1210, or to obtain the playlist of music at the reception 1212. In each case, the supplemental ticket data may include, for example, a hyperlink to a website where such action may be taken. Additionally, a computer 62, kiosk 74, or unmanned kiosk 88 may be available at the wedding reception. By providing the ticket data from the wedding invitation 1184 or the wedding program 1192 to the computer 62, kiosk 74, or unmanned kiosk 88, a user may obtain or purchase the above benefits in the manner described above with reference to FIG. 64 for obtaining the live recording 954 of the concert.

Another benefit that may be associated with the electronic wedding invitation or program 1200 may be a gift of music from the bride or groom 1214 to certain guests. The gift of music 1214 may be included in the supplemental ticket data associated with the electronic wedding invitation or program 1200 and may represent, for example, credits for certain songs to an online music vendor, such as iTunes®, or an audio file sent in the supplemental ticket data. The electronic wedding invitation or program 1200 may further include a link to a wedding website 1216, which may include, for example, a hyperlink to a website for the bride or groom or a web archive file of the website. To facilitate arriving to the church or reception, the electronic wedding invitation or program 1200 may additionally include credits or electronic coupons for passing through a toll road or for parking 1218. The credits or coupons may be redeemable using techniques described above.

Certain additional benefits may be included in the electronic wedding invitation or program 1200 for members of the wedding party. Tailored benefits for the wedding party 1220 may include, for example, links or maps to tuxedo rental or dress shops that the recipient of the electronic wedding invitation or program 1200 is requested to visit. In some instances, other benefits may also vary; for example, only members of the wedding party may receive a map to a rehearsal dinner or a calendar reminder for the wedding rehearsal, or a special gift of digital content may be provided only to bridesmaids or groomsmen.

As noted above, the supplemental ticket data associated with an electronic ticket may include the times for which the event begins and ends. With such information, the electronic device 10, upon receiving the electronic wedding invitation or program 1200, may also automatically input a calendar reminder 1221 on a calendar application that may run on the electronic device 10 for the various events that may take place during the wedding. The calendar reminder 1221 may denote the duration of the event and may be displayed when the user searches the calendar on the electronic device 10. Moreover, when more than one event may take place, such as may occur when a reception at one location follows a wedding at another location, a user may choose which events the user plans to attend prior to the imposition of the automatic calendar reminder 1221. In a similar fashion, the supplemental ticket data may indicate to the electronic device 10 that the event may be particularly quiet or solemn. As such, a handheld device 40 having the electronic ticket 998 may automatically place audio features, such as telephone ringtone, into a silent or vibrate mode 1222 for the expected duration of the event or while the user remains within the GPS coordinates of the church or reception. It should further be appreciated that a benefit associated with the electronic wedding invitation or program 1200 may include an electronic RSVP. Included in the supplemental ticket data associated with the electronic wedding invitation or program 1200 may be a hyperlink or email address to the organizer of the wedding. With such information, the electronic device 10 may provide a prompt or a screen asking a user to RSVP; when the user responds, the response may be sent to the linked location or email address to inform the wedding organizer that the user does or does not plan to attend the wedding.

FIGS. 78-81 may illustrate certain embodiments of benefits that may be associated with the electronic wedding invitation or program 1200. Turning first to FIG. 78A, after the electronic wedding invitation or program 1200 has been input onto the electronic device 10 using techniques described above, a user may employ certain benefits associated with the electronic wedding invitation or program 1200. As should be appreciated, the user may select the ticket management application icon 44 to cause the electronic device 10 to launch the ticket management application and display the screen 158, as shown in FIG. 78B.

The screen 158 may include the option to view the list of events as indicated by the button 162, as well as to add events as indicated by the button 164. Selection of the button 162 may cause the electronic device 10 to display the screen 610, as illustrated in FIG. 78C. As described above, the screen 610 may include a variety of categories 612 for events that may be stored on the electronic device 10. Among such categories may be included a wedding event. Selection of the category 612 labeled "Wedding" may cause the electronic device 10 to display a screen 1224, as illustrated in FIG. 78D. The screen 1224 may include certain text 1226 to indicate various details about the wedding, and may include a series of buttons 1228-1234 with various options relating to the electronic wedding invitation or program 1200. It should be appreciated that any number of user buttons may be present on the screen 1224, depending on the various benefits that may be associated with the electronic wedding invitation or program 1200.

By way of example, as illustrated on the screen 1224 of FIG. 78D, the button 1228, labeled "Buy Wedding Gift," may enable a user of the electronic device 10 to purchase a wedding gift for the bride and groom from a wedding registry at an online store. Similarly, the button 1230, labeled "Maps to Church/Reception," may provide various maps associated with the wedding. The button 1232, labeled "Add to Calendar," may allow the user to select the various events associated with the wedding to that may be automatically stored on a calendar application on the electronic device 10. The button 1234, labeled "Other Extras," may display various other benefits that may be associated with the electronic wedding invitation or program 1200.

Figures 78E, 78F:
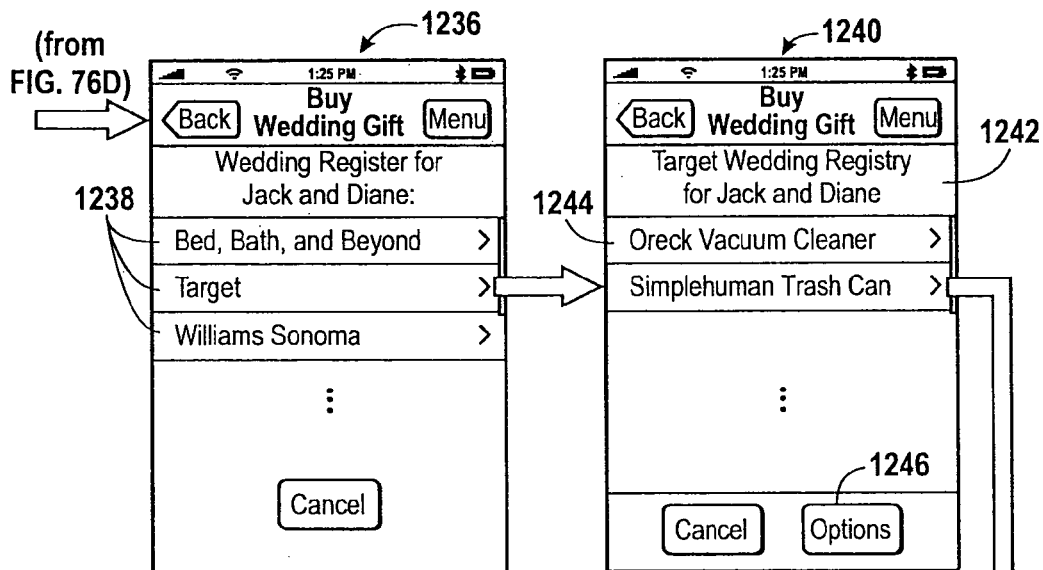

If the user selects the button 1228, labeled "Buy Wedding Gift," a screen 1236 may be displayed, as shown in FIG. 78E. The screen 1236 may enable the user to purchase a wedding gift from a wedding register of an online vendor. As illustrated on the screen 1236, various vendors for which the bride and groom may be registered may be listed as one of a series of list items 1238.

Selecting from one of the list items 1238 may cause the electronic device 10 to establish a connection to the online vendor, such that the electronic device 10 may obtain and display a list of various products which may be included on a wedding register. As such, a screen 1240 may appear on the electronic device 10, as shown in FIG. 78F. The screen 1240 may list the name of the online vendor 1242 and provide a series of list items 1244 representing various yet-to-be-purchased products from the wedding register of the bride and the groom. A button 1246, labeled "Options," may allow the user to order the list items 1244 according to various preferences, including by price, size, quantity desired, shipping costs, etc.

Figures 78G, 78H:
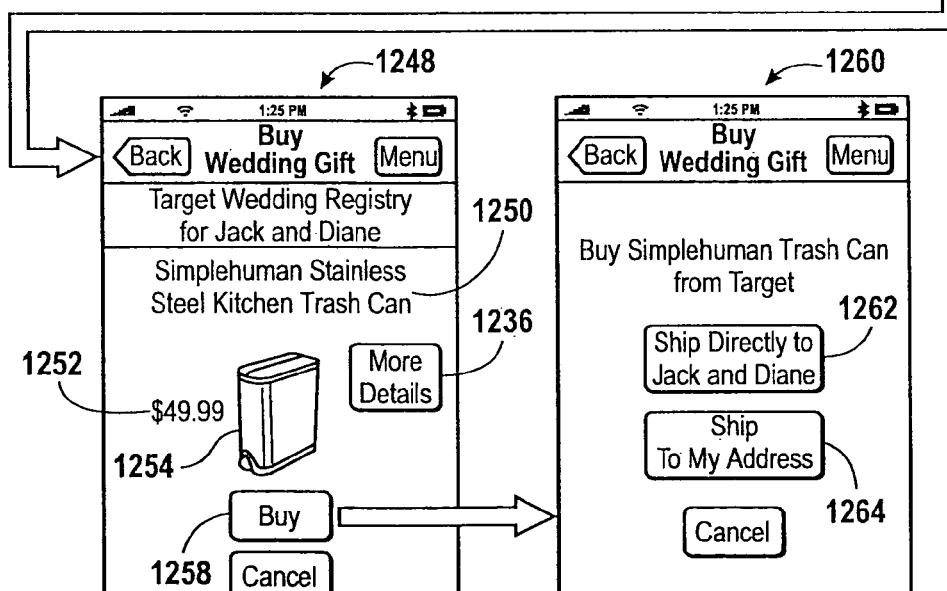

For exemplary purposes, if the user selects the second list item 1244 of the screen 1240, labeled "simplehuman Trash Can," the electronic device 10 may display a screen 1248, as illustrated in FIG. 78G. The screen 1248 may provide additional information about the selected product, such as text 1250 indicating the name of the product, pricing information 1252, and/or an image 1254 of the product. A button 1256, labeled "More Details," may allow the user to obtain technical details regarding the product prior to purchase. A button 1258, labeled "Buy," may enable the user to purchase the selected item.

Following the purchase of the item, the ticket management application may display a screen 1260 on the electronic device 10, as shown in FIG. 78H. The screen 1260 may provide various options for obtaining the purchased product. For example, the user may choose to ship the item directly to the bride and groom, as illustrated by a button 1262 labeled "Ship Directly to [Bride and Groom]." Alternatively, the user may chose to ship the product to the user's own address as illustrated by a button 1264 labeled "Ship to My Address." It should be appreciated that the screen 1260 may include other methods of obtaining the product, including, for example, picking up the item from a brick and mortar store.

Figures 79A, 79B:
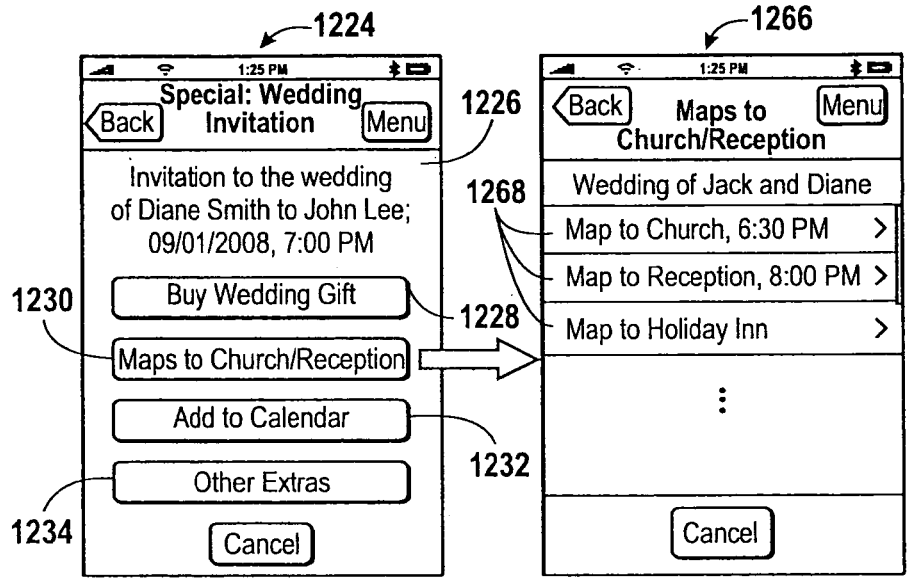
FIGS. 79A-B are schematics of screens that may be displayed on the electronic device of FIG. 1 when certain benefits associated with the electronic wedding invitation or program are accessed.

Turning next to FIG. 79A, the user may select the button 1230 of the screen 1224, labeled "Maps to Church/Reception," to view maps associated with the wedding. The electronic device 10 may display a screen 1266, as shown in FIG. 79B. The screen 1266 may include a series of list items 1268 representing links to various maps pertinent to the wedding. Selecting each list item 1268 may cause the electronic device 10 to launch an internet browser, such as Safari®, or a maps application, such as Maps, to open and display the maps. It should be appreciated that the list items 1268 on the screen 1266 may be obtained via the supplemental ticket data transferred to the electronic device 10 when the electronic wedding invitation or program 1200 is input onto the device. Further, it should be appreciated that the maps displayed may vary depending on the recipient of the electronic wedding invitation or program 1200. For example, an out-of-town recipient may receive a map certain overnight accommodations, and a member of the wedding party may receive a map to a restaurant for the rehearsal dinner.

Figures 80A, 80B:
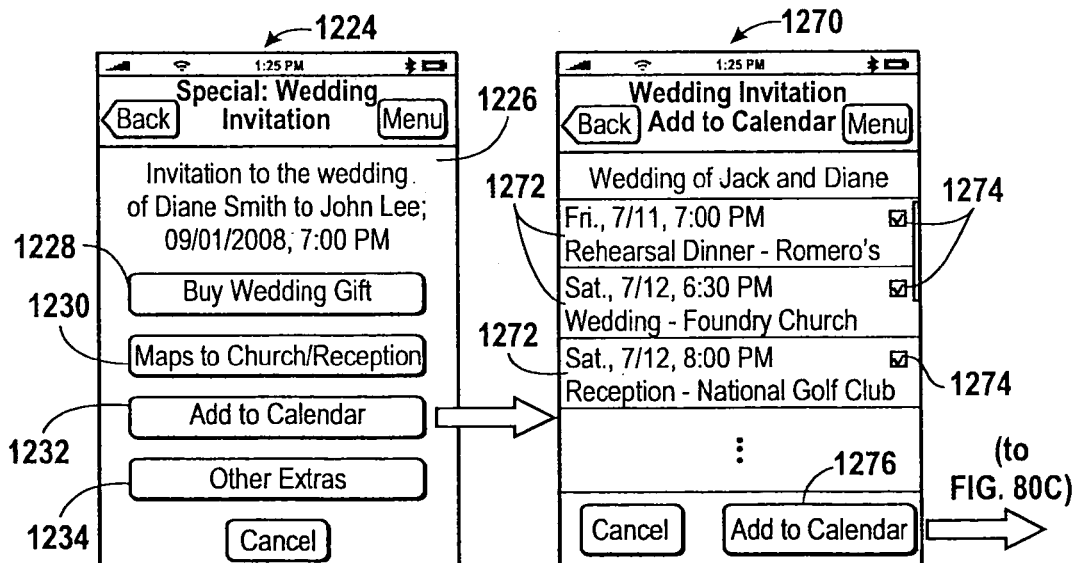
FIGS. 80A-C are schematics of screens that may be displayed on the electronic device of FIG. 1 when certain benefits associated with the electronic wedding invitation or program are accessed.
Figure 80C:
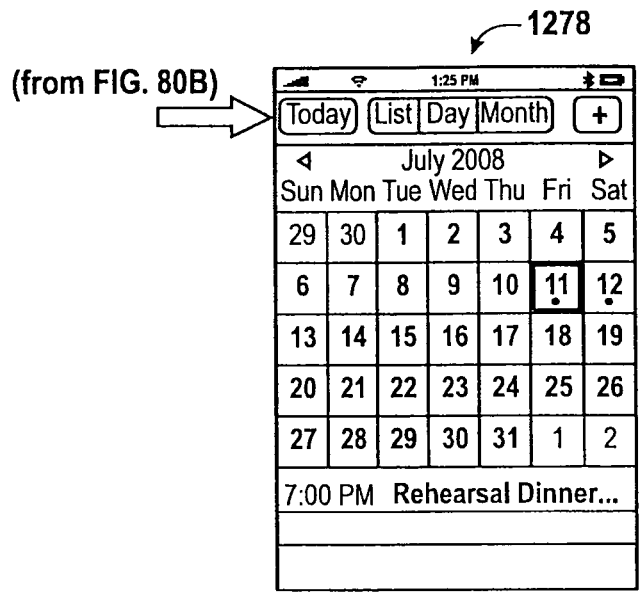

As illustrated in FIG. 80A, the user may select the button 1232 of the screen 1224, labeled "Add to Calendar," to select from among the various events associated with the wedding. When the button 1232 is selected, the electronic device 10 may display a screen 1270, as shown in FIG. 80B. The screen 1270 may include a series of list items 1272 that may represent the various events associated with the wedding event, such as a rehearsal dinner, the wedding ceremony, and/or a reception. The screen 1270 may include check boxes 1274 associated with the list items 1272 to enable a user to select whether or not the user plans to attend each of the events associated with the list items 1272. A button 1276, labeled "Add to Calendar," may be selected by the user to add all list items 1272 for which the associated check boxes 1274 have been selected into a calendar application on the electronic device 10. As illustrated by a screen 1278 of FIG. 80C, the selected events associated with the wedding may be recorded in the calendar application that may run on the electronic device 10.

Figures 81A, 81B:
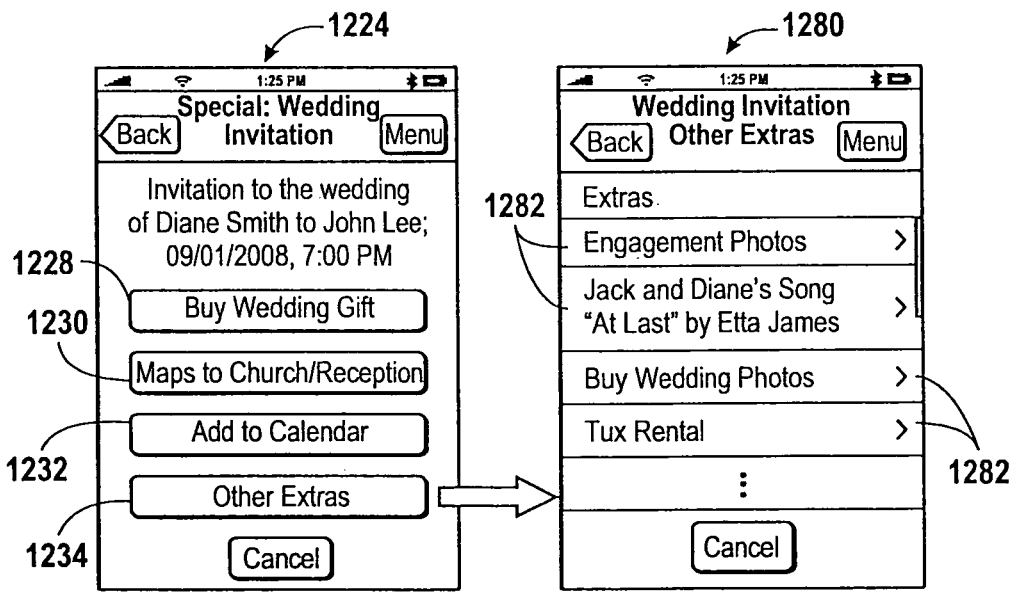
FIGS. 81A-B are schematics of screens that may be displayed on the electronic device of FIG. 1 when certain benefits associated with the electronic wedding invitation or program are accessed.

Turning to FIG. 81A, the user may select the button 1234 of screen 1224, labeled "Other Extras," to view additional benefits that may be associated with the electronic wedding invitation or program 1200. Upon selection of the button 1234, the electronic device 10 may display a screen 1280, as shown in FIG. 81 B. The screen 1280 may include a series of list items 1282 representing various other benefits that may be associated with the electronic wedding invitation or program 1200. As illustrated by the screen 1280, such items may include, for example, links to obtain engagement photos, a link to obtain a song gifted to the recipient by the bride and groom, an option to purchase certain wedding photos, as well as other benefits that may be associated with membership in the wedding party, such as a link to a recommended tuxedo rental store.

Figure 82:
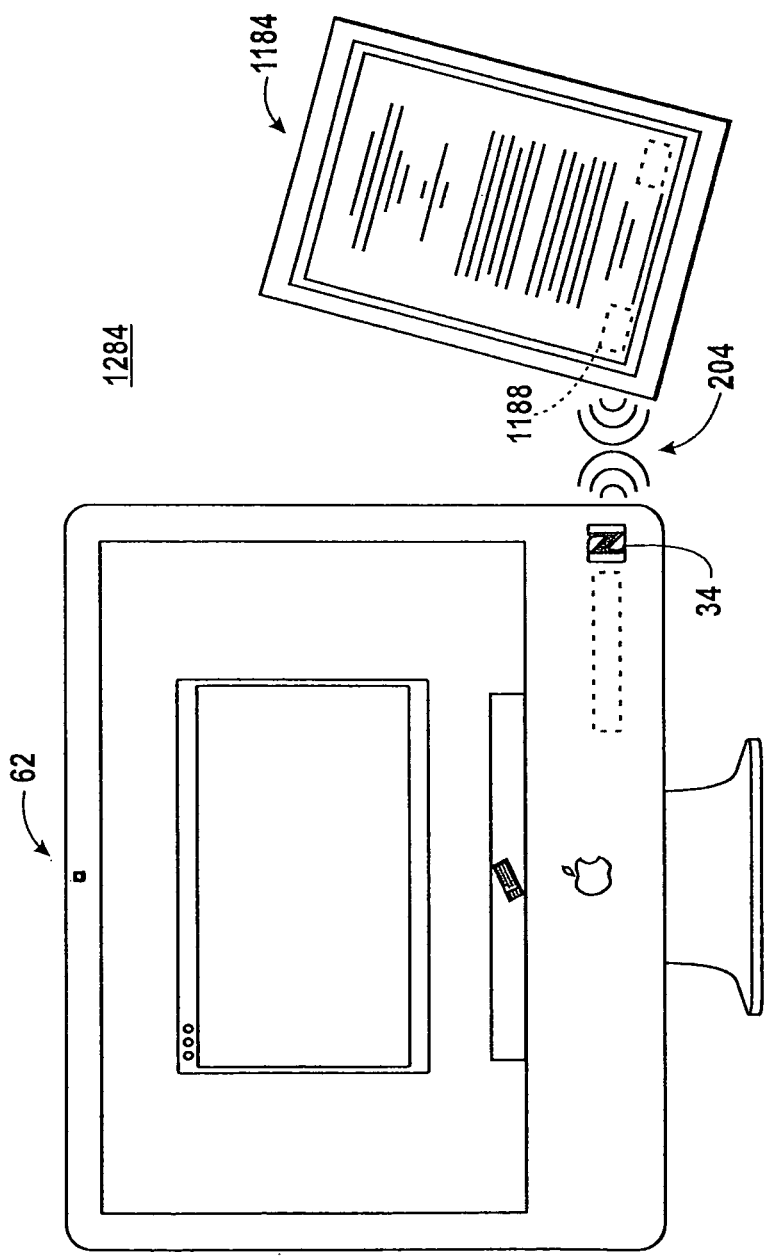
FIG. 82 is a schematic of an invitation-scanning operation for obtaining certain benefits associated with the electronic wedding invitation or program.

As noted above, certain benefits may be obtained in the same manner as the live recording 954, as described above with reference to FIGS. 64 and FIGS. 57-60. FIG. 82 illustrates an operation 1284 for obtaining such benefits. Though a wedding attendee may not have brought an electronic device 10 to the wedding, the attendee may have brought the wedding invitation 1184. It should be appreciated that ticket data stored on the RFID tag 1188 of the wedding invitation 1184 may link the attendee recipient to a particular account, such as an iTunes® account. As such, the attendee may purchase or otherwise elect to obtain a wedding video 1206, wedding photos 1208, an audio recording of the toast 1210, and a playlist from the reception 1212 from a kiosk 74, unmanned kiosk 88, or a computer 62 that may be operated, for example, by a wedding DJ. As illustrated by the operation 1284 of FIG. 82, the attendee may tap the wedding invitation 1184 to the NFC interface 34 of the computer 62 to transfer the ticket data stored on the RFID tag 1188. The computer 62 may thereafter transfer the ticket data, along with information regarding the product(s) selected by the attendee, to credit the account associated with the attendee with the select product(s). Such communication may occur in a manner similar to that described above in the communication diagram 856 of FIG. 58.

The following example may illustrate the use of the benefits disclosed in the benefit diagram 1198 of FIG. 77 and the related FIGS. 78-82. To obtain the benefits of the electronic wedding invitation or program 1200, a user of a handheld device 40 that is a member of a wedding party may receive an NFC-enabled wedding invitation 1184 in the mail. The user may tap the NFC-enabled wedding invitation 1184 to the NFC interface 34 of the user's handheld device 40 to store the electronic wedding invitation 1200 on the handheld device 40. Based on user preferences, the handheld device 40 may automatically create a calendar reminder 1221 and may prompt the user to send an electronic RSVP 1223 to the bride and groom. A number of the benefits that may be associated with the electronic wedding invitation 1200 may thereafter become available to the user.

Prior to attending the wedding, the user may download songs provided as a gift of music 1214 from the bride and groom, receive a hyperlink to a wedding website 1216 set up by the bride and groom, and may retrieve other information relating to membership in the wedding party 1220, such as a hyperlink to a tuxedo rental store. The user may choose to buy a wedding gift from a wedding register 1204 provided to the handheld device 40.

When the day of the wedding arrives, the calendar reminder 1221 on the handheld device 40 may alert the user. The user may drive to the wedding ceremony location assisted with a map 1202, and any tolls passed along the way may be paid for with toll road credits 1218. During the wedding, the user may receive a phone call on the handheld device 40; however, rather than interrupting the wedding with a loud ringtone, the handheld device 40 may have automatically set the ringtone to silent 1222 based on the user's preferences when the wedding was about to start. When the wedding is scheduled to end, the handheld device 40 may reinstate the ringtone to its prior setting.

Following the wedding ceremony, the user may attend a wedding reception. The user may drive to the reception aided by the map 1202, using toll road credits 1218 to take toll roads without paying additional fees. After an especially funny toast, the user may choose to reserve a copy of an audio recording of the toast 1210. Moreover, having enjoyed the evening, the user may choose to view or purchase various wedding photos 1208 and selections from the wedding video 1206 and to download the playlist 1212 of special wedding songs chosen by the bride and groom for the reception.

Figure 83:
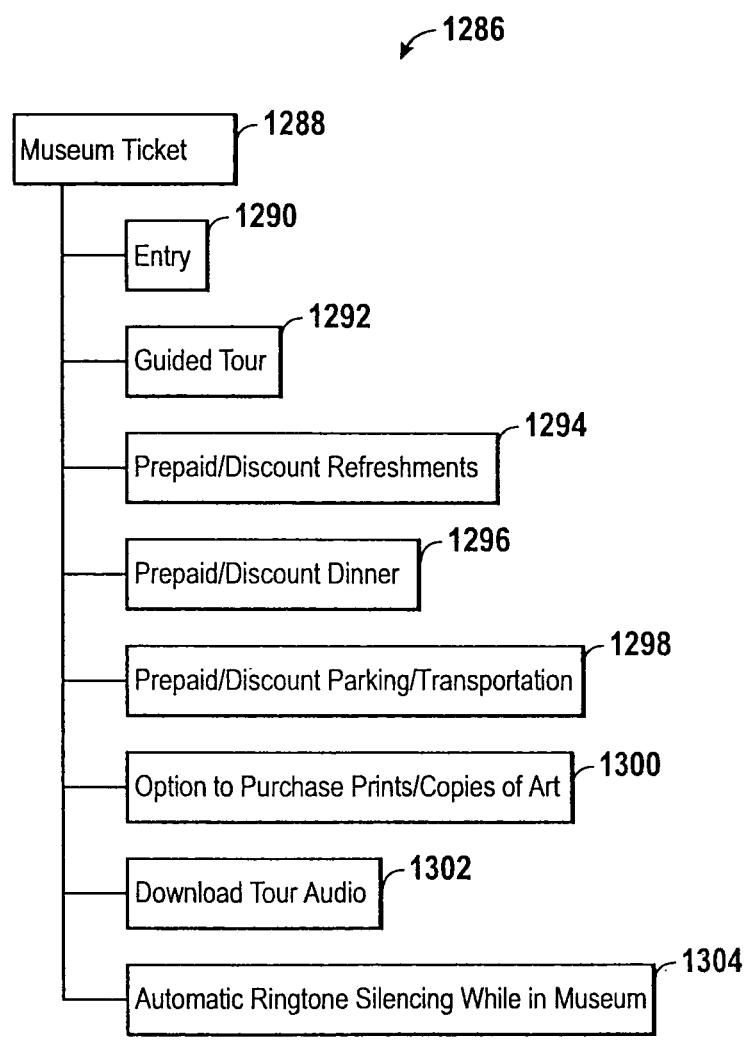
FIG. 83 is a block diagram representing benefits that may be associated with an electronic museum ticket.

FIGS. 83-93 relate the techniques described above for use with tickets to a museum. Turning first to FIG. 83, a benefits diagram 1286 describes a series of benefits that may be associated with an electronic museum ticket 1288. It should be appreciated that the electronic museum ticket 1288 may be obtained, stored, and used in any electronic device 10 according to the techniques described above relating to obtaining, storing, and using an electronic ticket. Moreover, it should be appreciated that the benefits associated with the electronic museum ticket 1288 are intended to be exemplary only and not exclusive.

Benefits associated with the electronic museum ticket 1288 may include, for example, entry 1290 to the museum. The entry 1290 may be obtained using the techniques discussed above. The benefits may further include a guided tour 1292. The guided tour 1292 may be obtained, for example, as a link to digital content, such as digital audio, video, and/or text, which may be downloaded from the Internet, or as credit for digital content from an online digital content vendor, such as iTunes®. Alternatively, the guided tour 1292 may represent digital content received directly in the supplemental ticket data. The digital content associated with the guided tour 1292 may be associated with certain stations which may be located in the museum, as described with reference to FIGS. 84-87 below, but may also be based upon certain location information (e.g., GPS coordinates) for various museum exhibits.

The electronic museum ticket 1288 may also include such benefits as prepaid or discount refreshments 1294, prepaid or discount dinner 1296, or prepaid or discount parking or transportation 1298. It should be appreciated that the above benefits may be obtained in the manner described above with reference to the prepaid or discount refreshments 960 or prepaid or discount attire 962 of FIG. 64.

If the museum displays works of art, the electronic museum ticket 1288 may include an option to purchase prints of copies of the art 1300. The option to buy prints or copies of the art 1300 may be offered in conjunction with the guided tour 1292, as described below. Additionally, a user may be able to purchase or otherwise obtain an audio tour 1302. The audio tour 1302 may represent, for example, digital audio or video content that may enable a user to explore the museum in a prerecorded manner.

As noted above, the supplemental ticket data associated with an electronic ticket may indicate to the electronic device 10 that the event may require a degree of silence. As such, a handheld device 40 having the electronic ticket 1288 may automatically place audio features, such as telephone ringtone, into a silent or vibrate mode 1304 for the expected duration of the event or while the user remains within the GPS coordinates of the museum.

Figure 84:
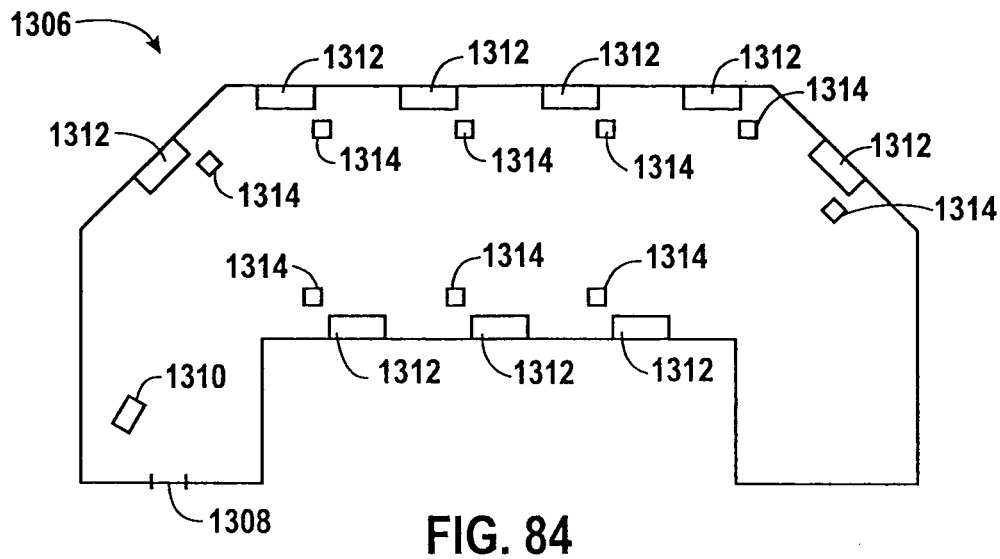
FIG. 84 is a schematic of a museum floor plan that may be used in conjunction with benefits associated with an electronic museum ticket.
Figure 85:
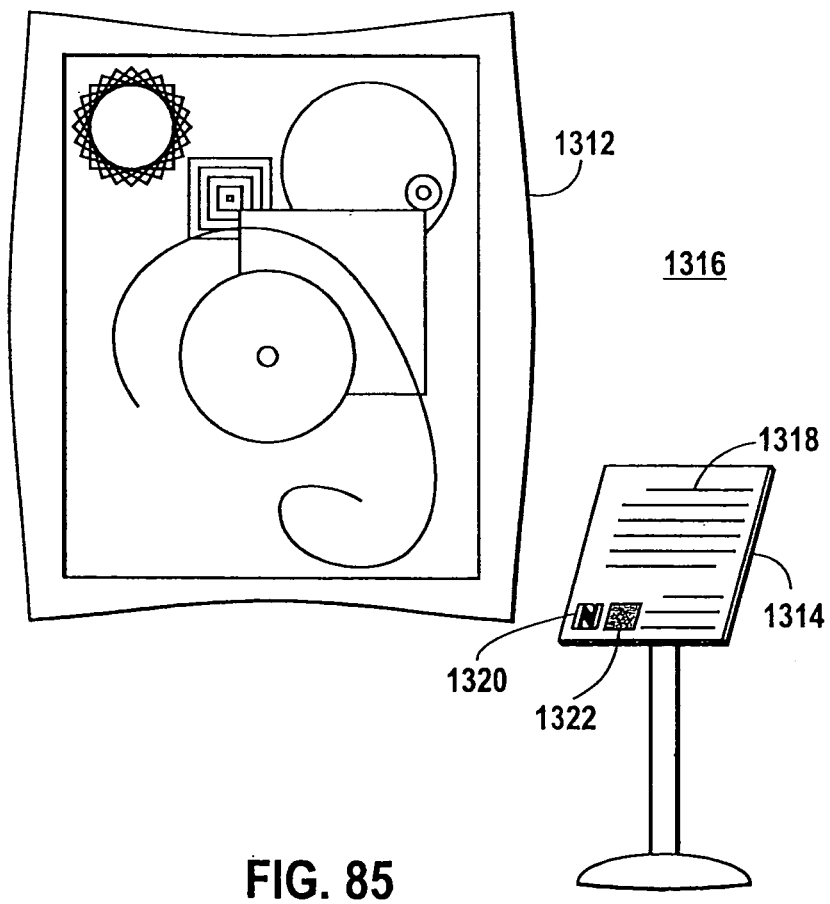
FIG. 85 is a schematic of a museum exhibit and museum exhibit station that may be located on the museum floor plan of FIG. 84.

FIGS. 84 and 85 may illustrate an embodiment of the guided tour 1292. Turning first to FIG. 84, an exemplary museum floor plan 1306 may include, for example, a main entrance 1308 and an entryway kiosk 1310. It should be appreciated that the main entrance 1308 or the entryway kiosk 1310 may allow a user to gain entry to the museum, in accordance with the techniques described above. For example, the entryway kiosk 1310 may represent the ticket turnstile 94, the kiosk 74, or the unmanned kiosk 88. Exhibits 1312 may line the walls of the museum floor plan 1306, accompanied by exhibit stations 1314, as described further below.

FIG. 85 is a schematic diagram 1316 of one of the exhibits 1312 and associated exhibit stations 1314. By way of example, the exhibit station 1314 may include text 1318 describing the exhibit 1312. An RFID tag 1320 may be embedded in or placed upon the exhibit station 1314, and a matrix code or barcode 1322 may be printed on the exhibit station 1314. As described below, stored on the RFID tag 1320 or encoded in the matrix code or barcode 1322 may be certain station data associated with the exhibit station 1314. An electronic device 10 may use the station data to retrieve information regarding the exhibit 1312.

Figures 86E, 86F:
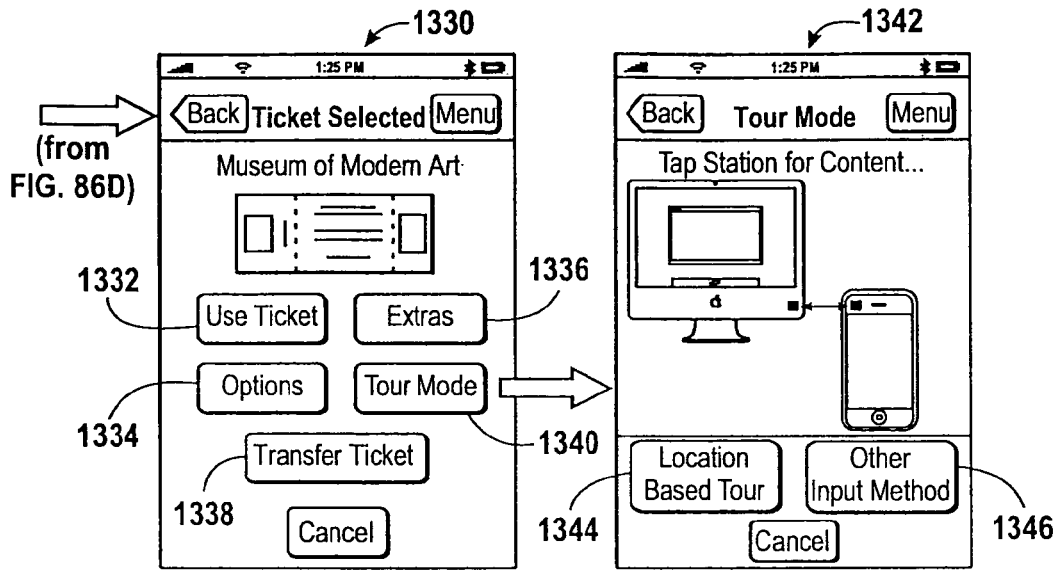
Figure 87:
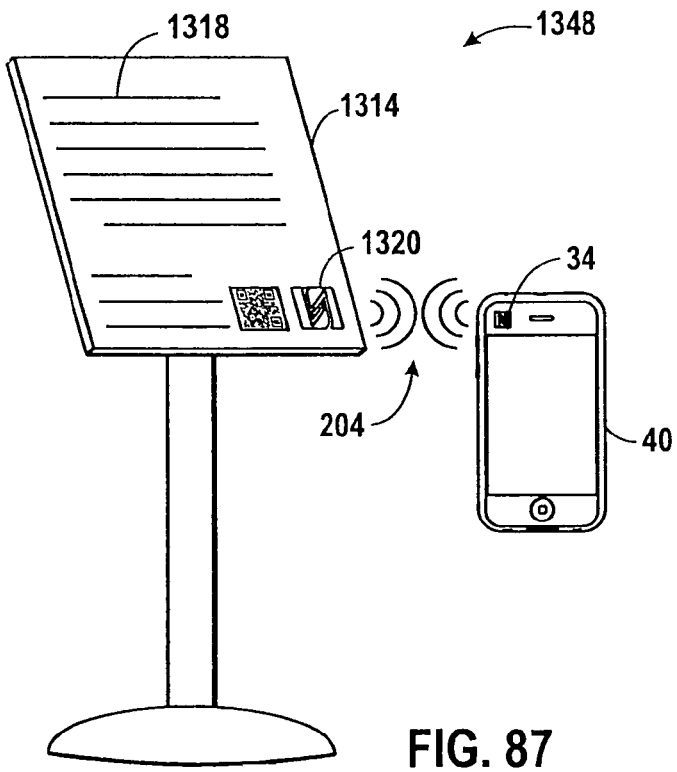
FIG. 87 is an exhibit station-scanning operation for obtaining certain benefits associated with an electronic museum ticket.
Figure 88:
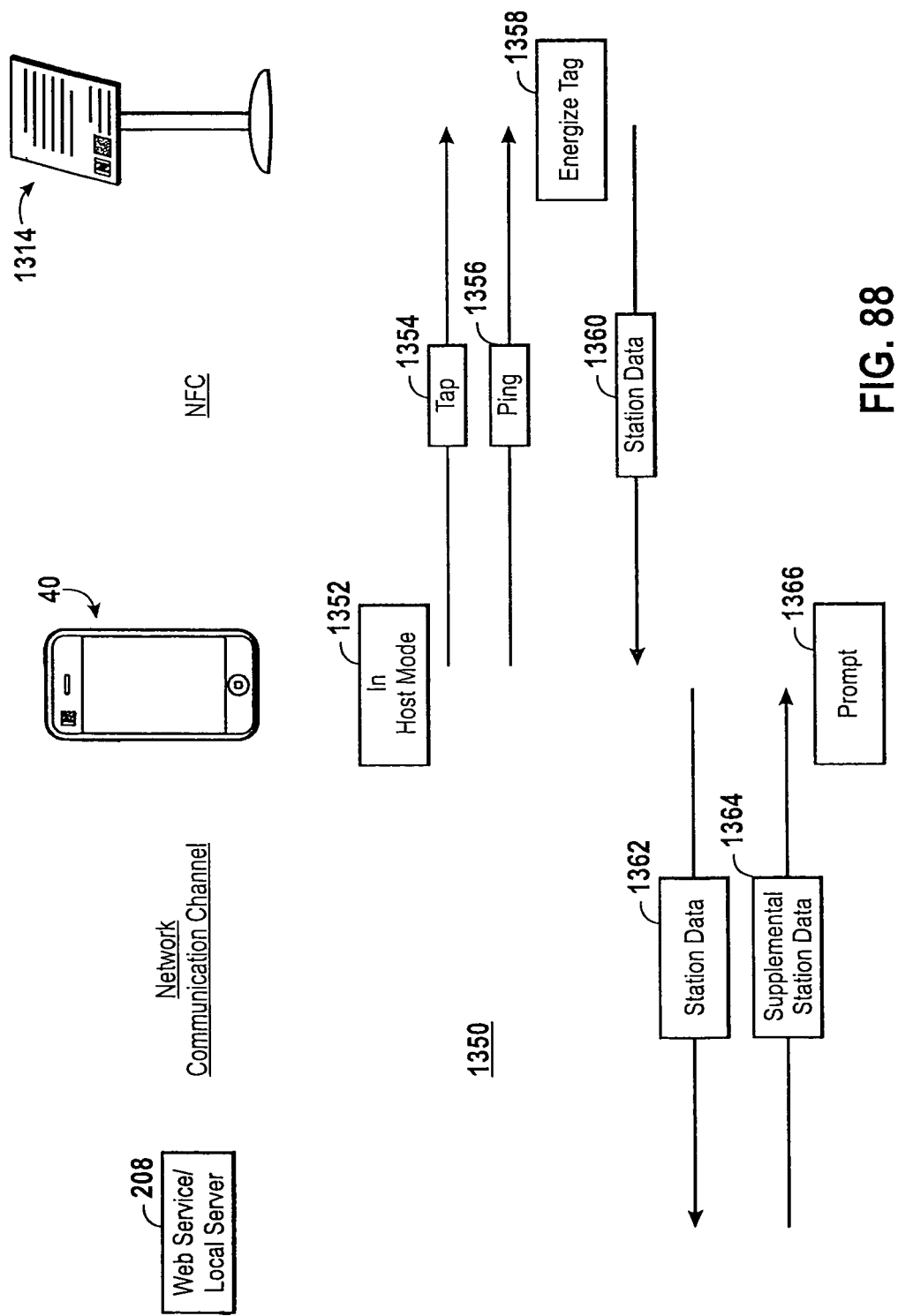
FIG. 88 is a block diagram representing communication that may take place during the exhibit station-scanning operation of FIG. 87.

FIGS. 86-88 describe a manner of performing the guided tour 1292 using the electronic device 10 and the exhibit stations 1314. Turning first to FIG. 86A, an electronic device 10 such as the handheld device 40 may display a home screen having the ticket management application icon 44. If a user selects the icon 44, the screen 158 may be displayed, as shown in FIG. 86B. Selecting the button 162, labeled "Event List," may cause the screen 610 to be displayed, as shown in FIG. 86C. As illustrated, the screen 610 may include a series of buttons 612 displaying various categories of events. Selecting the category 612 for museum may cause the electronic device 10 to display a screen 1324, as shown in FIG. 86D, which may list all of the electronic museum tickets that may be stored on the electronic device 10.

The screen 1324 of FIG. 86D may display various list items 1326 representing museum tickets that may be stored on the electronic device 10. A button 1328, labeled "Options," may enable the user to vary the manner in which the list items 1326 are displayed on the electronic device 10 according to techniques described above. In the example of FIG. 86D, the screen 1324 indicates that the electronic device 10 holds two tickets for the Museum of Modern Art.

Turning to FIG. 86E, a screen 1330 may be displayed when a user selects one of the list items 1322. The screen 1330 may generally indicate that a ticket has been selected, and may provide a variety of options for employing the electronic museum ticket 1288, as indicated by buttons 1332-1340. By way of example, the button 1332, labeled "Use Ticket," may enable a user to gain entry to the museum; the button 1334, labeled "Options," may enable the user to set certain preferences regarding the ticket in the manners described above; the button 1336, labeled "Extras," may enable the user to access the various benefits that may be associated with the electronic museum ticket; the button 1338, labeled "Transfer Ticket," may enable a user to transfer the ticket to another electronic device 10 using techniques described above; and the button 1340, labeled "Tour Mode," may cause the electronic device 10 to enter a mode conducive to providing the guided tour 1292, as described further below.

Selecting the button 1340, labeled "Tour Mode," may cause the electronic device 10 to display a screen 1342, as illustrated in FIG. 86F. The screen 1342 may instruct the user to gain information from a particular exhibit station 1314 by tapping the electronic device 10 to the RFID tag 1320. By tapping the station 1314, the electronic device 10 may obtain certain supplemental data associated with the station 1314, described below as supplemental station data, from which the electronic device 10 may display additional information regarding an associated nearby exhibit 1312. A button 1344, labeled "Location-Based Tour," may enable a user to obtain the guided tour 1292 of the museum based on the GPS coordinates of the exhibits in the museum. A button 1346, labeled "Other Input Methods," may enable a user to obtain the station data from the matrix code or barcode 1322 of the exhibit station 1314 using the camera 36 with the techniques described above.

FIG. 87 illustrates an operation 1348 for obtaining station data from the RFID tag 1320 of the exhibit station 1314. As illustrated by the operation 1348 of FIG. 87, an electronic device 10, such as the handheld device 40, may be tapped to the RFID tag 1320 of the exhibit station 1314. When the RFID tag 1320 is tapped, the NFC interface 34 may emit an NFC ping, causing the communication channel 204 may be established and the RFID tag 1320 to become energized. The energized RFID tag 1320 may thereafter transmit station data relating to the exhibit station 1314. The handheld device 40 may thereafter use the station data to obtain information regarding the exhibits of the museum.

FIG. 88 is a communication diagram 1350 describing communication that may take place during the operation 1348 of FIG. 87. As indicated by the communication diagram 1350, communication may take place between the handheld device 40 and the exhibit station 1314 over the NFC communication channel 204, and between the handheld device 40 and the web service or local server 208 via another network communication channel 376. At the start of the communication diagram 1350, the NFC interface 34 of the handheld device 40 may be in a "host mode," as indicated by block 1352. The NFC interface 34 of the handheld device 40 may enter the "host mode" when the button 1340 of the screen 1330 of FIG. 86E is selected. As shown by block 1354 of the communication diagram 1350 and illustrated in the operation 1348 of FIG. 87, the user may tap the NFC interface 34 of the handheld device 40 to the RFID tag 1320. Because the NFC interface 34 of the handheld device 40 may be operating in the "host mode," the NFC interface 34 may periodically emit an NFC ping, as illustrated by block 1356. The NFC ping may energize the RFID tag 1320 of the exhibit station 1314, as noted by block 1358. Subsequently, as shown by block 1360, the RFID tag 1320 may transfer certain stored station data to the handheld device 40.

The station data may be stored in the main memory 14 or the nonvolatile storage 16 of the handheld device 40. As noted above, the station data may include, for example, a unique identifying number representing a pointer to data located in an external database, or a data file, such as an XML file, describing the exhibit to which the exhibit station 1314 pertains. The handheld device 40 may transmit the ticket data via the Internet or another communication channel 376 to the web service 208, as shown by block 1362. The web service 208 may have access to a database relating station data to certain other information. Subsequently, the web service 208 may transmit supplemental station data to the handheld device 40, as shown by block 1364. As noted above, the supplemental ticket data of block 1364 may represent, for example, data associated with the guided tour 1292, including a link to digital content, such as digital audio, video, and/or text, which may be downloaded from the Internet, or credit for digital content from an online digital content vendor, such as iTunes®. Additionally or alternatively, the supplemental station data may itself include the digital content associated with the guided tour 1292. Upon receipt of such supplemental station data 1364, a prompt may be displayed on the handheld device 40, as illustrated by a block 1366.

Figures 89A, 89B:
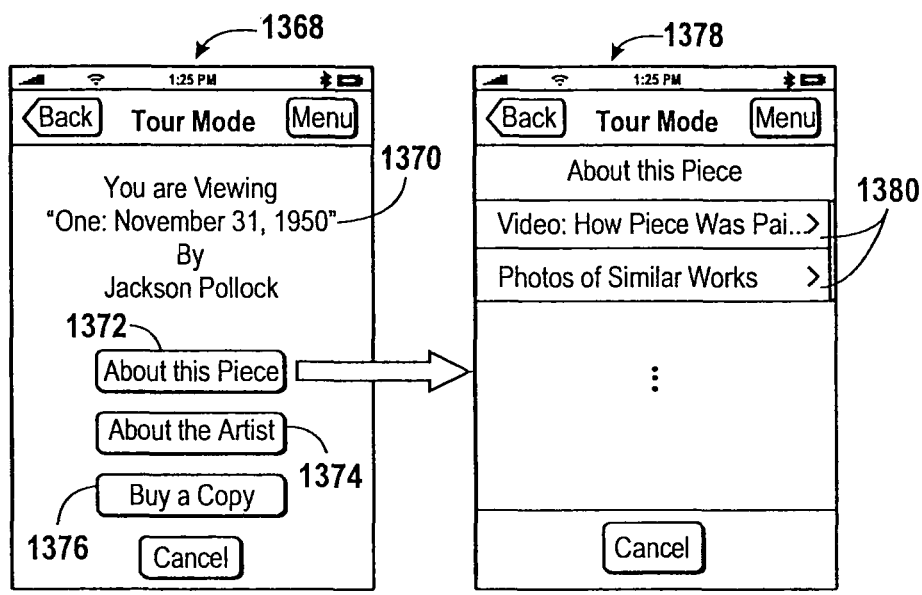
FIGS. 89A-B are schematics of screens that may be displayed on the electronic device of FIG. 1 when certain benefits associated with an electronic museum ticket are accessed.

Turning to FIG. 89A, a screen 1368 may be displayed as a prompt upon receiving certain supplemental station data from the web service 208, as illustrated by the communication diagram 1350 of FIG. 88. The screen 1368 may represent a prompt having text 1370 describing the title of the exhibit and the artist of the exhibit. A button 1372, labeled "About This Piece," may enable a user to learn more about the exhibit 1312; a button 1374, labeled "About the Artist," may enable the user to learn more about the artist behind the exhibit 1312; and a button 1376, labeled "Buy a Copy," may enable the user to purchase a copy of the art of the exhibit 1312.

By way of example, if the user selects the button 1372, labeled "About This Piece," a screen 1378 may be displayed on the handheld device 40, as shown in FIG. 89B. A series of list items 1380 of the screen 1378 may include, for example, a video that may describe how the work was painted, which may be available for a download from an on-line music distribution service, such as iTunes®, or from a web location, such as YouTube. A list item 1380 labeled "Photos of Similar Works," may provide a link to an Internet site exhibiting photos of similar works, or may display images previously received in the supplemental station data.

Figure 90:
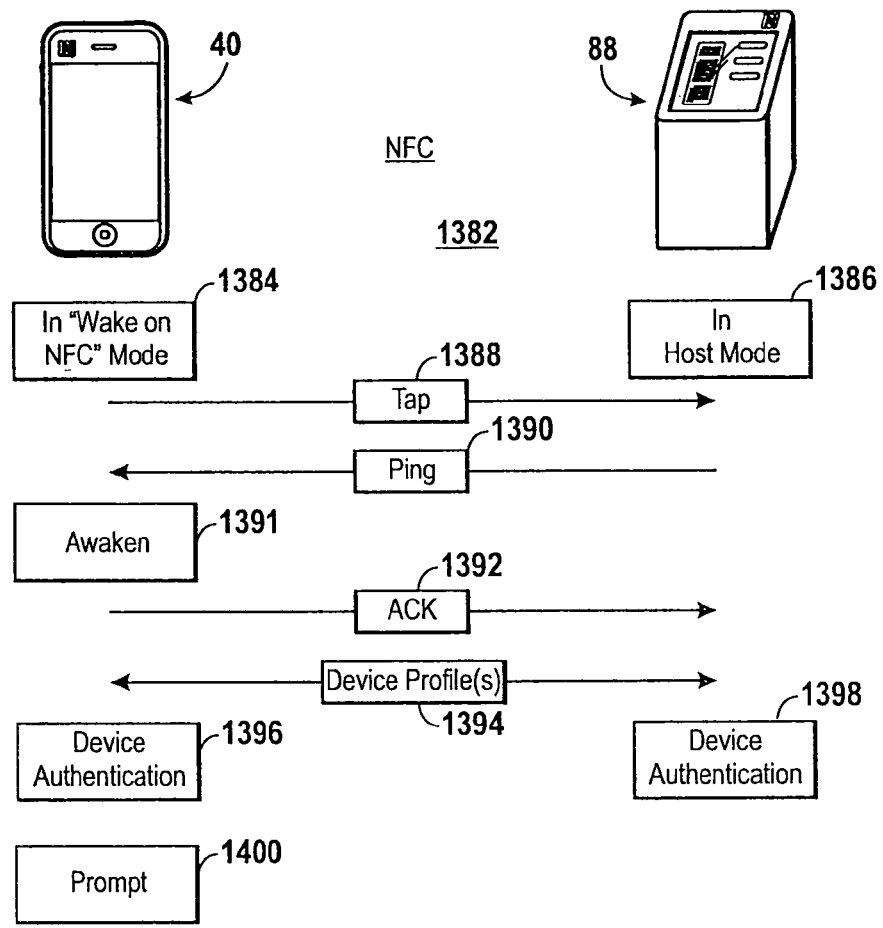
FIG. 90 is a block diagram representing alternative communication that may take place during the exhibit station-scanning operation of FIG. 87.

FIG. 90 describes an alternative embodiment of a manner of obtaining the guided tour 1292 associated with the electronic museum ticket 1288. As illustrated in FIG. 90, a communication diagram 1382 may describe a manner of obtaining information from the entryway kiosk 1310 of the museum, which is noted above in the museum floor plan 1306 of FIG. 84. Particularly, the communication diagram 1382 may represent communication that may take place when a museum attendee taps the handheld device 40 to the entryway kiosk 1310, which may be, for example, the unmanned kiosk 88. As described below, tapping the handheld device 40 to the entryway kiosk 1310 may cause the handheld device 40 to display a prompt to enter the tour mode.

At the start of the communication diagram 1382, the NFC interface 34 of the handheld device 40 may be in a "wake on NFC" mode, as shown in a block 1384. The "wake on NFC" mode may be the default mode for the NFC interface 34. By contrast, the NFC interface 34 of the unmanned kiosk 88 may operate in a "host mode," as indicated by block 1386. Communication between the handheld device 40 and the unmanned kiosk 88 may become established in an NFC handshake. To begin the NFC handshake, the user may tap the NFC interfaces 34 of the handheld device 40 and the unmanned kiosk 88, as indicated by a block 1388. Because the unmanned kiosk 88, rather than the handheld device 40, may be operating in the "host mode," the unmanned kiosk 88 may emit periodic NFC pings. One of the NFC pings may be transmitted from the unmanned kiosk 88 to the handheld device, as indicated by block 1390. Receiving the NFC ping may cause the NFC interface 34 of the handheld device 40 to awaken, as noted by block 1391, and the handheld device 40 may reply with an NFC acknowledgement packet, as noted by block 1392, labeled "ACK."

With NFC communication established between the devices, the handheld device 40 and the unmanned kiosk 88 may exchange device profiles, as shown by block 1394. As noted above, the device profiles may include a variety of information regarding the capabilities of the handheld device 40 and the unmanned kiosk 88. For example, the device profiles may include messages of any form, including extensible markup language (XML), which may denote the device name, serial number, owner name, type of device, as well as other identifying information. The other identifying information may include, for example, a hash of the user's account for a web service, such as iTunes®, or a public or private encryption key. The device profiles may additionally denote capabilities of the handheld device 40 or the unmanned kiosk 88 by indicating which applications, drivers, or services may be installed on each device.

Subsequently, the handheld device 40 and the unmanned kiosk 88 may authenticate one another based at least in part on the information from the device profiles. The authentication procedures of blocks 1396 and 1398 of FIG. 31 may involve, for example, verifying that the purchaser of the ticket and the owner of the handheld device 40 are the same. Authentication may rely on a private key known to both the unmanned kiosk 88 and the handheld device 40, which may have been exchanged prior to communication or, additionally or alternatively, a combination of a public key and a private key. Under the latter scheme, the unmanned kiosk 88 and the handheld device 40 may each exchange public keys associated with one another prior to or during the authentication procedure of blocks 1396 and 1398, or may obtain public keys from another source. The unmanned kiosk 88 and the handheld device 40 may verify the public keys with a certificate authority over the Internet or via a web of trust. In certain variations, the web service 208 may represent the certificate authority. If there is any link broken in the chain of trust, the authentication procedure of blocks 1396 and 1398 may be terminated. Following the device authentication procedure of blocks 1396 and 1398, the handheld device 40 may display a prompt, as indicated by block 1400.

Figure 91:
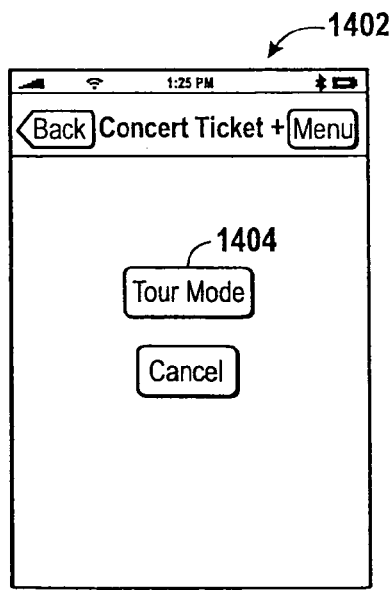
FIG. 91 is a schematic of a screen that may be displayed on the electronic of FIG. 1, representing a prompt to enter a tour mode associated with an electronic museum ticket.

Turning to FIG. 91, a screen 1402 may represent a prompt that may be displayed on the handheld device 40 after communication with the entryway kiosk 1310, as noted above with reference to the block 1400. The handheld device 40 may display the prompt of the screen 1402 based upon certain information in the device profiles of block 1394, which may indicate to the handheld device 40 that the unmanned kiosk 88 represents an entryway kiosk 1310 for a museum. Accordingly, the screen 1402 may display, among others, a button 1404 labeled "Tour Mode." Selecting the button 1404 may cause the handheld device 40 to enter the tour mode, which is described above with reference to FIG. 86F. Once the handheld device 40 has entered the tour mode, the techniques discussed above for carrying out the guided tour 1292 may be employed.

Figure 92A:
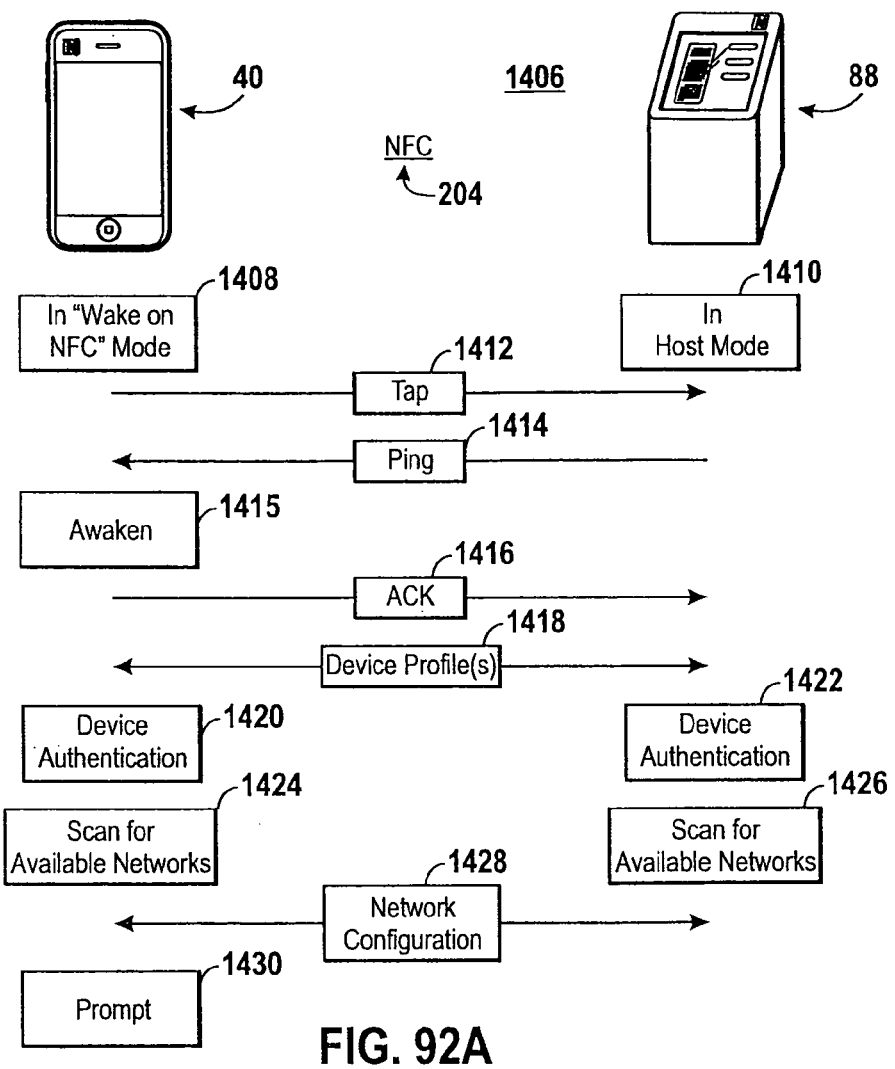
FIGS. 92A-B are block diagrams representing communication that may take place during a kiosk-scanning operation associated with an electronic museum ticket.
Figure 92B:
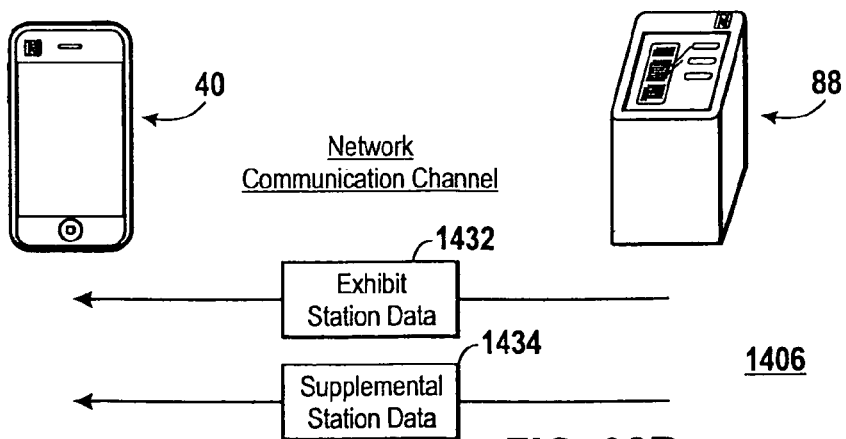
Figure 93:
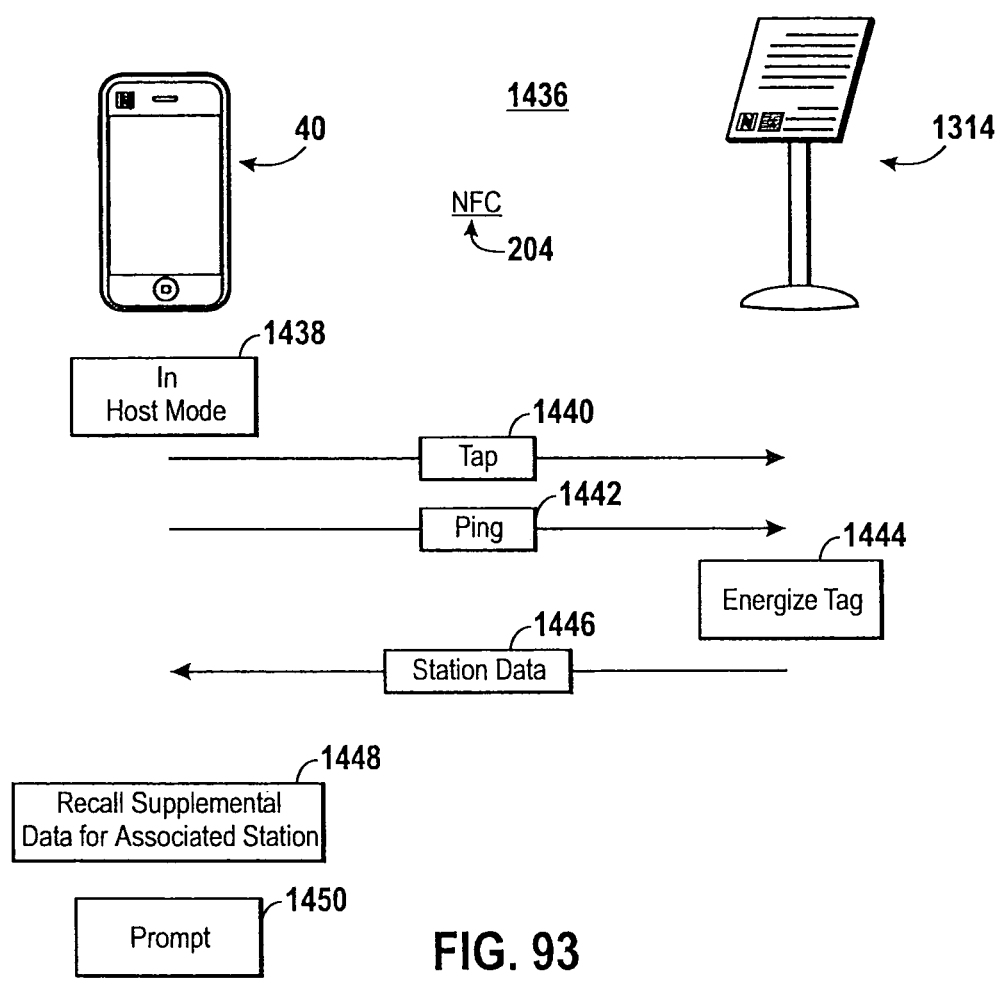
FIG. 93 is a block diagram representing communication that may take place to obtain certain benefits associated with an electronic museum ticket.

FIGS. 92-93 represent an alternative manner of performing the guided tour 1292. Like the techniques described above with reference to FIGS. 90-91, the techniques described with reference to FIGS. 92-93 may take place when a museum attendee taps the handheld device 40 to the entryway kiosk 1310, which may be, for example, the unmanned kiosk 88. As described below, tapping the handheld device 40 to the entryway kiosk 1310 may cause the handheld device 40 to display a prompt to enter the tour mode or to retrieve all supplementary station data prior to retrieving the individual station data associated with each exhibit station 1314.

Turning first to FIG. 92A, a communication diagram 1406 represents a manner of transferring supplemental station data from the unmanned kiosk 88 to the handheld device 40. The communication may initially take place over the NFC communication channel 204. At the start of the communication diagram 1406, the NFC interface 34 of the handheld device 40 may be in a "wake on NFC" mode, as shown in a block 1408. The "wake on NFC" mode may be the default mode for the NFC interface 34. By contrast, the NFC interface 34 of the unmanned kiosk 88 may operate in a "host mode," as indicated by block 1410.

Communication between the handheld device 40 and the unmanned kiosk 88 may become established in an NFC handshake. To begin the NFC handshake, the user may tap the NFC interfaces 34 of the handheld device 40 and the unmanned kiosk 88, as indicated by a block 1412. Because the unmanned kiosk 88, rather than the handheld device 40, may be operating in the "host mode," the unmanned kiosk 88 may emit periodic NFC pings. One of the NFC pings may be transmitted from the unmanned kiosk 88 to the handheld device, as indicated by block 1414. Receiving the NFC ping may cause the NFC interface 34 of the handheld device 40 to awaken, as noted by block 1415, and the handheld device 40 may reply with an NFC acknowledgement packet, as noted by block 1416, labeled "ACK."

With NFC communication established between the devices, the handheld device 40 and the unmanned kiosk 88 may exchange device profiles, as shown by the block 1418. As noted above, the device profiles may include a variety of information regarding the capabilities of the handheld device 40 and the unmanned kiosk 88. For example, the device profiles may include messages of any form, including extensible markup language (XML), which may denote the device name, serial number, owner name, type of device, as well as other identifying information. The other identifying information may include, for example, a hash of the user's account for a web service, such as iTunes®, or a public or private encryption key. The device profiles may additionally denote capabilities of the handheld device 40 or the unmanned kiosk 88 by indicating which applications, drivers, or services may be installed on each device.

Subsequently, the handheld device 40 and the unmanned kiosk 88 may authenticate one another based at least in part on the information from the device profiles. The authentication procedures of blocks 1420 and 1422 of FIG. 92A may involve, for example, verifying that the purchaser of the ticket and the owner of the handheld device 40 are the same. Authentication may rely on a private key known to both the unmanned kiosk 88 and the handheld device 40, which may have been exchanged prior to communication or, additionally or alternatively, a combination of a public key and a private key. Under the latter scheme, the unmanned kiosk 88 and the handheld device 40 may each exchange public keys associated with one another prior to or during the authentication procedure of blocks 1420 and 1422, or may obtain public keys from another source. The unmanned kiosk 88 and the handheld device 40 may verify the public keys with a certificate authority over the Internet or via a web of trust. In certain variations, the web service 208 may represent the certificate authority. If there is any link broken in the chain of trust, the authentication procedure of blocks 1420 and 1422 may be terminated.

Following device authentication, the handheld device 40 and the unmanned kiosk 88 may scan for available network communication channels 376 for the other to join for further communication, as indicated by blocks 1424 and 1426. After scanning for the available network communication channels 376, the handheld device 40 and the unmanned kiosk 88 may exchange network configuration information, as shown by block 1428. The network configuration information of block 1428 may include, for example, XML messages denoting lists of network communication channels 376 accessible via the unmanned kiosk 88 or the handheld device 40. Among other things, the network configuration information of block 1428 may include known authorization keys and service set identifier (SSID). By way of example, the network configuration information may include PAN interface 28 configuration information, such as a Bluetooth serial number, MAC address, and an associated password, as well as LAN interface 30 configuration information, such as a WiFi IP address, a WiFi MAC address, and a WiFi SSID. The network configuration information may be stored for use at a later time to permit the handheld device 40 and the unmanned kiosk 88 to ascertain a higher bandwidth connection.

Turning next to FIG. 92B, the handheld device 40 and the unmanned kiosk 88 may next initiate a subsequent data transfer via another network communication channel 376 other than the NFC communication channel 204 using the network configuration information of block 1428. Over the newly established network communication channel 376, the unmanned kiosk 88 may transfer exhibit station data and supplemental station data associated with one or more exhibit stations 1314 of the museum. In certain cases, all exhibit station data and supplemental station data may be transferred at once and stored in the main memory 14 or nonvolatile storage 16 of the handheld device 40.

It should be appreciated that the prompt of block 1430 of FIG. 92A may similarly cause the handheld device 40 to display the screen 1402 of FIG. 91, which may represent a prompt that may be displayed on the handheld device 40 after communication with the entryway kiosk 1310. When a user selects the button 1404 labeled "Tour Mode," the handheld device 40 to enter the tour mode and, in some cases, may cause the handheld device 40 to pursue the communication described above in the communication diagram 1436 of FIG.

93. Once the handheld device 40 has entered the tour mode, the techniques discussed above for carrying out the guided tour 1292 may be employed. Additionally, because the handheld device 40 may have already received and stored all station data and supplemental station data from the entryway kiosk 1310, as described above with reference to FIGS. 92A-B, the tour mode may alternatively function according to a technique described below.

FIG. 93 is a communication diagram 1436 that may represent an alternative embodiment for performing the guided tour 1292 when the handheld device 40 has already received and stored all station data and supplemental station data in the manner described above. The communication diagram 1436 may illustrate communication between the handheld device 40 and the exhibit station 1314. Though the communication is illustrated in FIG. 93 as taking place over the NFC communication channel 204, it should be appreciated that station data may be obtained from the station 1314 in any manner.

At the start of the communication diagram 1436, the handheld device 40 may already have entered the tour mode, which is described above with reference to FIG. 86F. As such, the NFC interface 34 of the handheld device 40 may be operating in a "host mode," as shown by block 1438. When the user taps the RFID tag 1320 of the exhibit station 1314, as illustrated in block 1440, the handheld device 40 may emit an NFC ping, as illustrated in block 1442. The NFC ping may cause the RFID tag 1320 to become energized, as shown by block 1444. The RFID tag 1320 may thereafter emit station data that may be stored thereon, as shown by block 1446.

Having received the station data, the handheld device 40 may be able to identify at which station the user of the handheld device 40 may be located. As a result, the handheld device 40 may recall the supplemental station data associated with the received station data, as shown by block 1448. It should be appreciated that, alternatively, the handheld device 40 may determine which supplemental station data to access based upon a physical location rather than the communication described in the communication diagram 1436. After recalling the supplemental station data associated with the received station data, as shown by block 1448, the handheld device 40 may issue a prompt, as shown by block 1450. The prompt issued with regard to the block 1450 may represent, for example, the screen 1368 of FIG. 89A and screen 1378 of screen 89B, which may display information relevant to the associated nearby exhibit 1312.

The following example may illustrate the use of the benefits disclosed in the benefit diagram 1286 of FIG. 83 and the related FIGS. 84-93. To obtain the benefits of the electronic museum ticket 1288, a user of a handheld device 40 may purchase such a ticket from an unmanned kiosk 88 before entering a museum. After making a selection, the user may tap the NFC interface 34 of the user's handheld device 40 to kiosk 88 to transfer the electronic museum ticket 1288 onto the handheld device 40. A number of benefits that may be associated with the electronic museum ticket 1288 may thereafter become available to the user.

Prior to entering the museum, the user may download tour audio 1302 for an audio tour, as well as prepay for dinner 1296 or refreshments 1294 following the visit to the museum. The user may gain entry to the museum using the techniques described above. Once inside the museum, the handheld device 40 may recognize its location and switch the phone ringtone of the handheld device 40 to silent or vibrate 1304. Also upon entering the museum, the user may tap the handheld device 40 to an entryway kiosk 1310, causing the handheld device 40 to automatically issue a prompt to enter a tour mode. When the user elects to enter the tour mode, the user may then take a guided tour 1292 of the various museum exhibits. The user may tap an exhibit station 1314 near each art exhibit 1312 to learn more about each piece.

When the user finds a particular piece of art that the user would like to have at home, the user may choose to purchase a print or a copy of the work 1300 from the handheld device 40. It should be understood that the user may alternatively purchase the print or copy of the work 1300 using any of the techniques for purchasing a live recording 954 as relating to the electronic concert ticket 948. Finally, when the user has finished visiting the museum, the user may exit from a museum parking lot without paying additional fees using the prepaid or discount parking 1298 on the handheld device. The user may finish the evening by driving to an affiliated restaurant to meet friends or colleagues for prepaid refreshments 1294 or dinner 1296 and to discuss the exhibits.

Figure 94:
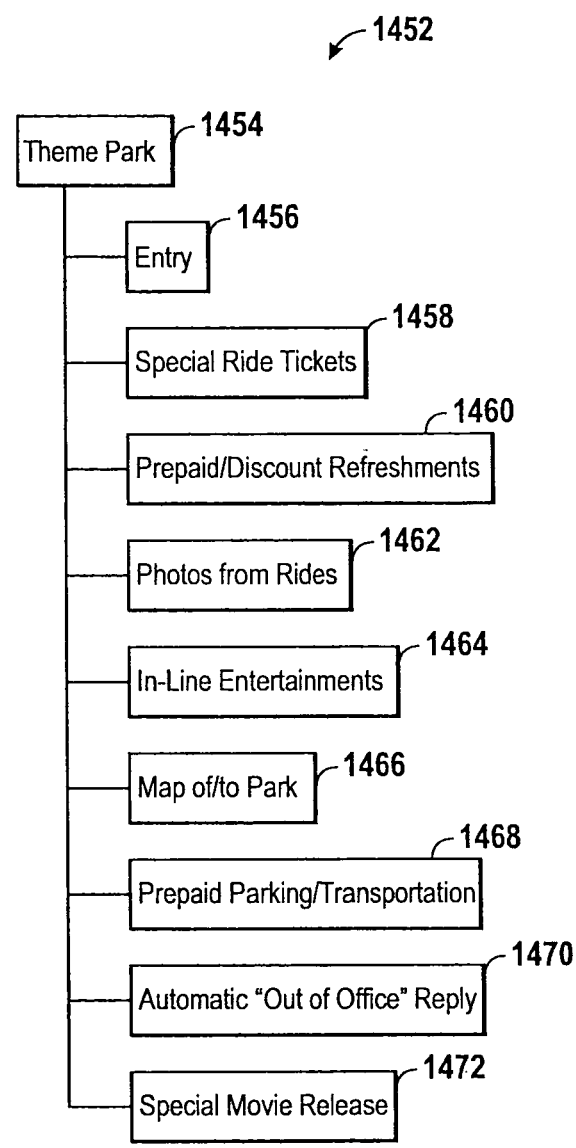
FIG. 94 is a block diagram representing benefits that may be associated with an electronic theme park ticket.

It should be appreciated that the techniques described above may also be employed with regard to a ticket for a theme park. As such, FIGS. 94-96 may represent various benefits and techniques for employing the techniques described above with an electronic ticket for a theme park. Turning first to FIG. 94, a benefit diagram 1452 may represent a variety of benefits that may be associated with an electronic theme park ticket 1454. It should be appreciated that the electronic theme park ticket 1454 may be obtained, stored, and used in any electronic device 10 according to the techniques described above relating to obtaining, storing, and using an electronic ticket. Moreover, it should be appreciated that the benefits associated with the electronic museum ticket 1288 are intended to be exemplary only and not exclusive.

One benefit associated with the electronic theme park ticket 1454 may be entry 1456 to the theme park. The entry 1454 may be obtained using the techniques discussed above. The electronic theme park ticket 1454 may also include such benefits as special ride tickets 1458 or prepaid or discount refreshments 1460. The special ride tickets 1458 may represent a benefit that may be available to those who enter the theme park using the electronic theme park ticket 1454 or who may have prepaid for or reserved a ride for a particular time. The prepaid or discount refreshments 1460 may be available in the same manner described above with reference to other embodiments.

Other benefits which may be associated with the electronic theme park ticket 1454 may include photos 1462 of the user on certain rides, as well as certain entertainment which may become available while the user waits in line 1464. The photos 1462 from the rides may be obtained in a manner described below with reference to FIGS. 95-96. In-line entertainment 1464 may include, for example, complimentary or for-purchase digital content such as music, videos, or games.

A map to or of the theme park 1466 may also be associated with the electronic theme park ticket 1454. Like the map to the venue 964 associated with the electronic concert ticket 948, the map to or of the theme park 1466 may be received by the handheld device 40 in a variety of forms in the supplemental ticket data, such as a web archive file or a hyperlink to an online map, and may be displayed in a web browser, such as Safari®, or a dedicated map application, such as Maps for the Apple iPhone®. Prepaid or discount parking or transportation 1468 may also be associated as a benefit with the electronic theme park ticket 1454. As should be appreciated, the prepaid or discount parking or transportation 1468 may be available in the same manner described above with reference to other embodiments.

As noted above, the supplemental ticket data associated with an electronic ticket may include the GPS coordinates delineating where the event may take place. With such information, the electronic device 10, upon receiving the electronic theme park ticket 1454, may also automatically instate an "out of office" reply to all incoming email or phone calls, indicating that the user is currently unavailable while the user remains within certain GPS coordinates delineating the bounds of the theme park. Additionally, as some theme parks may be affiliated with movie studios, the electronic theme park ticket 1454 may include a benefit such as special movie releases 1472. Such special movie releases 1472 may become available, for example, when a user enters the theme park using the electronic theme park ticket 1454.

Figure 95:
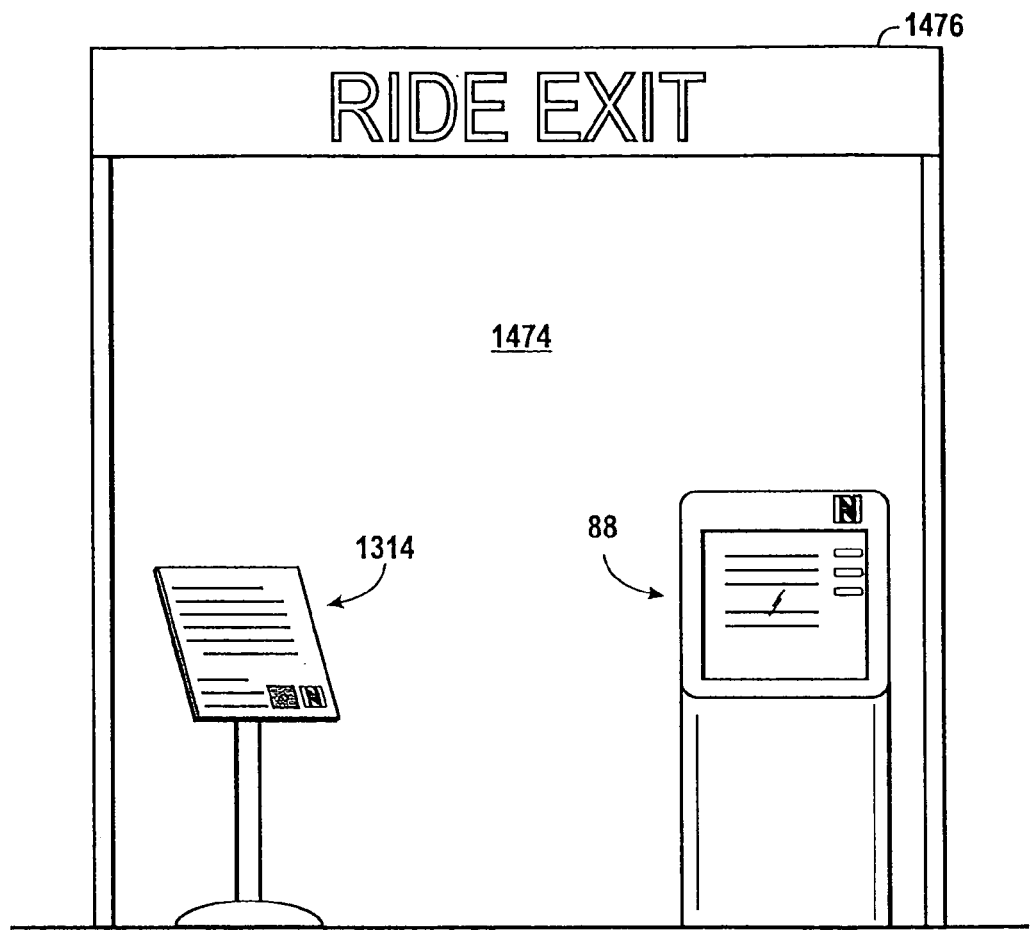
FIG. 95 is a schematic illustrating a manner of obtaining certain benefits associated with an electronic theme park ticket.
Figure 96:
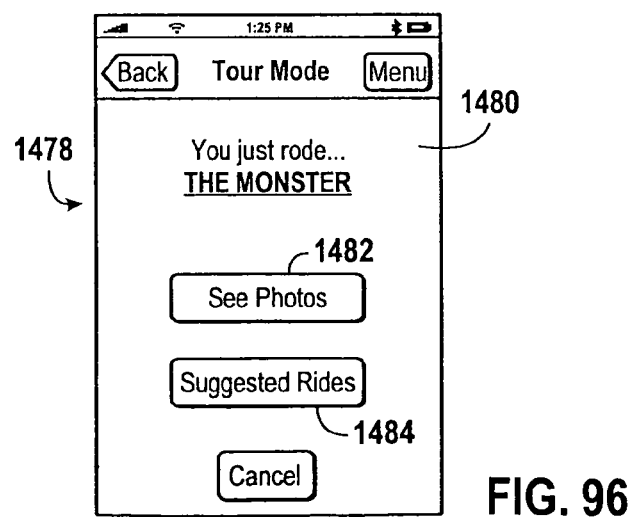
FIG. 96 is a schematic of a screen that may be displayed on the electronic device of FIG. 1, representing a prompt that may be displayed in association with certain benefits associated with an electronic theme park ticket.

FIGS. 95-96 may represent an embodiment of obtaining photos 1462 associated with recent theme park rides. Turning first to FIG. 95, a schematic 1474 may represent the exit to a ride which the user of the electronic device 10 may have just completed. As the user passes a ride exit 1476, the unmanned kiosk 88 or the exhibit station 1314 may be nearby. The unmanned kiosk 88 and the exhibit station 1314 may enable the user to exploit a variety of benefits associated with the electronic theme park ticket 1454.

First, the user may tap the unmanned kiosk 88 while the handheld device 40 displays a home screen. Doing so, as illustrated by FIGS. 90-91 above, may cause the handheld device 40 to communicate with the unmanned kiosk 88 and subsequently display a smart prompt. As should be appreciated, the prompt may allow the user to initiate a tour mode or to launch the ticket management application. If the user responds to the prompt by initiating the tour mode or launching the ticket management application, the handheld device 40 may display another prompt, as illustrated below with reference to FIG. 96.

Second, the user may tap an NFC-enabled ticket 106 or scan a ticket 108 or 146 for the theme park to the unmanned kiosk 88, after selecting photos to purchase or otherwise obtain photos of the user during the ride. In the manner described above with reference to FIGS. 57-60, the unmanned kiosk 88 may use the ticket data supplied by the ticket 106, 108, or 146 to credit an account for an online media service, such as an iTunes® account, associated with the ticketholder with the images. At a later time, the user may retrieve the images from the online media service from an electronic device 10.

Third, the user may tap an electronic device 10 operating in a tour mode, as described above, to the exhibit station 1314 near the ride exit. The exhibit station 1314 may transfer station data to the handheld device, which may use the station data to obtain recent photos taken from the ride. As should be appreciated, the handheld device 40 may display another prompt, as illustrated below with reference to FIG. 96, to provide the user with the photos from the ride.

Turning to FIG. 96, the electronic device 10 may display a screen 1478 when, as discussed above, the electronic device 10 interacts with the unmanned kiosk 88 or the exhibit station 1314 located near the ride exit 1476. Text 1480 may indicate the name of the ride. A button 1482, labeled "See Photos," may enable the user to view photos from the ride. Another button 1484, labeled "Suggested Rides," may recommend similar rides and provide maps to the rides.

It should further be appreciated that the screen 1478 may be additionally or alternatively displayed while the electronic device 10 is operating in a tour mode and the GPS coordinates denoting the end of the ride are detected by the location-sensing circuitry 22. The electronic device 10 may compare the location data observed by the location-sensing circuitry 22 and various locations denoting ride exits, noted as GPS coordinates in the supplemental ticket data. A hyperlink to a website or other server from the supplemental ticket data may provide up-to-date photo data from the ride.

The following example may illustrate the use of the benefits disclosed in the benefit diagram 1452 of FIG. 94 and the related FIGS. 95-96. To obtain the benefits of the electronic theme park ticket 1454, a user of a handheld device 40 may order several NFC-enabled tickets 106 corresponding to the number of family members that will be going. When the NFC-enabled tickets 106 arrive in the mail, the user may tap the NFC interface 34 of the user's handheld device 40 to the tickets 106 to obtain the electronic theme park tickets 1454 onto the handheld device 40. A number of benefits that may be associated with the electronic theme park ticket 1454 may thereafter become available to the user.

While still at home, the user may prepay for parking 1468 and for enough refreshments 1460 for the whole family. The user and family may drive to the theme park aided by a map to the park 1466. Upon arrival, because the user has prepaid for parking, the handheld device 40 may display an electronic coupon indicating the user has prepaid for parking 1138 when the user arrives. Alternatively, the prepaid parking may be redeemed by tapping the NFC-enabled conference ticket 1108 to a kiosk 74 or unmanned kiosk 88, which may verify that parking has been prepaid by contacting the web service 208.

The user and family may gain entry 1456 to the theme park using the handheld device 40 using the techniques described above. Once inside the park, the user and family may avoid certain ride lines with special ride tickets 1458 and, while waiting in line throughout the day, may take advantage of special in-line entertainment 1464 such as a trivia game against others waiting in line. After riding certain rides, the user may purchase photos 1462 of his family's recent ride experiences by tapping the handheld device 40 to an unmanned kiosk 88 stationed at the exit. Meanwhile, though the user may not have set an "out-of-office" reply before going to the theme park, the handheld device 40 may automatically set an "out-of-office" reply 1470 when the user entered the park, based on user preferences. Finally, when the day winds down and the family is ready to go, certain special movie releases 1472 may be offered for purchase on the handheld device 40 on the way out. As the user and family drive home, one of the recently-purchased special movie releases 1472 may play in the car.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:
1. A method comprising:
   providing credit to a user for digital content related to an event after a ticket to the event is tapped to a near-field communication interface of an electronic device, wherein the ticket to the event is configured for near field communication and wherein the credit may be exchanged for digital content from an online digital content service.
2. The method of claim 1, wherein the credit is provided after the ticket to the event is tapped to the near field communication interface of the electronic device, wherein the electronic device is a personal device belonging to the user.

3. The method of claim 1, wherein the credit is provided after the ticket to the event is tapped to the near field communication interface of the electronic device, wherein the electronic device is a kiosk located at a venue associated with the event.

4. The method of claim 1, wherein the credit is provided based on data received by the near field communication interface of the electronic device from a radio frequency identification tag of the ticket to the event.

5. The method of claim 1, wherein providing the credit to the user for digital content related to the event comprises providing credit to the user for a digital recording of the event.

6. The method of claim 1, wherein the electronic device comprises a handheld device and the handheld device comprises a portable phone.

7. The method of claim 1, wherein the electronic device comprises a handheld device, the handheld device having a height less than approximately 5.0 inches, a width less than approximately 2.5 inches, and a depth less than approximately 0.5 inches.

8. The method of claim 1, wherein the electronic device comprises a handheld device, the handheld device weighing less than approximately 5.0 ounces.

9. The method of claim 1, wherein the ticket is an electronic ticket stored on a physical ticket and the physical ticket is configured to transmit the electronic ticket to the electronic device after the physical ticket is tapped to the near field communication interface of the electronic device.

10. The method of claim 1, wherein the event comprises a concert.

11. The method of claim 1, wherein the digital content comprises a map of a venue.

12. The method of claim 1, wherein the digital content comprises a song currently being played while the ticket is tapped to the near-field communication interface of the electronic device.

13. The method of claim 1, comprising authenticating that a purchaser of the ticket and an owner of the electronic device are the same entity.

14. The method of claim 1, comprising displaying information from the ticket on a screen of the electronic device.

15. The method of claim 1, wherein the electronic device comprises a handheld device and the handheld device comprises a portable media player.

16. The method of claim 1, wherein the event comprises a musical.

17. The method of claim 1, wherein the event comprises a play.

18. The method of claim 1, wherein the event comprises a symphony.

19. The method of claim 1, wherein the event comprises an opera.

20. The method of claim 1, wherein the event comprises a sporting event.

21. The method of claim 1, wherein the event comprises a school-related event.

22. The method of claim 1, wherein the event comprises a movie showing.

23. The method of claim 1, wherein the event comprises a cruise.

24. The method of claim 1, wherein the event comprises a tour.

25. The method of claim 1, wherein the event comprises a conference.

26. The method of claim 1, wherein the event comprises a wedding.

27. The method of claim 1, wherein the event comprises a wedding reception.

28. The method of claim 1, wherein the event comprises a museum visit.

29. The method of claim 1, wherein the event comprises a theme park visit.

30. The method of claim 1, wherein the digital content comprises a map to a venue.

31. The method of claim 1, wherein the digital content comprises exclusive content associated with a performer associated with the event.

32. The method of claim 1, wherein the digital content comprises a live recording of the event.

33. The method of claim 1, wherein the digital content comprises prepaid studio albums associated with a performer associated with the event.

34. The method of claim 1, wherein the digital content comprises discount studio albums associated with a performer associated with the event.

35. The method of claim 1, wherein the digital content comprises one or more special singles by a performer associated with the event.

36. The method of claim 1, wherein the digital content comprises a coupon for refreshments at the event.

37. The method of claim 1, wherein the digital content comprises a coupon for attire associated with the event.

38. The method of claim 1, wherein the digital content comprises a coupon for parking at the event.

39. The method of claim 1, wherein the digital content comprises a coupon for transportation to the event.

40. The method of claim 1, wherein the digital content comprises an event schedule.

41. The method of claim 1, wherein the digital content comprises song lyrics of a song associated with the event.

42. The method of claim 1, wherein the digital content comprises a calendar reminder for the event.

* * * * *